United States Patent
Pizzi et al.

(10) Patent No.: US 10,677,725 B2
(45) Date of Patent: Jun. 9, 2020

(54) SENSOR DEVICE FOR CONTAINERS OF LIQUID SUBSTANCES

(71) Applicant: ELTEK S.p.A., Casale Monferrato (Alessandria) (IT)

(72) Inventors: Marco Pizzi, Casale Monferrato (IT); Piercarlo Merlano, Casale Monferrato (IT); Fabio Cavalli, Casale Monferrato (IT); Mauro Zorzetto, Casale Monferrato (IT)

(73) Assignee: ELTEK S.p.A., Casale Monferrato (Alessandria) (IT)

( * ) Notice: Subject to any disclaimer, the term of this patent is extended or adjusted under 35 U.S.C. 154(b) by 21 days.

(21) Appl. No.: 16/080,187

(22) PCT Filed: Mar. 1, 2017

(86) PCT No.: PCT/IB2017/051201
§ 371 (c)(1),
(2) Date: Aug. 27, 2018

(87) PCT Pub. No.: WO2017/149475
PCT Pub. Date: Sep. 8, 2017

(65) Prior Publication Data
US 2019/0056321 A1  Feb. 21, 2019

(30) Foreign Application Priority Data
Mar. 4, 2016  (IT) ........................ 102016000022718

(51) Int. Cl.
*G01N 21/43* (2006.01)
*G01F 23/30* (2006.01)
(Continued)

(52) U.S. Cl.
CPC ............ *G01N 21/43* (2013.01); *F01N 11/007* (2013.01); *G01F 23/00* (2013.01); *G01F 23/30* (2013.01);
(Continued)

(58) Field of Classification Search
CPC ................. G01N 21/43; G01N 21/552; G01N 2021/434; G01K 13/02; G01K 1/14;
(Continued)

(56) References Cited

U.S. PATENT DOCUMENTS 9,068,875 B1 * 6/2015 Wirthlin .............. G01F 23/0061
2007/0169544 A1 * 7/2007 Yamamoto ............ G01F 23/268
73/61.41
(Continued)

FOREIGN PATENT DOCUMENTS

DE  10 2011 089703  5/2013
EP  2 937 537  10/2015
(Continued)

OTHER PUBLICATIONS

International Search Report and Written Opinion of the ISA for PCT/IB2017/051201, dated May 29, 2017, 13 pages.

*Primary Examiner* — Hina F Ayub
(74) *Attorney, Agent, or Firm* — Nixon & Vanderhye P.C.

(57) ABSTRACT

A sensor device for a container of a liquid substance comprises a body with a housing portion having a closing structure, the body having an inner surface and an outer surface. The housing portion is pre-arranged for assembly on the container, in such a way that a portion of the outer surface of the body faces the inside of the container to be in contact with the liquid substance, and the inner surface of the body is isolated from the inside of the container. Associated to the body is a first arrangement for detection of the level of the substance.

(Continued)

Associated to the body of the device is a second arrangement for detection of a characteristic of the liquid substance, which comprises an emitter and a receiver of a given optical radiation. A first portion of the body of the device is made of a material designed for propagation of the given optical radiation, the emitter and the receiver being optically coupled to the inner surface of the body at the first portion. The first portion of the body of the device is shaped to contribute to propagation of the given optical radiation from the emitter to the receiver, in such a way that the given optical radiation is propagated through the first portion of the body of the device towards the receiver, at an angle and/or with an intensity that are/is variable as a function of the characteristic of the liquid substance.

20 Claims, 64 Drawing Sheets

(51) Int. Cl.
  *G01N 21/552* (2014.01)
  *G01F 23/00* (2006.01)
  *G01K 1/14* (2006.01)
  *G01K 13/02* (2006.01)
  *F01N 11/00* (2006.01)

(52) U.S. Cl.
  CPC .............. *G01K 1/14* (2013.01); *G01K 13/02* (2013.01); *G01N 21/552* (2013.01); *F01N 2560/14* (2013.01); *F01N 2610/02* (2013.01); *F01N 2610/142* (2013.01); *F01N 2610/1406* (2013.01); *F01N 2900/1814* (2013.01); *F01N 2900/1818* (2013.01); *G01N 2021/434* (2013.01)

(58) Field of Classification Search
  CPC ........ G01F 23/00; G01F 23/30; F01N 11/007; F01N 2610/142; F01N 2900/1818; F01N 2900/1814; F01N 2560/14; F01N 2610/1406; F01N 2610/02
  See application file for complete search history.

(56) References Cited

U.S. PATENT DOCUMENTS

| | | | |
|---|---|---|---|
| 2009/0153846 A1* | 6/2009 | Gan | G01F 23/292 356/133 |
| 2010/0084558 A1 | 4/2010 | Wang et al. | |
| 2011/0155262 A1* | 6/2011 | Ante | G01F 23/263 137/341 |
| 2012/0186334 A1* | 7/2012 | Steinhauser | G01N 27/123 73/61.76 |
| 2014/0132951 A1 | 5/2014 | Georis | |
| 2015/0337708 A1* | 11/2015 | Schlenke | G01M 15/102 73/61.59 |

FOREIGN PATENT DOCUMENTS

| | | |
|---|---|---|
| WO | 2010/151327 | 12/2010 |
| WO | 2013/064961 | 5/2013 |

* cited by examiner

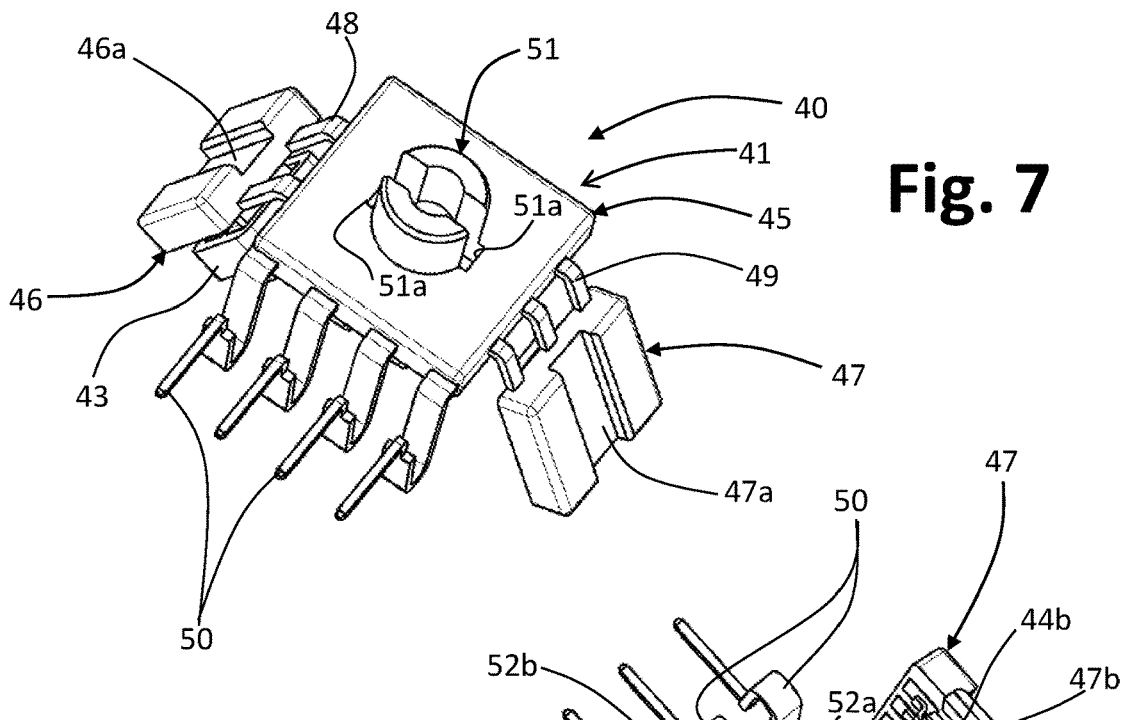
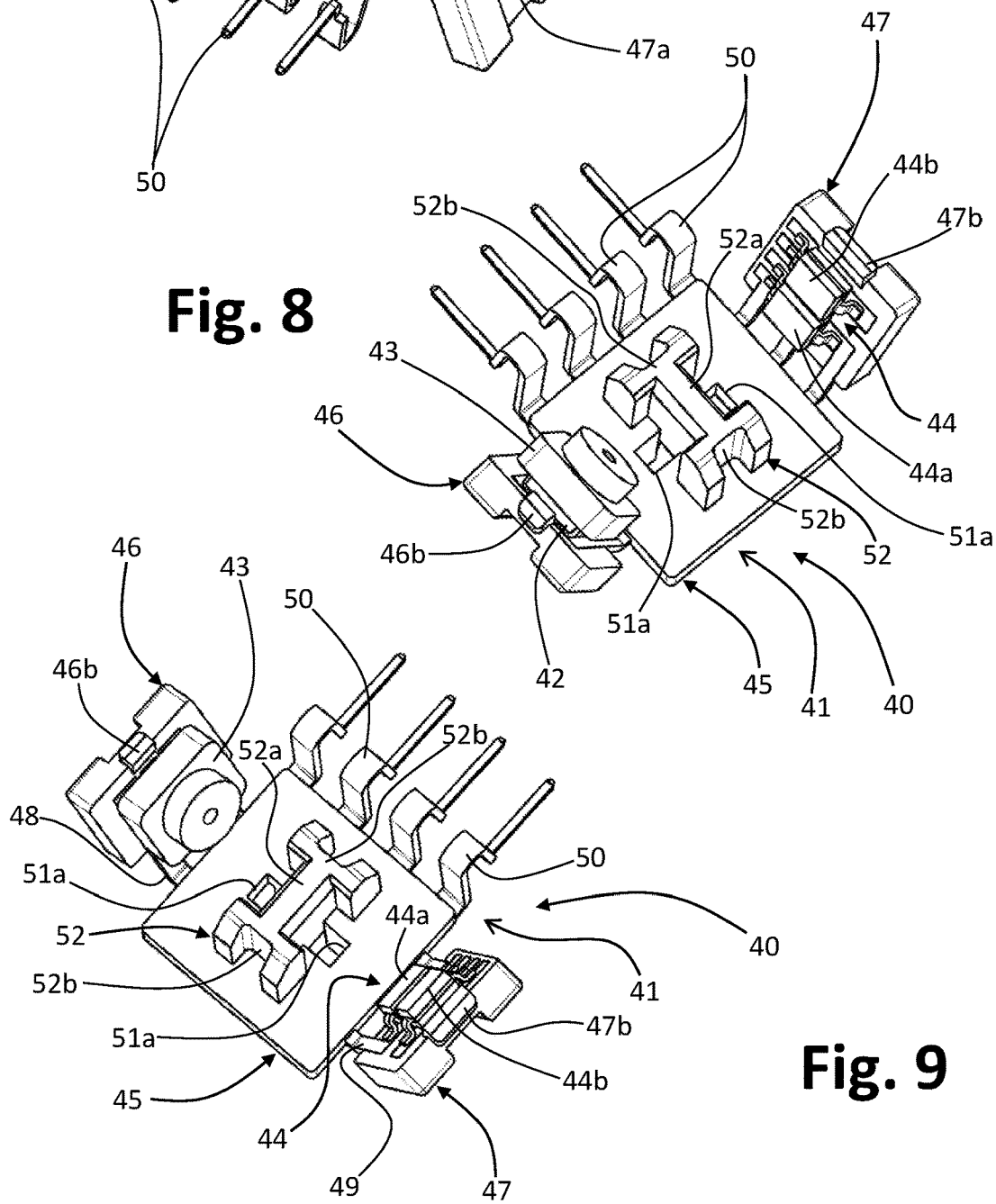

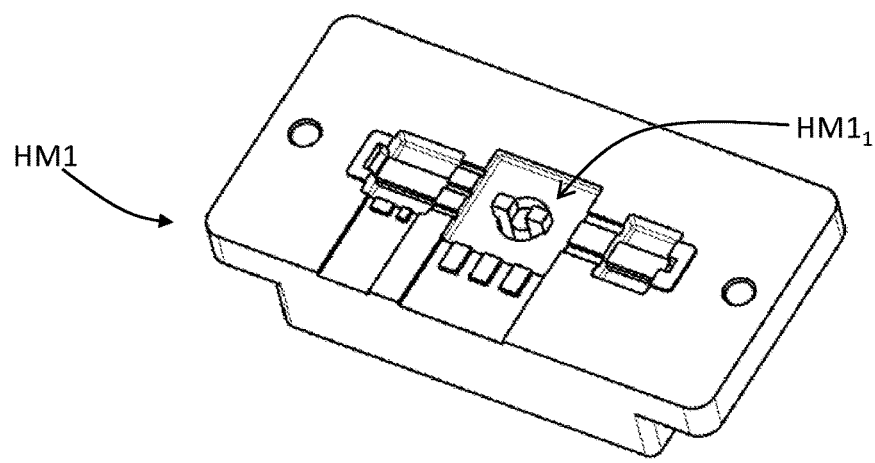
Fig. 16
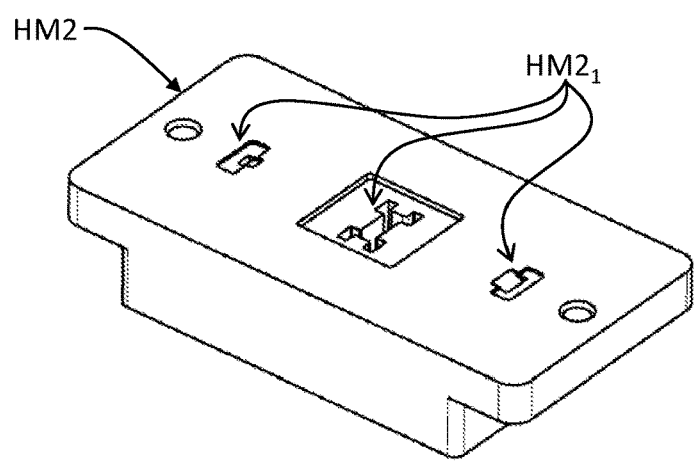
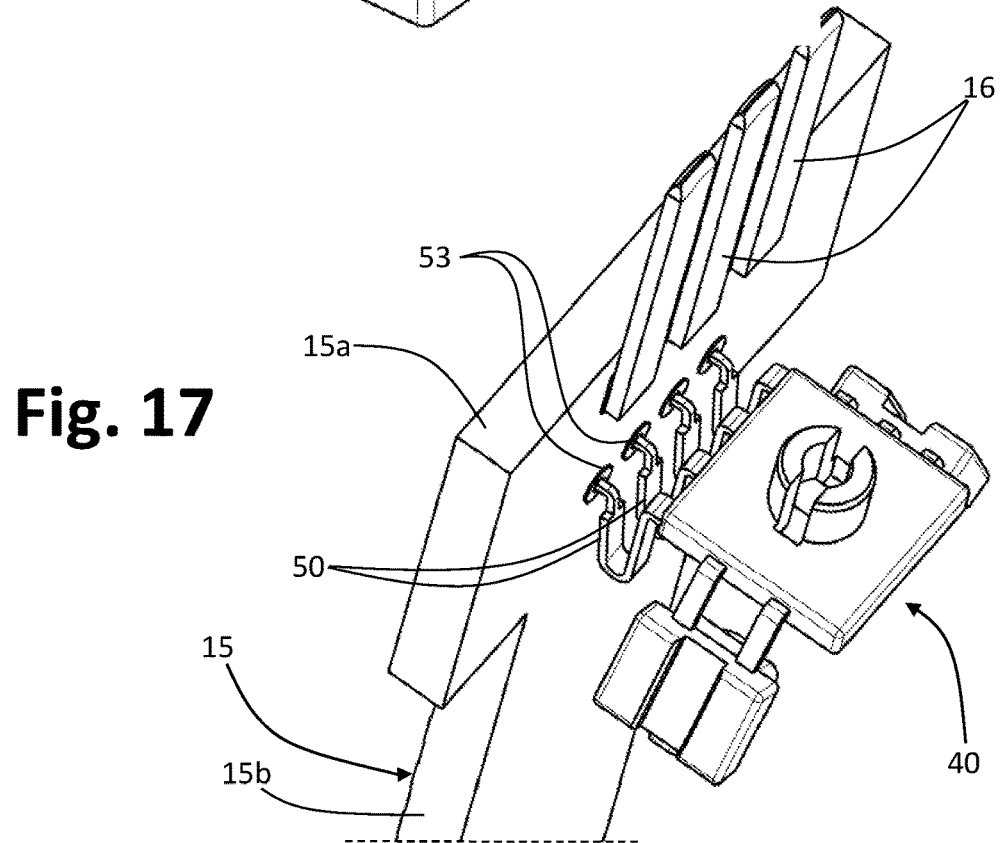
Fig. 17

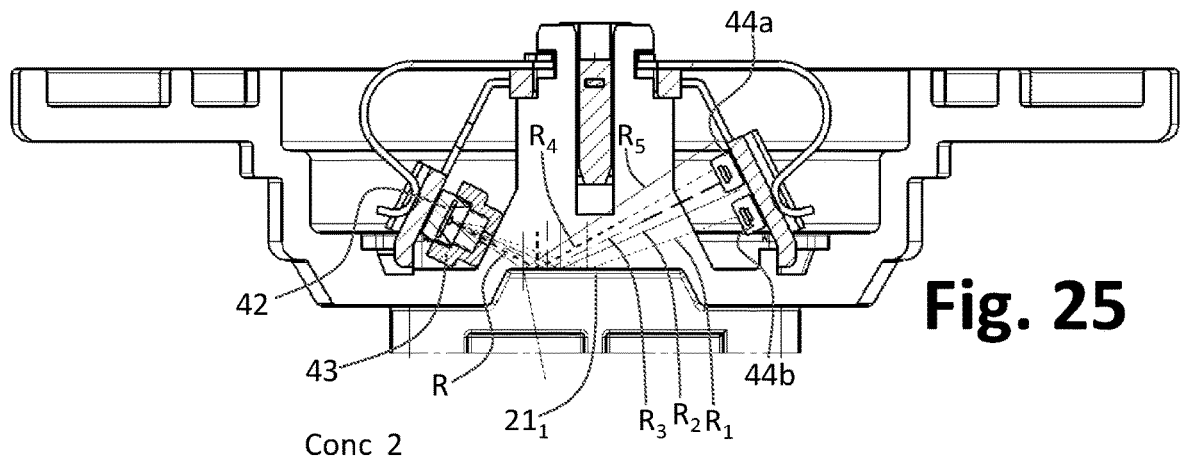
Fig. 25
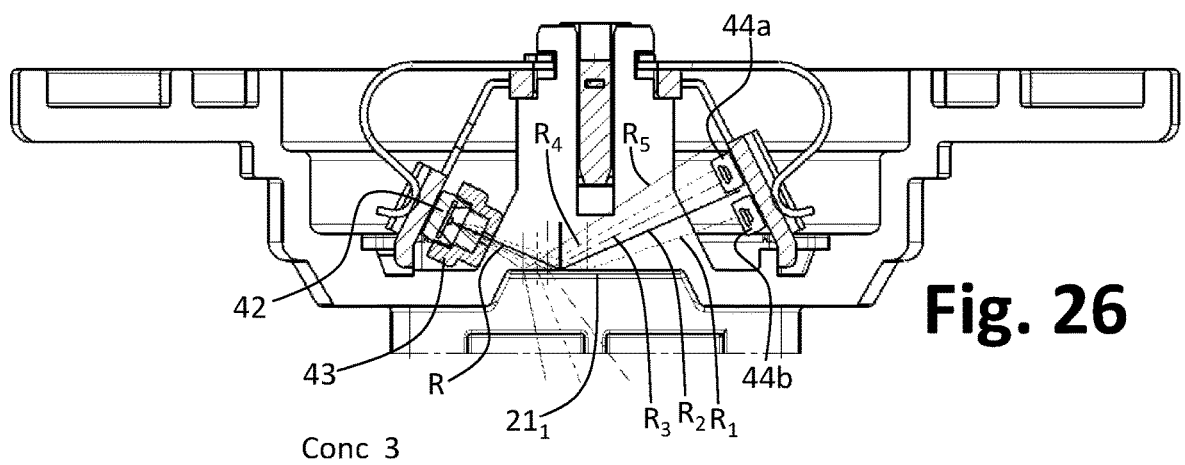
Fig. 26
Fig. 27
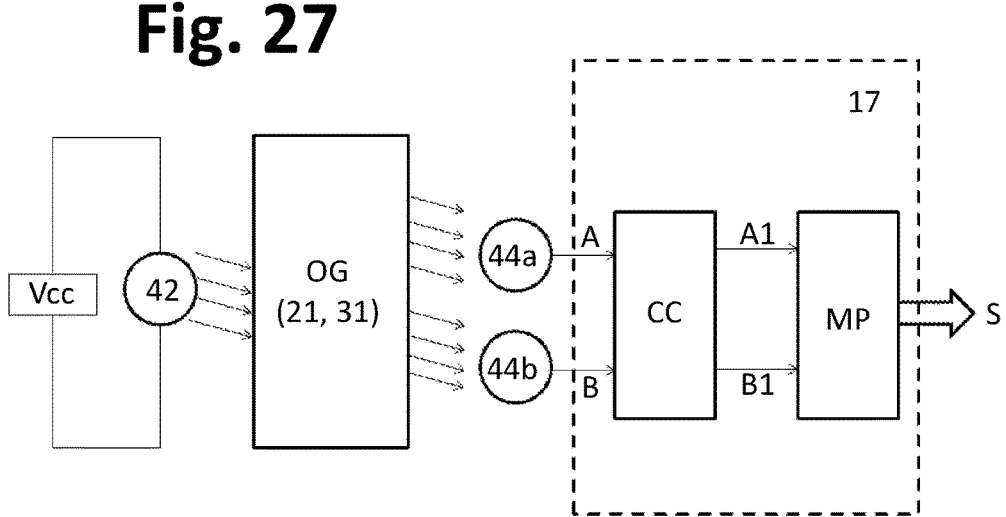

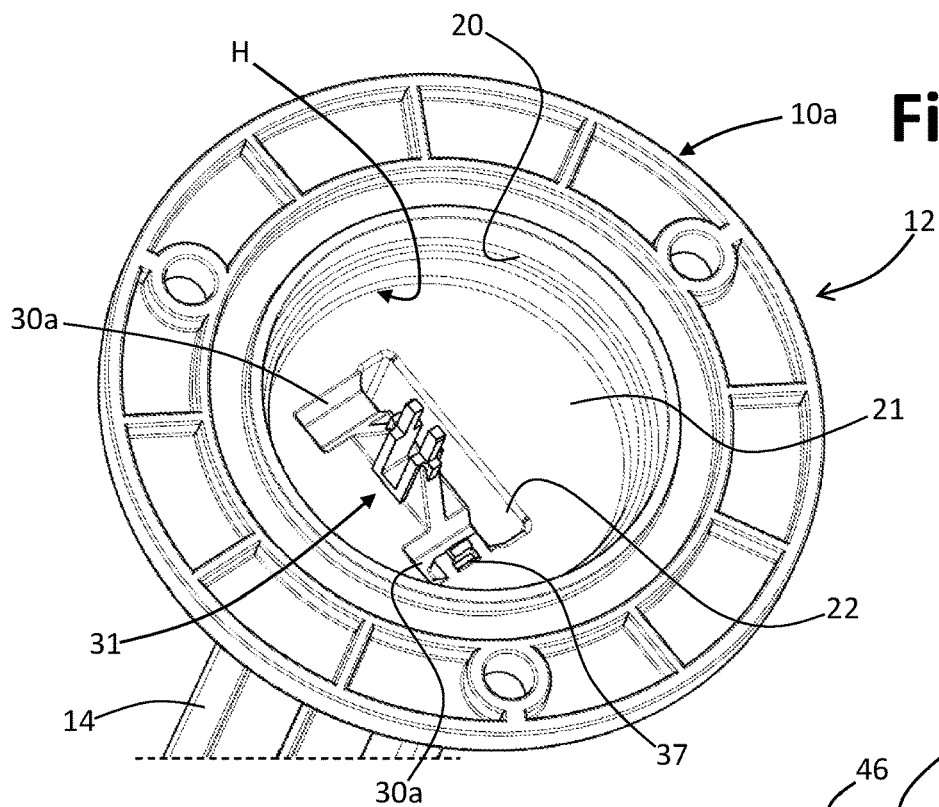
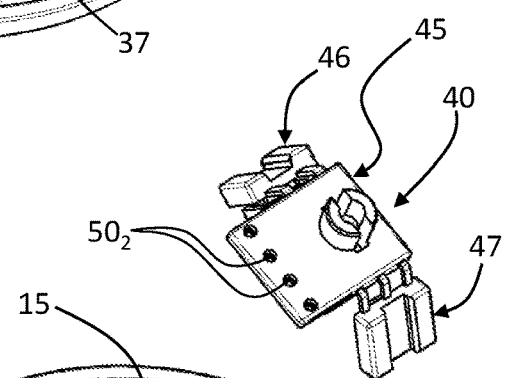
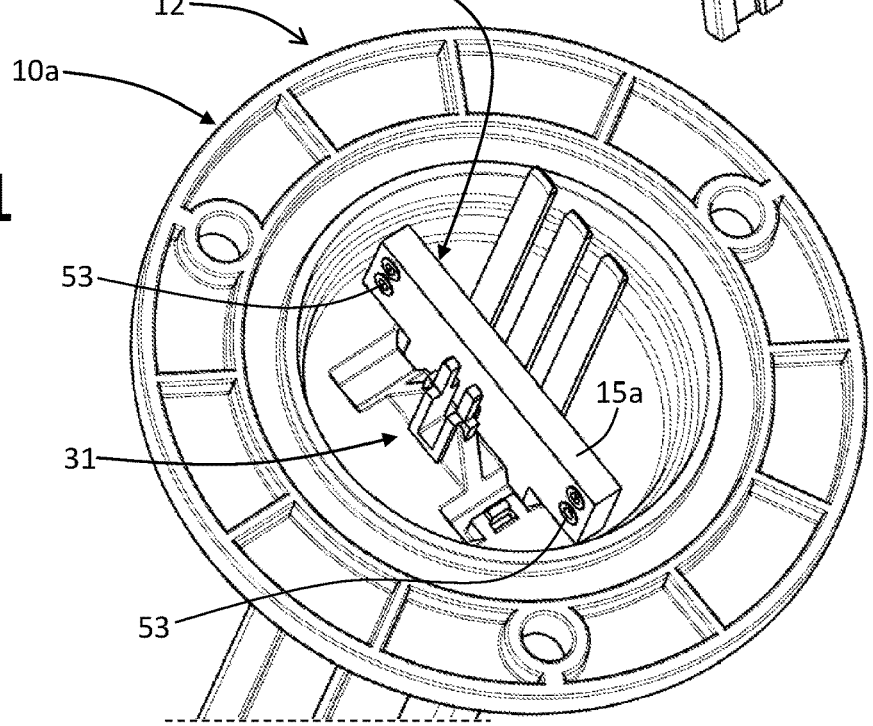

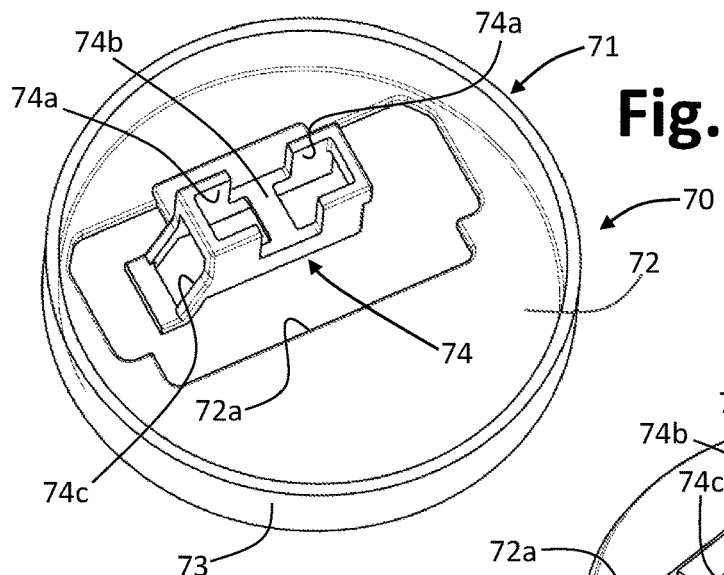
Fig. 35
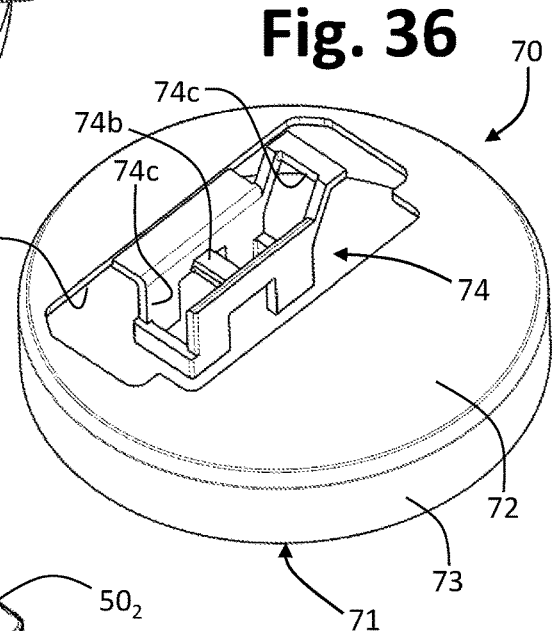
Fig. 36
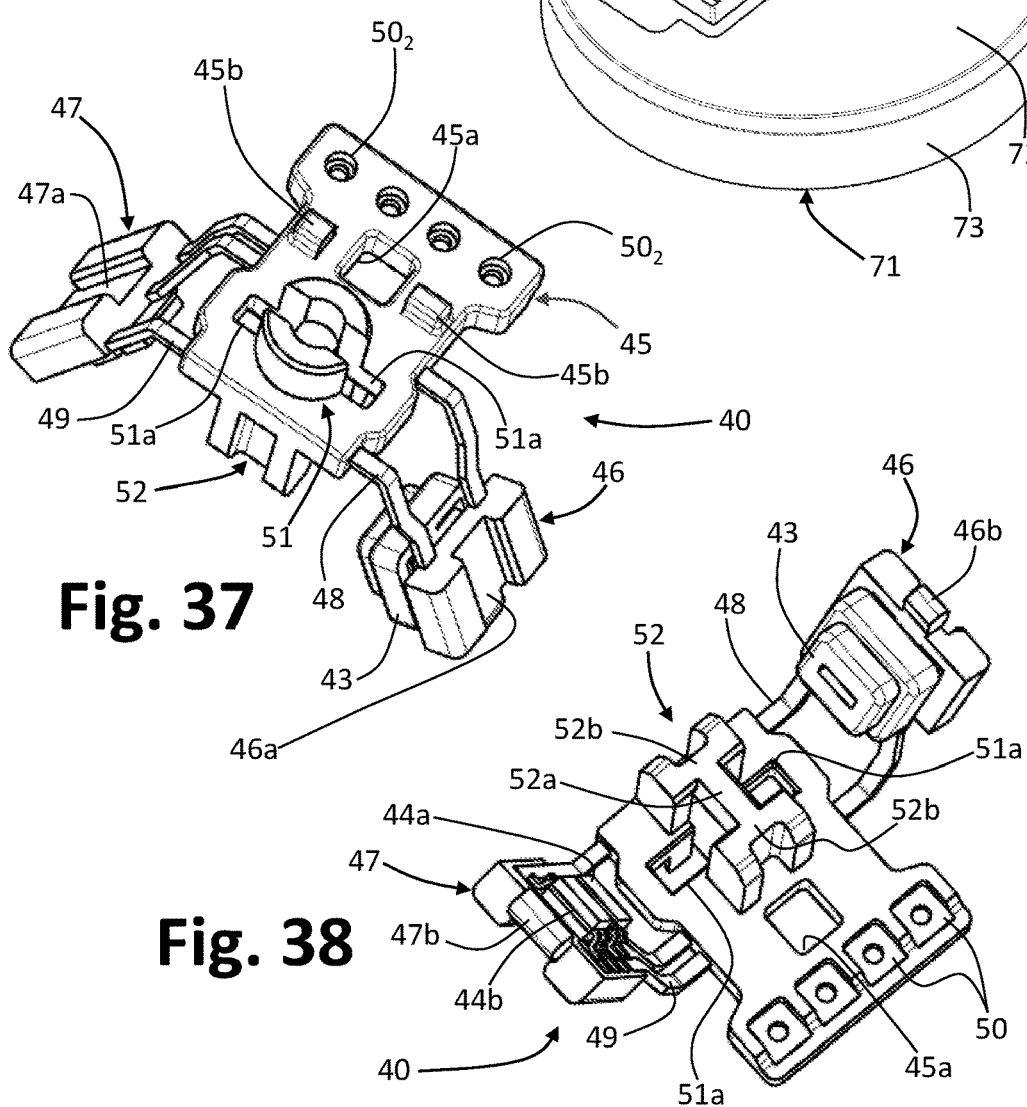
Fig. 37
Fig. 38

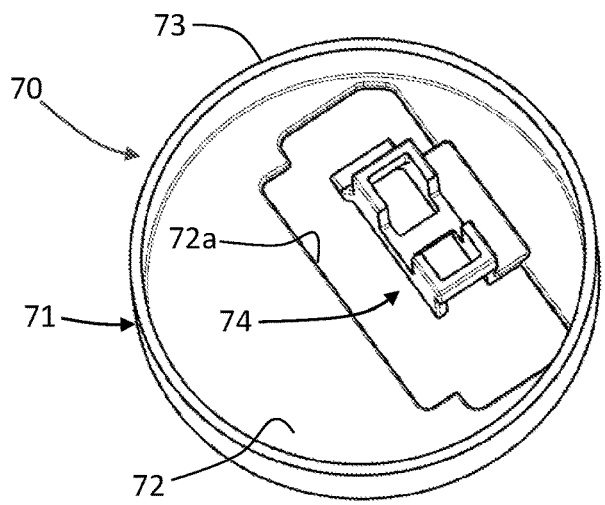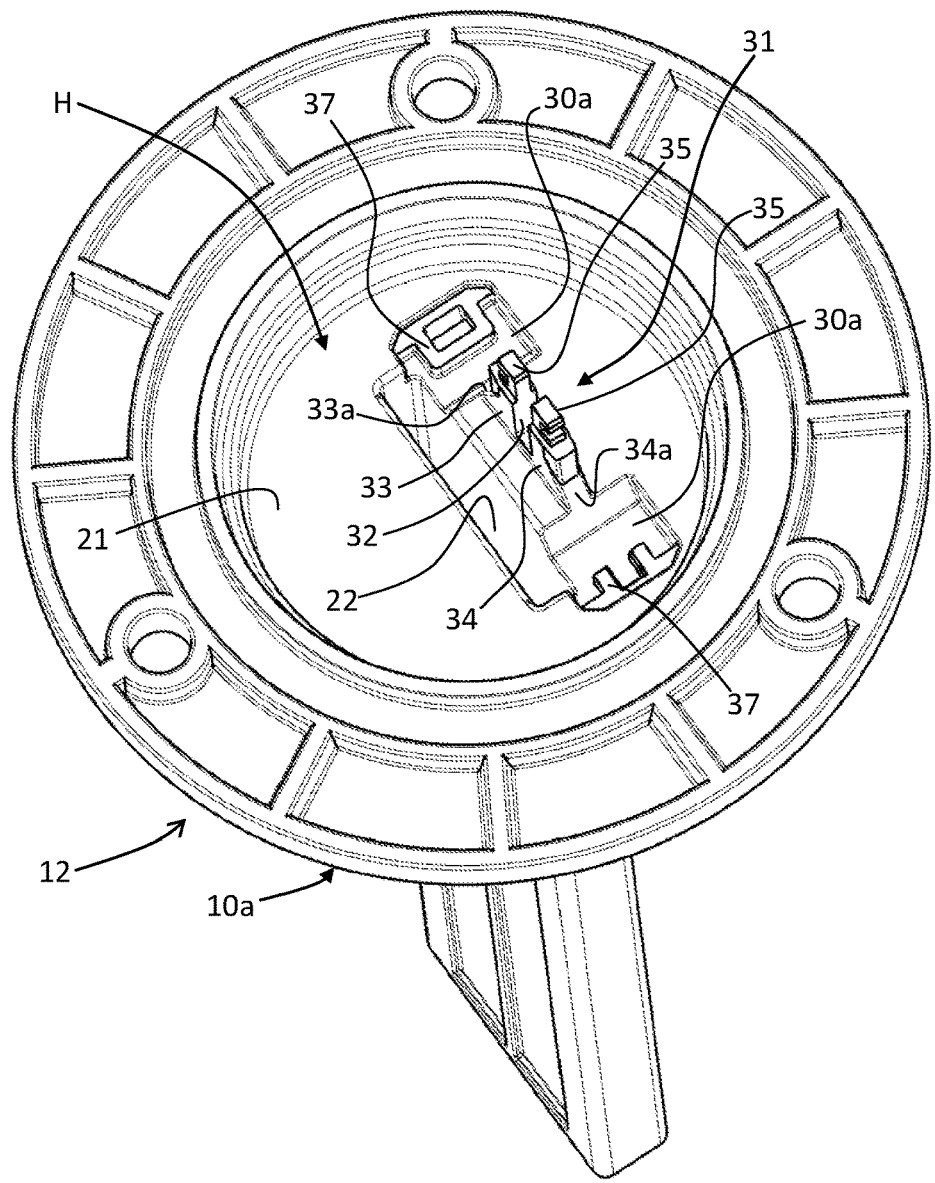
Fig. 39

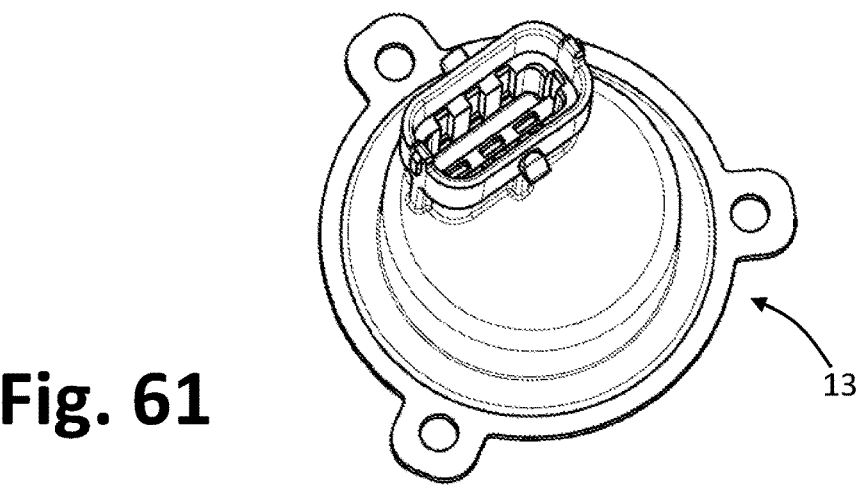
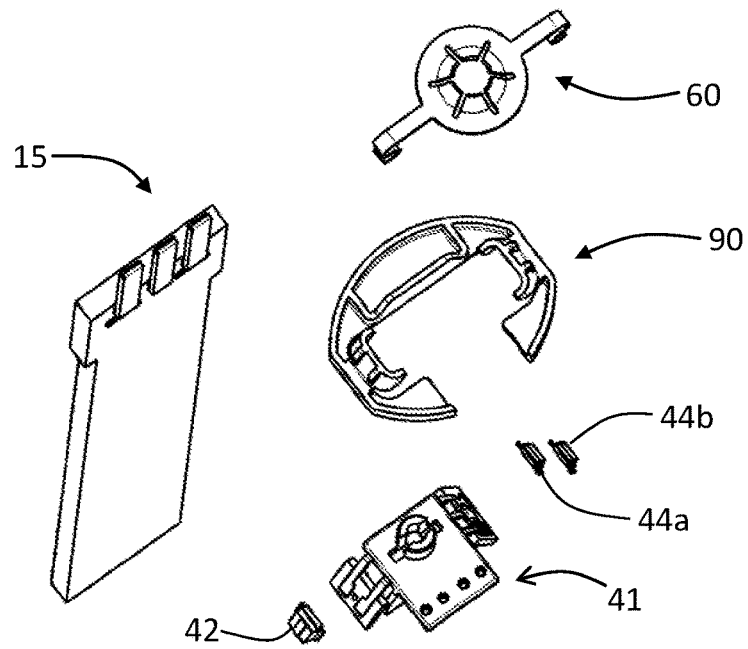
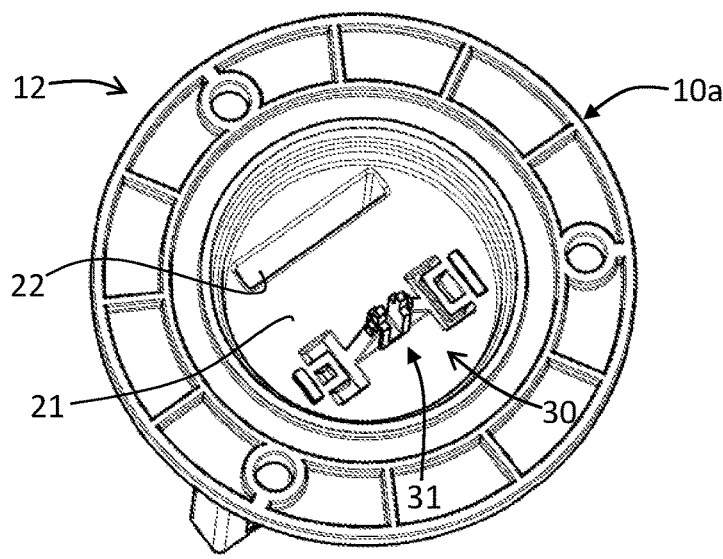
Fig. 61

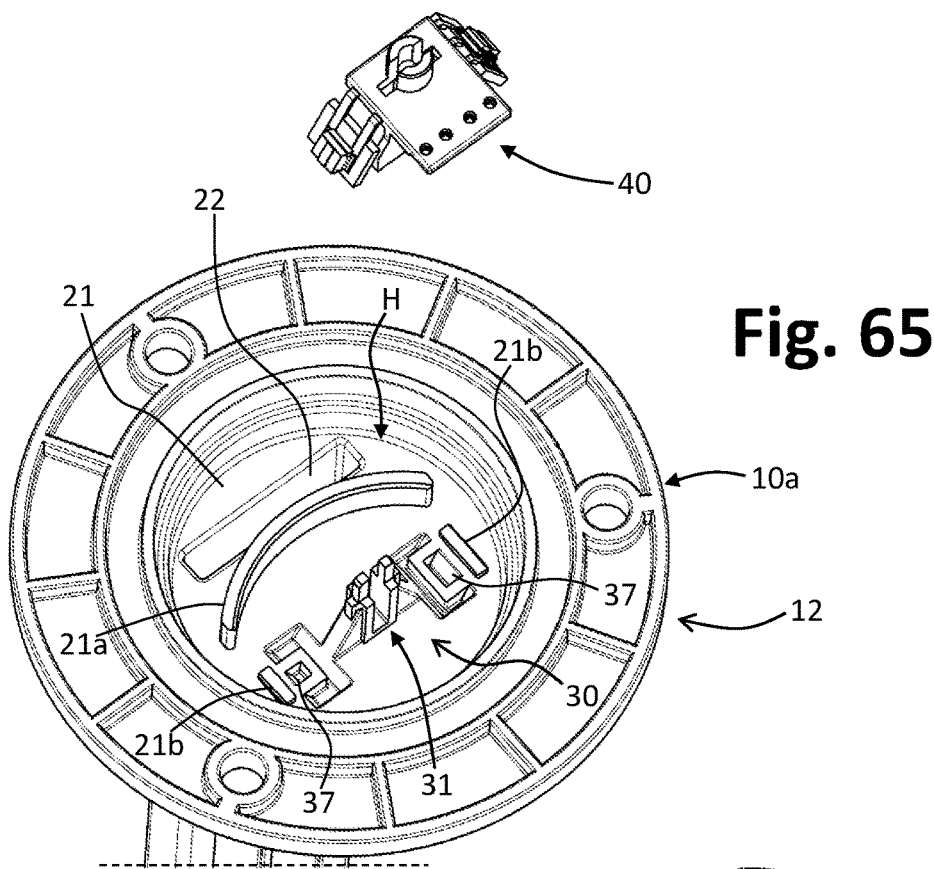
Fig. 65
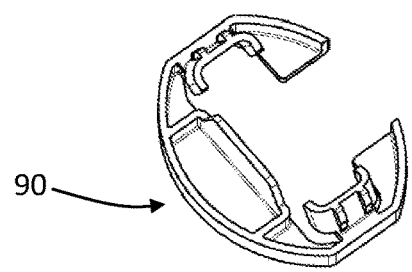
Fig. 66
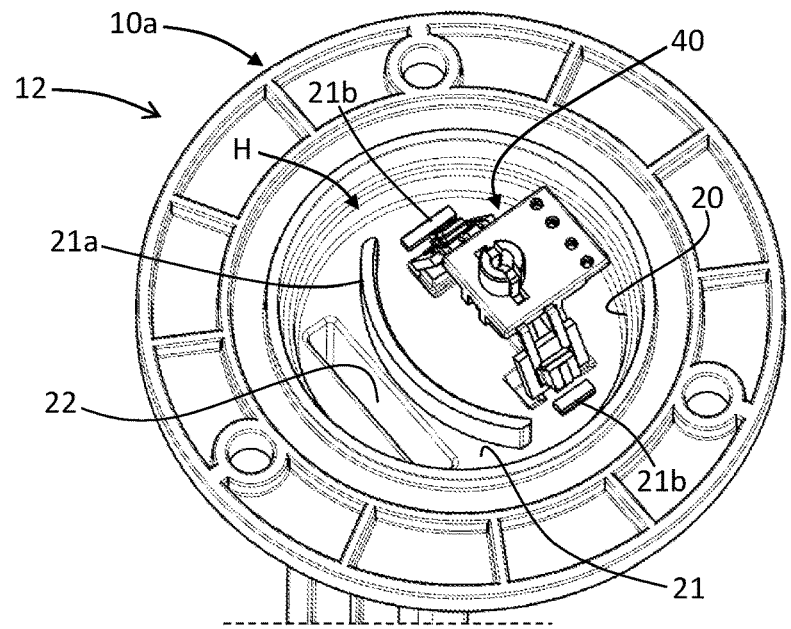

Fig. 74
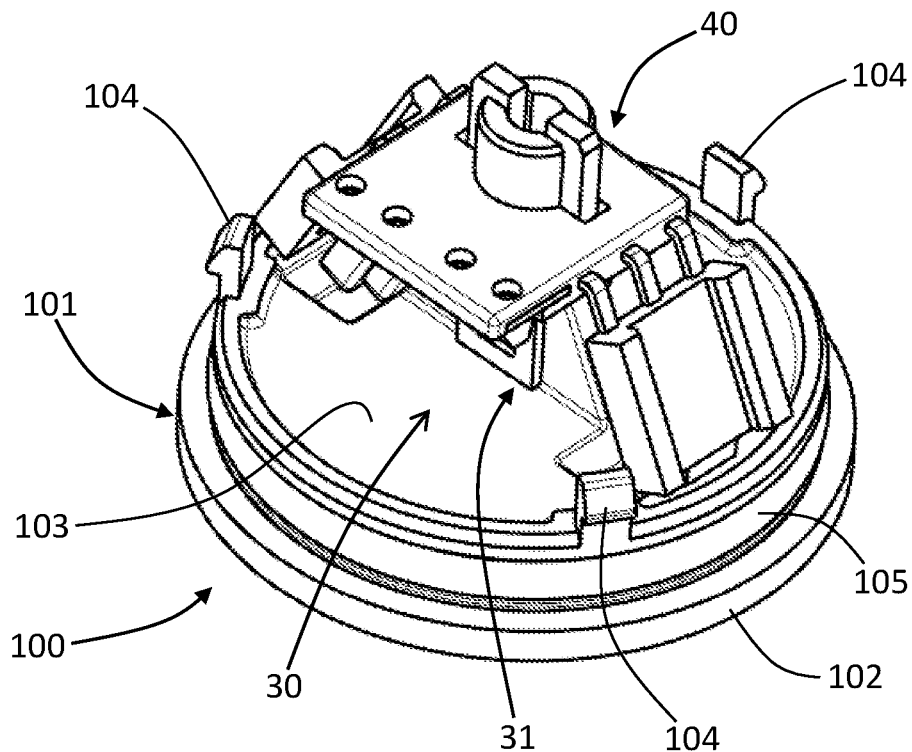
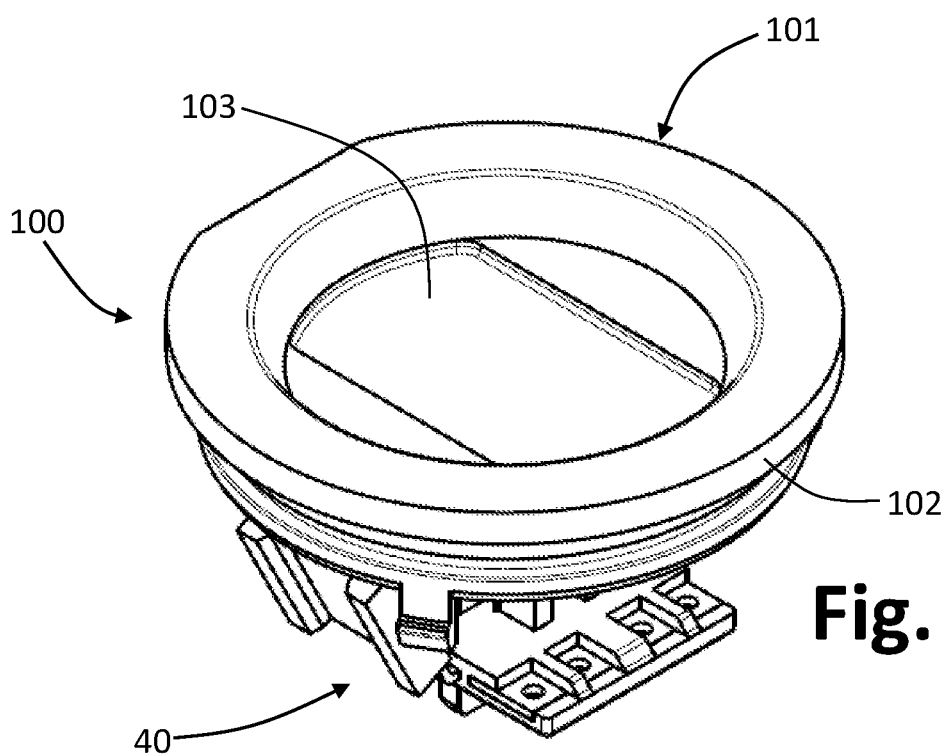
Fig. 75

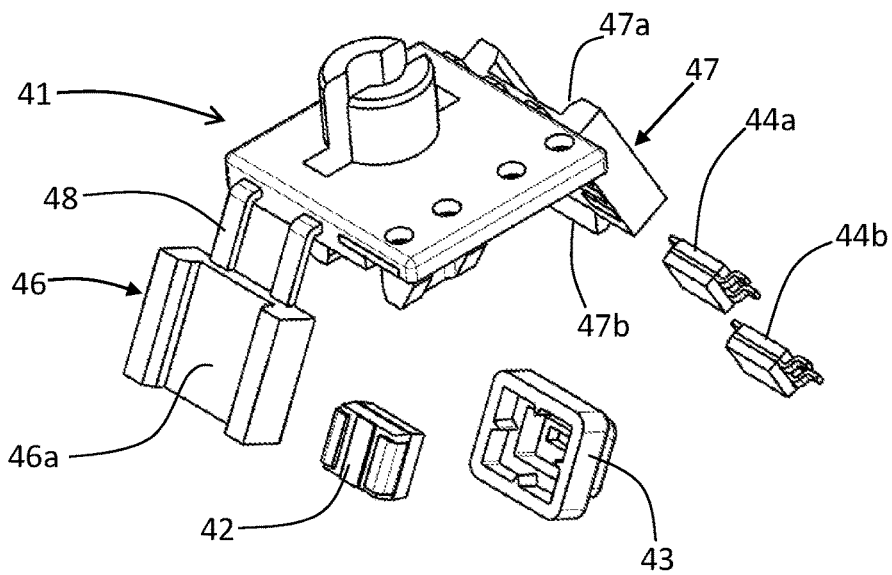
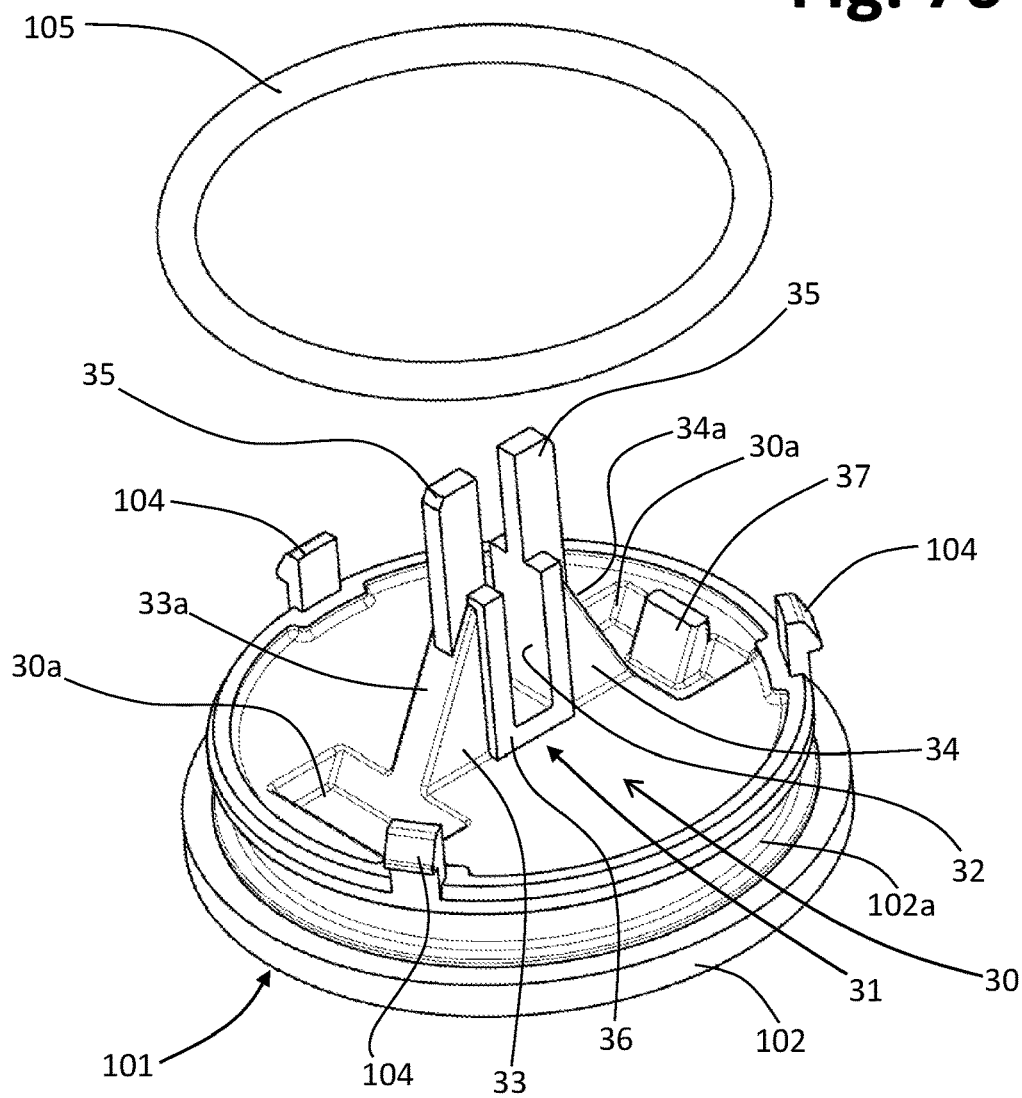
Fig. 76

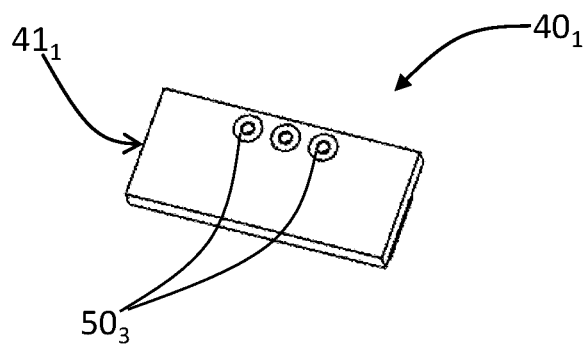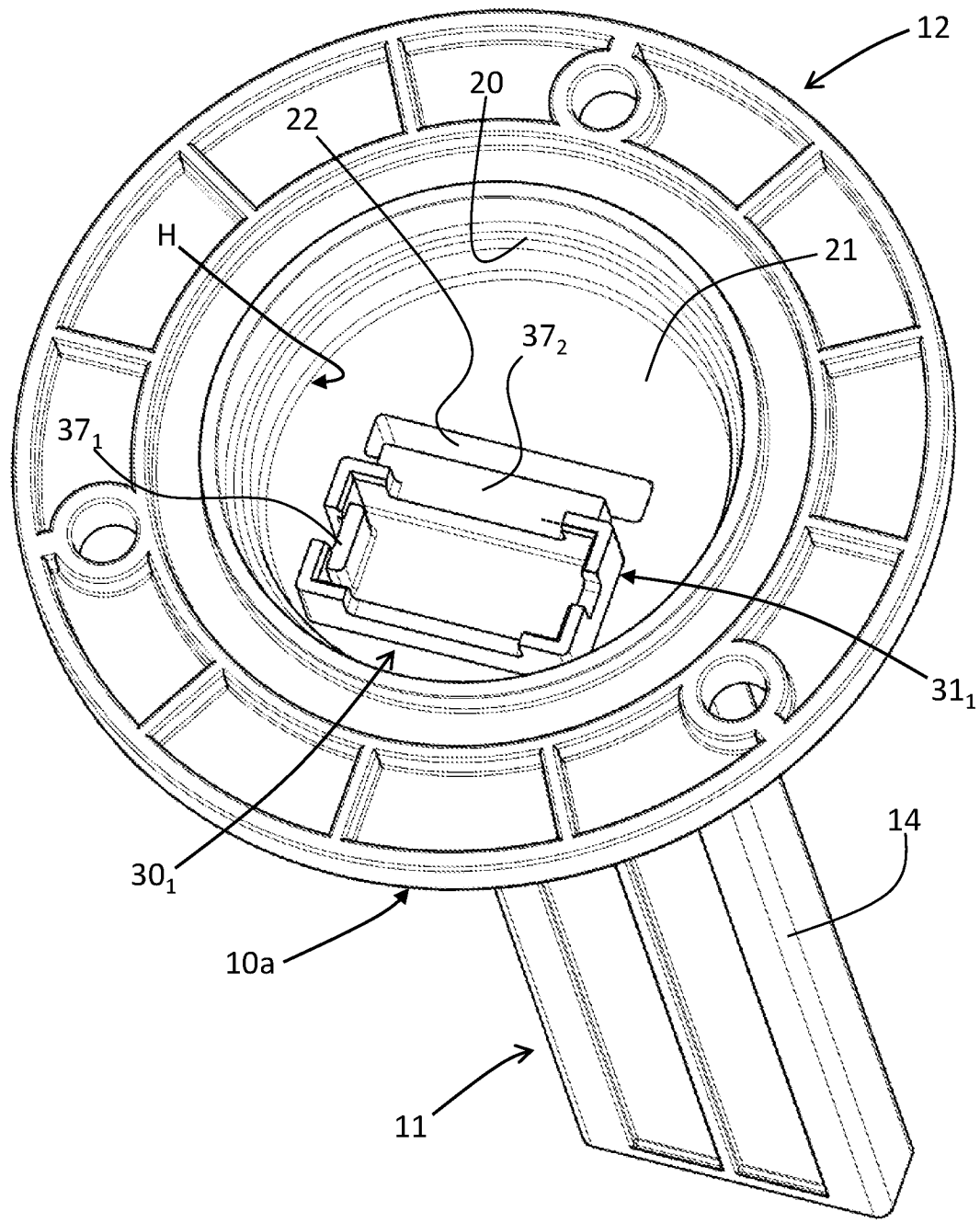
Fig. 81

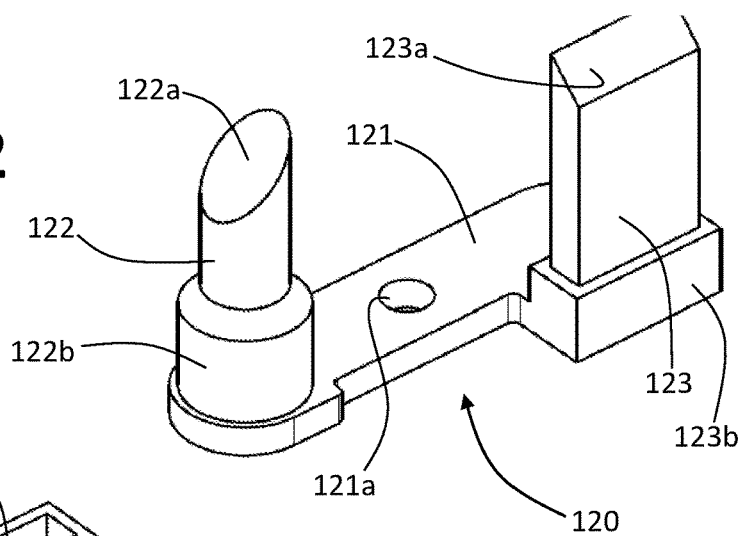
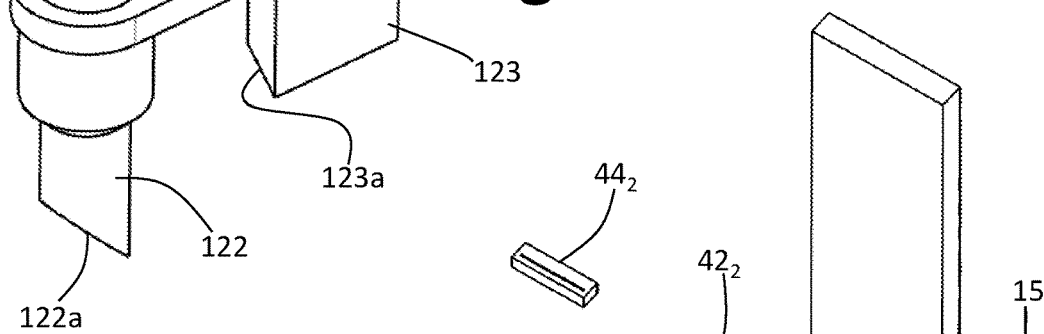
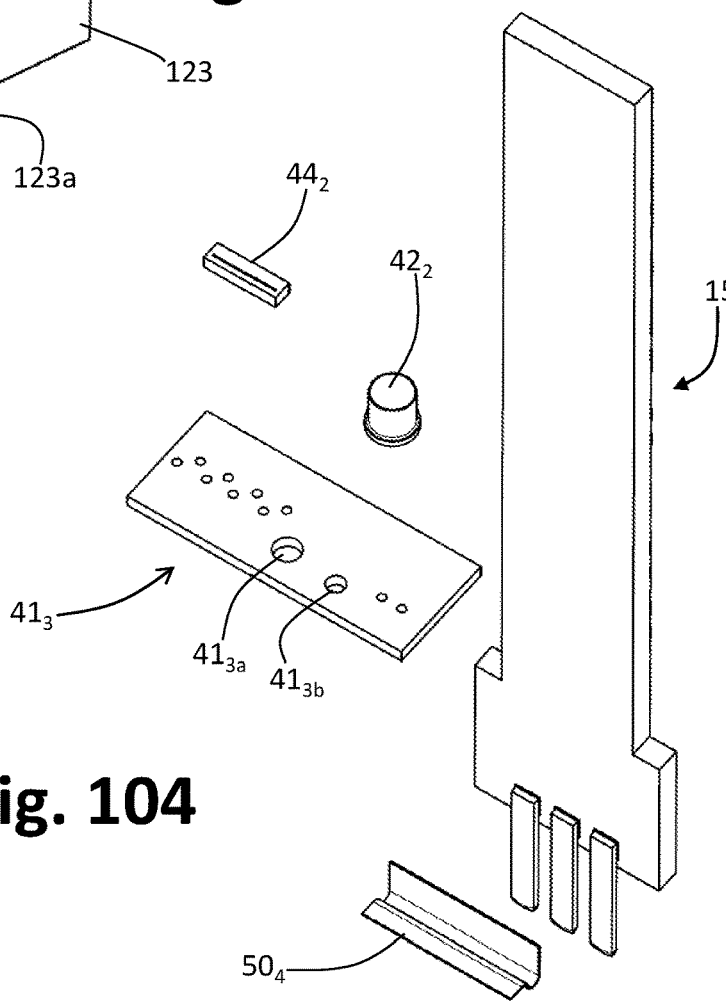
Fig. 102
Fig. 103
Fig. 104

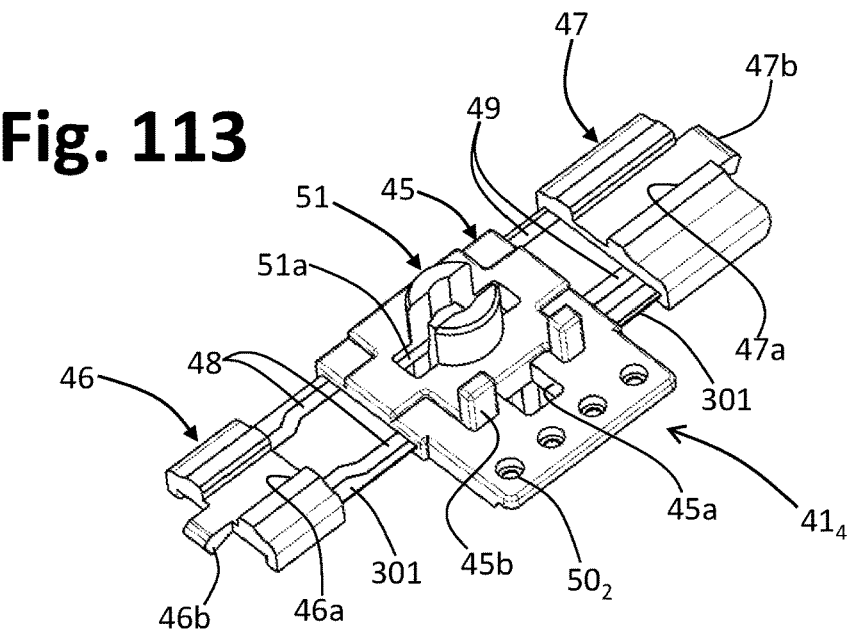
Fig. 113
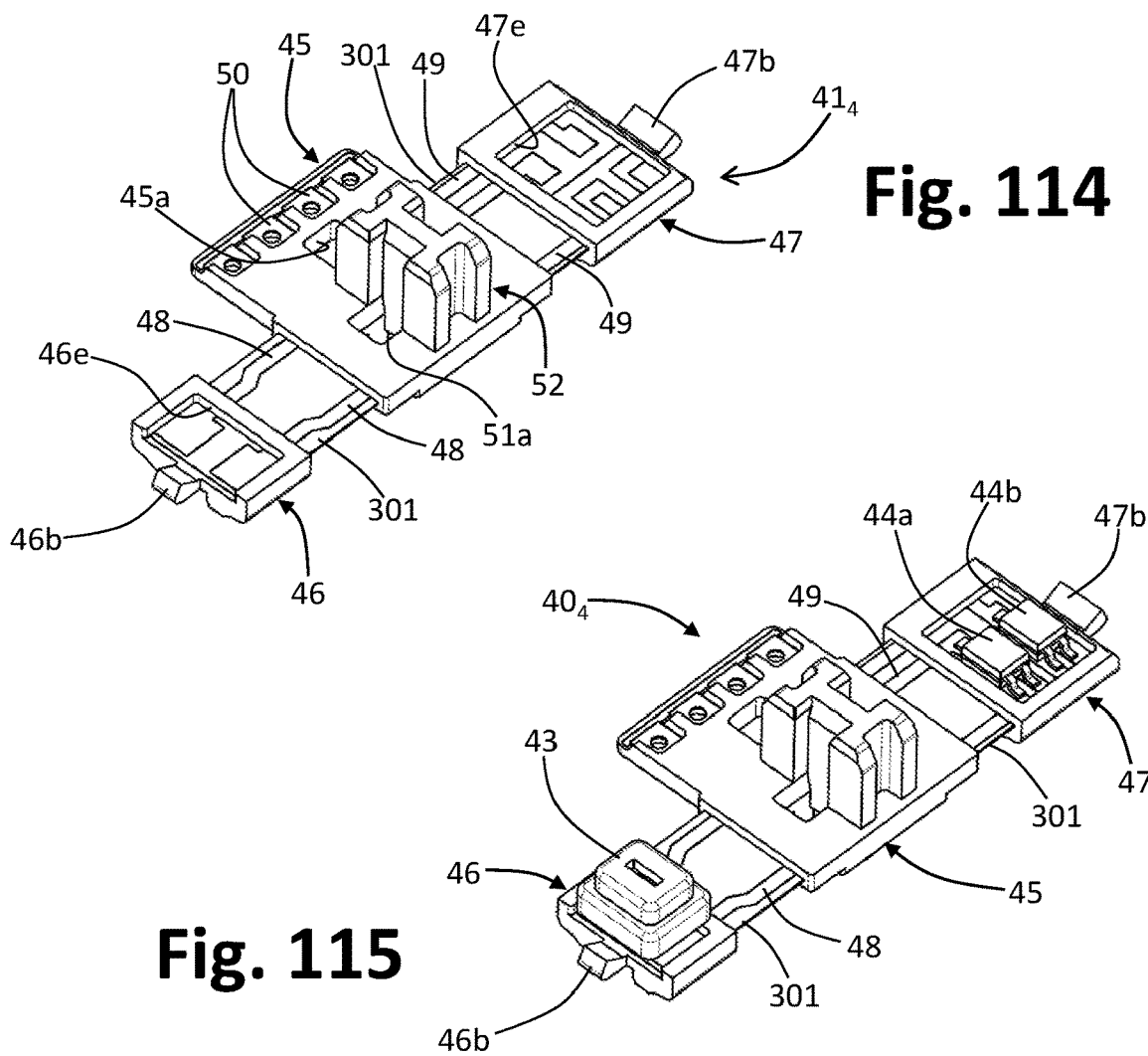
Fig. 114
Fig. 115

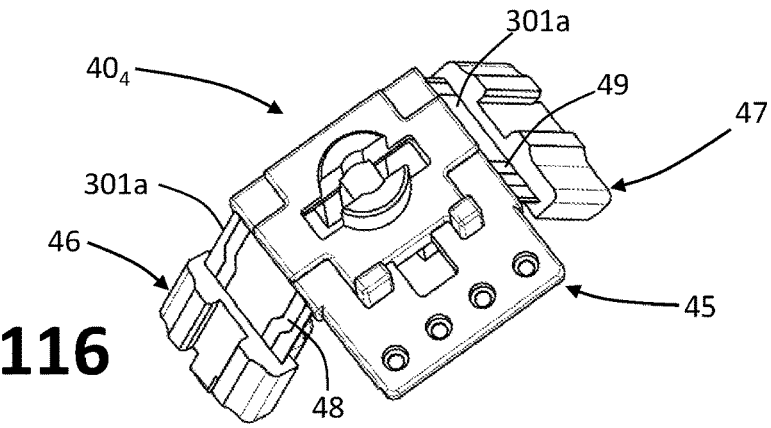
Fig. 116
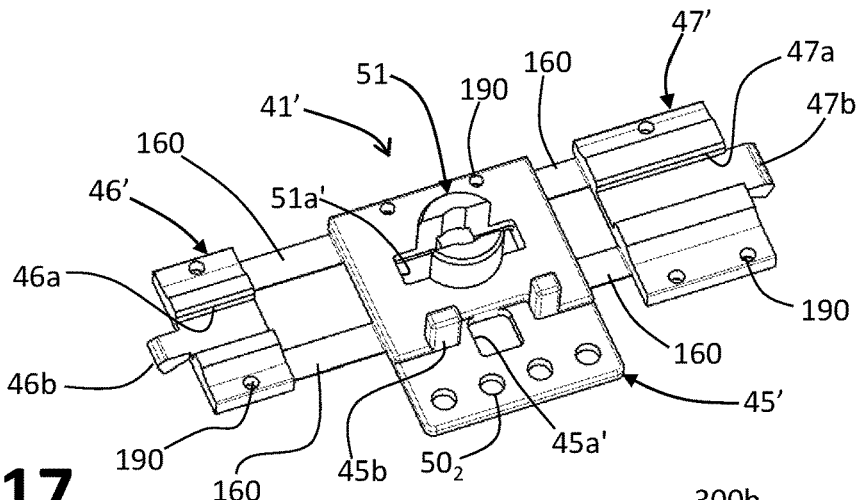
Fig. 117
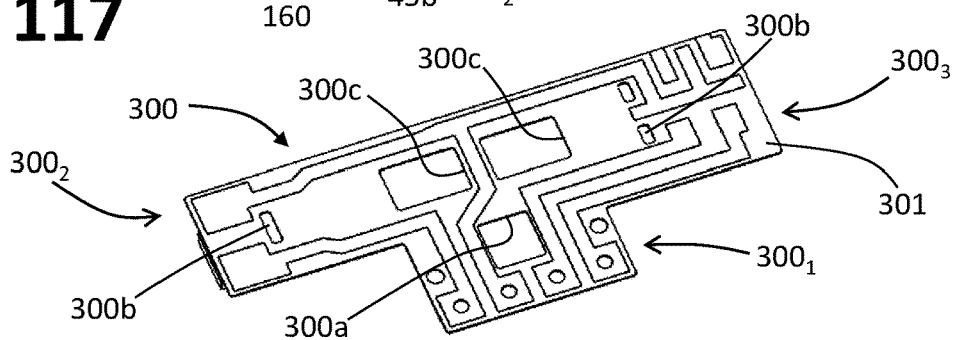
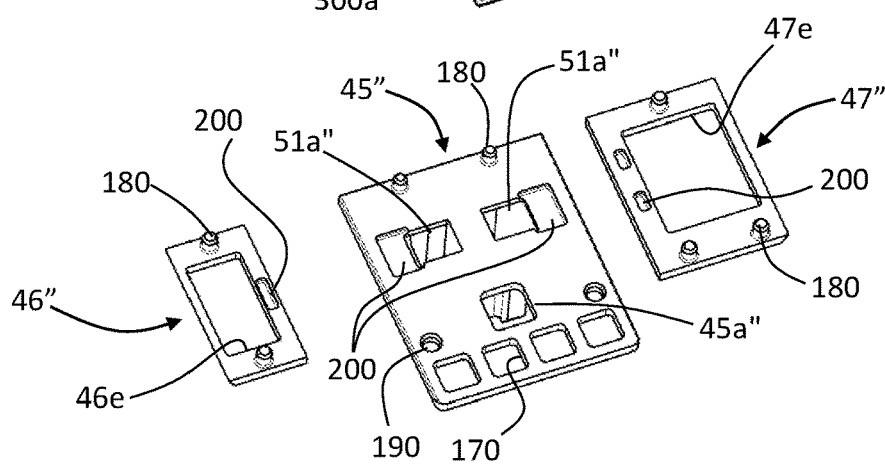

SENSOR DEVICE FOR CONTAINERS OF LIQUID SUBSTANCES

This application is the U.S. national phase of International Application No. PCT/IB2017/051201 filed 1 Mar. 2017, which designated the U.S. and claims priority to IT Patent Application No. 102016000022718 filed 4 Mar. 2016, the entire contents of each of which are hereby incorporated by reference.

FIELD OF THE INVENTION

The present invention relates to sensor devices used in combination with generic containers designed to contain a liquid substance, and has been developed with particular reference to a device prearranged for measurement of the level of a liquid substance within a corresponding container.

The invention finds a preferred application in the vehicle sector or in the sector of systems in general that are equipped with internal-combustion, or endothermic, engines, in particular in combination with tanks designed to contain a substance, such as a fuel or else a liquid solution necessary for operation of an exhaust-gas treatment system of an internal-combustion engine.

PRIOR ART

For the purposes of checking substances contained in generic containers it is common to use sensors of characteristics such as level, temperature, quality, etc. A typical example is represented by tanks containing liquid substances, which belong to exhaust-gas emission systems of some types of vehicles, devised for the purposes of reduction of release of nitrogen oxides (NOx) into the atmosphere. A particularly widespread system for this purpose is based upon the process known as SCR (Selective Catalytic Reduction), which enables reduction of nitrogen oxides of the gases via injection of a reducing liquid substance into the exhaust line. These treatment systems presuppose that the reducing agent is dosed and injected into the flow of the exhaust gases in order to convert nitrogen oxide (NOx) into nitrogen ($N_2$) and water ($H_2O$). The reducing substance is typically constituted by a solution of water and urea.

Proper operation of these systems presupposes that the corresponding control unit recognises the presence of the reducing substance within the tank, in particular measuring the level thereof and warning of the possible need for topping up. Information useful for managing these systems regard other characteristics of the reducing substance, such as characteristics linked to its composition or temperature.

For instance, WO 2010/151327 describes a tank for a reducing substance, mounted on which is a level sensor, configured for generating a radiofrequency signal in a resonant circuit and for propagating the resulting electromagnetic radiation in the substance, as well as for detecting changes in the impedance and resonance of the aforesaid circuit, where such changes are considered as being representative of changes in the conductivity and dielectric properties of the substance that are proportional to the amount of the substance, i.e., its level. The level sensor may be provided with capacitive and/or resistive probes for detecting the quality of the substance. On a side wall of the tank there may possibly be mounted a further sensor of an electro-optical type, designed to detect other characteristics of the substance. This further optical sensor is submerged by the substance when the latter has a sufficient level in the tank. An emitter directs a light beam towards a prism, which constitutes a tip of the sensor and is configured for refracting the radiation into the liquid, the reflected light being detected by a receiver. The reflected light is considered directly proportional to the refractive index of the substance, which makes it possible to determine whether the substance contained is water or a solution of urea, and to determine the concentration of the solution.

Solutions of this type are generally complicated and entail the need to install on the tank a plurality of sensors, which must then be interfaced to a control unit external to the sensors, with consequent complications of production and the need for multiple connections and wiring.

OBJECT AND SUMMARY OF THE INVENTION

The aim of the present invention is basically to overcome the drawbacks highlighted above, in a simple, economically advantageous, and reliable way.

The above and other aims, which will emerge more clearly hereinafter, are achieved according to the present invention by a sensor device having the characteristics specified in the annexed claims. The claims form an integral part of the technical teaching provided herein in relation to the invention.

Integrated in a sensor device according to the invention are a plurality of detection arrangements of various types, comprising at least a level-sensing arrangement and an optical arrangement for detection of one or more characteristics of the substance, and possibly also a temperature-sensing arrangement, with these arrangements that are operatively associated to one and the same casing or assembly body. The device according to the invention hence makes it possible to achieve important benefits over known solutions, where there must be associated to the container of the substance being checked a plurality of different sensor devices, in particular in the case where it is preferable to use at least one sensor of an optical type. In this way, moreover, the various detection arrangements of the device may also have at least part of the corresponding control and connection circuitries in common, such as a control circuitry of the level-sensing arrangement and of the optical-sensing arrangement, thus facilitating and also speeding up interfacing of these arrangements to corresponding control systems, such as a control unit on board a vehicle. For this purpose, the device may even include just a single connector, for carrying the signals outside. The temperature-sensing arrangement, when present, makes it possible, if need be, to compensate both detections made via the level-sensing arrangement and detections made via the optical arrangement.

Thanks to the invention, the sensor device can have a very compact structure, with overall dimensions that are of the same order as those of level-sensing sensor devices of a known type. This means that, if need be, a sensor device according to the invention can be installed instead of a traditional level sensor, affording with respect to the latter additional functions, linked to the detections that can be made by the optical sensor. For this purpose, for example, a simple update of the program or software of the control system, to which the device is to be connected, for example a control unit on board the vehicle, may be sufficient.

According to a preferential embodiment, such as the one referred to in claim 2, a receiver and an emitter of optical radiation of the optical arrangement are integrated in an optical module, which is configured as component distinct from the main body of the device. In this way, the optical module can be easily pre-assembled and subsequently mounted in the main body of the device and electrically connected in a simple, fast, and automatable way.

According to a preferential embodiment, such as the one referred to in claim 3, the main body of the device is shaped to define a positioning site that guarantees maintenance of the correct operating position of the aforesaid emitter and receiver, to the advantage of ease and precision of assembly, as well as precision of detection. This is particularly advantageous in the event of use of the aforesaid module that integrates the emitter and the receiver.

According to a preferential embodiment, such as the one referred to in claim 4, an optical module as the one that includes at least one emitter and one receiver of optical radiation can be secured in position in a simple and fast way, preferably via a single fixing member or a fast-coupling element, in particular exploiting one or more elements of the aforesaid positioning site. Very advantageously, according to preferential embodiments, such as the ones referred to in claim 5, these elements may be optical elements used also for propagation of optical radiation, in particular in the form of optical prisms.

According to preferential embodiments, such as the ones referred to in claims 6, 15, and 16, and as already mentioned, the sensing arrangements can share circuit elements, such as a circuit support, as well as electrical and/or electronic components mounted on the support or connected thereto, such as a microcontroller or the terminals of a connector, or again a common connector.

The level-sensing arrangement of the device according to a preferential embodiment, such as the one referred to in claim 7, is provided with a very compact sensing part, to the advantage of reduction of the overall dimensions. Likewise compact is hence also a casing designed to contain the sensing part, which is to project towards the inside of the container of the substance being checked.

The shielding means provided according to preferential embodiments, such as the ones referred to in claim 8, prevent any undesired optical radiation from possibly adversely affecting the precision and quality of the detections made via the optical arrangement. For instance, a shielding element may be used for preventing part of the optical radiation emitted by the emitter from possibly reaching the receiver directly, without contributing to detection of the characteristic of interest and instead adversely affecting the aforesaid detection. Advantageously, this shielding element may belong to the optical module, to further advantage of compactness and ease of assembly, this element being able, if need be, also to be exploited for purposes of positioning of the module itself. Likewise, an optical shield may be used for eliminating or minimising the negative effects that ambient light could cause in the course of optical sensing. This characteristic is particularly advantageous when the body of the device, or at least a housing portion thereof, is made at least in part of a transparent material or material permeable to ambient light.

In a sensor device according to a preferential embodiment, such as the one referred to in claim 9, a body or casing of the sensor device comprises a first body provided with a seat or through opening, and a second body that is located in a position corresponding to said seat or through opening, where at least one of the first body and the second body includes a portion made of material designed for propagation of operating optical radiation of the device. Advantageously, in this way, the body or casing of the sensor device may be made up of a number of parts, using for the purpose different materials deemed most convenient from the functional standpoint, as explained hereinafter. For instance, in various embodiments, such as the one referred to in claim 10, an optical assembly including the emitter, the receiver, and a part of body through which sensing optical radiation is to propagate, may be configured as a part distinct from another part of the main body of the device, purposely provided with a through opening for installation of the aforesaid optical assembly. In this way, the optical assembly can be easily pre-mounted, possibly tested, and then associated in a sealed way to the corresponding opening for installation provided on the main body. In an embodiment of this type, the presence of a positioning element as optionally referred to in claim 10, is advantageous in order to guarantee proper positioning of the emitter and receiver, even when they belong to an optical assembly of the type referred to previously.

A sensor device according to a preferential embodiment, such as the one referred to in claim 11, enables use of a relatively simple optical-guide structure in order to obtain in any case an efficient and reliable propagation of sensing optical radiation, based upon the principles of inner reflection. Such a solution moreover renders less critical positioning of the emitter and of the receiver, which may simply face the two ends of the optical guide.

A sensor device according to a preferential embodiment, such as the one referred to in claim 12, has instead an optical-sensing arrangement, operation of which is based upon optical refraction, in particular in passage of the optical radiation from a solid to a fluid, which enables a measurement with good resolution.

In embodiments in themselves autonomously inventive, such as the ones referred to in claim 14 and/or claim 17, a sensor device is equipped with an auxiliary optical arrangement, aimed at detecting possible variations of the characteristics of the plastic material through which a sensing optical radiation is to propagate, these variations being, for example, due to ageing and temperature variations. In this way, if need be, it is possible to make a corresponding compensation of detections made, for example, via the main optical arrangement, to the advantage of reliability and precision of the device in the long term. According to preferential embodiments, the emitter and the receiver of the auxiliary optical arrangement can be integrated in the same optical module as the one that integrates the main emitter and receiver, or else be carried by a circuit support belonging to the level-sensing arrangement, to the advantage of simplicity of assembly.

BRIEF DESCRIPTION OF THE DRAWINGS

Further purposes, characteristics, and advantages of the present invention will emerge clearly from the ensuing detailed description, with reference to the annexed schematic drawings, which are provided purely by way of non-limiting example and in which:

FIGS. 7-9 are perspective views, from different angles, of an optical module of a sensor device according to possible embodiments of the invention;

FIGS. 15-16 are perspective views of a mould, which can be used for production of an optical module of the type illustrated in FIGS. 7-9;

FIG. 17 is a partial perspective view of a circuit of a sensor device according to possible embodiments of the invention, with associated an optical module of the type illustrated in FIGS. 7-9;

FIGS. 22-26 are partial vertical cross-sectional views aimed at exemplifying operation of an optical sensor of a sensor device according to possible embodiments of the invention;

FIG. 27 is a simplified block diagram of an optical sensor of a sensor device according to possible embodiments of the invention;

FIGS. 30-33 are perspective views aimed at representing some steps of assembly of a sensor device according to possible embodiments of the invention;

FIGS. 35-36 are perspective views from different angles of a protective element, which can be used in a sensor device according to possible embodiments of the invention;

FIGS. 37-38 are perspective views, from different angles, of an optical module of a sensor device according to possible embodiments of the invention;

FIGS. 39-43 are perspective views aimed at representing some steps of assembly of a sensor device according to possible embodiments of the invention;

FIG. 61 is an exploded view of a sensor device according to possible embodiments of the invention;

FIGS. 65-69 are perspective views aimed at representing some steps of fixing of a sensor device according to possible embodiments of the invention;

FIGS. 74-75 are perspective views, from different angles, of an optical assembly of a sensor device according to possible embodiments of the invention;

FIG. 76 is an exploded view of an optical assembly of the type illustrated in FIGS. 74-75;

FIG. 81 is a partially exploded view of a part of a sensor device according to possible embodiments of the invention;

FIGS. 102-103 are perspective views, from different angles, of an optical element of a sensor device according to possible embodiments of the invention;

FIG. 104 is a partial exploded perspective view of a circuit of a sensor device according to possible embodiments of the invention, with a corresponding optical module;

FIGS. 113 and 114 are schematic perspective views from different angles of a supporting and electrical-connection structure integrating an element of the type represented in FIG. 112;

FIGS. 115 and 116 are schematic perspective views from different angles of an optical module that can be used in a sensor device according to possible embodiments of the invention, in two different conditions;

FIGS. 117 and 118 are partially exploded schematic views of a supporting and electrical-connection structure of an optical module that can be used in a sensor device according to possible embodiments of the invention.

DESCRIPTION OF PREFERRED
EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment, "in various embodiments", and the like, that may be present in different points of this description, do not necessarily refer to one and the same embodiment. Furthermore, particular conformations, structures, or characteristics defined in the framework of the present description may be combined in any adequate way in one or more embodiments, that may eve differ from the ones represented. The reference numbers and spatial references (such as "upper", "lower" "top", "bottom", etc.) used herein are merely for convenience and hence do not define the sphere of protection or the scope of the embodiments. It should be considered, for example, that, for needs of greater clarity, in various attached figures the device forming the subject of the invention is represented in a condition turned upside down with respect to that of normal operation. It is pointed out that, in the present description and in the attached claims, the adjective "outer" or "external"—when referred to a surface of at least part of an (interface) wall of a body of the device described herein—is intended to designate a surface designed to face the inside of a generic container or of a duct, i.e., in contact with the liquid substance undergoing detection, whereas the adjective "inner" or "internal" is intended to designate an opposite surface of the aforesaid wall, i.e., a surface designed to be located on the outside of the tank or duct, and in any case not in contact with the substance. It is likewise pointed out that, in the present description and in the attached claims, by "optical radiation" is meant that part of the electromagnetic spectrum that comprises radiation in the range between 100 nm (nanometres) and 1 mm (millimetre), including ultraviolet radiation (100 to 400 nm), visible radiation (380-780 nm), and infrared radiation (780 nm to 1 mm). Moreover being understood as comprised in the scope of the invention are both sources of optical radiation of a "coherent" or laser type and sources of optical radiation of a "non-coherent" type. Furthermore, where not otherwise specified or evident from the context described, the term "material", for example when referred to the body of an element that has been described, it is to be understood as indicating a single material (e.g., a metal or a plastic material) or a composition of a number of materials (e.g., a metal alloy, or a composite material, or a mixture of materials, etc.).

Figure 1:
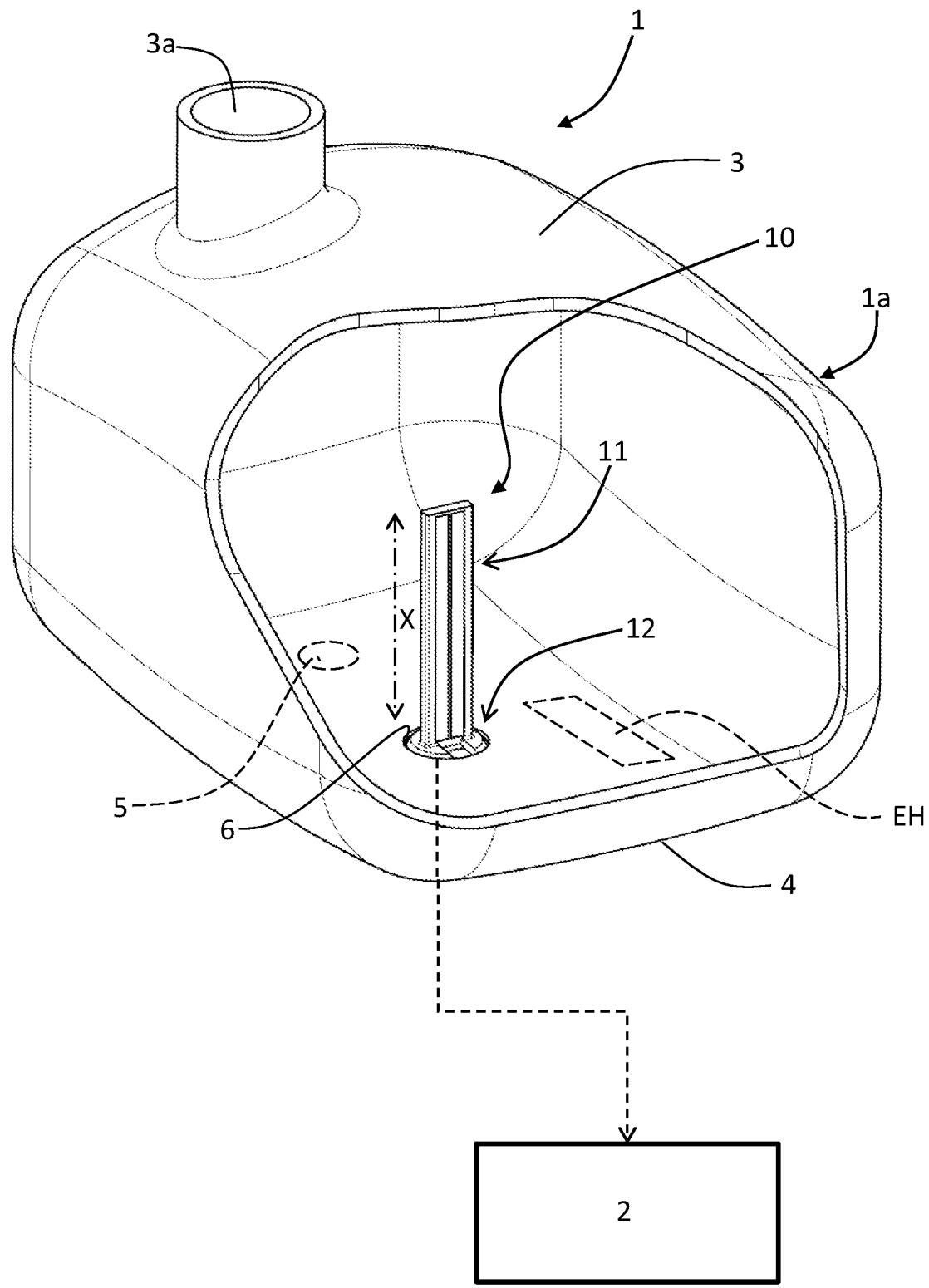
FIG. 1 is a sectioned perspective view of a generic container that comprises a sensor device according to possible embodiments of the invention.

In FIG. 1, designated as a whole by 1 is a generic container, such as a tank, in particular a tank of a motor vehicle. In the sequel of the present description, it is to be assumed that this container 1 (also defined hereinafter for simplicity as "tank") is designed to contain a liquid additive, or reducing agent, and forms part of an exhaust-gas treatment system of an internal-combustion engine, represented as a whole by the block 2. In various embodiments, the treatment system 2 is of an SCR type, as explained in the introductory part of the present description, used for abatement of nitrogen-oxide emissions, for example in motor vehicles, in particular with diesel engines. The aforesaid reducing agent is hence preferably a liquid solution, in particular urea in a solution of distilled water, such as the one known commercially by the name AdBlue™. The container 1 could in any case be replaced by a duct of a hydraulic system and/or be used for other purposes and/or in sectors different from the automotive sector, and could be designed to contain a different liquid or fluid substance of some other type that can be detected optically (the definitions provided hereinafter occasionally referred to a liquid substance or to a reducing agent may hence be understood with reference to a different liquid or fluid substance). The main body 1*a* of the tank 1 may be made of any material, preferably a material that is chemically resistant to the liquid substance or solution and is, preferably, electrically insulating, for example a suitable plastic material, according to known technique, such as a high-density polyethylene (HDPE). There may possibly be associated to the tank 1 a heater of a type in itself known, used for heating the tank itself and/or its contents, for example in the case of freezing. An electric heater is represented schematically in the figures by the block designated by EH. Advantageously, in various embodiments, such a heater EH is associated to or integrated in the sensor device according to the present invention.

In the schematic example illustrated, the tank has an upper part 3, for example an upper wall thereof, at which is an opening 3a for topping up the liquid solution. A lower part 4 of the tank 1, for example its lower wall, then has an outlet opening 5, via which the solution comes out or is drawn in, for example via a pump, for supplying the liquid to the system 2. Once again at the lower part 4, the tank 1 has a second opening, designated by 6, where the body of a sensor device according to various possible embodiments of the invention is fixed in a sealed way. In preferred applications, in fact, the sensor device forming the subject of the invention is designed to be installed in the lower part of a container or of a duct, so that an outer surface of its body is at least in part in contact with the liquid substance, even when this is at a minimum level.

In various embodiments, a body of the sensor device according to the invention defines itself at least part of the outlet opening of the tank 1, with the latter that could hence be provided with just one opening 6, instead of the openings 5 and 6.

The sensor device, designated as a whole by 10, includes a level-sensing arrangement, also defined hereinafter for simplicity as "level sensor", which includes a level-sensing part 11. The sensing part 11 is designed to face the inside of the tank 1 and/or extend at least partially therein. The device 10 then includes a housing and/or assembly part or portion 12, configured for being coupled in a sealed way to the opening 6. The part 12 has a closing or bottom structure including at least one wall (designated hereinafter by 21), which is to come into contact with the liquid solution contained in the tank 1, the sensing part 11 of the level sensor preferably projecting from this wall. As will be seen, in accordance with the invention, the sensor device 10 comprises at least one further sensing arrangement, in particular of an optical type, for detection of one or more characteristics of the liquid substance or solution contained in the tank 1: for this purpose, the sensor device 10 includes a second sensing part—also defined hereinafter as "optical positioning site"—which in various embodiments may also be configured as projecting towards the inside of the tank 1.

The sensor device 10 is preferably mounted so as to extend at least in part according to a level-sensing axis, designated by X, which is preferably substantially vertical, but, if need be, can be inclined with respect to the vertical. Preferably, the aforesaid second sensing part or the aforesaid optical site is designed to be positioned at a height relatively close to the lower wall 4 of the tank 1; i.e., it is located in a proximal end region of the device 10 close to the wall 4 when it is mounted in the tank.

The distal end region of the sensing part 11 may also be in contact with, or at a slight distance from, the upper wall of the tank and may possibly be fixed inside the aforesaid upper wall. Preferentially, the proximal end region of the level-sensing part 11 extends within the tank 1 at a height relatively close to the lower wall 4 in order to be able to detect the presence of an even very low level in the tank.

It should be noted that, instead of being directly mounted at the opening 6 of the tank 1, the device 10 according to the invention may constitute, or be associated to or integrated in, a further body or component that is mounted in a sealed way at a different opening of the tank itself.

Figure 2:
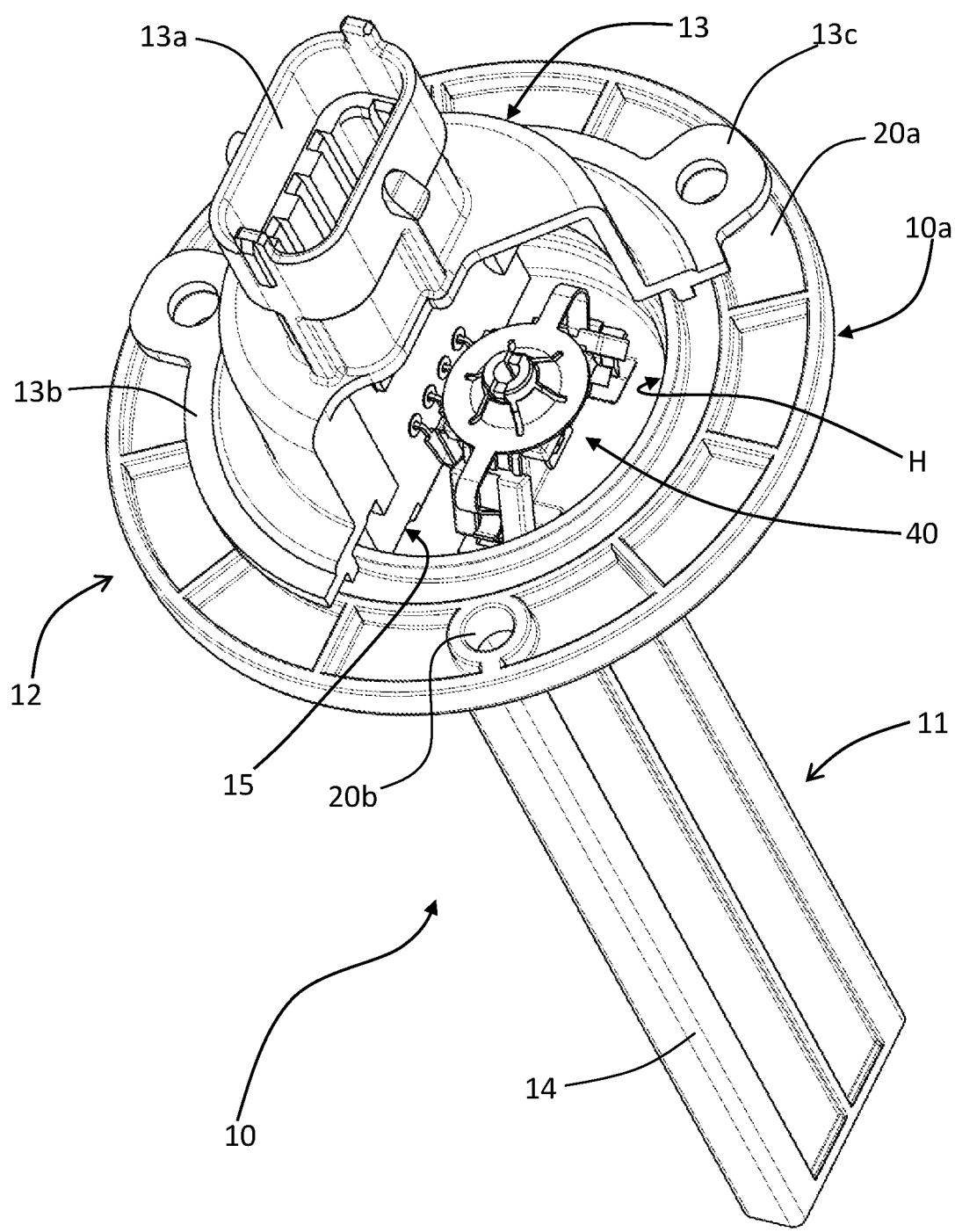
FIG. 2 is a partially sectioned perspective view of a sensor device according to possible embodiments of the invention.

In FIG. 2 a device 10 according to one embodiment is represented in isolation. The device 10 has a device body 10a that defines the housing and/or assembly portion 12, which is preferably provided with a closing cover 13.

Preferably, the body 10a is hollow for housing at least part of the level-sensing components, in particular the components of a level sensor of a capacitive type, as well as at least part of the components of an arrangement for detection of one or more characteristics of the substance contained in the tank 1, in particular a sensor of an optical type, preferably of an opto-electronic type, suitable for detection of the quality of the aforesaid substance (in what follows, for simplicity, reference will hence also be made only to detection of the quality of the substance). As will be seen, in preferred embodiments, the part of the casing body of the device—here represented by the housing portion 12—that has the associated sensing arrangement of an optical type is designed to extend prevalently on the outside of the container or duct in which the liquid substance is located, except for at least a portion of a wall of the body part. In other words, then, preferentially the aforesaid optical-sensing arrangement is not housed in a body designed to be completely or prevalently positioned within a volume for containing the liquid substance, or else designed to be completely or prevalently immersed in the latter.

In particular, the body 10a of the device defines, at the region of the sensing part 11, a hollow casing 14, having a generally elongated shape; in the example illustrated, the casing 14 has a generally prismatic shape, in particular substantially parallelepipedal. In various embodiments, the casing 14 may be obtained via direct overmoulding of electrically insulating plastic material on a circuit support, described hereinafter. More in general, the sensor 10 may present at least one insulating layer, for electrical insulation of its electrodes (described hereinafter) from the inside of the tank 1.

In preferred embodiments, the housing part 12 and the casing 14 are defined by a single body 10a of electrically insulating plastic material. On the other hand, not excluded from the invention is an embodiment of the body 10a in distinct parts rendered fixed in a sealed way, for example via mutual coupling means, or else via welding or overmoulding. In various embodiments, the casing 14 provides a projecting part of the closing or bottom structure of the housing portion 12, which is to be immersed at least partially in the substance or solution contained in the tank 1.

In various embodiments, the body 10a, or at least one part of its portion that is to come into contact with the liquid solution, is made of a mouldable thermoplastic material, such as a polypropylene (PP) or a high-density polyethylene (HDPE), or a polysulphone (PSU). Practical tests conducted by the present Applicant have on the other hand made it possible to ascertain that a material that is particularly suitable—also in view of the particular modalities of detection of level and quality described hereinafter—is a cyclic-olefin copolymer (COC).

Materials of this type—which are used also in the medical field—present particularly advantageous characteristics for the application considered herein, amongst which are to be emphasized the low density, the very low water absorption, the excellent barrier properties to water vapour, the high stiffness, strength, and hardness, the high resistance to extreme temperatures and to thermal shock, the excellent resistance to aggressive agents such as acids and alkalis, the excellent properties of electrical insulation, the ease of manageability using ordinary methods of treatment of thermoplastic materials, such as injection moulding, extrusion, blow moulding, and injection blow moulding.

Once again in FIG. 2 it may be noted how the housing part 12 defines a cavity, designated as a whole by H, which together with the cover 13 delimits a housing for at least part of the electrical and electronic sensing components. In a preferred embodiment, at least part of these components is mounted on an electrically insulating substrate 15 that provides a circuit support or PCB (Printed Circuit Board), also defined hereinafter as "circuit", given that mounted and connected thereon are electrical and/or electronic components. The circuit support 15 is preferably made of a material suitable for production of printed circuits, such as FR4 or a similar composite material such as fibreglass, or again a ceramic material or a polymer-based material, preferably a mouldable material for the purposes of production of the circuit support 15.

Figure 3:
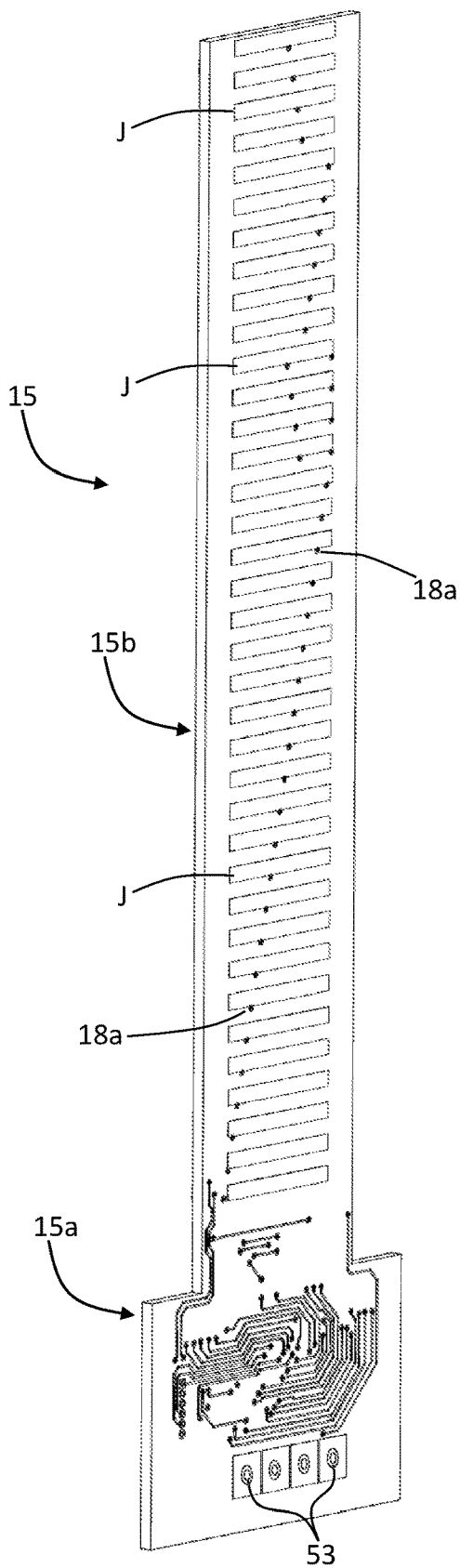
FIGS. 3-4 are perspective views from different angles of a circuit of a sensor device according to possible embodiments of the invention.
Figure 4:
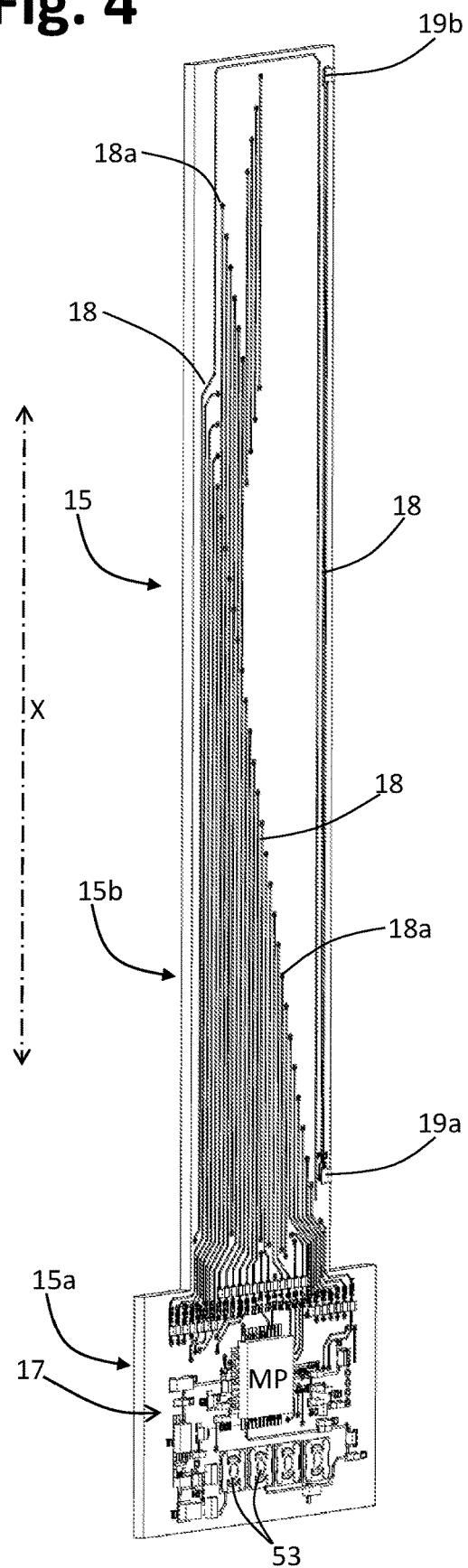

With reference also to FIGS. 3 and 4, identified in the circuit support 15 are a first portion 15a, designed to be received in the housing part 12, and a second portion 15b designed to be received in the casing 14.

Associated to the portion 15a of the circuit support 15 are prevalently the sensing and/or control electronic components of the device 10, which are preferably connected both to the level sensor and to the quality sensor. The aforesaid components preferentially include both components for treatment and processing of level-sensing signals and components for treatment and processing of quality-sensing signals.

Figure 5:
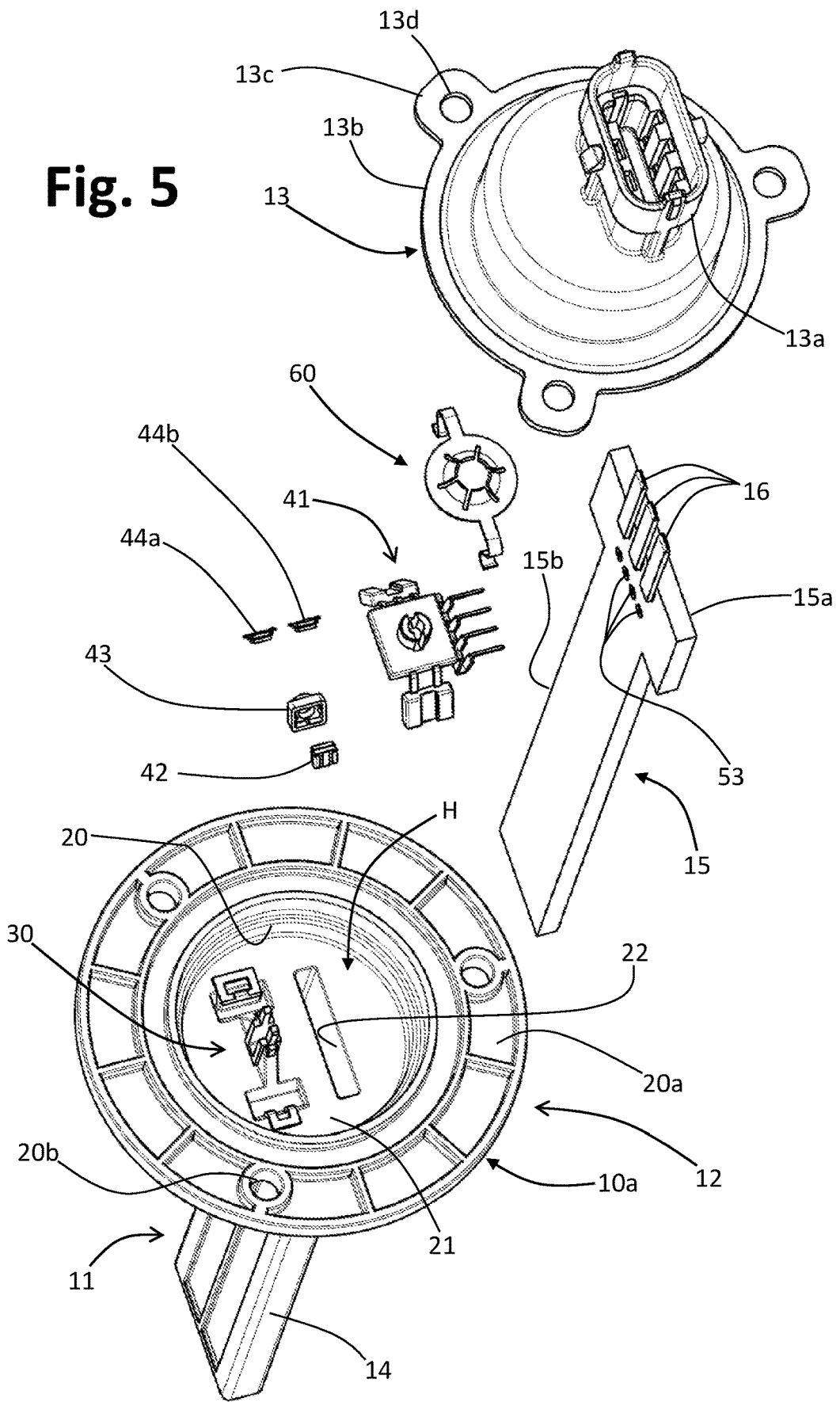
FIGS. 5-6 are exploded views, from different angles, of a sensor device according to possible embodiments of the invention.
Figure 6:
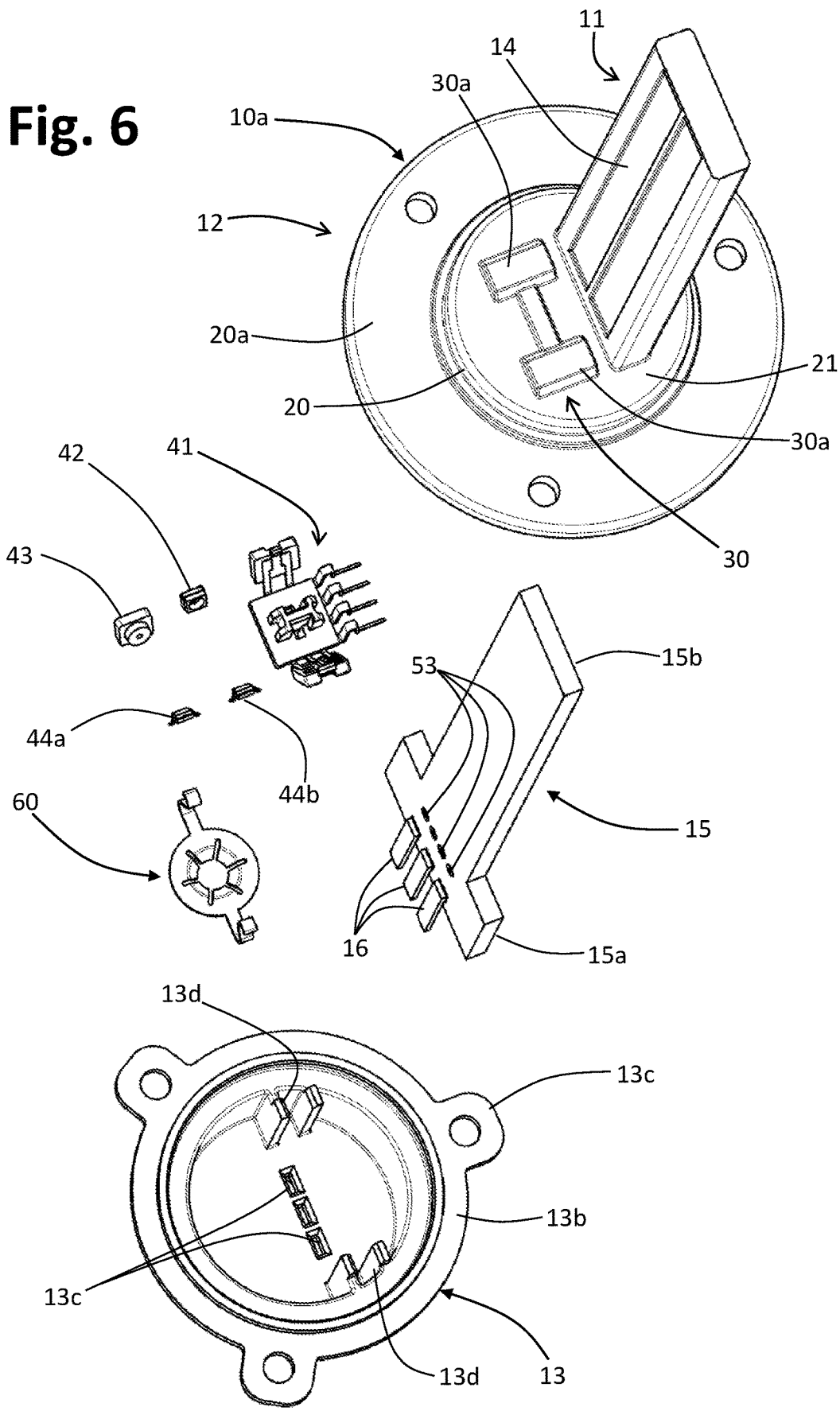

Preferably associated to the portion 15a are moreover corresponding terminals for external electrical connection of the device 10, preferably of a generally flat shape, visible, for example, in FIGS. 5 and 6, where they are designated by 16. These terminals 16 form, with a connector body 13a of the cover 13, an interface or connector for external electrical connection of the device 10, for example to a control unit of the system 2 on board the vehicle.

Associated to the portion 15b of the circuit support 15 is at least part of the components used for level sensing. In various embodiments, these components include a series of electrodes, some of which are designated by J, which extend in a direction transverse to the sensing axis, substantially from the proximal end to the distal end of the sensing part 11, i.e., of the portion 15b of the circuit support 15.

Provided in the example illustrated is a single circuit support 15, defined in which are the parts 15a and 15b, but in possible variant embodiments a number of circuit supports may be provided connected together by means of suitable electrical-interconnection means and possibly mechanical-interconnection means, for example a circuit support for the portion 15a and a circuit support for the portion 15b, with electrical conductors or connectors for connecting electrically conductive paths of one portion to electrically conductive paths of the other portion, or again a circuit support carrying part of the components just for detection of quality (or of some other characteristic quantity of the substance), connected to a circuit support carrying at least part of the components for level sensing.

Once again with reference to FIGS. 3 and 4, in various embodiments the circuit support 15, preferably having a generally elongated and flat shape, has associated on one of its major faces—herein conventionally defined as "back"—a control circuit arrangement, designated as a whole by 17, preferentially comprising an electronic controller MP, for example a microprocessor or a microcontroller.

The controller MP preferably comprises at least one processing and/or control logic unit, a memory circuit, and inputs and outputs, amongst which inputs of an analog/digital type. The arrangement 17 or the controller MP then comprises elements for conditioning and/or treatment of the signals for detection of level and quality of the liquid solution. It should be noted that the components associated to the circuit support 15 or the arrangement 17, except for its connection elements 16 and 53, are represented only in FIGS. 3-4, for needs of clarity of the subsequent drawings.

The components of the circuit arrangement 17 are connected to electrically conductive paths (not indicated) provided in the portion 15a. Provided then on the back of the portion 15b of the circuit support is a series of electrically conductive paths 18, for electrical connection of the electrodes J, which are located, instead, on the front of the portion 15b. For this purpose, metallized holes 18a are preferably provided for connection between paths and electrodes or circuit components provided on different surfaces of the circuit support 15.

In various embodiments, the device according to the invention comprises at least one temperature sensor, for detection of at least one of a temperature of the liquid solution and an ambient temperature, such as the temperature of the air within the tank or the temperature within the body 10a. Preferentially, at least one temperature sensor is provided on the circuit support 15. A temperature sensor, for example of an NTC type, may be mounted at least one of the distal end region and the proximal end region of the portion 15b of the circuit support 15. In the example represented, mounted on the portion 15b, in particular on its back, are two temperature sensors 19a and 19b, in opposite end regions of the portion 15b, connected to the circuit arrangement 17 via corresponding conductive paths. Assuming an installation of the device 10 in the tank 1 as the one illustrated in FIG. 1, the temperature sensor 19a may be used for detecting the temperature of the liquid, whereas the sensor 19b—which, in the mounted condition, is located closer to the upper wall of the tank—may be used for detecting the temperature that exists in the internal volume of the tank above the liquid, for example the temperature of the air. In various embodiments, such as the one exemplified here, the measurement made by the at least one temperature sensor provided in the device is an indirect measurement, given that the aforesaid temperature sensor is not directly in contact with the fluid to be detected (the liquid substance or the air). It will in fact be appreciated that, in various embodiments, the at least one temperature sensor is housed within the body 10a of the device (and especially within the casing 14), and hence not directly in contact with the liquid substance or the air present in the tank 1. For this purpose, in various embodiments, the control circuit arrangement 17 of the device 10 is pre-arranged—in a way in itself known—for making an appropriate compensation of the measurement made by the temperature sensor, which takes into account at least the presence of a wall set between the temperature sensor and the fluid being measured (e.g., in a memory of the circuit arrangement 17 there may be contained corresponding corrective parameters, based upon experimental analyses).

A sensor for detection of temperature may possibly be provided within the portion 15a of the circuit support, i.e., within the housing part 12, for detecting the temperature that exists in the cavity H, for example in order to compensate for variations or thermal drifts of the opto-electronic components and/or of the electronic components of the control circuit, in particular in order to improve the accuracy of the device. In various embodiments, one or more temperature sensors are provided in intermediate positions of the portion 15b. At least one temperature sensor, for example one or more of the ones referred to above, is provided in the device 10 for compensating the value of measurements made via the level sensor and/or via the quality sensor.

According to various embodiments, the detection of temperature made via at least one temperature sensor, such as the sensor, enables a compensation to be made both of the measurements made by the level sensor and of those made by the optical sensor. According to an inventive aspect, then, in one and the same sensor device or in the body of the device at least three sensors of a different type are provided, such as a sensor for detecting the level of the substance, an optical sensor for detecting the characteristics of the substance, and a sensor for detecting the temperature of the substance and/or of the environment, which are preferably connected to one and the same circuit arrangement, such as the arrangement 17 or the controller MP, in particular in order to process and/or combine together at least part of the signals or values detected by these sensors, such as processing designed to compensate at least part of the values detected and/or carry out a temperature compensation of the values of level and/or quality of the substance.

In various embodiments, such as the one exemplified, all the sensors, in particular the level, quality, and temperature sensors, are insulated from the liquid substance, preferably via at least one wall of the body of the device.

In the non-limiting example represented, the electrodes J are arranged according to an array that extends in the direction of length of the portion 15b of the circuit support, i.e., along the sensing axis X, set apart from one another. The electrodes J are made of electrically conductive material, for example a metal material or a metal alloy, and are associated to the front of the portion 15b of the circuit support 15. The electrodes J are preferably coplanar with respect to one another and may, for example, be in the form of plates or laminas either etched or applied on the circuit support 15, or else constituted by an electrically conductive layer (like the paths 18) deposited on the circuit support 15, for example with a shield-printing technique or the like. As has been mentioned, in one embodiment the circuit support 15 has through holes—some of which designated by 18a—which contain conductive material for electrical connection between the electrodes J provided on the front of the portion 15b and the conductive paths 18 present on the back of the same portion of the circuit support 15, or possibly located in intermediate layers of a support 15 of a multilayer type.

In preferred embodiments, level sensing carried out via the electrodes J is based upon measurement of values of capacitance. In various embodiments, at least two electrodes J substantially perform the functions of the plates of a capacitor, while the liquid solution contained in the tank substantially performs the function of dielectric of the capacitor itself. In other embodiments, each individual electrode J provides just one plate of a sort of "virtual capacitor", the other plate of which is obtained by the medium that is being measured present in the tank and where the interposed wall of the casing 14—or other insulating layer that replaces it—constitutes the dielectric between the plates of the aforesaid virtual capacitor. Hence, in various embodiments, the electrodes J form, together with the corresponding control electronics, a capacitive sensor, which is able to detect the presence or absence of the liquid solution even without direct contact with the latter. Preferentially, for this purpose, each electrode J is electrically connected—alone or else in parallel with at least one other electrode J—to a respective input of a plurality of inputs of the controller MP belonging to the circuit arrangement 17. In these implementations, the controller MP is prearranged for discriminating the value of capacitance associated to each electrode J or sets of electrodes J between at least two thresholds and consequently identifying at least one liquid-air transition in the tank, which indicates the level of the liquid solution. In preferred embodiments, the controller MP for this purpose makes a sequential sampling of the values of capacitance present on the inputs to which the electrodes J or the sets of electrodes J are connected in order to identify the aforesaid transition.

Hence, preferentially, level sensing is obtained by means of a measurement arrangement without moving parts such as a float, in particular for reasons of reliability; for this purpose, in various embodiments, the level-measurement arrangement is obtained according to the technique described in any one of the international patent applications Nos. PCT/M2015/054020, PCT/IB2015/057036 and PCT/IB2015/057043, filed in the name of the present Applicant, the teachings of which in this regard are incorporated herein for reference.

On the other hand, the level-sensing arrangement of the device 10 may be obtained according to other techniques known in the sector, albeit preferentially including level-sensing means that are without moving parts (such as a float), which might prove cumbersome and perturb the measurements made via the aforesaid further sensor, used for detection of one or more characteristics of the substance contained in the tank 1.

Preferentially, the level-sensing means used project from the assembly part 12 towards the inside of the tank, with the assembly part that has an interface wall designed to be directly in contact with the liquid solution contained in the tank. The specific level-sensing means of the device 10 could also be exposed directly to the liquid, it comprising, for example, two or more longitudinally extended electrodes, substantially parallel to one another, which are to come into direct contact with the liquid, or again an arrangement of comb-fingered electrodes, which are also to come into contact with the liquid.

As may be seen in FIGS. 5 and 6, in various embodiments, the housing and/or assembly part 12 includes a peripheral wall 20 and a bottom structure or wall 21, which define the cavity H designed for housing electrical and/or electronic components of the device 10. Preferably, the peripheral wall 20—here of a substantially cylindrical shape—has a flange 20a for fixing the body 10a in position. In the assembled condition, i.e., where the device 10 is mounted, at least one part of the bottom structure or wall 21—and in particular of its outer side—is to come into contact with the liquid solution contained in the tank: for this reason, in what follows the wall 21 will also be defined as "interface wall". As may be noted in particular in FIG. 5, an opening 22 is defined at the bottom wall 21, which connects the cavity H to the inner cavity of the casing 14. Through this opening 22, the circuit support 15 can be at least partially inserted in the casing 14, with the corresponding electrodes J or other sensing means envisaged that are insulated from the liquid solution.

From FIGS. 5-6 it may be appreciated how, in preferential embodiments, the cover 13 also performs functions of electrical connection in so far as it includes or defines a generally hollow connector casing 13a, for housing the electrical terminals 16 and, possibly, at least part of the circuit support 15 and/or of the optical sensor. In the example, the connector casing 13a projects in an axial direction of the cover 13 or of the level sensor, but other orientations are of course possible, for example orthogonal or angled with respect to the sensing axis X of the level sensor. The cover 13 is designed for being fixed on the body 10a, in particular on its housing and/or assembly part 12, so as to close the cavity H, preferably in a sealed way.

In various embodiments, the cover 13 defines for this purpose a flange 13b, for fixing the part 12 to the flange 20a, for example via gluing or welding (in particular, laser or vibration welding or remelting of at least part of the perimeter of the flanges 13b and 20a made of plastic material), or else via some other mechanical fixing between the aforesaid flanges, such as a thread or a bayonet coupling, possibly with interposition of sealing means, such as an elastic gasket. Preferably, in at least one of the bodies 10a and 13 means for fixing the device 10 to the tank are provided, such as perimetral holes, for example holes 20b in the flange 20a and holes 13d in one or more radial formations 13c of the flange 13b (see, for example, FIG. 5).

In the assembled condition, i.e., where the device 10 is mounted, the terminals 16 are designed to project within the connector casing 13a of the cover 13. For this purpose, the cover 13 has corresponding passages for these terminals, designated by 13c in FIG. 6; alternatively, the terminals 16 could be overmoulded with the plastic material of the cover 13. Once again from FIG. 6 it may be noted how, in various embodiments, within the cover 13, which also defines a corresponding cavity, positioning formations 13d are defined for the circuit support 15, in particular for its portion 15a.

In accordance with the invention, as has been said, the sensor device 10 includes at least an arrangement for detection of level and an optical arrangement for detection of quality (or other characteristic/characteristics) of the substance being checked—and possibly an arrangement for detecting a temperature—, where preferably these sensing arrangements comprise parts in common of the device 10. These parts in common may be of a basically mechanical type, such as a single body, for instance the one designated by 10a, or else a number of bodies coupled together, for example welded or glued or engaged together, or again a number of bodies fitted or slotted at least in part into one another. In addition and/or as an alternative, the parts in common may be of an electrical and/or electronic type, and include, for example, a circuit board (such as the one designated by 15), a connector (such as the connector 13a, 16), one or more control circuit components (such as the controller MP).

Preferably, a sensor device according to the invention, and in particular its control electronics, is prearranged for transmitting both first information representing the level of the substance and second information representing at least one characteristic of the substance (and possibly third information representing a temperature), by means of an electrical connector and/or by means of electrical terminals in common to the two (or three) sensing arrangements. In various embodiments, both the first information and the second information (and possibly also the third information) are transmitted via one and the same signal, preferably one and the same serial signal containing a plurality of data or values, such as data or values in digital format or encoded according to a predefined protocol. For this purpose, the control electronics of the device is preferably pre-arranged for transmission of data, preferably in the aforesaid serial format, very preferably by way of a serial interface and/or protocol, such as a SENT (Single Edge Nibble Transmission) protocol or CAN (Controller Area Network) protocol.

In preferred embodiments, the quality-sensing arrangement according to the invention comprises at least one emitter of optical radiation and at least one receiver of optical radiation, and a part of the sensor device 10, i.e., of its body 10a, is configured so as to contribute to propagation of optical radiation from the emitter to the receiver. In what follows, for simplicity it will be assumed that the aforesaid optical radiation is in the visible, there, however, being possible a different frequency of optical radiation for the purposes of implementation of the invention: hence, in what follows, reference will be made to rays or beams of visible light. Consequently, for simplicity, in what follows, the sensor for detecting quality or other characteristic/characteristics will also be defined as "optical sensor".

For this purpose, in various embodiments, the wall 21 that delimits the cavity H of the housing part 12 at the bottom is made at least in part of a material designed for propagation of light, at least by refraction and/or reflection, and at the aforesaid part there are operatively associated the emitter and the receiver. This material is preferably a transparent material, for example selected from cyclic-olefin copolymers (COCs), or a polysulphone (PSU), or a polypropylene (PP), or a high-density polyethylene (HDPE).

In various embodiments, at least one part of the wall 21 is shaped to define an optical site for positioning the aforesaid emitter and receiver.

In various preferred embodiments, the emitter and receiver form part of one and the same optical module, which is mounted at the aforesaid optical positioning site. With reference to FIG. 5, an aforesaid site is designated as a whole by 30, while an aforesaid module is designated as a whole by 40 in FIG. 2. As will emerge hereinafter, in various embodiments, the optical positioning site comprises a particular conformation of the wall 21 or else of a part thereof designed for propagation of the light beam. In preferred embodiments, the optical site 30 provides the previously mentioned second sensing part of the device 10, belonging to the optical sensor, which in various embodiments is designed to project at least in part towards the inside of the tank 1.

Visible in FIGS. 7-9 is an optical module obtained according to possible embodiments of the invention. The module 40 has a supporting and electrical-connection structure 41 (see also FIGS. 5 and 6), made in part of electrically insulating material and in part of electrically conductive material. The structure 41 of the module is pre-arranged for mounting of a light emitter 42 (only partially visible in FIG. 8, in so far as it is covered by a corresponding space filter 43, described hereinafter, but visible in FIGS. 5-6) and at least one light receiver 44. In preferred embodiments of the invention, the emitter is a non-diffused lambertian light source, for example a suitable LED (light-emitting diode). According to preferred embodiments of the invention, the light receiver 44 comprises two distinct receivers, designated by 44a and 44b, for example photodetectors or photodiodes suitable for detecting the light emission generated by the emitter 42.

Figure 22:
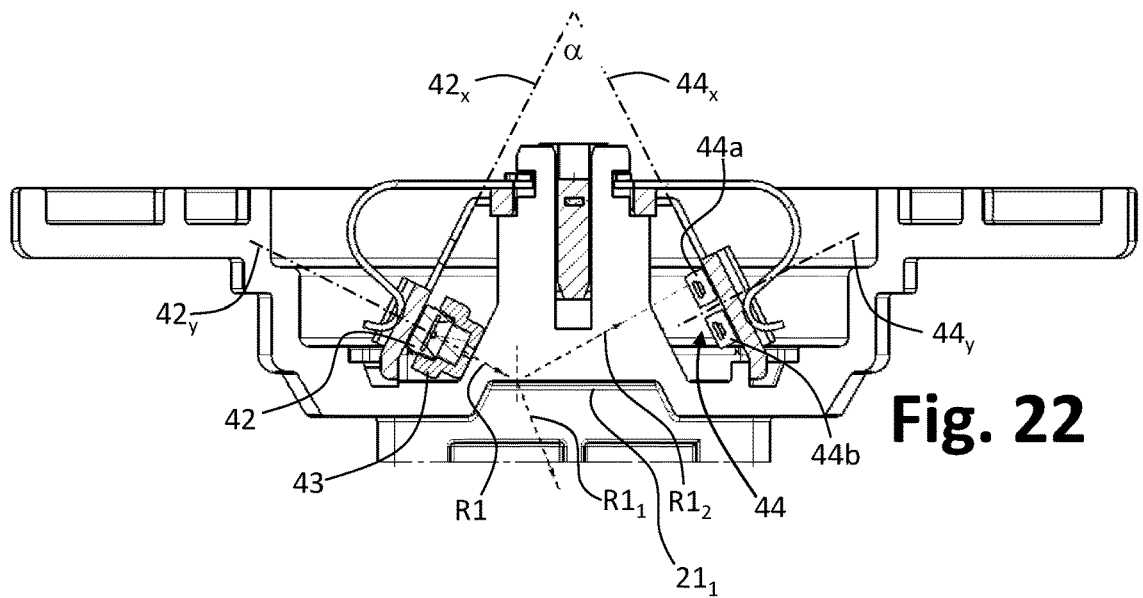

In various embodiments, the emitter 42 and the receiver 44 have their respective active parts for emission and reception, respectively, that generally face one another, but are arranged angled with respect to one another, preferably in such a way that their respective axes intersect. With reference, for example, to FIG. 22, the emitter 42 and the receiver 44 are arranged according to respective planes of lie $42_x$, $44_x$ that form between them an angle $\alpha$ that is less than 90°. Instead, the two planes passing through the axes $42_y$, $44_y$ of the receiver and of the emitter, respectively (meaning thereby two planes orthogonal to the axis of the sheet of FIG. 22), form between them an angle greater than 90°. In general, then, the axes $42_y$, $44_y$ of the receiver and of the emitter are inclined with respect to the main axis of the device 10 and/or of the level-sensing part 11, which is here assumed as corresponding to the level-sensing axis X (see FIGS. 1 and 3-4).

The angle α is predefined on the basis of the plastic material used for the interface wall (i.e., a wall of the body 10a, here the wall 21, in particular in a position substantially corresponding to the positioning site 30), the type of optical radiation (i.e., the type of emitter 42) that it is intended to adopt, and the type of fluid that is to be measured.

Preferably, with the use of certain plastic materials, the angle α and/or the angle of incidence of the ray emitted by the emitter with respect to the interface surface, namely, the critical angle, is comprised between 50° and 70°. For instance, for measurement of the quality of urea in aqueous solution using as plastic material COC, considering a light emission with a wavelength equal or close to 630 nm, the angle α must preferably be comprised between 52° and 54°, in particular 53°. Alternatively, in the same application and using as plastic material for the interface wall PSU, the angle α must preferably be comprised between 63° and 65°, in particular 64°. However, in a similar configuration, an appropriate angle α may be predefined for other materials of the interface wall, such as a PP or a HDPE. Alternatively, there may be envisaged a source of light emission of an infrared type, for example with wavelength equal or close to 850 nm or 860 nm, envisaging an appropriate angle α, also taking into account the material of the interface wall, such as a COC plastic material, or a PSU, or a PP, or a HDPE. The emitter and the receiver (or its individual photodetectors) must be positioned with their axes $42_y$ and $44_y$ orthogonal to the optical surfaces so that the ray R1 will impinge on the surface $21_1$ with an angle (with respect to the vertical or with respect to an axis parallel to the axis X or to an axis perpendicular to the surface $21_1$) equal to the critical angle: with reference to the previous examples, with COC and urea solution the aforesaid angle will preferably be comprised between 62° and 66°, in particular 64°, and with PSU and urea solution the angle will preferably be comprised between 56° and 60°, in particular 58°.

In various other embodiments, on the other hand, the emitter and the receiver may be arranged in some other way, for example with their respective axes $42_y$, $44_y$ generally parallel (as, for example, in the embodiments of FIGS. 81-88, 89-99, 100-111).

In preferred embodiments, the structure 41 includes a plurality of bodies made of insulating material, which are connected together by means of electrically conductive elements at least in part elastically deformable. Preferentially, the structure 41 includes electrical-connection terminals, which are also at least in part elastically deformable.

In the case exemplified in FIGS. 7-9, the structure 41 comprises a main body 45, in a central position, basically performing centring and fixing functions, and two lateral supporting bodies 46 and 47, these bodies being preferably made of plastic or thermoplastic material, or of a mouldable resin.

As may be seen in particular in FIG. 7, at two opposite peripheral sides of the central body 45 there project mechanical and electrical connection elements 48 and 49, preferably constituted by elastically flexible or deformable metal conductors, associated to which are the supporting bodies 46 and 47, respectively. In a position corresponding to another peripheral side of the body 45 there project, instead, electrical-connection terminals 50, which are also preferably constituted by elastically flexible metal conductors. The terminals 50 are used for electrical connection of the module 40 to the control electronics of the device, in particular to the portion 15a of the circuit support 15, whereas the conductors 48 and 49 are exploited for electrical connection of the emitter 42 and of the receiver 44, i.e., of its detectors 44a and 44b. As will be seen, the conductors 48, 49 and the terminals 50 are prearranged so as to render elastic or deformable the corresponding mechanical and/or electrical connection, in order to guarantee the precise relative positioning between parts of the device, as well as compensating possible dimensional and/or positioning tolerances to prevent damage caused by assembly and/or by vibrations during operation.

In various embodiments, defined at the upper face of the central body 45 is a first formation 51 for centring and/or blocking, which preferably has a substantially cylindrical shape provided with a transverse cut, not indicated. As will be seen, this upper formation 51 is configured for contributing to centring and/or blocking of a blocking and/or positioning element, designated by 60 in FIGS. 5 and 6, described hereinafter. Preferentially, the formation 51 is moreover hollow in order to contribute to centring of the module 40 with respect to the corresponding positioning site 30. In preferred embodiments, the body 45 is traversed by two through openings 51a, which open substantially at two diametrally opposite parts of the formation 51, in particular at the respective ends of the aforesaid transverse cut.

In various embodiments, at the bottom face of the central body 45 is defined a second formation 52, which is also designed to provide functions of centring or positioning of the module 40 with respect to the site 30 in order to guarantee proper positioning of the emitter 42 and of the receiver 44 with respect to optical surfaces provided at the site 30. For this purpose, as will be seen, a contribution is provided by the elasticity or the at least partial elastic deformability of the conductors 48 and 49. In preferred embodiments, the formation 52 or part of the body 45 also performs functions of optical shield, as described hereinafter.

The formation 52 includes at least one projecting wall 52a, which extends in a direction generally orthogonal to at least part of the conductors 48 and 49, such as a part on which the body 45 is overmoulded.

Preferably, at the two longitudinal ends of the wall 52a two further projecting walls 52b are provided, transverse to the wall 52a: hence, in these embodiments, the formation 52 substantially has an H-shaped profile in plan view, including a projecting wall. At the ends of the walls 52b there may possibly be provided further small walls or reinforcement ribbings, as illustrated.

As may be noted in particular from FIGS. 8 and 9, the two through openings 51a open, at the bottom face of the body 45, on the two sides of the wall 52a.

The two lateral bodies 46 and 47 each have, on their corresponding upper face, a groove 46a, 47a, designed for providing the seat for two opposite arms of the aforementioned blocking and/or positioning element 60, which is preferentially an elastic element. The shape of the grooves or seats 46a, 47a is such as to prevent movement of the aforesaid arms and guarantee adequate pressure of the module 40 and/or of the two lateral bodies 46 and 47 against corresponding contrast means, such as a formation forming part of the site 30 or belonging to the wall 21.

Preferably, associated to the module 40 or to at least one of the bodies 46 and 47 is at least one positioning and/or anti-rotation element: for this purpose, in various embodiments, the bodies 46 and 47 each have at least one lower appendage or projection 46*b* and 47*b*, for example shaped like a tooth, at their lower peripheral edge, which is designed to couple with an appropriate positioning seat of the site 30 or of the wall 21; alternatively, the aforesaid positioning and/or anti-rotation elements could be in the form of seats, designed to couple with an appropriate projection or a positioning tooth of the site 30 or of the wall 21.

Provided at the lower face of the bodies 46 and 47 are the ends of the respective conductors 48 and 49, for connection of the emitter 42 and of the two photodetectors 44*a* and 44*b* that constitute the receiver 44. The electrical connection of the aforesaid electronic components to the conductors 48 and 49 may be made using standard techniques employed in the sector of electronic circuits, for example welding/reflow.

The conductors 48 and 49 have an intermediate portion that is bent, here at an obtuse angle, in such a way that the bodies themselves, and hence the emitter on the one hand and the receiver on the other, are in positions angled with respect to one another and with respect to the body 45. Also the terminals 50 have an intermediate portion that is bent, here with a substantially U-shaped (or alternatively, S-shaped or Z-shaped) bend, to enable elastic assembly as mentioned previously.

Figure 10:
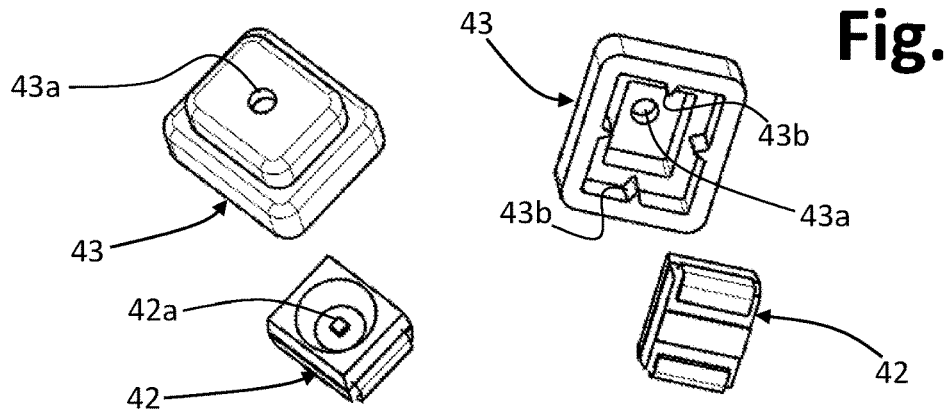
FIG. 10 illustrates, with different perspective views, an emitter of optical radiation and a corresponding component, which can be used in a sensor device according to possible embodiments of the invention.

In various embodiments, associated to the emitter 42 is an optical filter or space filter 43, in particular in order to select or concentrate the light beam. An example of such a filter is illustrated in FIG. 10, in different views, together with the emitter 42. The space filter 43 is basically a component made of plastic material not permeable to optical radiation or light, in particular moulded, preferably mounted directly on the emitter 42; alternatively, the space filter 43 could be mounted or fixed to the body 46.

The filter 43 is preferably configured as a cap provided with an opening 43*a* in a wall thereof opposite to the light source 42*a* of the emitter itself. This opening, which in FIG. 10 is substantially in the form of a circular hole, filters and selects or concentrates the light beam emitted by the emitter itself. The body of the filter 43 is preferably mounted with interference fit or engaged on the electronic component that provides the emitter 42. For this purpose, preferentially, provided on the inner side of at least two opposite walls of the body of the filter 43 are centring and/or fixing internal ribbings or reliefs 43*b*. Instead of a hole, the filter may be provided with an opening having a different shape designed for the purpose, such as a slit (as illustrated, for example, in FIG. 38) or else an oval or substantially square shape, the hole possibly having a shape with variable section.

Figure 11:
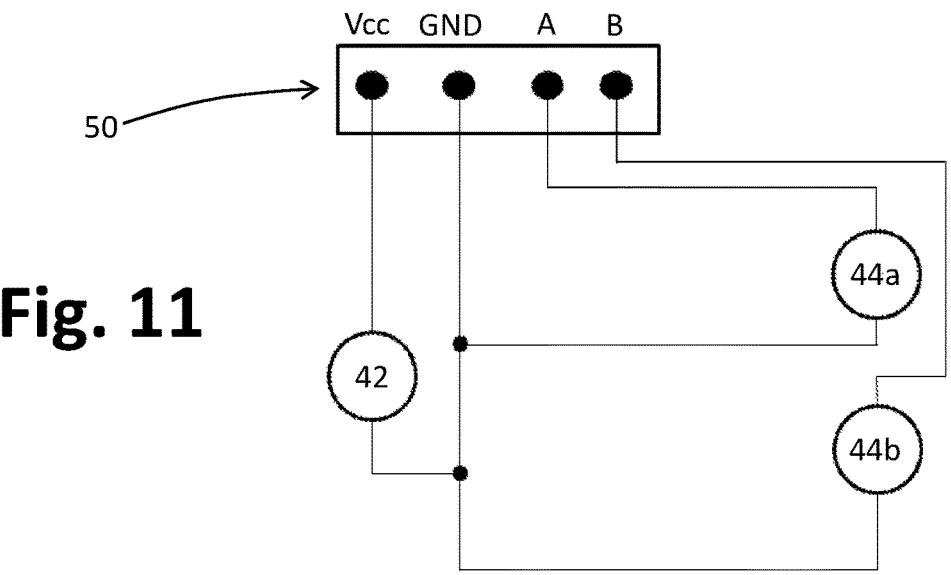
FIG. 11 is a possible electrical diagram of an optical module of a sensor device according to possible embodiments of the invention.

Represented by way of example in FIG. 11 is a possible electrical diagram of the module 40, for its connection to a corresponding interface circuit, here represented by the circuit of the level sensor, in particular the circuit arrangement 17 provided in the portion 15*a* of the circuit support 15 (see FIG. 4). As may be noted, the terminals 50 preferably make it possible to have as input and output signals a supply level Vcc of the emitter 42, a ground GND, and two voltage signals A and B for the two photodetectors 44*a* and 44*b*. These signals A and B reach the circuit arrangement 17, preferably for a numeric processing by the controller MP (as also represented schematically in FIG. 27).

Figure 12:
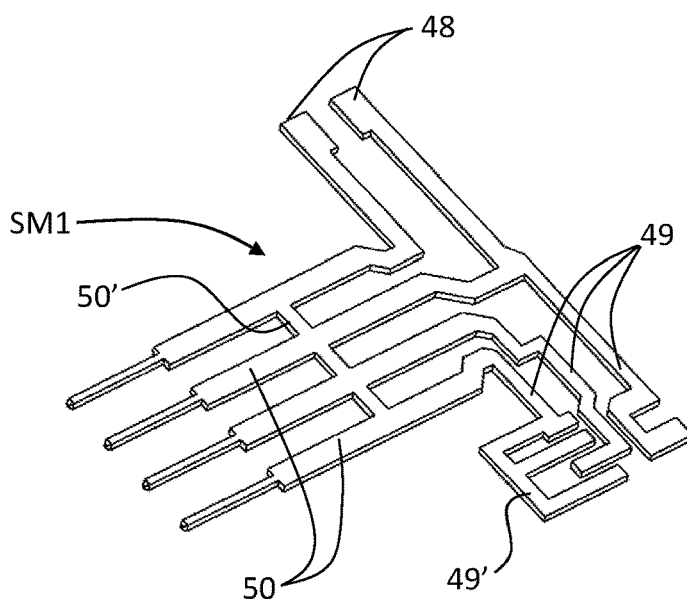
FIGS. 12-14 are perspective views of semi-finished products, which can be used for production of an optical module of the type illustrated in FIGS. 7-9.

In preferred embodiments, the bodies 45, 46, and 47 of the module are elements overmoulded on the conductors 48, 49 and on the terminals 50. For this purpose, in various embodiments, obtained from a substantially flat metal strap is a first semi-finished product SM1 visible in FIG. 12. The aforesaid strap may, for example, be made of copper or brass or some other conductive metal, preferably coated at least in part with a metal material designed to facilitate soldering of the emitter component 42 and receiver component 44 and/or of the circuit support 15 (such as gold or tin).

Figure 13:
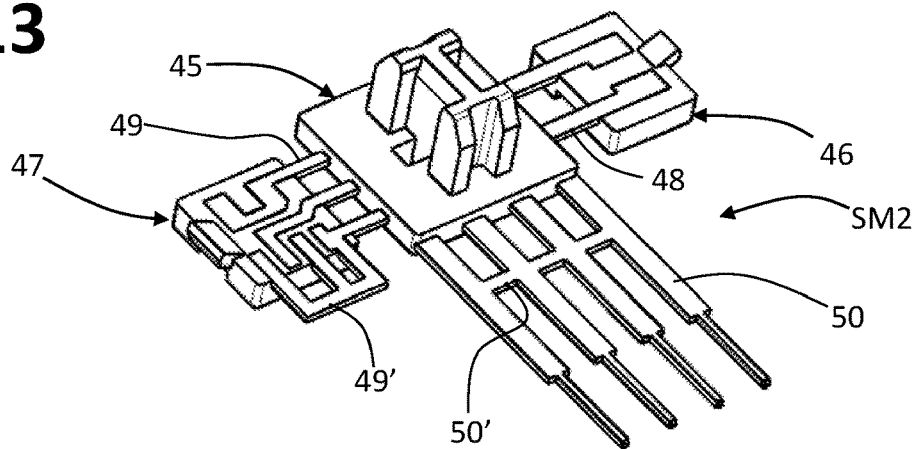
Figure 14:
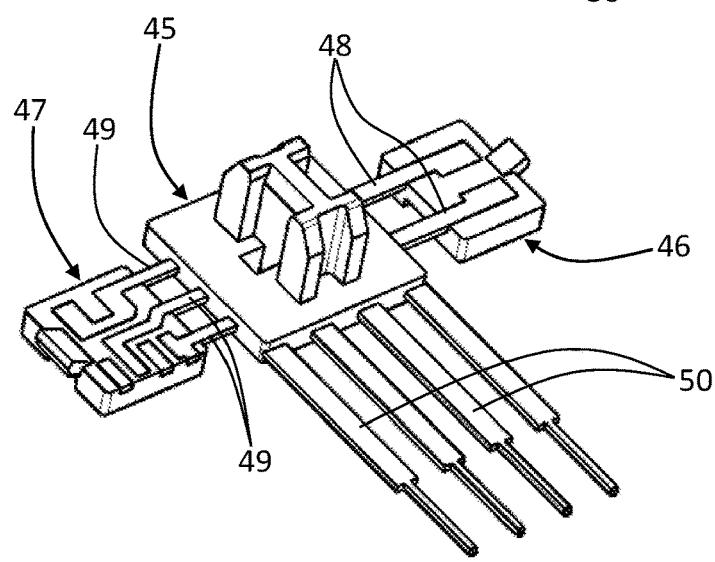
Figure 15:
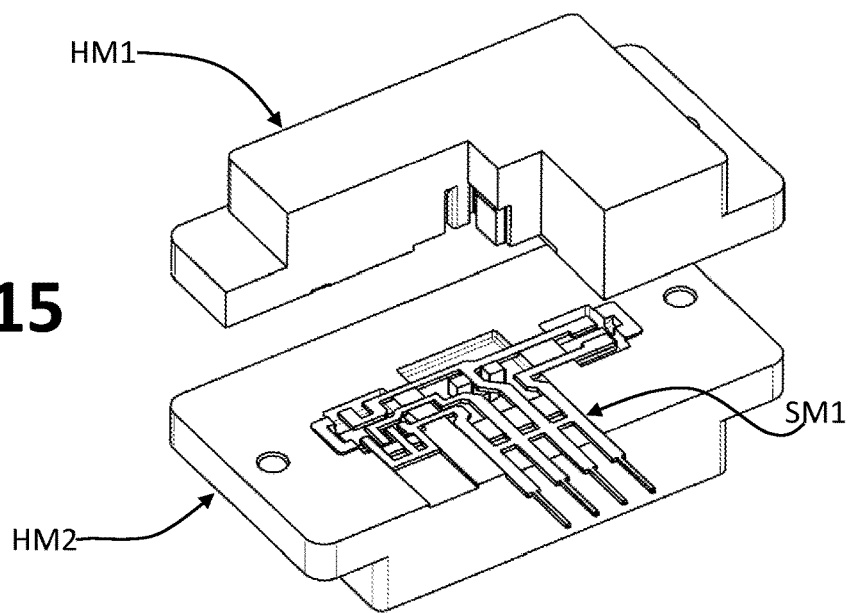

The semi-finished product SM1, which can be obtained, for example, via blanking from the aforesaid strap, defines in a single piece a plane shape of the conductors 48, 49 and of the terminals 50, which are joined together by means of accessory parts, some of which are designated by 49' and 50'. Moulded on the semi-finished product SM1 are the bodies 45-47, thereby obtaining a second semi-finished product, designated by SM2 in FIG. 13. From the second semi-finished product SM2 the aforesaid accessory parts are then eliminated, for example via blanking, so as to define the conductors 48, 49 and the terminals, once again having a plane configuration, as is clearly visible in FIG. 14. Next, preferentially, the intermediate portions of conductors and terminals are bent, as explained above, to assume the configuration visible in FIGS. 7-9. FIGS. 15 and 16 exemplify a mould, which can be used for formation of the semi-finished product, the two parts HM1 and HM2 of which include respective impressions $HM1_1$ and $HM2_1$, designed for positioning of the original semi-finished product SM1 of FIG. 12 and for definition of the profiles of the bodies 45-47 that are to be overmoulded on the aforesaid semi-finished product.

In other embodiments, a number of bodies of an optical module, such as the bodies 45-47, may be elements overmoulded at least in part on a flexible printed circuit board or PCB, which comprises or integrates at least part of the conductors (such as the conductors 48, 49) and terminals (such as the terminals 50). Alternatively, one or more bodies of a module, such as the bodies 45-47, may be elements moulded separately, in particular made of polymeric material, and subsequently associated, for example via gluing, to conductors (such as the conductors 48, 49) and terminals (such as the terminals 50) or to a flexible printed circuit board or PCB comprising at least in part the aforesaid conductors and terminals. For this purpose, a number of bodies of an optical module, such as the bodies 45-47, may also be joined together by respective flexible or articulated body portions, or else may be obtained as a single body comprising the aforesaid bodies joined by body portions of small thickness. In further embodiments, the bodies of an optical module may be moulded elements comprising an insulating polymer, whereas the corresponding conductors and/or terminals may be moulded elements made of an electrically conductive material that comprises a polymer, which are preferably comoulded or overmoulded on one another.

According to an inventive aspect, a number of bodies of an optical module, such as the bodies 45-47, are positioning and/or fixing moulded elements that can vary at least in part their relative position during assembly of the module. In particular, in various embodiments, these bodies, such as the bodies 45-47, are able to vary a respective relative angle, this variation being allowed also by a flexibility of corresponding conductors (such as the conductors 48, 49) and/or terminals (such as the terminals 50).

As has been explained, in various embodiments, the optical module 40 is connected in electrical-signal communication to the electronics of the sensor device 10, in particular to the circuit arrangement 17 of the circuit support 15. In various embodiments, for this purpose the circuit support 15 has, preferably in its portion 15*a*, suitable connection elements, for electrical connection of the terminals 50 of the module 40. These connection elements may for example be in the form of one or more from among metallized holes, solder pads, connectors provided with holes and small pins, at which the free ends of the terminals 50 are, for example, soldered or electrically connected, as represented schematically in FIG. 17, where the aforesaid holes are designated by 53 (see also FIGS. 4-5). In the example, the holes 53 (or the different connection means that replace them) are in a generally central position of the portion 15a; this must not, however, be deemed essential. As may be appreciated from FIG. 17, the bent portion of the terminals 50 is elastically flexible or deformable, thereby enabling performance of a function of spring, which enables autonomous adaptation of the relative position between the module 40 and the circuit support 15.

Figure 18:
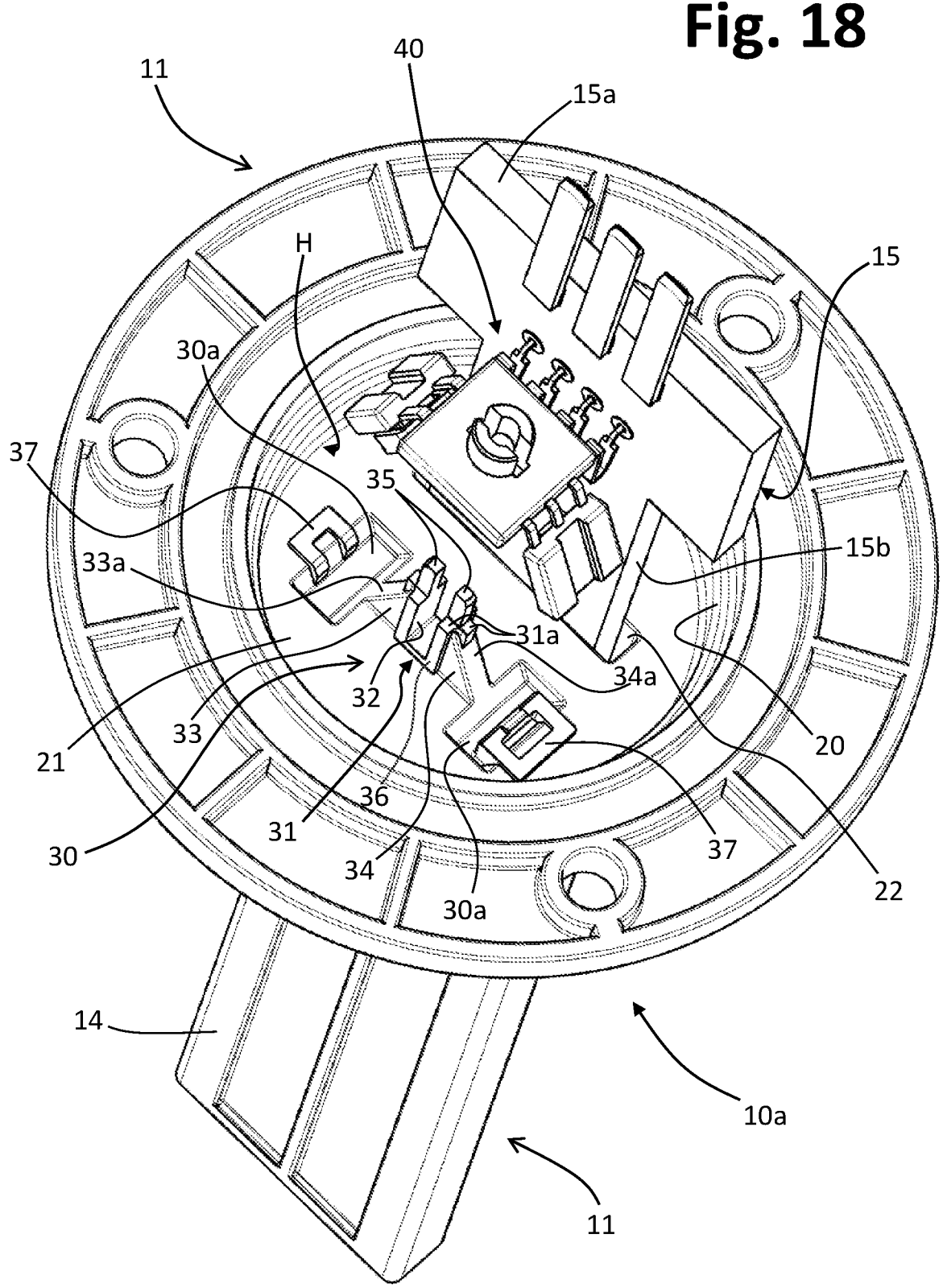
FIG. 18 is a perspective view aimed at representing a step of assembly of a sensor device according to possible embodiments of the invention.

Represented in FIG. 18 is a condition of partial insertion of the circuit support 15, with the associated optical module 40, within the body 10a of the device 10. Visible in this figure is a possible embodiment of the positioning site 30 for the module 40.

The site 30 includes at least one projecting element or formation 31 that rises, preferentially in an orthogonal direction, from the inner side of the wall 21 of the housing part 10a, designed to perform substantially functions of optical prism. The formation 31 basically consists of a wall—here generally parallel to the insertion opening 22 of the circuit support 15—which is made of the same material as the wall 21, in particular a transparent material or material permeable to the light or optical radiation used by the optical module 40, and that is preferably divided, by an intermediate cut or cavity 32, into two upright parts 33 and 34. The upright parts 33 and 34 are substantially specular to one another and each define an inclined face or surface 33a and 34a, in a lateral position, or in a position external to the intermediate cavity 32. In the case exemplified, the upright parts each have an approximately triangular shape, in particular the shape of a right-angled triangle, the hypotenuses of which forms the aforesaid opposite inclined surfaces.

Rising from the two upright parts 33 and 34, in the proximity of their upper ends, are positioning appendages 35 generally parallel to one another, preferably having a cross section substantially complementary to that of the through openings 51a of the central body 45 of the module 40 (see FIGS. 7-9). Preferentially, at the front and at the back (or at on non-inclined sides) of the formation 31, a projection 36 is provided, which preferably surrounds the intermediate cavity 32, when the latter is envisaged (visible in the figure is just the front projection of the formation 31; the rear projection may have a similar shape). Preferably, the projections 36 and/or the upright parts 33, 34 define contrast and/or positioning surfaces or seats 31a (FIG. 18) for the optical module 40, in particular in an area from which the appendages 35 rise.

Preferentially, even though this is not strictly indispensable, the site 30 comprises two recesses or seats 30a defined in the bottom wall 21, each at an upright part 33, 34, alongside the corresponding inclined surface 33a, 34a. Very preferably, defined at least one of the aforesaid recesses 30a is a positioning and/or centring and/or contrast and/or engagement element 37 for the lower end of a corresponding lateral body 46, 47 of the module 40, in particular for the corresponding lower projections 46b, 47b (see FIGS. 8 and 9).

During assembly, the circuit support 15 with the associated optical module 40 is inserted in the body 10a, with the portion 15b that penetrates through the opening 22 in the corresponding casing 14 until the portion 15a is located, instead, in the cavity H. In the course of this insertion, the upper appendages 35 of the upright parts 33, 34 (FIG. 18) penetrate into the through openings 51a of the central body 45 of the module 40 (FIGS. 7-9), and the wall 52a of the lower formation 52 of the aforesaid central body 45 (FIGS. 8-9) penetrates into the intermediate cavity 32 that separates the upright parts 33 and 34 of the optical formation 31 from one another (FIG. 18). The walls 52b of this formation 52 slide on the projections 36 of the front and back of the formation 31 (FIG. 18), thus contributing to centring.

Contact or abutment in the vertical direction between the module 40 and the formation 31 occurs in the upper part, with the lower surface of the central body 45 of the module 40 that comes to bear upon upper surfaces of the upright parts 33, 34, i.e., surfaces from which the appendages 35 project in height (these surfaces may be appreciated in FIG. 18, two of which are designated by 31a). Preferentially, provided in the lower part is at least one surface for abutment in a radial direction, also with the aim of positioning or countering rotation of the optical module 40 with respect to the site 30: this contrast surface is preferably obtained via the lower projections 46b and 47b (FIGS. 8 and 9) of the lateral bodies 46 and 47 of the module 40, which engage in the elements or seats 37 defined at the recesses 30a (FIG. 18), possibly with the provision of mutual-engagement means between the elements 46b, 47b and the elements 37. In this way, the module 40 is not able to turn and can remain in the desired position.

The flexibility of the conductors 48, 49 and of the terminals 50 of the module 40 is particularly advantageous in this step, in so far as it enables compensation of possible dimensional tolerances involved in production of the parts and in assembly of the module itself on the circuit support 15, which are relatively high in devices comprising a number of moulded parts made of plastic material, thereby preventing any failure during assembly and/or enabling precise positioning of the optical module 40.

Figure 19:
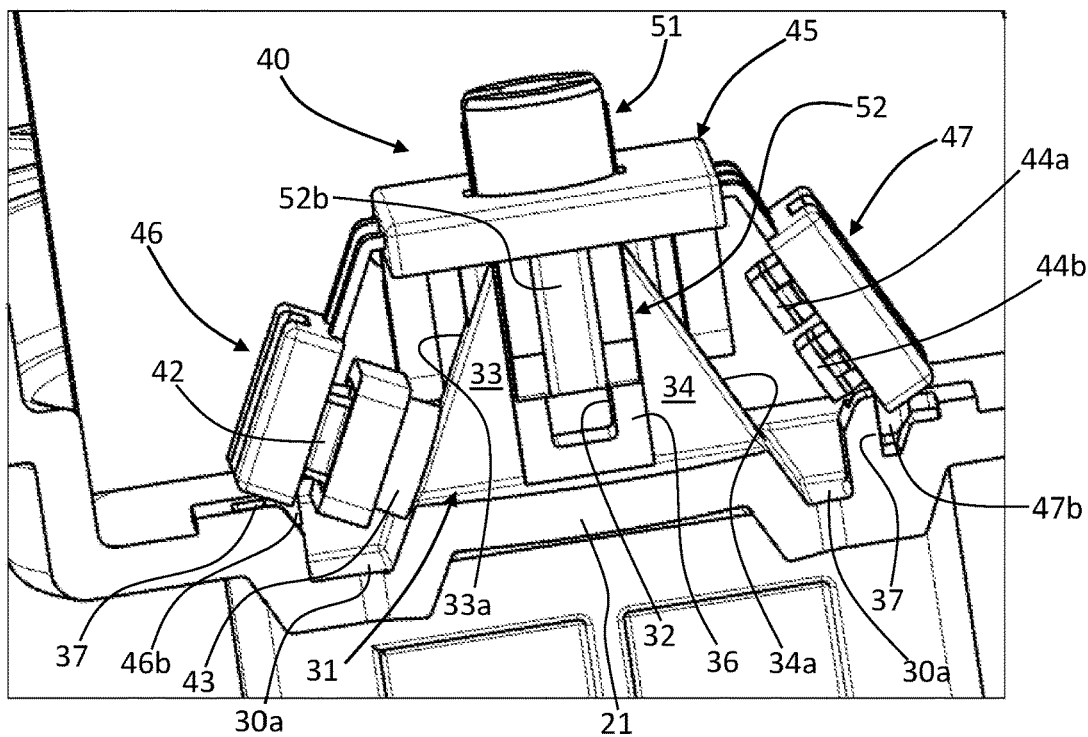
FIGS. 19 and 20 are a sectioned perspective view and a perspective view of a portion of a sensor device according to possible embodiments of the invention.
Figure 20:
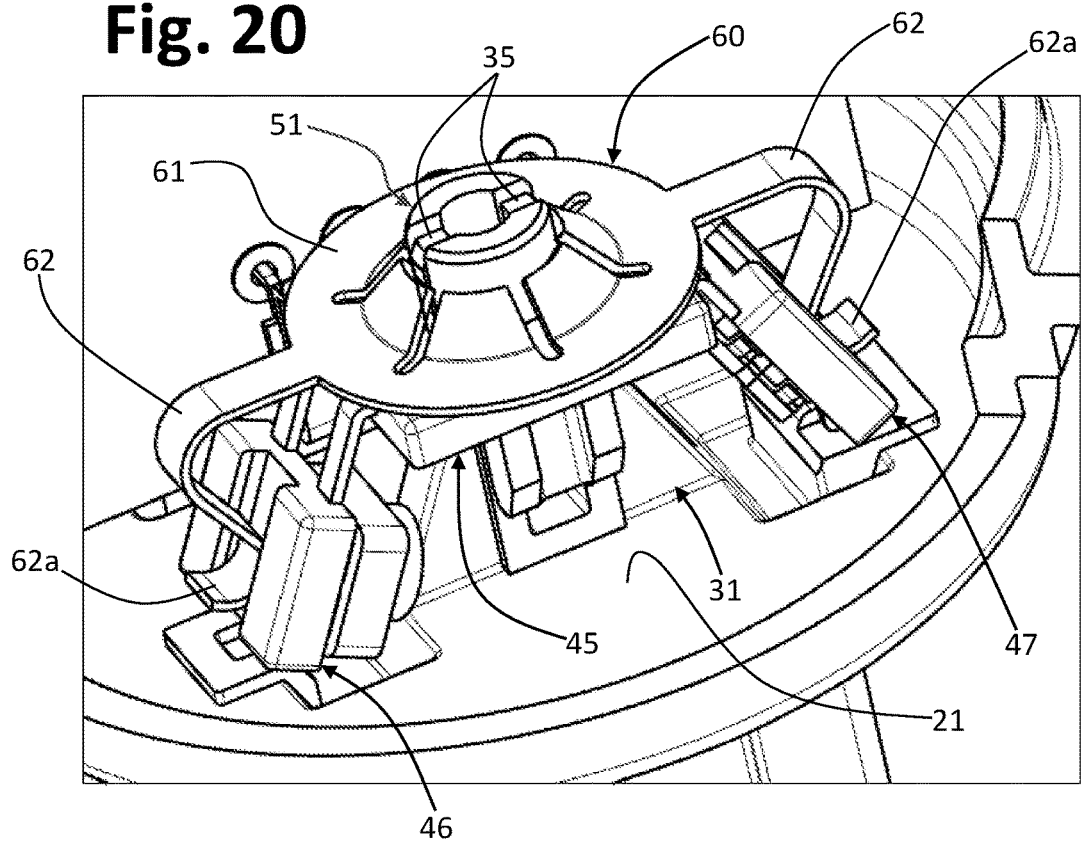

A partially assembled condition is visible in FIG. 19, from which it may be noted how, in the position described, the body 46, and hence the emitter 42, on the one hand, and the body 47, and hence the photodetectors 44a, 44b, on the other, are set facing and generally parallel to the inclined surfaces 33a and 34a of the two upright parts 33 and 34, respectively. Next, and as may be seen in FIG. 20, fitted on the formation 51 defined at the upper face of the central body 45 of the optical module 40 is the aforementioned elastic blocking and/or positioning element 60, hereinafter also defined for simplicity as "spring", preferably made of metal material. The spring 60 has a central part 61 provided with a tabbed hole (i.e., an opening defined by elastic radial tabs) in order to enable fixing thereof with interference on the formation 51 itself. It is preferable for the tabs of the hole to be sized also to enable fixing with interference fit also with the outer surface of the appendages 35 which projects in a position corresponding to the formation 51 (see FIG. 20).

Branching off from the central part 61 of the spring 60 are generally curved opposite elastic arms 62, designed to exert a force on the lateral bodies 46 and 47 of the module 40. The ends 62a of the arms 62 are for this purpose preferably shaped for being received in the grooves 46a and 47a (FIG. 7) of the lateral bodies 46 and 47 of the module 40, respectively. Preferably, the aforesaid ends 62a are curved, also in order to be able to slide in the grooves 46a and 47a during assembly. As may be appreciated, in this way, the optical module 40 is fixed in position with respect to the formation 31 (and/or to the site 30, and/or to the inclined surfaces 33a, 34a, and/or to the wall 21, and/or to the body 10a), as may be seen in FIGS. 20 and 21.

Figure 21:
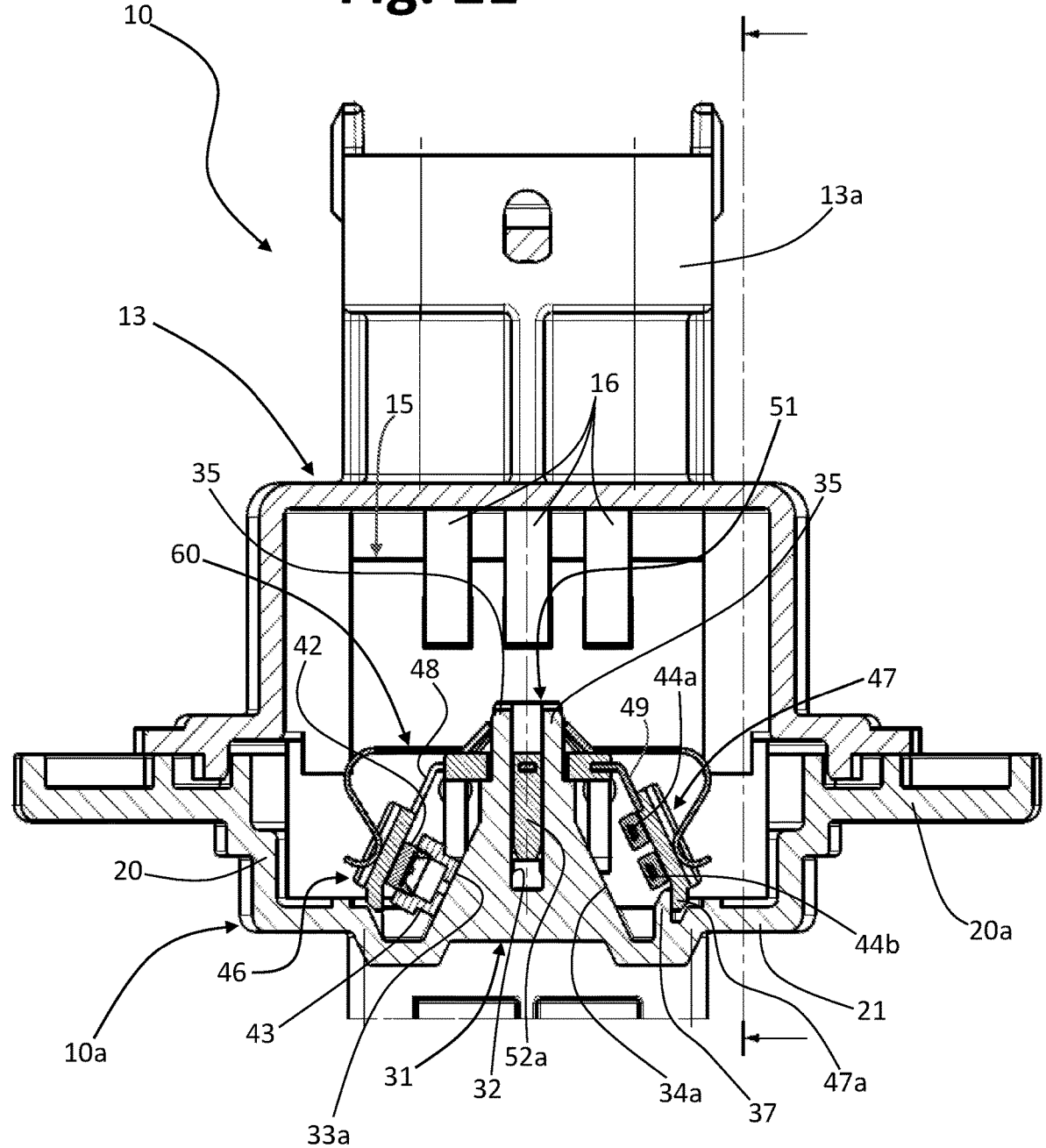
FIG. 21 is a partial vertical cross-sectional view of a sensor device according to possible embodiments of the invention.

The force exerted by the arms 62 of the spring 60 is able to bend the conductors 48, 49 of the module 49 (FIGS. 7-9), guaranteeing that the bodies 46 and 47 bear upon the body 10*a*. For this purpose, both the configuration of the conductors 48, 49 and the configuration of the spring 60 are predefined to guarantee the aforesaid bending of the conductors and/or the aforesaid positioning. With reference to FIG. 21, the force exerted by the spring 60 guarantees, on the side of the emitter 42, contrast and positioning between the space filter 43 and the optical surface represented by the inclined surface 33*a*. On the side of the receiver 44*a*-44*b*, the force of the spring 60 guarantees contrast between the lower projection 47*b* of the body 47 of the module 40 and the corresponding contrast surface 37 defined in the wall 21.

Provision of the two contrast elements mentioned, together with the use of the spring 60, guarantee recovery of possible tolerances deriving from assembly and production of the components in such a way as to obtain a precise position of the optical components 42 and 44*a*, 44*b*. The position of these components—which is linked to the critical angle envisaged by the application, as described hereinafter—affects calibration of the sensor for detecting the quality of the liquid solution and must thus be definite and precise so as not to generate errors of measurement. The spring 60 also guarantees recovery of any play and deformation that may be generated during the service life of the device 10, owing to thermal cycles and/or ageing of the materials. Obviously, also the flexibility of the conductors 48, 49 and of the terminals 50 contributes to recovery of tolerances and play.

In preferred embodiments, the intermediate cavity 32 of the formation 31 is provided in order to shield the receiver 44, i.e., the photodetectors 44*a*, 44*b*, from direct irradiation by the emitter 42 (i.e., without there being any incidence on the solid/liquid interface surface, as clarified hereinafter). This cavity 32, when envisaged, may hence not have just the centring function for the optical module 40 but, also thanks to the interposition of the wall 52*a* of the lower formation 52 of the module 40 (see once again FIGS. 8-9), could cause the aforesaid wall to operate as shield against parasitic emissions, as may clearly be appreciated for example from FIG. 21. Possibly the walls of the intermediate cavity 32 or some walls of the formation 31 may be at least in part coated with a material or paint impermeable to optical radiation, or else be shaped so as to deflect the rays of the emitter 42 in such a way that these do not reach the receiver 44 directly.

Preferably, shielding of the direct emissions is further improved by the use of the space filter 43. The use of at least one of such shielding elements represented by the cavity 32 and/or by the filter 43 could enable the use of lower-quality and less costly emitters 42, in so far as they are not designed or selected for emissions within a narrow angle. Such an emitter 42 could in fact be of the type that emits in a distributed way in all directions (0-180°) and, in addition to the space filter 43, the intermediate shield represented by the wall 52*a* prevents the light rays not involved in the measurement (i.e., the rays different from the ones reflected and refracted by the solid/liquid interface surface, as explained hereinafter) from possibly altering the measurement made via the photodetectors 44*a*, 44*b*.

Operation of the quality optical sensor integrated in the device 10 according to the invention is based upon the optical laws linked to refraction/reflection of optical radiation, and in particular to the critical angle of total reflection. More in particular, the operating principle is based upon the dependence of the refractive index of the liquid substance upon its composition or concentration: the measurement is hence based upon the jump in the refractive index between the liquid to be analysed and the solid material in which the optical formation 31, as well as the corresponding part of the bottom wall 21 of the body 10*a* (i.e., its part that is occupied by the optical positioning site 30 of the optical module), is defined, exploiting the principle of total inner reflection within the interface between the two media.

If $n_1$ is the refractive index of the aforesaid solid material (e.g., for a COC at 25° C., $n_1$=1.5413 at the wavelength of 650 nm), $n_2$ is the refractive index of the liquid solution, which presents a range of variation comprised between two limits according to its concentration (e.g., for urea we may consider a range of variation between 1.3626 and 1.3949 corresponding to a concentration between 20% and 40%), $\theta_1$ is the angle of incidence (propagation of light in the solid), and $\theta_2$ is the angle of deflection of the refracted beam (propagation of light in the liquid), the angle of propagation in the liquid medium will depend upon the angle of incidence, at the interface, of the beam that propagates in the solid medium, as expressed by Snell's law:

$$n_1 \sin \theta_1 = n_2 \sin \theta_2 \qquad 1)$$

The coefficient of reflection at the interface between the two materials as a function of the angle of incidence for the polarization p (parallel) and the polarization s (normal) of the light is expressed instead by Fresnel's law:

$$R_{s1} = \left(\frac{\sin(\theta_2 - \theta_1.)}{\sin(\theta_2 + \theta_1)}\right)^2 \qquad 2)$$

$$R_{p1} = \left(\frac{\tan(\theta_2 - \theta_1.)}{\tan(\theta_2 + \theta_1)}\right)^2 \qquad 3)$$

The intensity of the reflected ray is constituted by the composition of the two states $R_s$ and $R_p$. By computing Eqs. 2 and 3 for each angle of incidence and for each value of the refractive index of the liquid solution within the range of interest, it is possible to know the (percentage) value of the reflectivity as a function of the angle of incidence of the light beam. The angle of incidence at which Eqs. 2 and 3 generate a value of reflectivity of 100% is referred to as "critical angle of total inner reflection".

Since there exists a limit condition for the angle of incidence at the solid/liquid interface where the angle of refraction is tangential to the interface itself, $n_1$ must be greater than $n_2$, as in the situation of interest for the application considered herein, where propagation from solid to liquid is considered. For an incidence with an inclination greater than the critical angle, the beam is totally reflected at the interface.

It may be found that the critical angle of refraction at the interface is expressed by the relation:

$$\theta_c = \arcsin\left(\frac{n_2}{n_1}\right) \qquad 4)$$

which represents the condition where the value of reflectivity—as the angle of incidence $\theta_1$, calculated by applying Eqs. 2 and 3, varies—reaches 100%.

Computing Eq. 4 for all the values of $n_2$ of interest, where $n_2$ is the refractive index of the liquid solution, which depends upon its concentration, it is possible to link the value of the concentration to be measured to the position of the reflected light beam at the solid/liquid interface.

In particular, the following relations apply:

$$Conc\ 1 \Rightarrow n_2 = N_{21} \Rightarrow \theta_{c1} = \arcsin\left(\frac{N_{21}}{n_1}\right)$$
$$Conc\ 2 \Rightarrow n_2 = N_{22} \Rightarrow \theta_{c2} = \arcsin\left(\frac{N_{22}}{n_1}\right)$$
(5)

If Conc 1>Conc 2 then the following relation applies:

$$N_{21} > N_{22} \Rightarrow \theta_{c1} > \theta_{c2}$$

On the basis of what has been recalled here, it is hence possible to exploit the existence of a critical angle of total reflection that varies as the concentration varies for measuring the concentration itself, by applying the relations of Eq. 5.

For this purpose it is possible to use a light source—i.e., an emitter 42—with divergent output so as to illuminate the interface surface at all the angles of interest around the critical angle, and hence with an incidence that is greater and less than the critical angle. In this way, there will exist two areas: an area impinged upon by the totally reflected rays (which derive from the rays having an angle of incidence greater than the critical angle) and an area impinged upon with a lower intensity, which is illuminated by the partially reflected rays (which derive from the rays having an angle of incidence of less than the critical angle). There may thus be obtained, at output, a region of illumination in which the separation between the area highly illuminated by total inner reflection and the area less illuminated (partial reflection) is variable as a function of the concentration of the liquid.

Hence, using the two photodetectors 44a and 44b, positioned in the two areas, through the variation of their output signal it is possible to evaluate the variation of the critical angle and consequently the variation of composition or concentration—and, in the ultimate analysis—of the quality of the liquid substance or solution.

The inclination of the optical surfaces 33a and 34a is preferably calculated in such a way that the optical signal traverses them in a direction as far as possible orthogonal to the surfaces of entry and exit of the light, so as to minimise the reflection at the air/solid and solid/air interfaces, respectively.

The emitter 42 is preferably a light source with a narrow emission beam in order to concentrate the measurement in the area of interest (around the critical angle), according to the direction identified as a function of the critical angle (however, as mentioned previously, the preferential use of filters and/or shieldings enables the use also of light sources with wider emission beam). In this way, also any interference due to direct irradiation of the photodetectors 44a and 44b is minimised. In various embodiments, it is preferable to use non-diffused lambertian sources, i.e., sources with uniform light emission in space without holes or alterations in the near field. To exploit the practically constant area of maximum intensity of the source and restrict the emission in the area around the critical angle, also the space filter 43 is preferably introduced.

Figure 23:
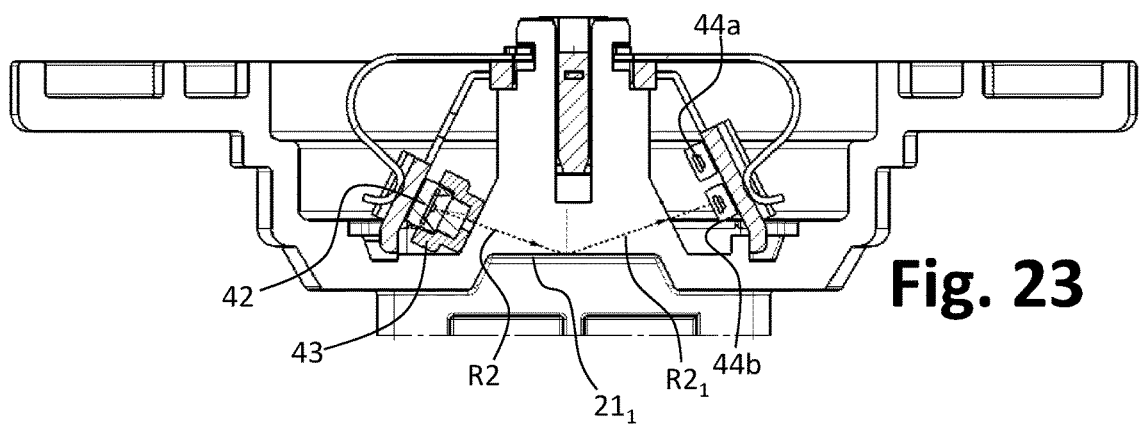

The path of the light rays can be represented schematically as exemplified in FIGS. 22 and 23.

In the above figures, there appear two rays R1 and R2 contained within the range of emission of the source, which are incident on the surface of separation between the solid and the fluid (i.e., the outer side—here designated by $21_1$—of the bottom wall of the cavity H) with two different angles; the angles of the rays R1 and R2 are, respectively, smaller and greater than the critical angle. Given that the ray R1 has an angle of incidence lower than the critical angle, it will be refracted in the ray $R1_1$ and reflected in the ray $R1_2$. By the law of conservation, the intensity of the ray R1 will be distributed between the ray $R1_1$ and the ray $R1_2$. The ray $R1_2$ will be detected by a first photodetector 44a, also defined hereinafter for simplicity as "upper photodetector". The ray R2, instead, is incident with an angle greater than the critical angle and will hence be totally reflected in the ray $R2_1$. Unless in case of dissipation, the ray $R2_1$ will have the same intensity as the ray R2. The totally reflected ray will be detected by the second receiver 44b, also defined hereinafter for simplicity as "lower photodetector".

The rays used for the schematic representation appearing in FIGS. 22 and 23 form part of a region of illumination that changes its configuration as a function of the variation of the critical angle (namely, of the refractive index of the liquid solution), i.e., of the concentration of the liquid solution. Exemplified for greater clarity in FIGS. 24, 25, and 26 are three working conditions, linked to three different concentrations of the fluid.

Figure 24:
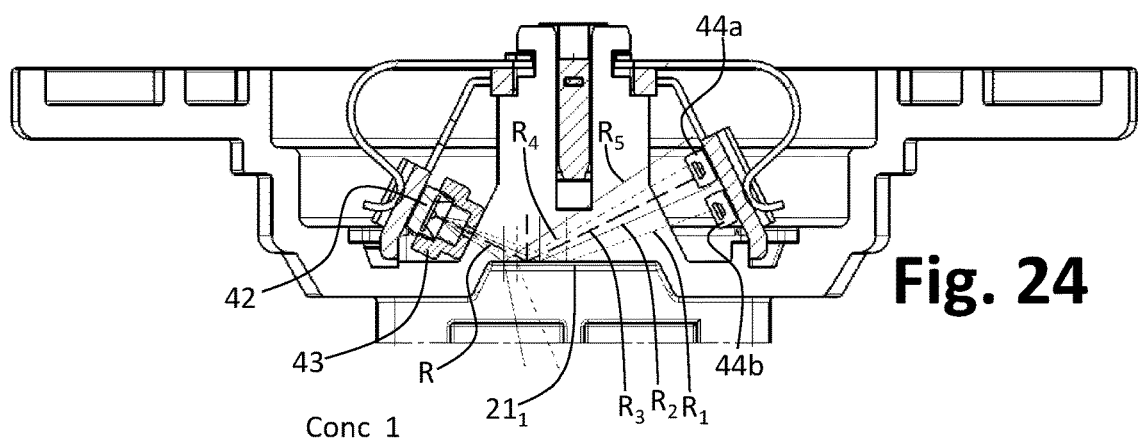
Figure 28:
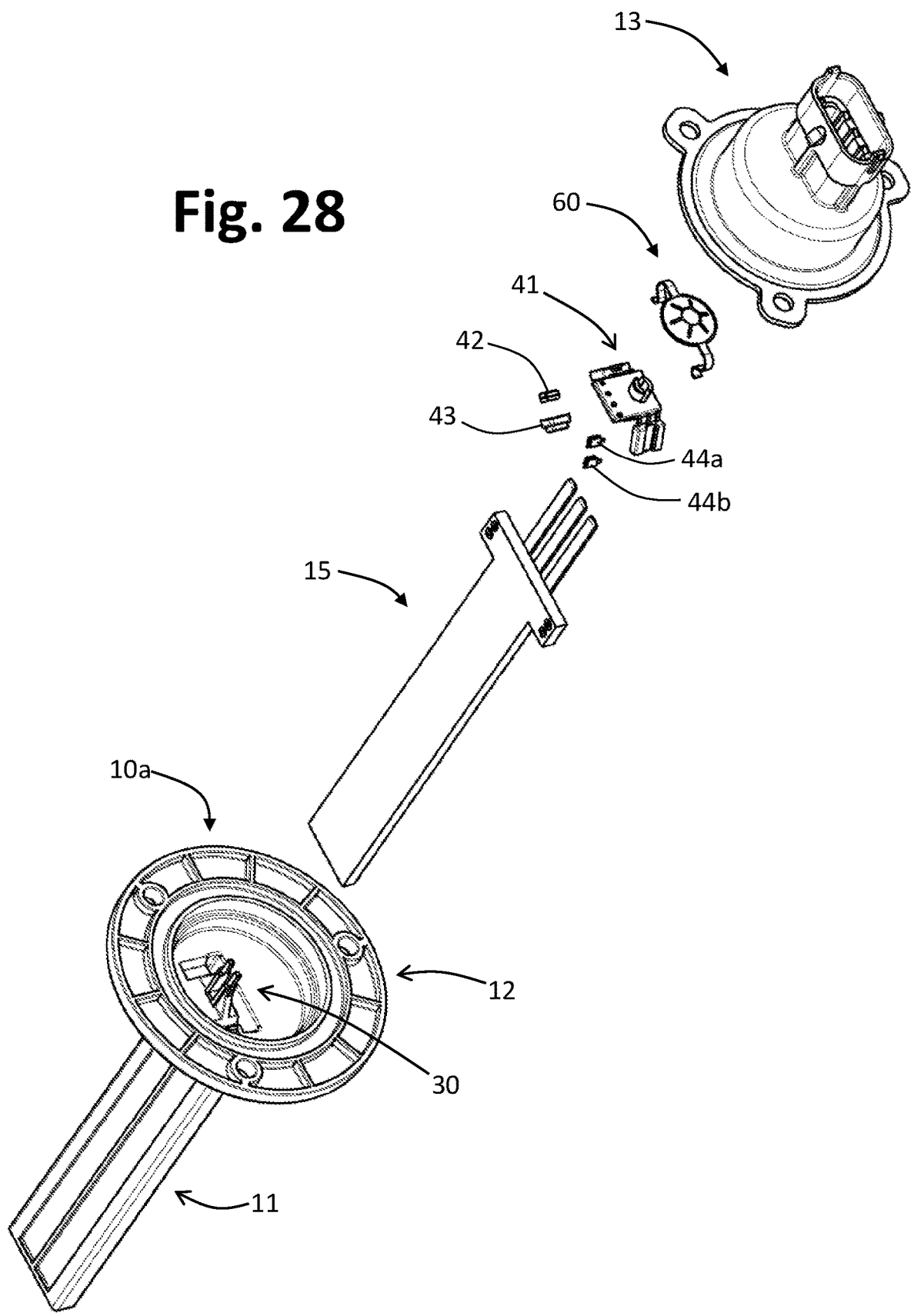
FIGS. 28-29 are exploded views, from different angles, of a sensor device according to possible embodiments of the invention.
Figure 29:
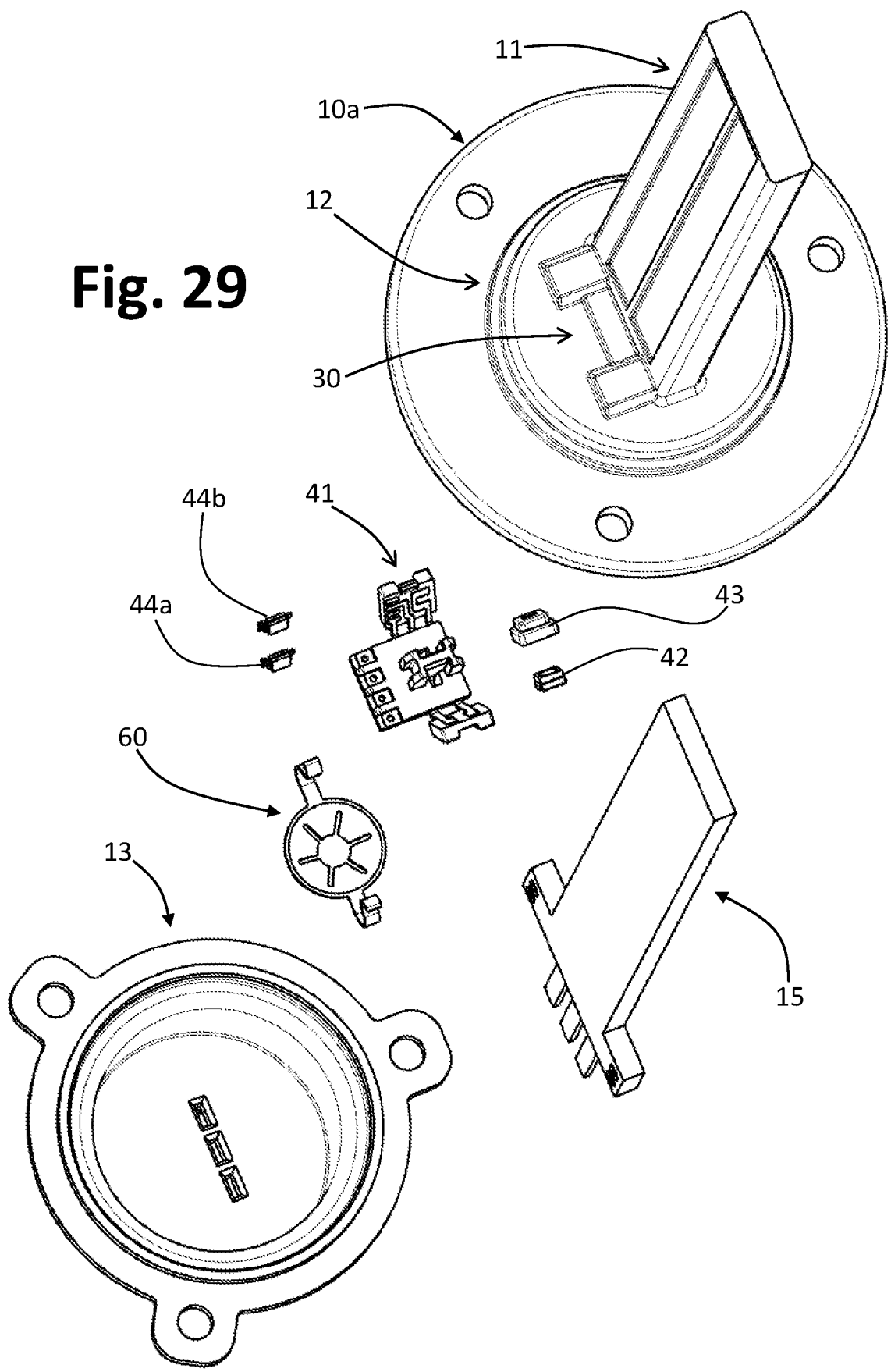

In the presence of a liquid substance or solution with a first composition or concentration Conc 1 the scheme represented in FIG. 24 is obtained: assuming that the rays of the beam R impinge upon the surface of interface with an angle equal to the critical angle, the rays $R_1$, $R_2$, and $R_3$ are obtained as total reflection of the incident rays, whereas the rays $R_4$ and $R_5$ are obtained as partial reflection of the incident rays. The lower receiver 44b will hence be completely illuminated by the totally reflected rays, whereas the upper receiver 44a will receive a lower intensity or radiation produced by the partially reflected rays.

FIG. 25 represents schematically a condition in which a second concentration of the liquid substance or solution is equal to Conc 2, where Conc 2 is smaller than Conc 1. The rays of the illuminating beam R produced by the emitter 42 always present the same angle of incidence, while the critical angle decreases. It follows that, in addition to the rays $R_1$, $R_2$, and $R_3$, there will be obtained also the ray $R_4$ by total reflection, whereas the ray $R_5$ will continue to be obtained by partial reflection. In this condition, the intensity of radiation on the upper receiver 44a will be increased, whereas the one on the lower receiver 44b will remain unchanged.

Finally, FIG. 26 represents schematically a condition where a third concentration of the liquid substance or solution has a value Conc 3, which is greater than Conc 1. Also in this case the rays of the illuminating beam R produced by the emitter always present the same angle of incidence, while the critical angle increases. It thus follows that the rays $R_1$ and $R_2$ will always be obtained by total reflection, whereas the ray $R_3$ will be obtained by partial reflection, like the rays $R_4$ and $R_5$. In this condition, the intensity of radiation on the upper receiver 44a will be reduced, whereas the one on the lower receiver 44b will remain unchanged. By further increasing the concentration of the fluid, the percentage of totally reflected rays will decrease, and also the signal on the lower receiver 44b will vary. In this condition, the intensity of radiation on the upper receiver 44a will be reduced, whereas the one on the lower receiver 44b will remain unchanged. By further increasing the concentration of the fluid, the percentage of totally reflected rays will decrease, and also the signal on the lower receiver 44b will vary.

Consequently, as may be appreciated, the photodetectors 44a and 44b are positioned so as to receive each a part of the reflected light beam, one of the photodetectors receiving radiation at high intensity, which is the light incident with an angle greater than the critical angle, and the other receiving radiation at low intensity, which is the light on the "tail" of the profile of radiation.

On the basis of what has been set forth above, if A and B are the voltage signals at output from the photodetectors 44a and 44b, it is easy to understand that they contain a term that depends upon the optical power P emitted by the source 42. A and B are in fact voltage signals generated by the value of photo-current, i.e., of electric current of the photodetectors upon which the light impinges, multiplied by the transimpedance gain. The photo-current is proportional to the optical power P emitted by the source 42, multiplied by the response (responsivity) of the photodetector 44a or 44b, namely:

$$A = ka * P \cdot \text{response} * \text{transimpedance}$$

$$B = kb * P \cdot \text{response} * \text{transimpedance}$$

where ka and kb are coefficients that take into account the amount of light incident upon the photodetector 44a or 44b, which will be a function of the refractive index and hence will be variable as a function of the critical angle.

To eliminate the dependence upon P and thus obtain a signal that depends only upon the position of the centroid of the region of illumination, irrespective of the peak intensity value, it is sufficient to introduce a normalized signal. This signal may be correlated, for example via an appropriate calibration that can be performed on the basis of predefined data, to the variation of concentration of the liquid substance or solution undergoing detection, which is hence independent of the illuminating power P. It is convenient to eliminate the dependence upon the intensity of the optical power so that the measurement will not be affected by any disturbance linked to variations (e.g., thermal variations or variations due to degradation over time) in the emission of the source 42.

The two signals A and B produced by the photodetectors 44a and 44b are preferentially treated by an analog conditioning network so as adapt them to the electronic controller MP, which is able to generate a signal S that is directly correlated, via appropriate calibration, to the concentration of the liquid solution.

FIG. 27 provides an example of operating block diagram of the quality optical sensor. In this figure, designated by Vcc is the low-voltage supply of the emitter 42, whilst the block OG represents the optical geometry provided by the positioning site 30 (formation 31 and corresponding wall portion 21). As may be noted, the voltage signals A and B at output from the photodetectors 44a, 44b are treated by a conditioning circuit CC, and the conditioned signals A1 and B1 reach corresponding inputs of the controller MP, which generates the signal S representing the value of concentration of the solution. The components CC and MP are preferably located on the circuit support 15, with the controller MP that manages both detection of level and detection of quality of the liquid substance or solution. The components CC and MP may also be integrated in a single microcontroller component.

In various embodiments, the connection between an optical module of the device 10 according to the invention and the corresponding interface and/or control circuit, such as the one provided on the circuit support 15 and/or the circuit arrangement 17, can be obtained via wiring, namely, electric wires, instead of terminals, preferably externally insulated wires. An embodiment of this type is, for example, illustrated in FIGS. 28-33, where the same reference numbers as those of the previous figures are used to designate elements that are technically equivalent to the ones already described above.

The use of electric wires enables the circuit support 15 to be kept separate from the optical module in order to be able to mount them separately, for making the wired connection between them after assembly of the two parts. Advantageously, and as may be evinced in particular from FIG. 30, in an embodiment of this type the opening 22 for insertion of the portion 15b of the circuit support 15 may be in a more central position of the wall 21 as compared to the embodiments illustrated previously, with the optical formation 31 that is directly adjacent to the opening 22. Considering the preferential case of a cavity H with peripheral wall 20 of a circular shape, useful for the purposes of a better seal via gaskets of a circular type (O-rings), a more central arrangement of the opening 22 in the cavity H affords a greater radial width of the opening 22, and consequently affords a greater width of the portion 15b of the circuit support 15, which is important for obtaining a larger surface and/or higher capacitance of the electrodes J and hence a higher sensitivity of the level sensor given the same resolution in height.

Figure 32:
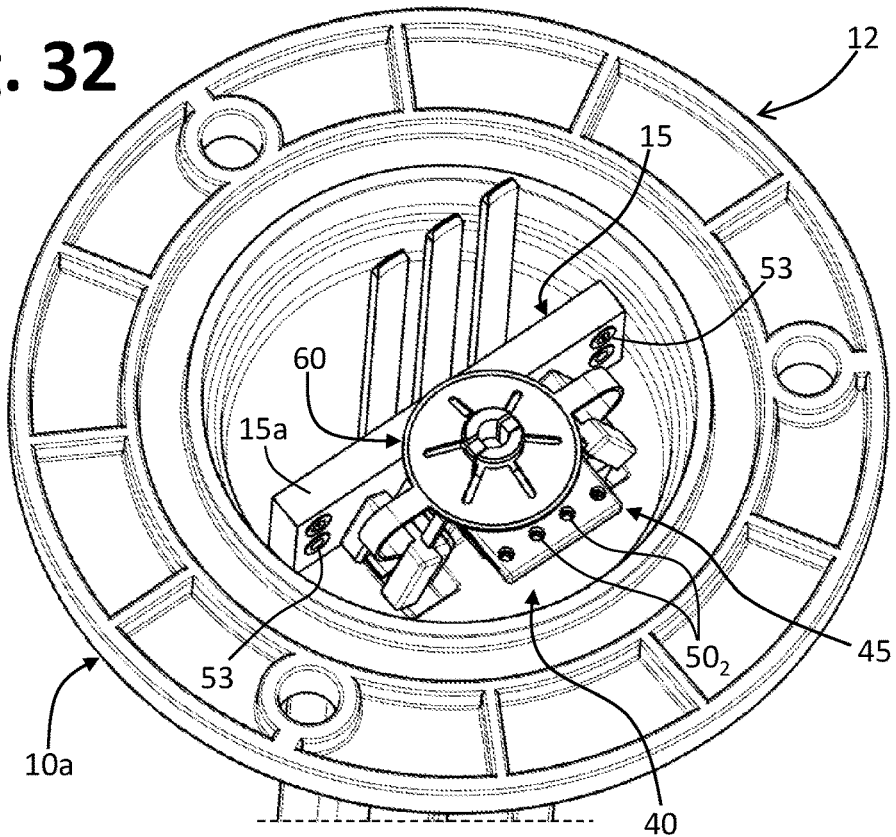
Figure 33:
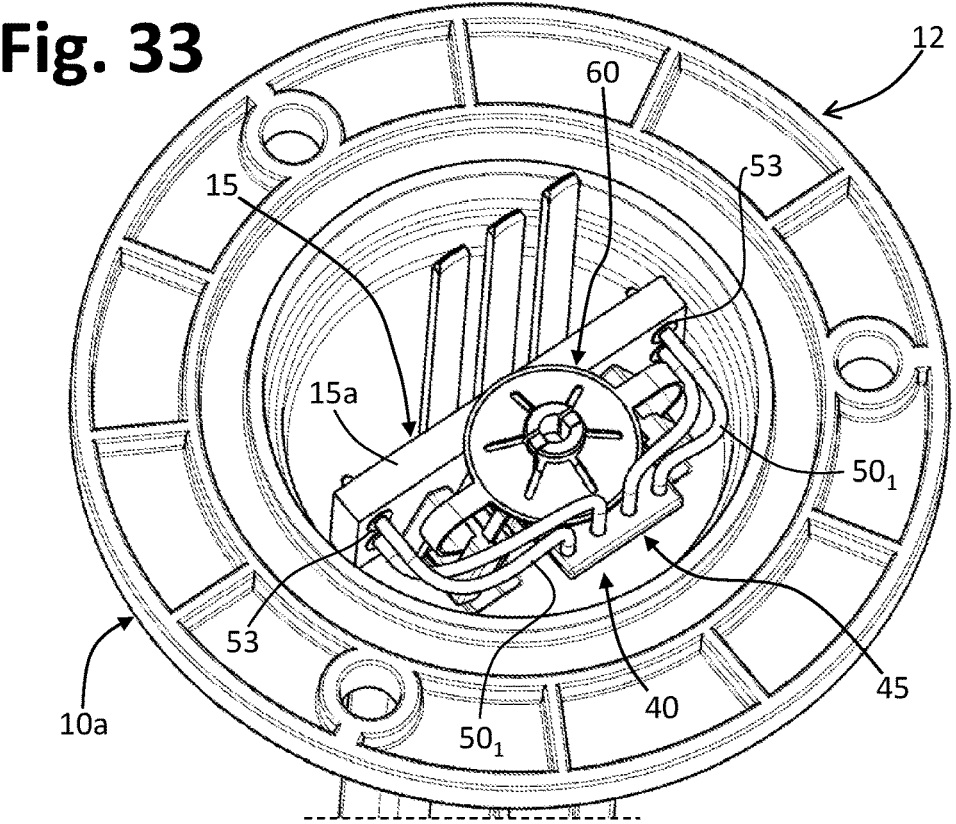

Preferentially, and as may be evinced in particular in FIGS. 31-33, the connection holes 53 are provided in lateral positions of the portion 15a of the circuit support 15, to which the aforesaid electric wires—some of which are designated by $50_1$ in FIG. 33—may, for example, be soldered. The holes 53 may also be replaced by metallized pads or small pins. The dimensions of the portion 15a of the circuit support 15, in particular its height, may be smaller than in the case illustrated previously.

In view of the use of electric connection wires, the body 45 of the optical module 40 is slightly modified with respect to what has been illustrated previously. In particular, the terminals previously designated by 50 are shorter and are prevalently embedded in the plastic material that constitutes the body 45 (see, for simple reference, FIGS. 37 and 38, as regards a further embodiment). Preferentially, these terminals have through holes (or pads) in respective end regions, and the central body 45 of the module 40 is moulded so as to leave the aforesaid holes (or pads) accessible, as may be seen, for example, in FIGS. 31 and 32, where designated by $50_2$ are some of the passages of the body 45 that enable access to the aforesaid holes of the embedded terminals in order to enable connection of the electric wires (for an embodiment of this sort, see, for example, also FIGS. 38 and 50).

In embodiments of this sort it is preferable first for the circuit board 15 to be inserted through the opening 22 of the wall 21, and then the optical module 40 is positioned and fixed on the formation 31 in a way substantially similar to what has already been described previously, via the spring 60. The next step is to connect the electric wires $50_1$ between the circuit support 15 and the module 40. The wires $50_1$ may, on the other hand, also be connected on the optical module 40 prior to mounting thereof on the formation 31. The operating principle of the device, as regards detection of the quality of the liquid solution, is similar to what has been described previously.

The advantage of solutions that entail the use of electric connection wires affords greater flexibility in the coupling between the optical module 40 for measurement of the concentration and the circuit support 15 (on the other hand, instead of the aforesaid electric wires there could be provided other electrical connections or terminals, for example in the form of terminals obtained from a blanked metal strap or stamped or machined metal; electrical terminals of this sort could possibly envisage an overmoulded body, distinct from the bodies 45-47 of the optical module 40).

The version described, where the module 40 can be mounted separately from the circuit support 15, is particularly advantageous in devices 10 where overmoulded on the circuit support 15 (or at least on a portion 15a thereof) is the body 10a (or at least the casing 14), or where the two parts are co-moulded, these production measures possibly being adopted for improving operation and above all reliability of the device in terms of resistance to penetration of the fluid. For instance, in such a case, the circuit support 15 is placed in a mould, then overmoulded thereon is the body 10a or the casing 14, and finally the module 40 is assembled and then connected to the circuit support 15.

In various embodiments, provided within the cavity of the body of the sensor device is an optical shield, preferably of a dark colour or impermeable to optical radiation or light at a predefined frequency, which performs the function of shield from ambient light.

FIGS. 34-48 illustrate a variant embodiment in this sense. Also in these figures the same reference numbers as those of the previous figures are used to designate elements that are technically equivalent to the ones already described above, in particular as regards the relative position between the formation 31 and the opening 22, as well as the type of electrical connection of the optical module 40 to the circuit support 15, i.e., its arrangement 17. The embodiments described with reference to FIGS. 34-48 are basically distinguished by the presence, within the cavity H, of a shield or body aimed at limiting diffusion of ambient light, as well as by a different mode of fixing in position of the optical module 40, as compared to the previous embodiments.

With initial reference to FIG. 34, the body 10a and the circuit support 15 may be of a construction substantially similar to the one described with reference to FIGS. 2-27, as likewise the basic structure of the formation 31, which may be in a position closer to the opening 22 and the upper appendages 35 of which have external recesses.

The optical module 40 is substantially similar to that of FIGS. 28-33, possibly with some modifications that depend upon its mode of fixing in position: for example, in various embodiments, the module 40 may be secured in position via a different elastic element or spring $60_1$ and an arrest or retention ring 80, in particular an elastic retaining ring or circlip (Seeger).

Figure 34:
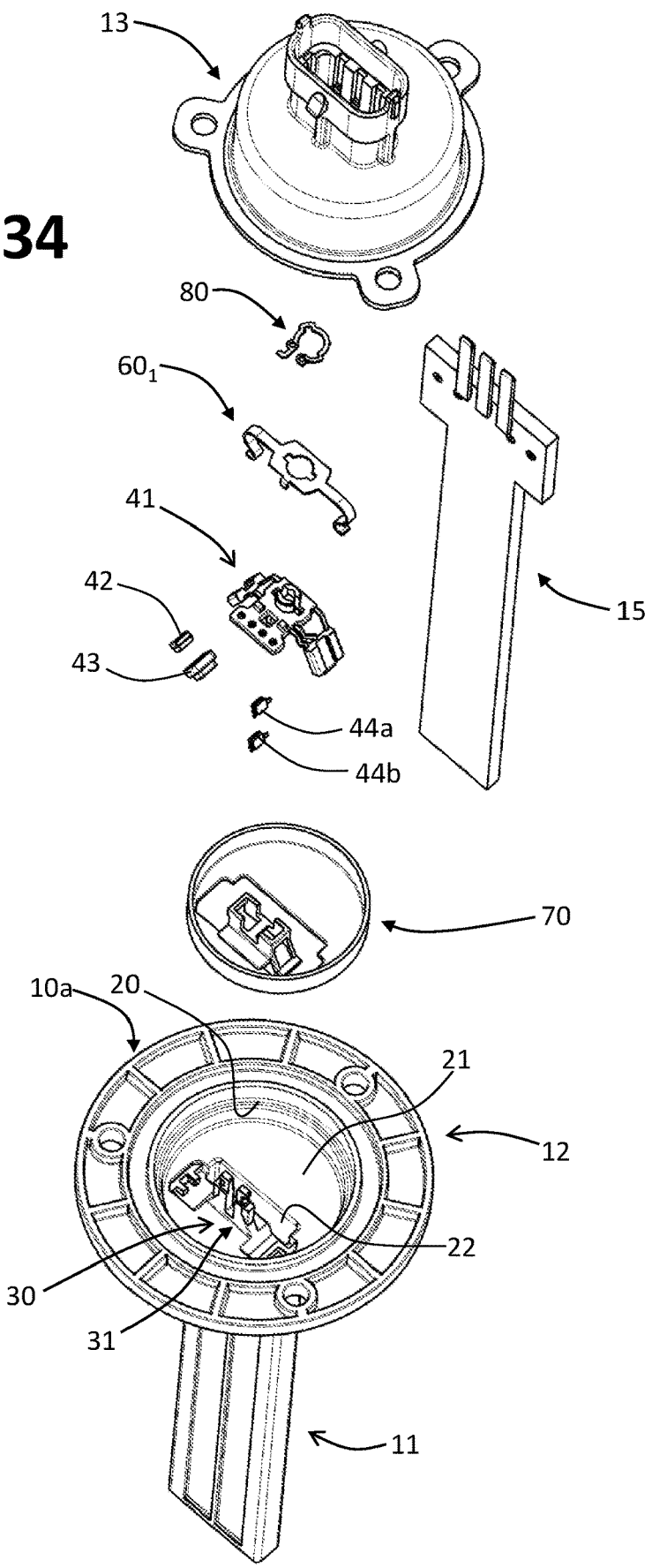
FIG. 34 is an exploded view of a sensor device according to possible embodiments of the invention.

The aforesaid optical shield, designated as a whole by 70 in FIG. 34, is represented in detail in FIGS. 35-36. The shield 70 has a body 71 preferably made of a material that is not permeable to optical radiation of predefined wavelengths, such as a dark material or in any case a material that is able to limit or prevent passage of ambient light. The body 71 has a bottom wall 72, designed to rest on the wall 21 of the body 10a, and a peripheral wall 73, preferably but not necessarily with a profile corresponding to that of the peripheral wall 20 of the body 10a (FIG. 34). In the example, this profile is circular, with a diameter slightly smaller than that of the wall 20, or possibly such as to enable insertion with slight interference.

Defined in the bottom wall 72 is an opening 72a, the peripheral profile of which is such as to circumscribe an area at least corresponding to the one corresponding to the positioning site 30 and to the opening 22 of the bottom wall 21 of the body 10a. Projecting in cantilever fashion within the opening 72a is a substantially frame-like structure 74, designed to be fitted on the optical formation 31. For this purpose, the structure defines two upper openings 74a, in which there may partially penetrate the upright parts 33 and 34 of the optical formation 31, these openings being separated from one another by an intermediate wall 74b, which can be received in the intermediate cavity 32 of the formation 31 (see FIG. 39, for reference to the aforesaid upright parts and intermediate cavity).

The frame-like structure 74 of the shield 70 has further lateral passages 74c, which are designed to face at least part of the inclined optical surfaces 33a and 34a of the formation 31.

The optical module 40 is, instead, illustrated in FIGS. 37 and 38. As may be evinced, its basic structure is similar to that of the module appearing in FIGS. 28-33. In various embodiments, the central body 45 of the module 40 defines an opening 45a for positioning of an arrest element of a spring $60_1$, in particular, defined between the upper formation 51 and the area in which the passages $50_2$ for connection of the electric wires (designated hereinafter by $50_1$) for interfacing to the circuit 15 are defined. Once again preferentially, on at least one side of the opening 45a the upper face of the central body 45 has a projection 45b that performs functions of arrest for the retaining ring 80 (FIG. 34).

For the purposes of assembly, the shield 70 is inserted in the cavity H of the body 10a, with its bottom wall 72 facing the bottom wall 21 (as in FIG. 39) in such a way that the upper appendages 35 of the optical formation 31 penetrate into the passages 74a of the frame-like structure 74 of the shield itself, and the intermediate wall 74b of the shield penetrates into the intermediate cavity 32 of the formation 31 itself. Following upon positioning of the shield 70, as may be seen in FIG. 40, the opening 22 remains exposed (via the opening 72a of the shield), as likewise the recesses or seats 30a of the bottom wall 21 of the body 10a and possible further parts of the optical site 30; moreover the lateral openings 74c are set facing the inclined optical surfaces 33a and 34a of the optical formation 31.

The circuit 15 is then inserted through the opening 22, and the module 40 is fitted on the formation 31, as has already been described previously and as may be seen in FIG. 41. Fixing may be carried out using a spring of the same type as the ones mentioned previously and designated by 60. Alternatively, positioned on the upper formation 51 of the module 40 is the spring $60_1$, having a shape slightly different from that of the ones previously designated by 60, but having a structure and functions that are substantially similar, and the aforesaid spring is then blocked in position via a ring 80, as may be seen in FIG. 42. Next, the module 40 is connected to the circuit support 15 via the electric wires $50_1$, as has already been described previously and as may be seen in FIG. 43.

As has been said, the plastic component 70 performs the function of shield against ambient light, which may derive from any light emission external to the device 10 and/or to the optical module 40. Given that the operating principle of the quality optical sensor is based upon detection of optical radiation, the possibility of having "parasitic" ambient light that impinges upon the liquid solution and/or upon the photodetectors 44a, 44b may disturb the measurement. This condition may arise, for example, with application of the device according to the invention on transparent or non-opaque tanks, or if the entire body 10a of the device 10 is made of a material permeable to light emission: ambient light can hence illuminate the fluid and/or the photodetectors

44a, 44b through the walls of the tank, and/or parts of the body 10a, and thus disturb the measurement. The plastic shield 70, mounted within the body 10a, enables, for example, shielding from ambient light, thereby eliminating any risk of disturbance due to ambient light.

Figure 44:
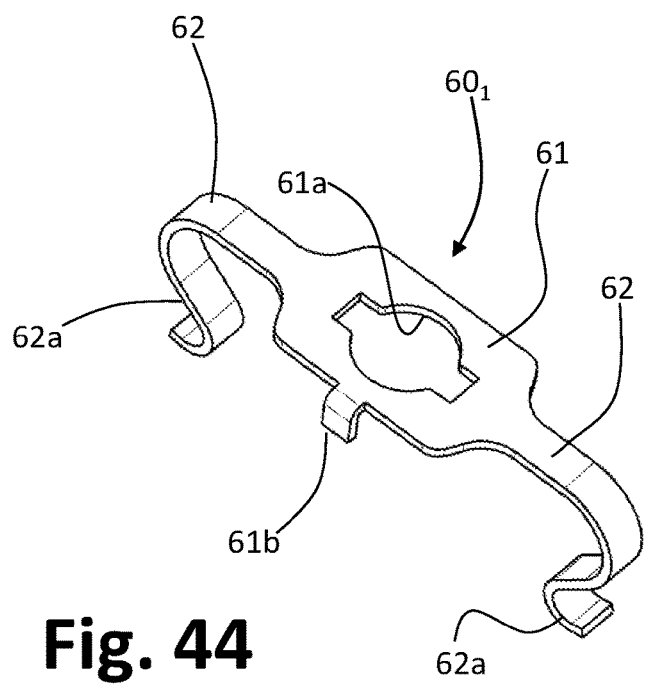
FIGS. 44 and 45 are perspective views of an elastic element and of a corresponding blocking element, which can be used in a sensor device according to possible embodiments of the invention.

FIG. 44 represents a possible embodiment of the spring 60₁. Also in this case, the structure of the spring includes a central part 61, branching off from which are two opposite arms 62, the ends of which are shaped for engagement in the corresponding seats 46a, 47a provided on the outer face of the lateral bodies 46, 47 of the module 40 (see FIGS. 37-38). Preferably, these ends 62a are curved, also so that they can slide in the grooves 46a and 47a during assembly.

Figure 41:
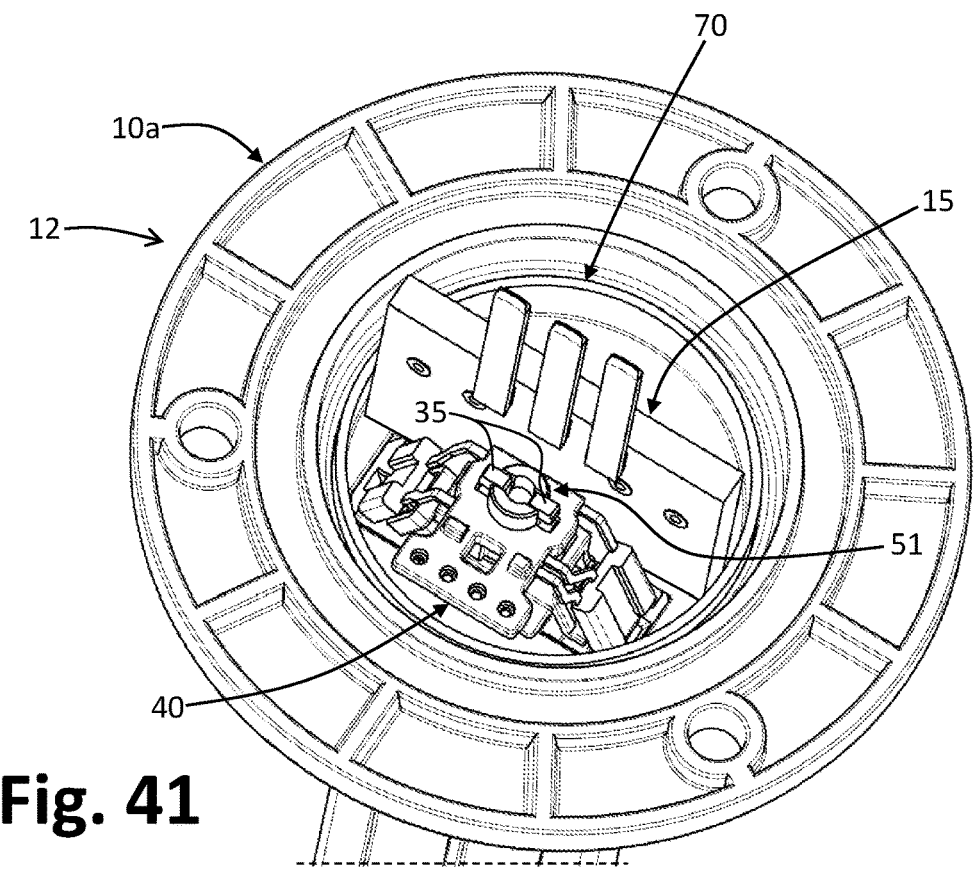
Figure 42:
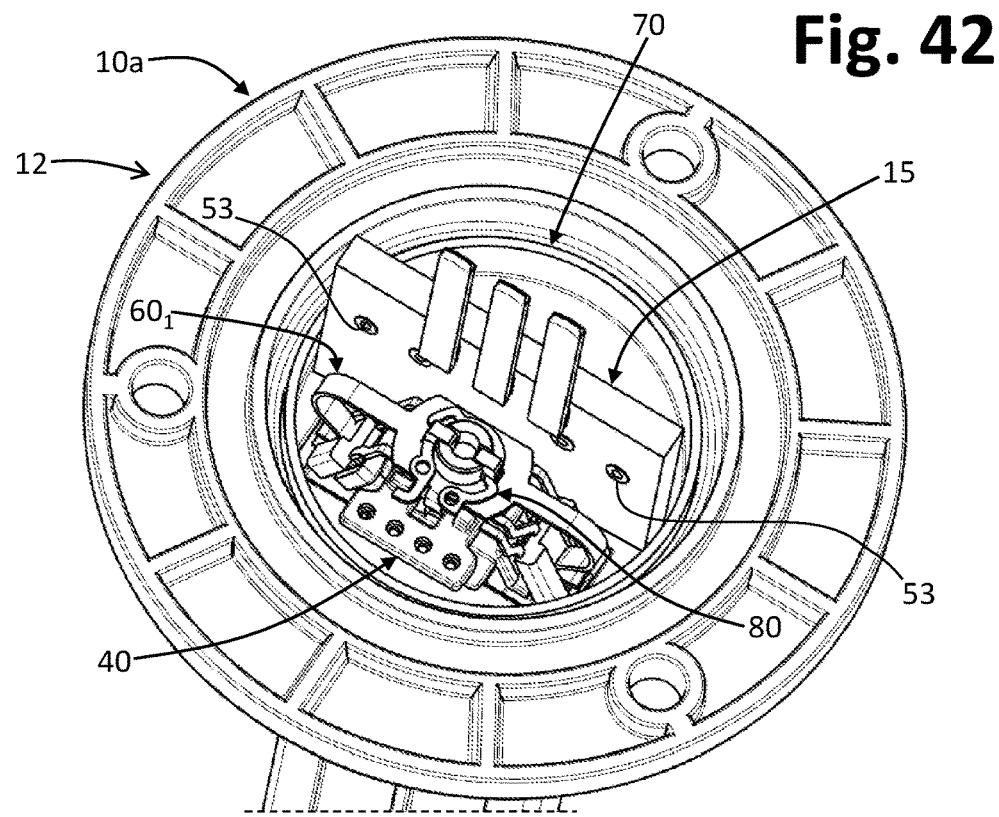
Figure 43:
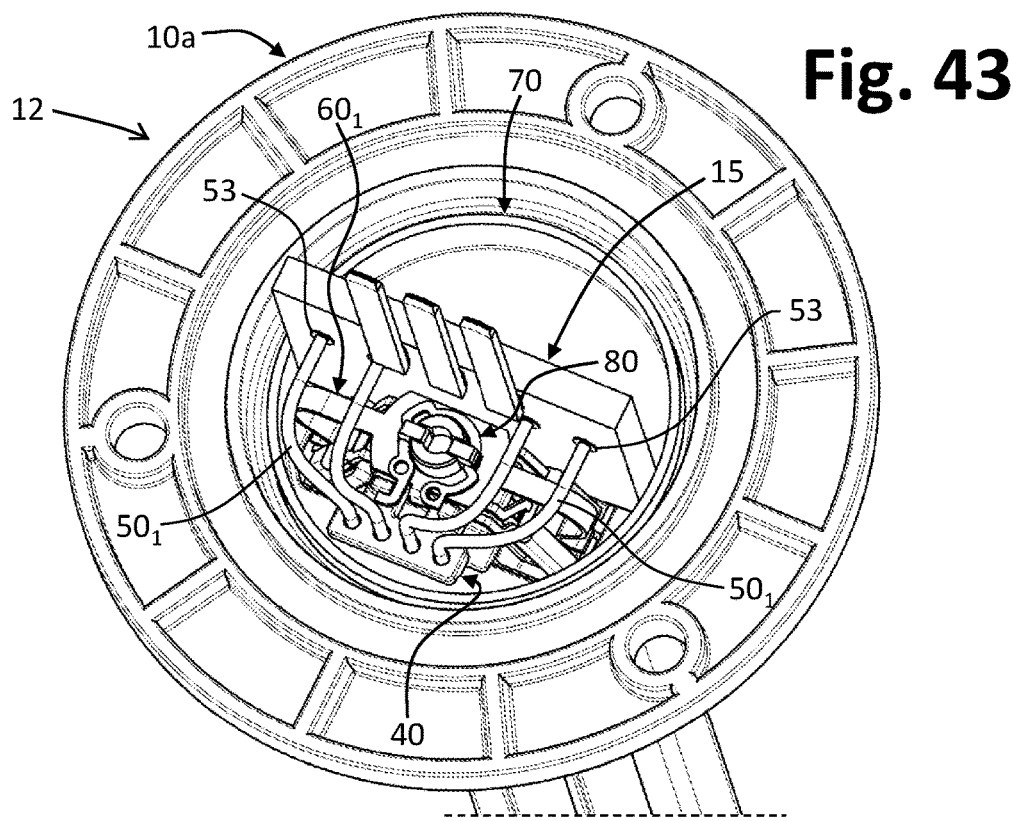

In this case, preferentially the central part 61 has a hole or opening, the profile of which substantially corresponds to the outer profile in plan view defined by the upper formation 51 of the module 40 and by the upper appendages 35 of the optical formation 31 (it should be noted that in this embodiment the passages 51a of the body 45 of the module 40—FIGS. 37-38—and the aforesaid appendages 35 are configured in such a way that the appendages project laterally, to an appreciable extent, beyond the outer profile of the formation 51: see for reference FIG. 41). Furthermore, projecting on one side of the central part 61 of the spring 60₁, here the front side, is an arrest element 61b, here in the form of tab bent downwards, like a tooth.

Figure 45:
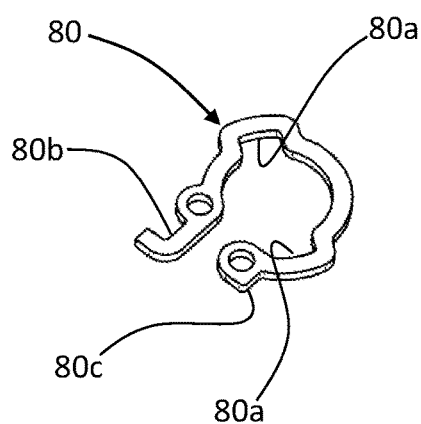

Represented in FIG. 45 is a possible embodiment of the retaining ring 80. In preferred embodiments, the ring 80 is substantially a circlip (Seeger), i.e., a ring—preferably made of metal, very preferably of elastic steel—having a generally flat configuration, the circumference of which is not complete and, in its two end regions, holes are defined for insertion of a suitable tool for application and removal thereof, such as circlip pliers (Seeger plier). In the case illustrated, according to a characteristic in itself inventive, at least the internal profile of the ring 80 substantially reproduces part of the profile of the opening 61a of the spring 60₁ and/or is complementary to part of the aforesaid outer profile in plan view of the upper formation 51 and of the upper appendages 35, hence presenting a substantially circular profile with two opposite projections or recesses 80a. At one end, beyond the corresponding hole, the ring 80 defines a detent projection or seat 80b. Preferably, moreover, the other end of the ring, which is provided with a hole, defines an outer contrast surface 80c. At least one of the projection or seat 80b and the contrast surface 80c defines anti-rotation means for the ring 80.

Figure 40:
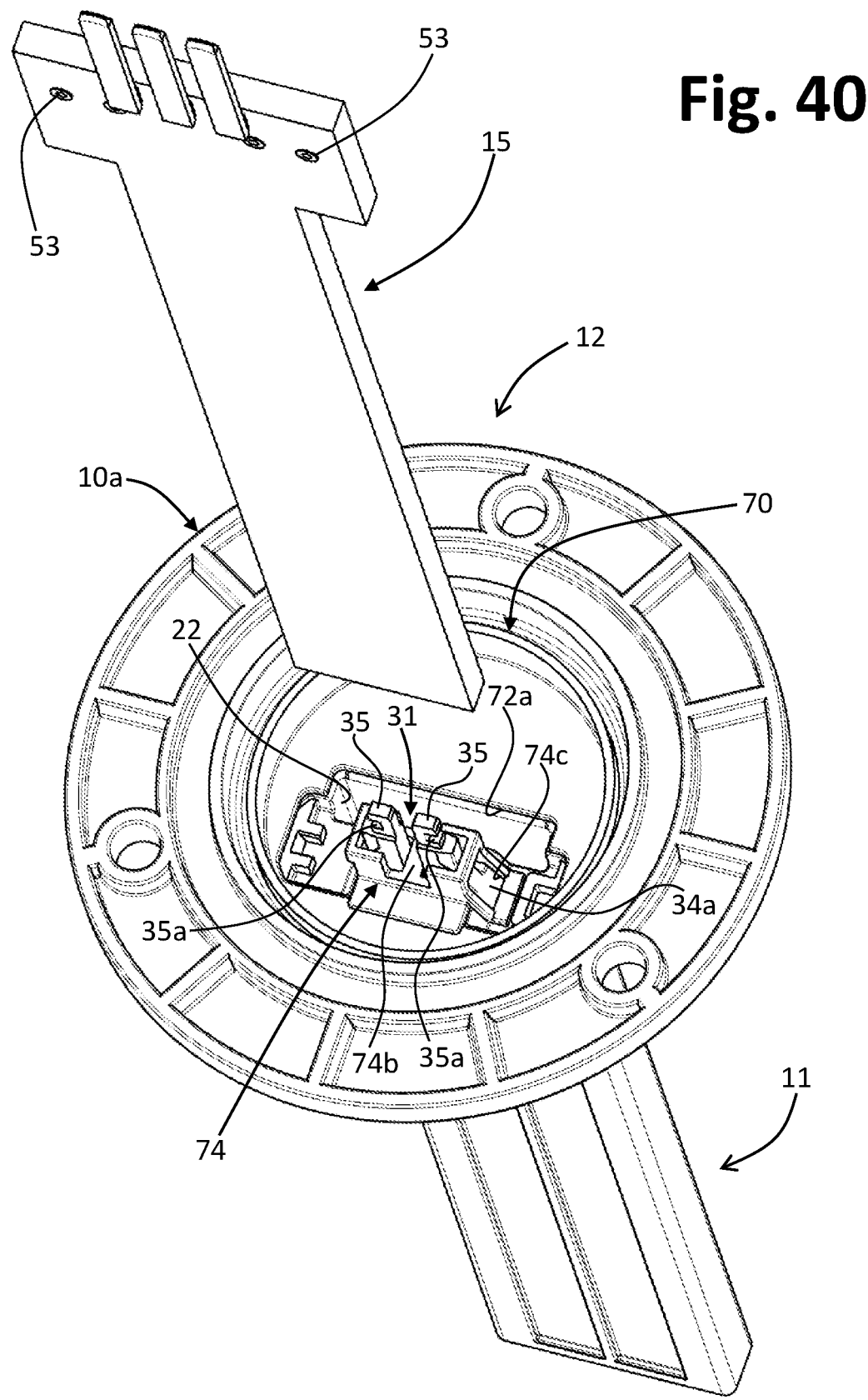
Figure 79:
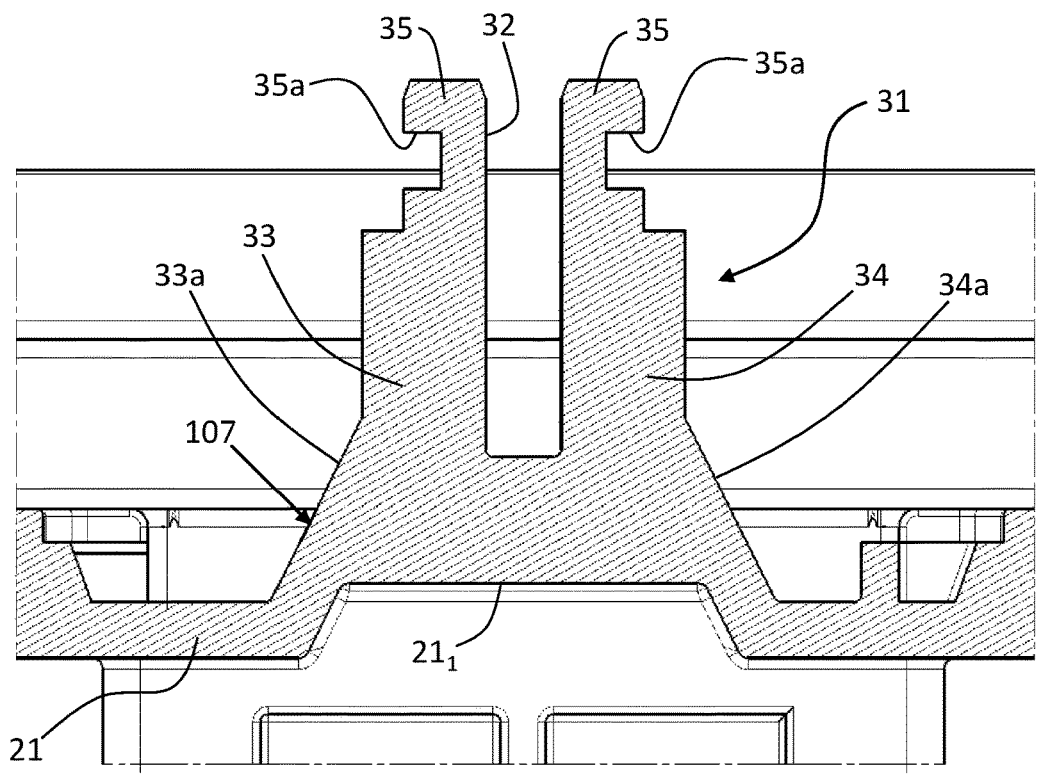
FIG. 79 is a partial and schematic cross-sectional view of a portion of a sensor device according to possible embodiments of the invention.

It should again be noted how, in particular from FIG. 40, in various embodiments of the invention, the upper appendages 35 of the formation 31 present, in their upper end region and at their outer side, a lateral recess, designated by 35a (see, merely for reference, also FIG. 79).

Figure 46:
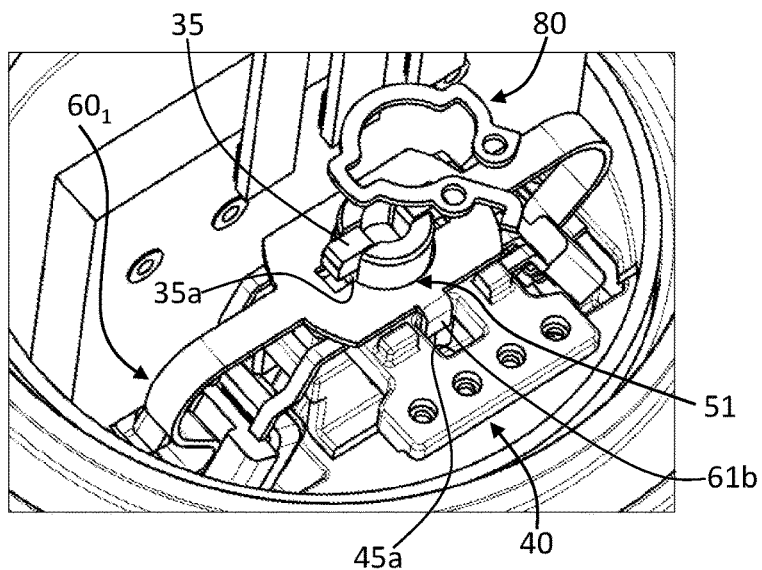
FIGS. 46-48 are partial perspective views aimed at representing some steps of fixing of an elastic element of the type illustrated in FIG. 44 by way of a blocking element of the type illustrated in FIG. 45.
Figure 47:
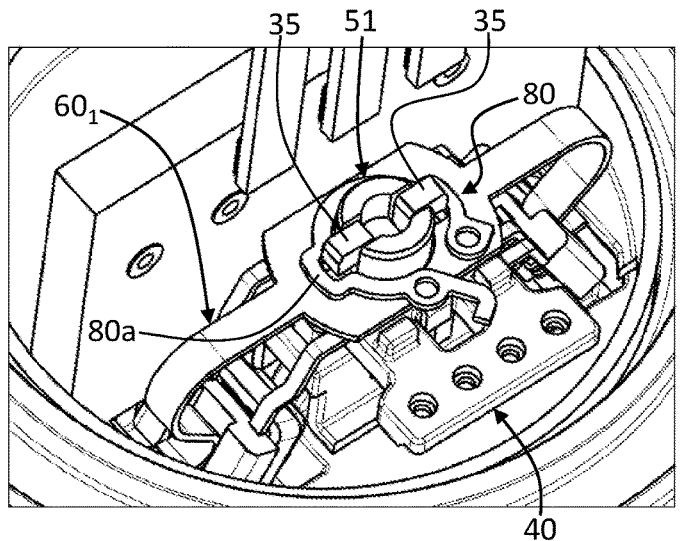
Figure 48:
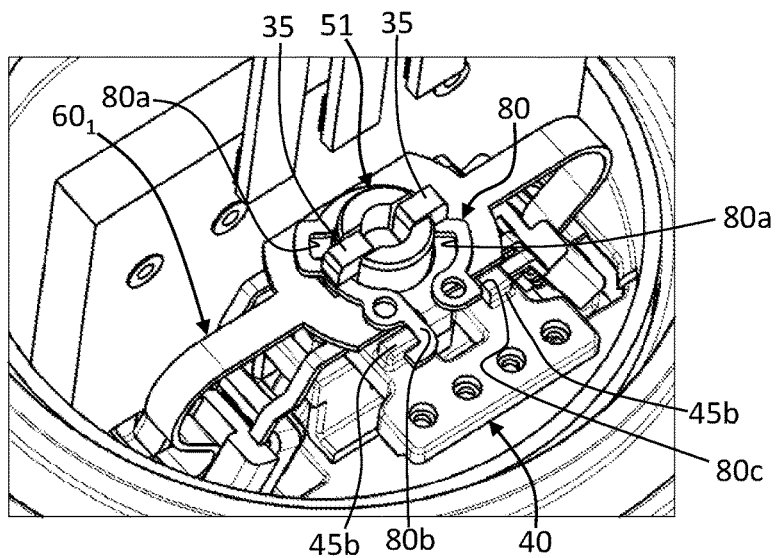

As has already been pointed out, the spring 60₁ performs the same functions as the ones already described previously, but it is not mounted via interference fit on the formation 51 of the optical module 40, given that it is blocked by the ring 80. FIGS. 46-48 highlight a possible sequence of assembly of the spring 60₁ and of the corresponding retaining ring 80.

After the module 40 has been fitted on the optical formation 31, preferably with the structure 74 of the shield 70 set in between, the spring 60₁ is fitted on the module, so that the formation 51 and the projecting part of the appendages 35 are inserted in its central opening 61a (see FIG. 44), as in FIG. 46. With this insertion, moreover, the element 61b of the spring engages in the opening 45a of the central body 45 of the optical module 40, thereby having the function of preventing rotation of the spring 60₁.

Then, fitted on the formation 51 and on the appendages 35 is the ring 80, in an angular position thereof that enables its insertion, as in FIG. 47. In practice, in this angular position of the ring 80, its two projections or recesses 80a (FIG. 45) are in a position corresponding to the appendages 35; i.e., the internal profile of the ring 80 corresponds to part of the outer profile defined by the formation 51 and by the appendages 35. Next, for example by exploiting the two holes of the ring 80 and using a normal pair of circlip pliers, the ring itself is made to turn in such a way that the latter engages the lateral recesses 35a of the appendages 35 (see FIG. 40) and until its detent projection 80b and the contrast surface 80c encounter the projections 45b defined on the upper face of the body 45 of the module 40. This final blocking situation is highlighted in FIG. 48.

The clamping system described with reference to FIGS. 44-48 enables reduction of the overall dimensions of the spring and avoids fixing thereof with mechanical interference fit, which could cause possible problems of failure or damage to the plastic material of which the formations 31 and/or 51 are made. This type of fixing of the spring is regardless of the presence of an optical shield of the type designated by 70 and can be employed also in the other embodiments described herein that envisage the use of an optical module substantially of the type designated by 40 and/or other devices. As has been mentioned, on the other hand, there is nothing, in principle, to rule out the use also in the device of FIGS. 34-48 of an elastic fixing element of the type described with reference to the previous FIGS. 2-33. Furthermore, a shield of the type described, also having a shape different from the one exemplified, but with the same purposes may be used in all the embodiments described herein.

In various embodiments of the invention, a fixing element of an optical module is configured for being secured in position, with respect to an optical formation, by means of an angular movement thereof. Possible embodiments of this type are described with reference to FIGS. 49-60. Also in these figures the same reference numbers as those of the previous figures are used to designate elements that are technically equivalent to the ones already described.

Figure 49:
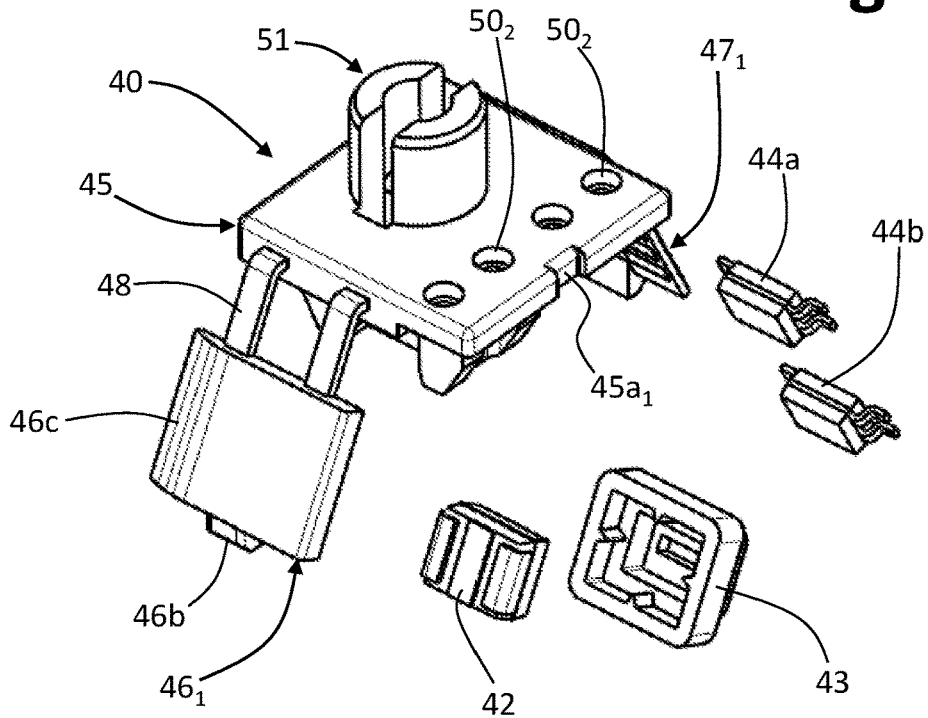
FIGS. 49-50 are perspective views, from different angles, of an optical module of a sensor device according to possible embodiments of the invention.
Figure 50:
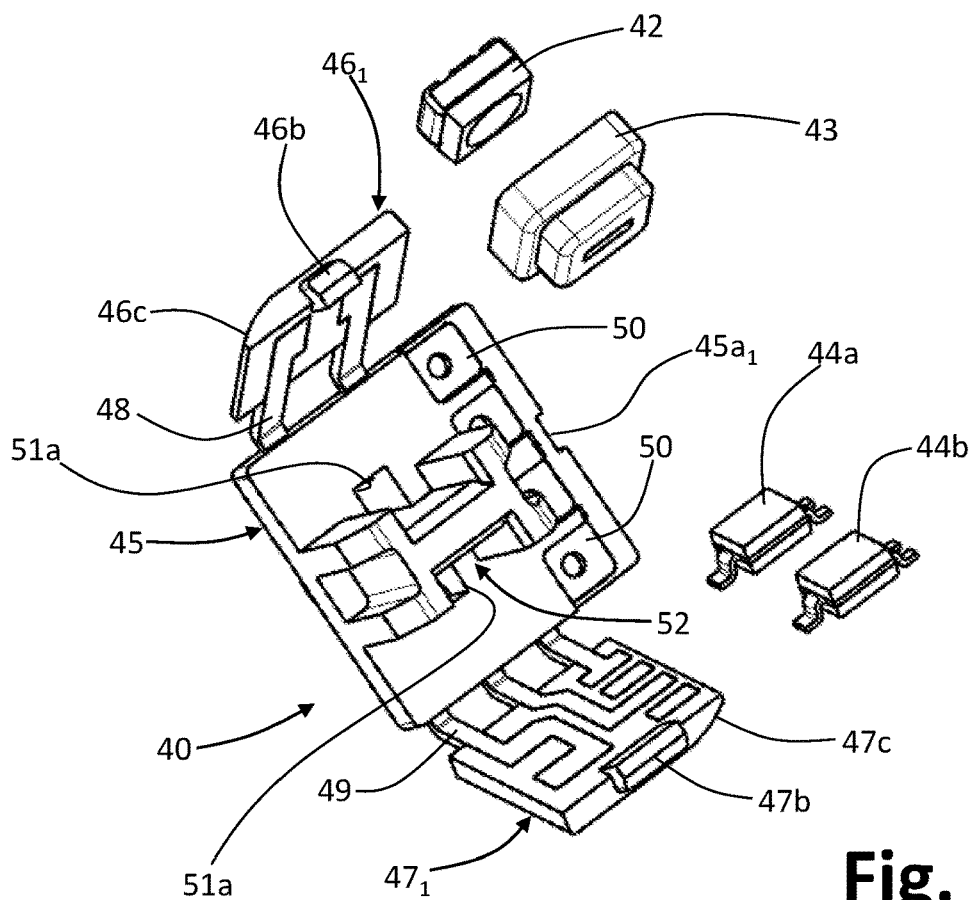

As may be seen in FIGS. 49-50, in various embodiments lateral bodies 46₁ and 47₁ of the module 40 are provided, which have, at least one lateral region, a lead-in surface 46c, 47c, for example an inclined surface or a curved surface, which extends towards the upper face of the body itself. Preferentially, the lead-in surface 46c is defined in the body 46₁ in a position opposite to the lead-in surface 47c defined in the body 47₁. For the rest, the optical module 40 is obtained in a way substantially similar to what has been described with reference to the previous embodiments, with the central body 45 that defines at the upper the formation 51 and at the bottom the formation 52, with the through openings 51a. Also in this case, the terminals 50 are preferably embedded, to a major extent, in the plastic material of the body 45 and have in respective end areas solder pads or holes aligned to passages 50₂ of the body 45.

In preferred embodiments, defined at least one edge of the body 45—here the front edge—is a positioning recess 45a₁, the functions of which will appear clearly hereinafter. Also the site 30, or the optical formation 31 (FIGS. 58-59), is similar to the one described with reference to FIGS. 32-44, in particular as regards the presence of lateral recesses 35a in the upper end regions of the appendages 35.

Figure 51:
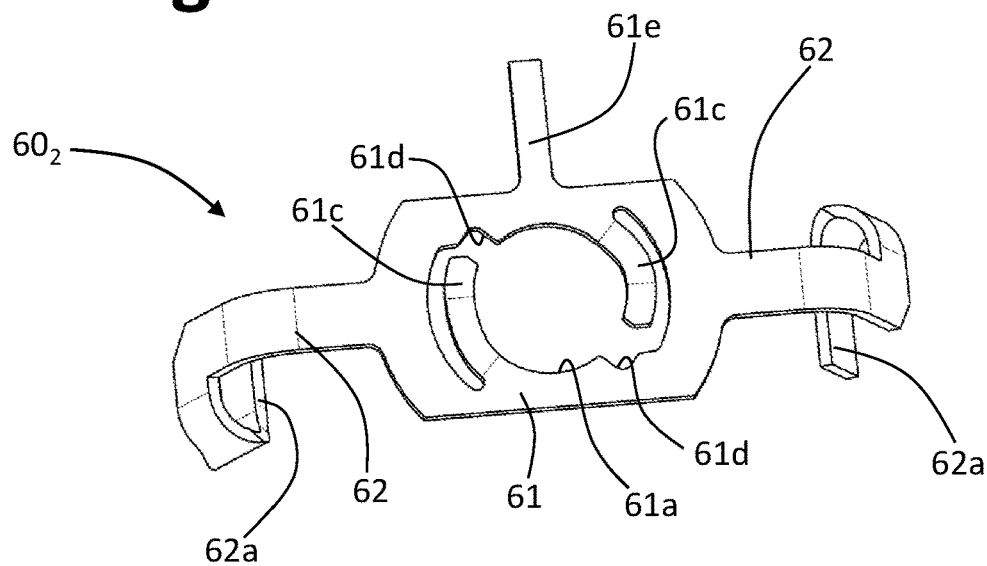
FIG. 51 is a perspective view of an elastic element, which can be used in a sensor device according to possible embodiments of the invention.

Also in embodiments of this type, the module 40 is fitted on the formation 31 with modalities similar to the ones described previously, but fixing is obtained via an elastic blocking and/or positioning element having a different configuration, a possible embodiment of which is visible in FIG. 51, where the aforesaid spring element is designated as a whole by $60_2$.

Also in this case, the elastic element $60_2$ has a central part 61 provided with a through hole 61a and two elastically flexible opposite arms 62. Preferentially, the distal ends 62a of these arms 62 are bent or in any case shaped in order to facilitate their sliding on the bodies $46_1$ and $47_1$, in particular in an angular or rotary direction, as described in what follows. The part 61 is shaped so as to define two flexible tabs 61c within the hole 61a, in opposite positions, preferably in positions generally corresponding to those of the arms 62. The tabs 61c, here having a substantially arched configuration, each follow part of the profile of the hole 61a, this profile moreover presenting a pair of widened portions in diametrally opposite positions, each substantially at the free end of each tab 61c. Preferentially, moreover, branching off from the central part 61 is an appendage 61e, set generally transverse or orthogonal to the arms 62. The elastic element $60_2$, like the ones described previously, is preferentially made of metal, starting from a blanked and deformed strap.

Figure 52:
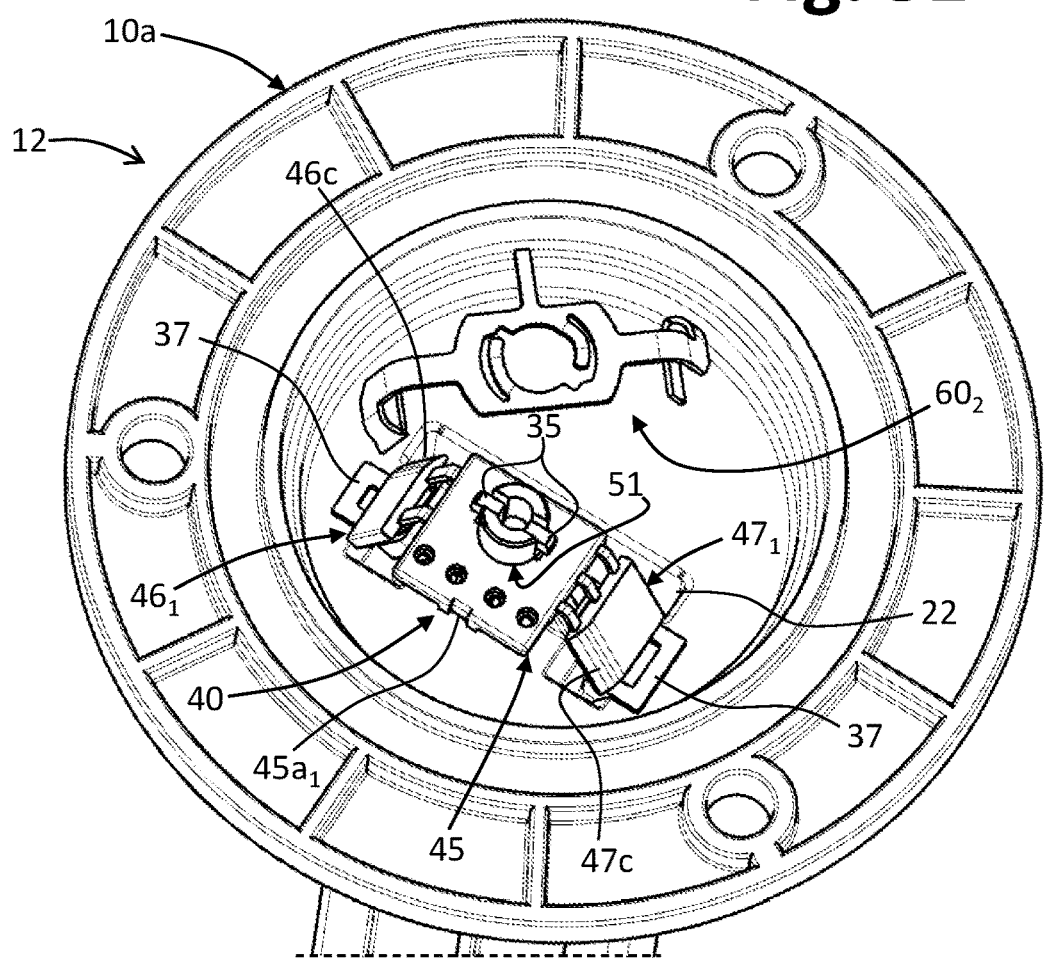
FIG. 52 is a partial perspective view aimed at representing a step of assembly of a sensor device according to possible embodiments of the invention.
Figure 53:
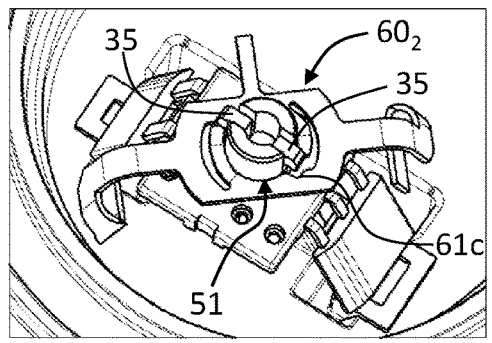
FIGS. 53-57 are partial perspective views aimed at representing some steps of fixing of an elastic element of the type illustrated in FIG. 51.
Figure 54:
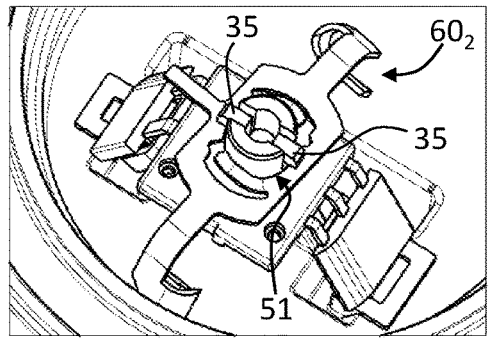
Figure 55:
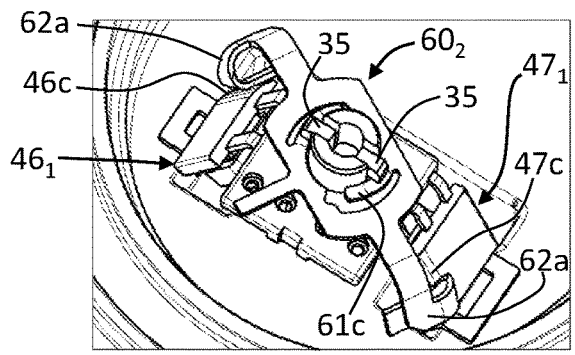

As may be seen in FIGS. 52 and 53, the element or ring $60_2$ is fitted on the formation 51 of the module 40 and on the projecting part of the appendages 35 that projects at the sides of the formation. This is allowed by the presence of widened portions 61d, which in this step are in positions corresponding to the aforesaid appendages. Next, the spring is turned (in a counterclockwise direction, as viewed in FIGS. 53-57), in such a way that first the edge of the hole of the spring—FIG. 54—and then that of the tabs 61c—FIG. 55—penetrates into the recesses 35a of the appendages 35 (see also FIGS. 58-59). At a certain point of the angular movement, the free ends of the arms 60 of the spring come to interfere with the lead-in surfaces 46c and 47c, as may be seen in FIG. 55. As has been said, the ends 62a of the arms 62 are preferably curved or shaped to facilitate sliding and/or prevent any sticking: in the example, these ends are bent substantially to form a C.

Figure 56:
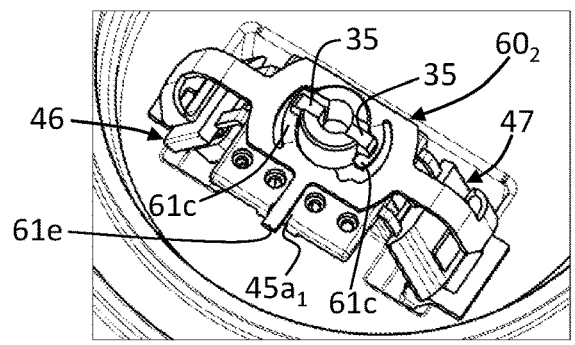
Figure 57:
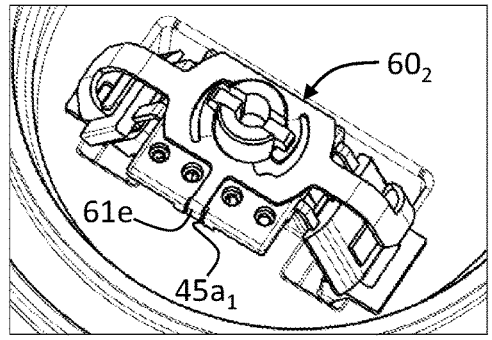
Figure 58:
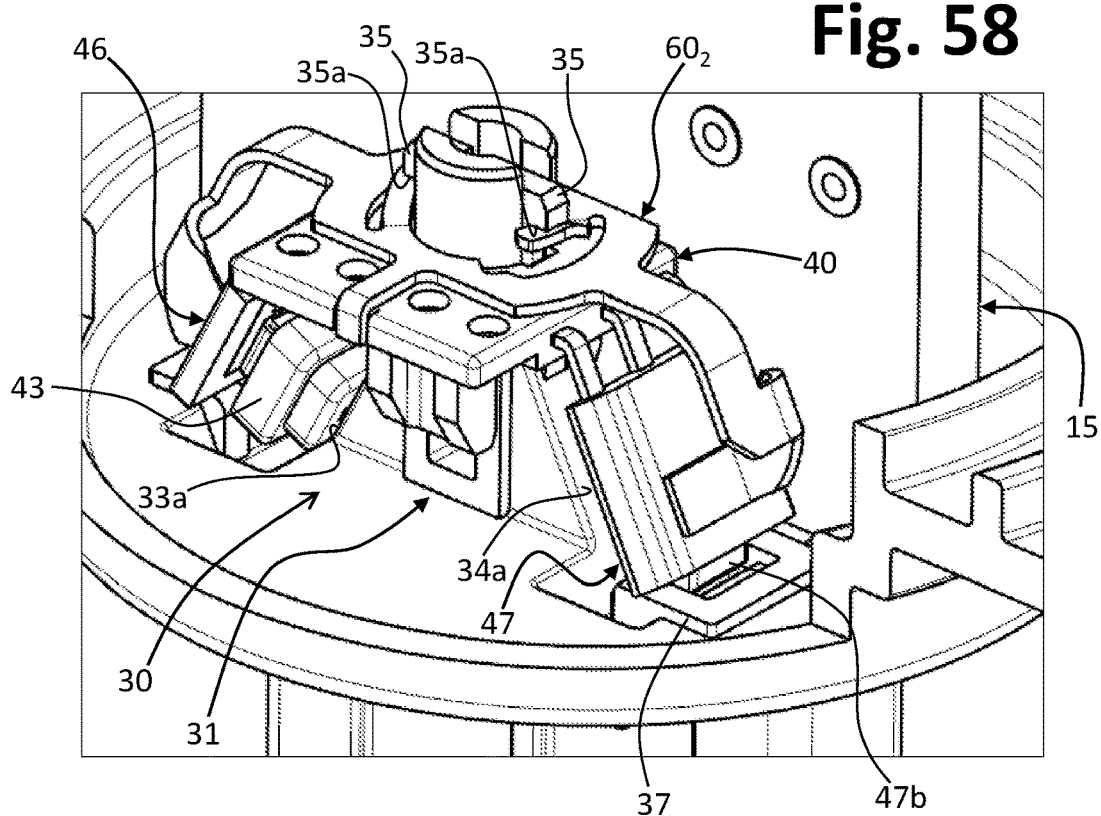
FIGS. 58-59 are perspective views from different angles of a portion of a sensor device according to possible embodiments of the invention.
Figure 59:
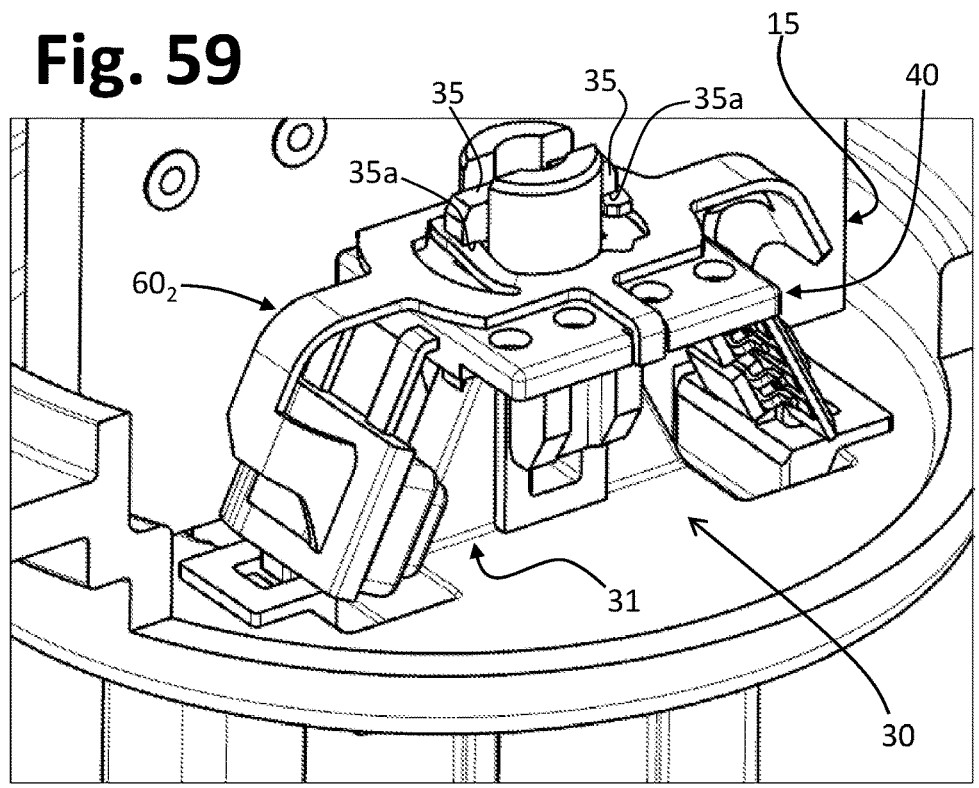
Figure 60:
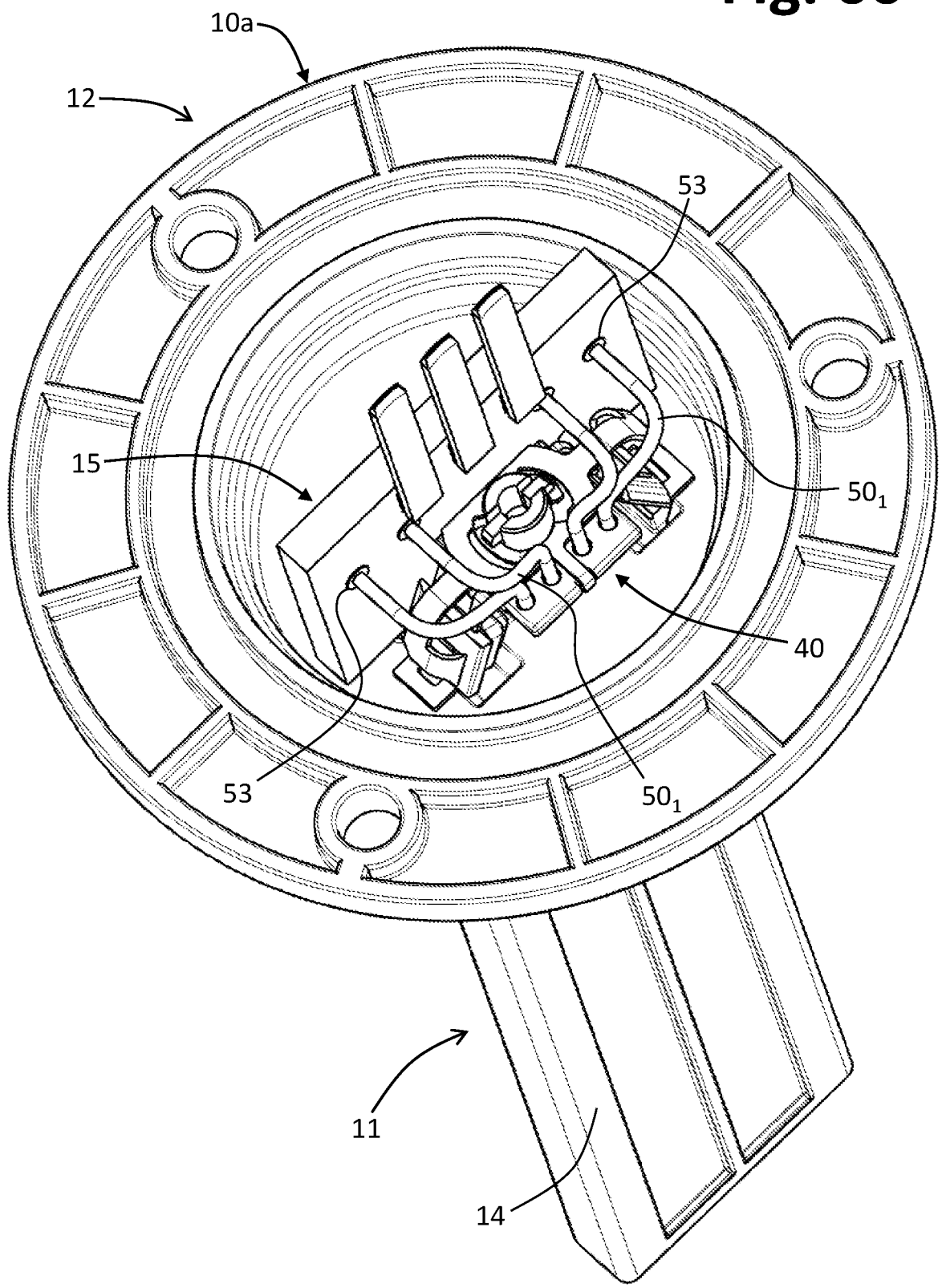
FIG. 60 is a perspective view that shows a part of a sensor device according to possible embodiments of the invention.

The prosecution of the angular movement of the spring $60_2$ is then allowed by the presence of the inclined or curved lead-in surfaces 46c, 47c, which in this step function as chute, with the ends 62a of the spring that can slide as far as on the upper face of the bodies $46_1$ and $47_1$, as may be seen in FIG. 56. In this way, an elastic bending of the arms 60 is brought about, i.e., a preloading thereof, which urges the bodies $46_1$ and $47_1$, and hence the module 40 as a whole, onto the corresponding formation 31: the optical filter 43—and hence the body $46_1$—is elastically pressed on the inclined surface 33a, whereas the lower appendage 47b of the body $47_1$ is elastically pressed on the corresponding contrast 37 (see FIG. 58).

When the ends 62a of the two arms 62 of the spring $60_2$ are in the substantially central positions of the upper faces of the bodies $46_1$ and $47_1$, i.e., the spring $60_2$ is in the right position, in the recesses 35a of the appendages 35, terminal end regions of the tabs 61c are in any case engaged, and the appendage 61e that branches off at the front from the spring $60_2$ is aligned with the recess $45a_1$, as may be seen in FIG. 56. The spring may then be secured in position by causing a plastic deformation of the appendage 61e, in the sense of engaging it in the recess $45a_1$, as may be seen in FIG. 57. Next, the circuit support 15 can be inserted in the corresponding opening 22 (FIG. 52), as may be seen in FIGS. 58-59. Then, the optical module 40 can be electrically connected to the circuit cupport 15 via the electric wires $50_1$, as in FIG. 60, with the modalities already described.

Of course, the fixing system described with reference to FIGS. 49-59 can be used also in other embodiments described herein of the device according to the invention.

In embodiments so far described, the emitter 42 and the receiver 44a-45a of optical radiation of the optical module 40 are set in a position corresponding to the lower face of the corresponding supporting bodies 46 or $46_1$ and 47 or $47_1$. However, in various embodiments, an opposite configuration is possible, i.e., with the emitter and receiver at the outer face of the aforesaid supporting bodies. Possible embodiments of this type are described with reference to FIGS. 61-71, where the same reference numbers as those of the previous figures are used to designate elements that are technically equivalent to the ones already described above.

In various embodiments of this type, the emitter and receiver electronic components used have a respective package, of the type commonly referred to as "reverse gullwing". This possibility can advantageously be exploited to integrate a space filter—for example, of the types previously designated by 43—directly in the structure of the optical module 40, assembling the emitter 42 and/or the receiver 44a-44b at the outer face of the corresponding supporting bodies 46, 47. The operating principle of the module 40 does not change with respect to the versions described above, and also the basic elements of the optical sensor preferably maintain the same characteristics already described, even with slightly different shapes. The spring used may be of the type previously designated by 60.

Figure 62:
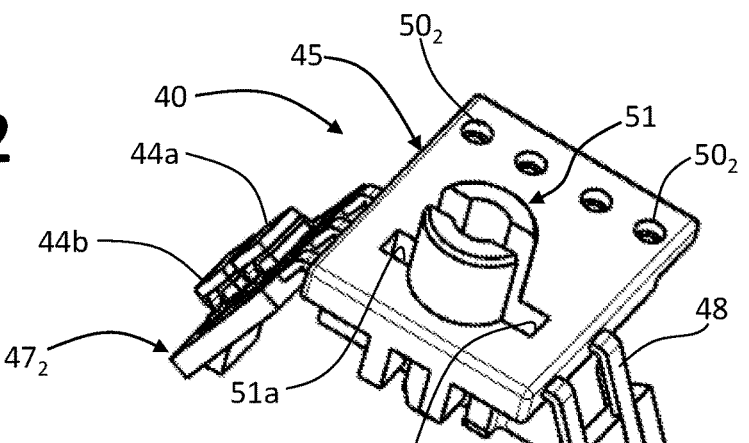
FIGS. 62-63 are perspective views, from different angles, of an optical module of a sensor device according to possible embodiments of the invention.
Figure 63:
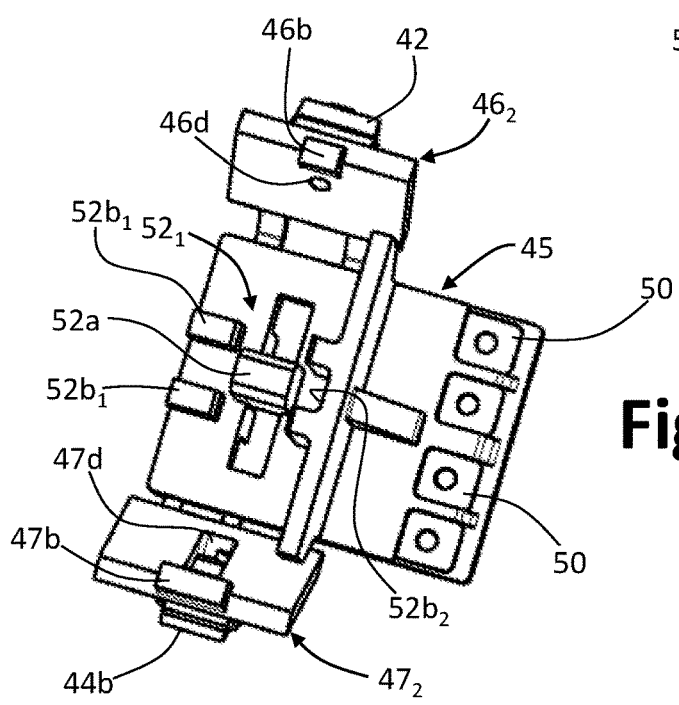

As may be seen in particular in FIGS. 62-63, the structure of the module 40 is substantially similar to the ones described previously, i.e., with the central body 45 and the lateral bodies—here designated by $46_2$ and $47_2$—overmoulded on conductors 48, 49 and terminals 50. In the case exemplified, the lower formation of the central body 45, here designated by $52_1$, is slightly modified with respect to the previous versions, but is in any case distinguished by the presence of the transverse wall 52a, which is designed for coupling with the corresponding intermediate cavity of the optical formation 31. To enable centring and resting on the formation 31, the walls 52b of the embodiments illustrated previously are replaced by projections $52b_1$ and by homologous axial ribbings provided on a wall $52b_2$ that extends orthogonally downwards from the lower face of the body 45. The wall $52b_2$, which may have a height such that its lower edge rests on the wall 21 of the cavity H of the body 10a in order to constitute a support for the module 40, advantageously also performs functions of rear shield from ambient light, since the bodies 45-47 are preferably made of dark material or in any case of a material not permeable to visible light and/or to optical radiation at predefined wavelengths.

The lateral bodies $46_2$ and $47_2$ are provided with through openings 46d and 47d in order to enable passage of optical radiation, as may be noted in particular in FIG. 63. According to an aspect in itself autonomously inventive, the body $46_2$ or at least the opening 46d, also performs the functions of space filter described previously; i.e., the body $46_2$ of the module 40 defines at least one through opening or hole, preferably circular or shaped like a slit, which filters and selects or concentrates the light beam emitted by the emitter 42.

Assembly of the electronic components 42 and 44a-44b on the upper surface of the bodies $46_2$ and $47_2$ entails the need to introduce a protective surface in the area where the spring 60 is to exert its pressure. To prevent the spring 60 from exerting force directly on the aforesaid electronic components, in various embodiments a protective element is used, designated as a whole by 90 in FIG. 61, which can advantageously also perform functions of shield against ambient light. The spring will hence exert the force on the protective element 61 and indirectly also on the module 40. It should be noted that, since the space filter 43 is no longer present, it is also preferable to ensure that the lateral body 46$_2$ and the formation 31 bear upon one another in order to guarantee always proper positioning of the components: for this purpose, the lower appendage 46b of the body 46$_2$ (see FIG. 63) and the corresponding positioning element 37 are configured for bearing upon one another and/or defining the mutual positioning (see, for example, FIG. 70).

Figure 64:
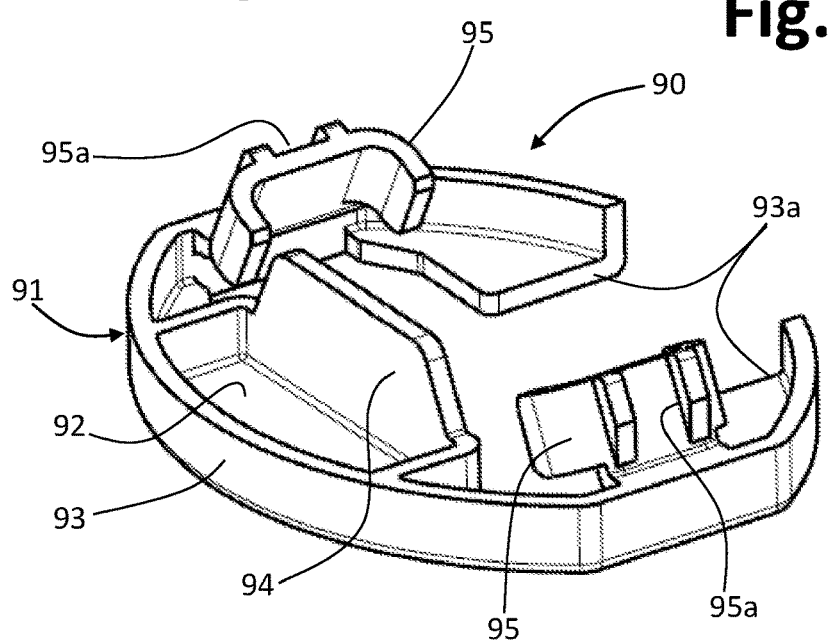
FIG. 64 is a perspective view of a protective element, which can be used in a sensor device according to possible embodiments of the invention.

A possible embodiment of the protective element or shield 90 is visible in FIG. 64. With reference to the example illustrated, the shield has a plastic body 91, preferably dark or not permeable to light, having a generally open annular shape—here approximately elliptical—defined in which are a bottom wall 92 and a peripheral wall 93. Rising from the bottom wall 92 is a front wall 94, which, in the assembled condition of the device, is located in front of the positioning area of the emitter 42 and the receiver 44a-44b, in such a way as to produce a front shield against ambient light. The shield 90 is shaped so as to define upper appendages 95, generally inclined in opposite positions, which define on their outer surface seats 95a for the ends of the opposite arms of the spring 60. The appendages 95 are shaped so as to define a sort of seat for housing and protecting the emitter 42 and the photodetectors 44a, 44b, as will emerge hereinafter. The bottom wall 92 is shaped so as to define an axial passage, for mounting in position of the shield 90 after the module 40 has been mounted on the corresponding formation 31. For this purpose, the peripheral wall 93 also has an interruption 93a.

In case of use of the shield 90, it is preferable for there to be provided on the bottom wall 21 of the cavity H at least one positioning or contrast element for the shield itself, given that the spring 60 exerts its own pressure thereon. In the case represented (see in particular FIGS. 65 and 66), at least one positioning element 21a, constituted by a wall that rises from the bottom 21 of the cavity H, is provided for this purpose, the aforesaid wall 21a here having a curved shape, corresponding to part of the outer profile of the peripheral wall 93 of the shield 90. The opposite part of the profile of the peripheral wall 93, which here includes two stretches separated by the interruption 93a, is compliant with the profile of the peripheral wall 20 of the cavity H: in this way, the shield 90 can be positioned between the element 21a and the peripheral wall 20. In the example illustrated, moreover, in the bottom wall 21 of the cavity H there are also defined further contrast elements 21b for the shield 90, at the opposite ends of the site 30.

Figure 67:
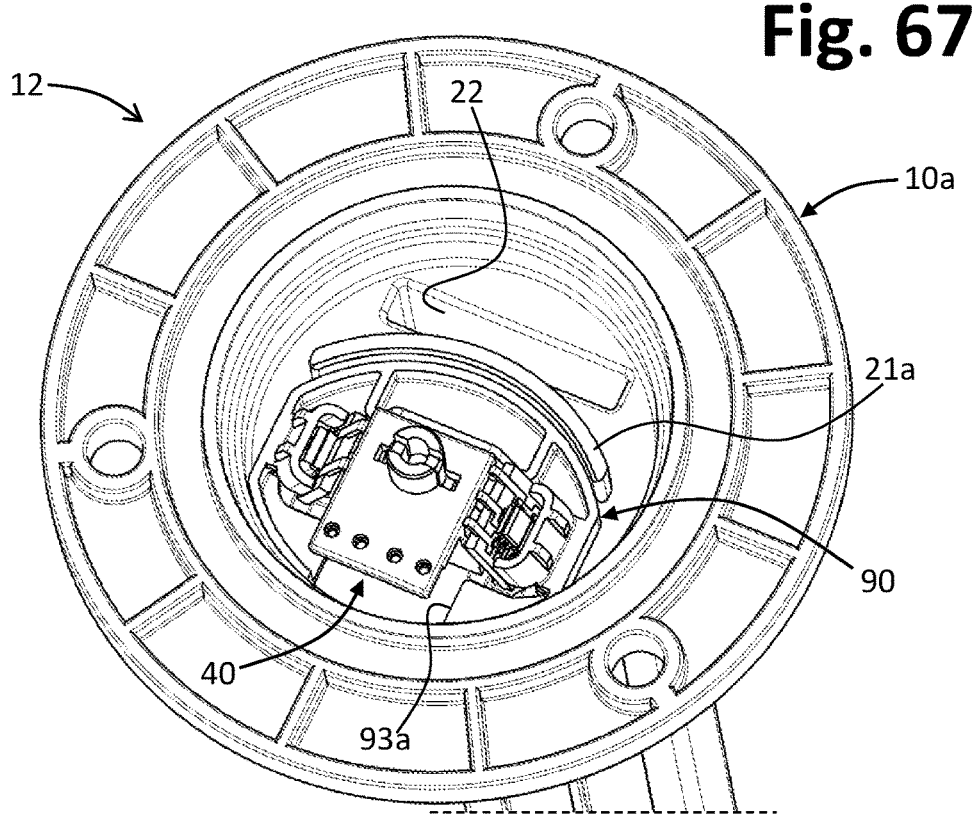

For the purposes of assembly, the module 40 is fitted on the formation 31 with modalities similar to the ones that have already been described previously, as represented schematically in FIGS. 65-66, after which positioned within the cavity H of the body 10a is the shield 90, as represented schematically in FIGS. 66 and 67. The presence of the interruption 93a in the peripheral profile of the shield 90 is aimed at enabling or facilitating assembly of the shield itself after fixing of the module 40.

Figure 68:
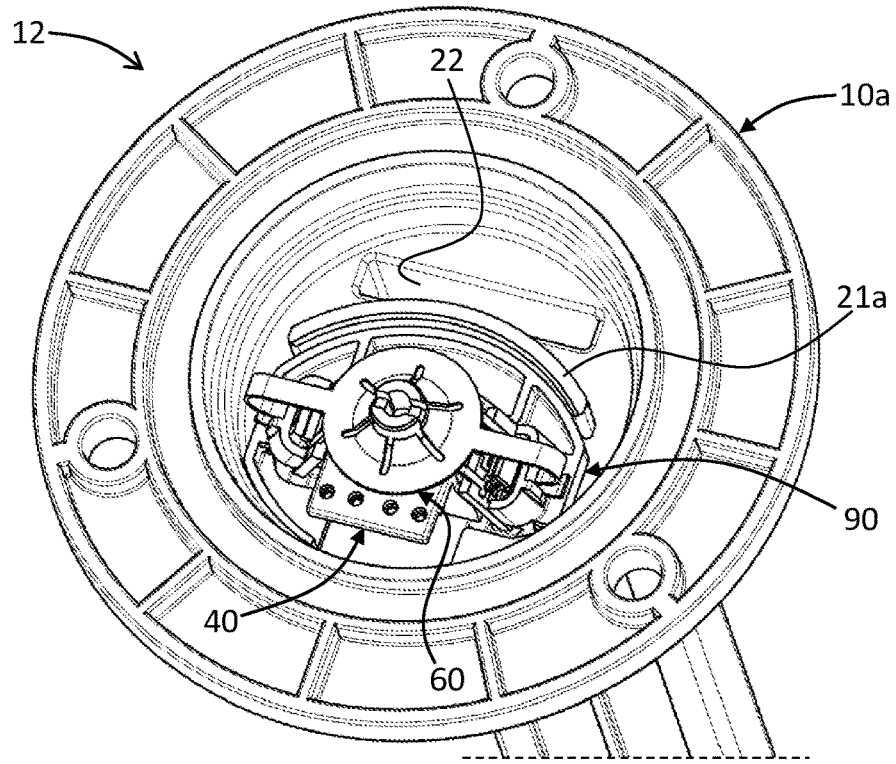
Figure 69:
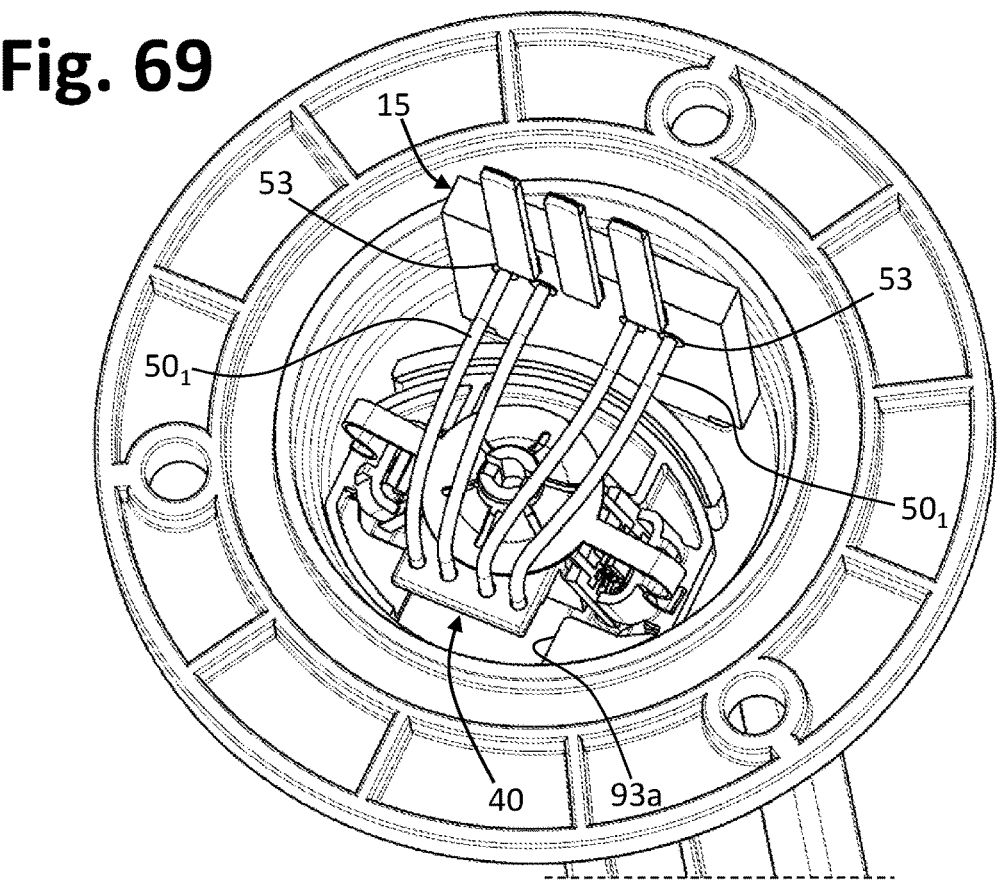

After assembly of the shield 90, the module 40 can be fixed in position via the elastic element 60, as may be seen in FIG. 68, and then the circuit 15 is positioned in the corresponding seats 22, and the connection is made via the electric wires 50$_1$, as may be seen in FIG. 69. Advantageously, the wires 50$_1$ can be welded to the module 40 prior to fixing of the wires to the body 10a, and/or the terminals 50 could comprise electrical connections of a snap-in type and/or of the insulation-piercing type.

Figure 70:
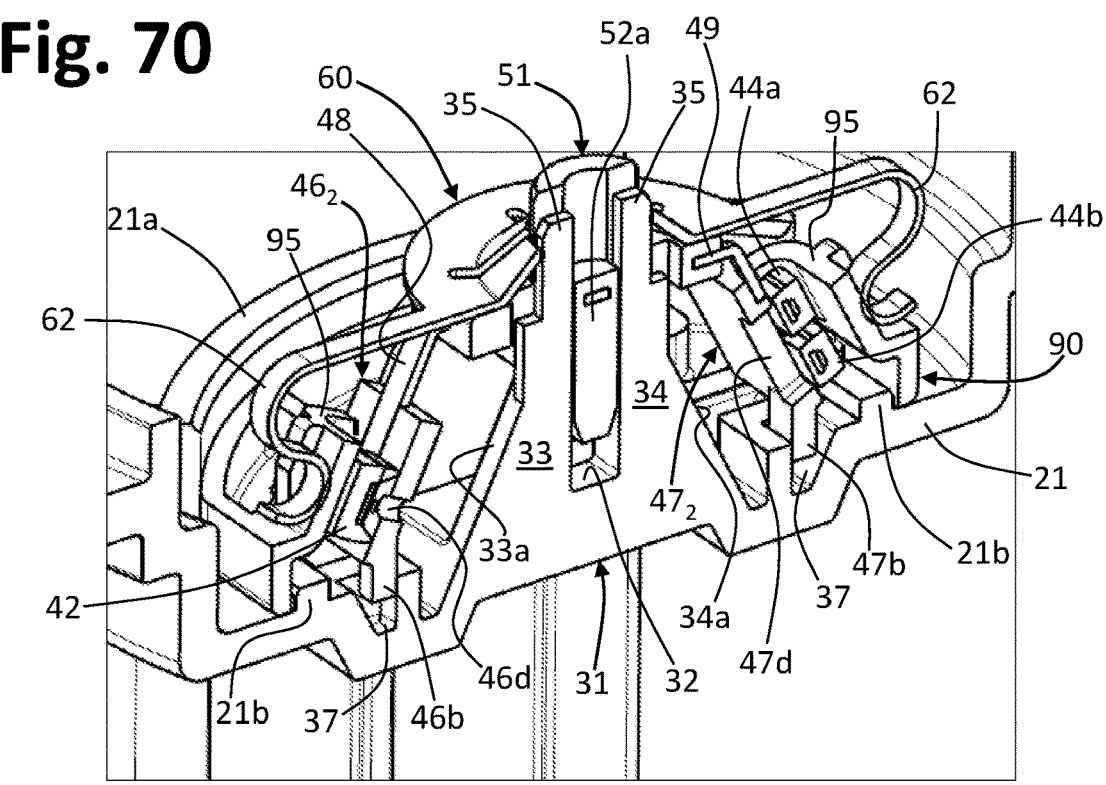
FIG. 70 is a sectioned perspective view of a portion of a sensor device according to possible embodiments of the invention.
Figure 71:
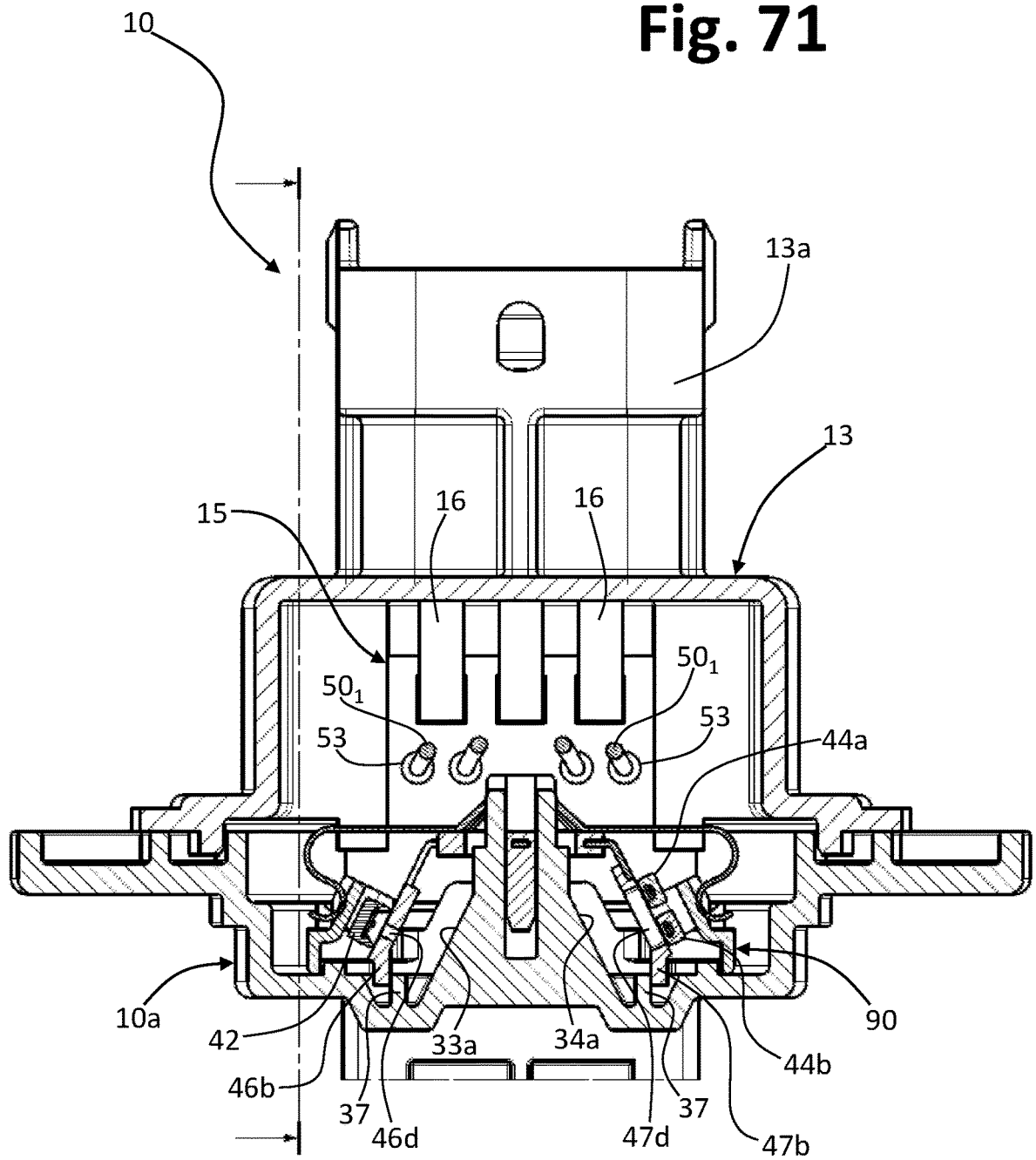
FIG. 71 is a partial vertical cross-sectional view of a sensor device according to possible embodiments of the invention.

The assembled condition is clearly visible in the sections presented in FIGS. 70 and 71. In particular, from FIG. 70 it should be noted how the lower projections 46b and 47b of the bodies 46 and 47 are inserted in respective positioning seats 37 and/or bear upon corresponding contrast elements in order to guarantee precise positioning of the bodies 46$_2$ and 47$_2$, and hence of the emitter 42 and of the photodetectors 44a, 44b, with respect to the inclined surfaces 33a and 34a of the formation 31. The precision of positioning is rendered possible thanks to the flexibility of the conductors 48, 49 that connect the bodies 46$_2$ and 47$_2$ to the central body 45. The module 40 is held in position thanks to the spring 60, the tabbed hole of which engages with interference on the formation 51 and on the outside of the appendages 35, exerting a thrust on the shield 90 and on the module 40. The shield 90 is positioned in the ways described above, between the elements 21a, 21b (FIGS. 65-66) and the peripheral wall 20 of the cavity H, and is held in position thanks to the arms 62 of the spring 60, which are engaged in the external seats 95a of the appendages 95 of the shield (see FIG. 64). As may be appreciated, in the assembled condition, the appendages 95 of the shield come to perform the function of protection for the emitter 42 and the photodetectors 44a, 44b.

Operation of the device of FIGS. 61-71, as regards detection of the quality of the liquid solution, is similar to that of the previous embodiments.

In the embodiments so far described, the bottom wall 21 of the cavity H is formed integrally with the part 12 of the main body 10a. In various embodiments, on the other hand, the body or casing 10a of the device 10, and in particular its bottom wall 21, may comprise distinct parts that are associated in a sealed way to one another, and in particular parts that integrate the positioning site 30 for an optical module. Embodiments of this type are described with reference to FIGS. 72-78, where the same reference numbers as those of the previous figures are used to designate elements that are technically equivalent to the ones already described.

Represented in FIGS. 72-78 is an example in which the body or casing of the device according to the invention comprises at least one first body of a level sensor, such as the body designated by 10a, and a second body of an optical sensor or assembly, such as the body designated by 101, which are associated to one another in a sealed way, preferably with interposition of at least one further body or of a sealing element, and/or via soldering or gluing. Possibly, at least one further body or sealing element is overmoulded on at least one between the first body 10a of a level sensor and the second body 101 of the optical sensor or assembly.

In various embodiments, at least the aforesaid first body is made of a thermoplastic polymer (e.g., HDPE) or a thermosetting polymer (e.g., an epoxy resin), whereas the aforesaid second body is made of a thermoplastic polymer (e.g., PSU or COC); the aforesaid further body is preferably made of an elastically compressible polymer. In the case of a first body at least in part overmoulded on the circuit support 15, in particular on its portion 15a, a thermosetting material or polymer, such as an epoxy resin, is preferably used.

In various embodiments, it is hence possible to produce an optical assembly for measuring the concentration (or other characteristic quantity) of the liquid substance or solution as a component separate and independent of the body 10a, to be coupled in a through seat of the latter. Alternatively, it is also possible to produce an optical sensing assembly having a body that defines a portion performing the functions of the housing and/or assembly part previously designated by 12, having a through seat in which to house and/or fix a different version of the body of the level sensor, or again to provide a body of the optical assembly that defines a casing of the same type as the one previously designated by 14, in order to receive at least the part of the circuit board 15 responsible for level measurement.

In this way, one and the same optical measuring assembly may be used in level-measurement devices according to the invention (and vice versa) that are made of materials and/or have dimensions and/or configurations that are different from the ones so far illustrated and may be interfaced to circuits having a shape different from the one so far illustrated. A substantial advantage of this type of solution is that the materials of which the two parts are made, i.e., a main body (10a) of the device and a body of the optical assembly, could be different: for example, for the body of the optical assembly that defines the positioning site 30 a transparent material may be used, for example designed to obtain better optical characteristics, whereas for the main body of the sensor device a different material, even a non-transparent one, may be used, for example one that is designed to obtain better mechanical characteristics. Furthermore, considering the possibility of separating the optical sensing assembly from the main body of the device and from the corresponding circuit, it is possible to use other different technologies or methods for producing the two parts. For instance, the main body 10a of the device may be overmoulded on at least the portion 15b of the circuit 15, and then there may be associated to the body 10a the optical sensing assembly, on which the body has been in part moulded.

In various embodiments, the body of the optical assembly is made of thermoplastic material, in particular PSU, whereas the main body of the sensor device is preferably made of a thermosetting material or resin.

Figure 72:
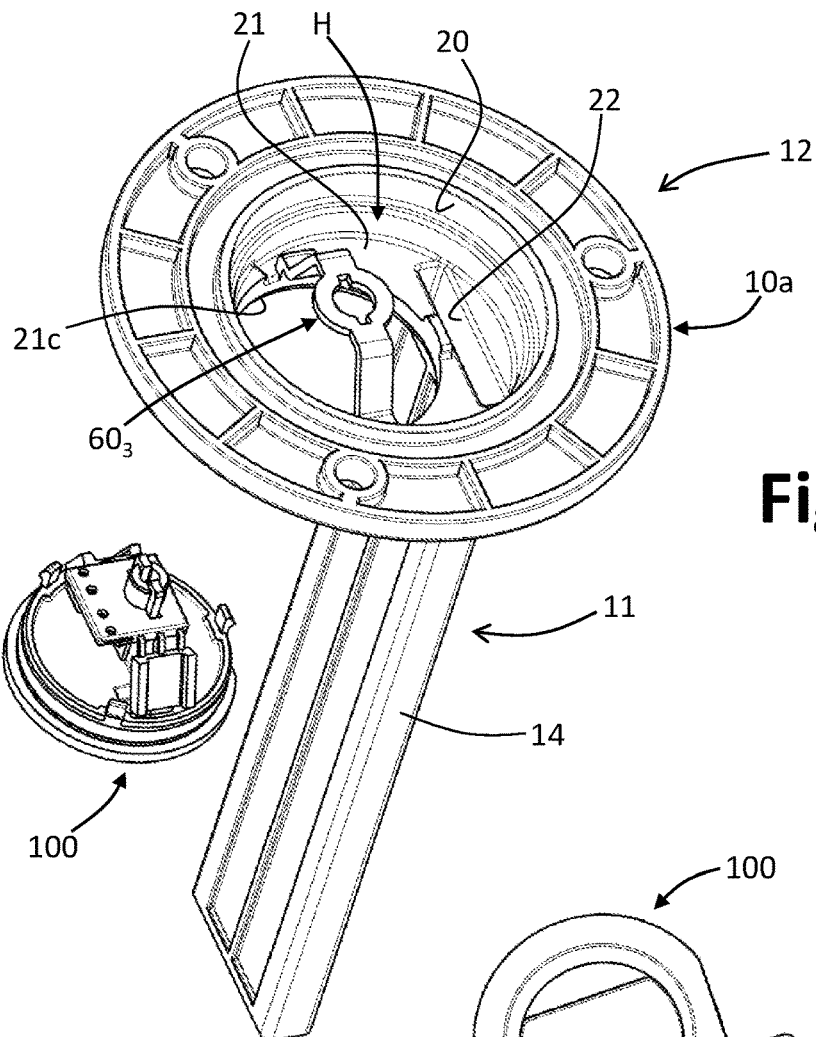
FIGS. 72-73 are partially exploded views, from different angles, of a sensor device according to possible embodiments of the invention.
Figure 73:
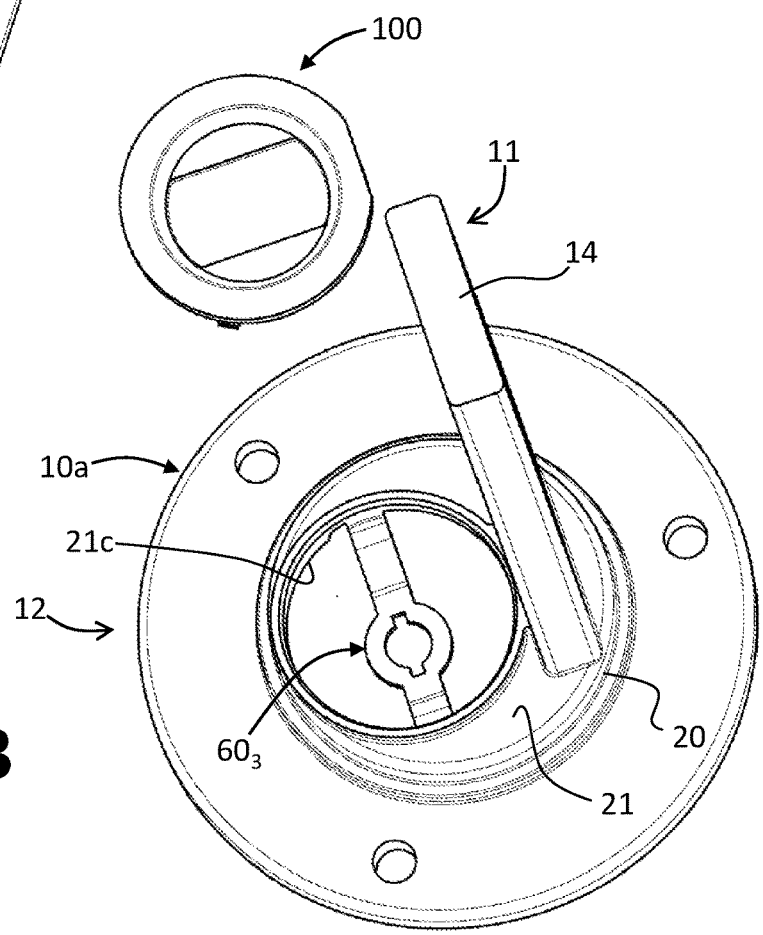

With reference, for example, to FIGS. 72-73, in various embodiments, the main body 10a has a seat or a through opening 21c in its bottom wall 21, at which a distinct optical measuring assembly, designated as a whole by 100, is designed to be mounted in a sealed way, with a body of this assembly 100 that may provide a sort of plug or insert having a shape substantially complementary to that of the aforesaid opening 21c. In other versions, the body of the assembly 100 is housed at least partially in a blind seat, for example having a shape similar to that of the opening 21c but provided with a bottom wall transparent to optical radiation.

The assembly 100 is visible in different views in FIGS. 74-75. The assembly 100 has a respective main body 101 that preferably has a circular shape, or a shape with a profile at least in part curved. Alternatively, the profile of the seat or opening 21c and respective profile of the body 101 could have an elliptical or oval shape, or one with linear stretches and curved stretches, such as polygonal profiles with rounded corners.

The body 101 is made at least in part of a material transparent to light or to the operating optical radiation of the optical sensor, or in any case permeable or designed for diffusion and/or reflection and/or refraction to the aforesaid light or radiation. The body 101 has a peripheral wall 102, preferably defining a flanged portion, and a bottom wall 103 that, in the mounted condition, is to be exposed to the substance contained in the tank 1. In the example illustrated, the outer side of the bottom wall 103 is in a position recessed with respect to the lower edge of the peripheral wall 102 (FIG. 75) in order to favour an accumulation of the substance or a presence thereof even in conditions of minimum level, but this does not constitute an essential characteristic.

In various embodiments, in its upper part, in particular at its peripheral wall, rising from the body 101 are engagement elements 104, preferably in the form of elastically flexible teeth, which project from the upper face of the body itself, for being engaged at the opening 21c of the body 10a. Preferentially, moreover, defined along the peripheral wall 102 is a seat 102a for an annular sealing element 105, as is clearly visible in FIG. 76. The engagement elements 104 may define a sealed fixing in combination with the sealing element 105, or else may provide a provisional fixing during production steps, final fixing and/or sealing being then obtained in some other way, for example via welding or gluing or resin bonding between the body 101 and the body 10a (e.g., laser or vibration welding or welding by melting of the material of at least one between the body 101 and the body 10a).

Present at the top face of the body 101, i.e., the inner side of its wall 103, is the positioning site 30, including the optical formation 31, on which an optical module 40 is to be mounted, the site and the module possibly being obtained substantially according to any one of the embodiments that have been described and/or illustrated previously, in particular the ones prearranged for connection via electric wires. Alternatively, there may be envisaged a connection via an electrical connector, possibly of a snap-in type, or else a connection via terminals 50 similar to the ones described previously with reference to FIGS. 5-18 but with ends of a different shape, for example terminals 50 shaped for being coupled and welded on electrical pads 53 of the circuit support 15 (which, for this purpose, are facilitated by the aforesaid elastic curved portions, such as U-shaped or S-shaped or Z-shaped portions, which compensate for the tolerances of positioning between the bodies 101 and 10a, and/or the module 40 and the circuit 15).

Figure 77:
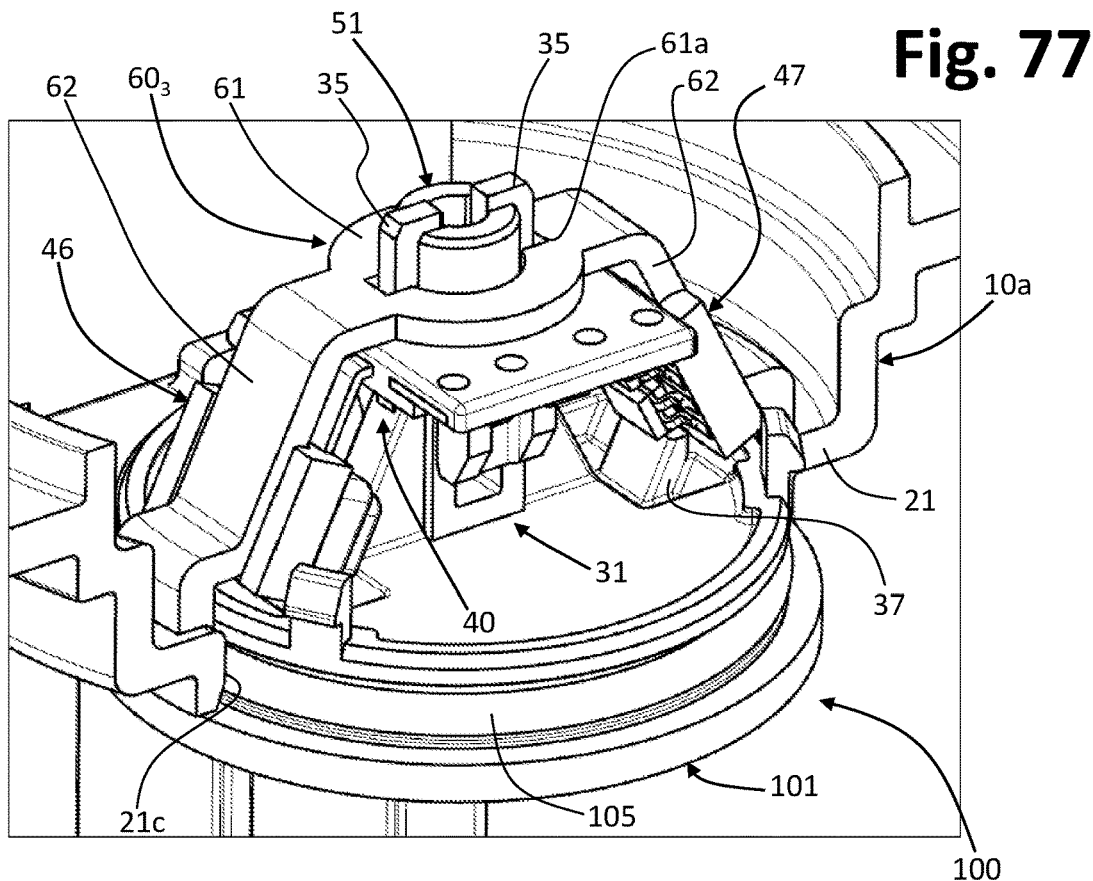
FIG. 77 is a perspective view in partial section of a portion of a sensor device according to possible embodiments of the invention.
Figure 78:
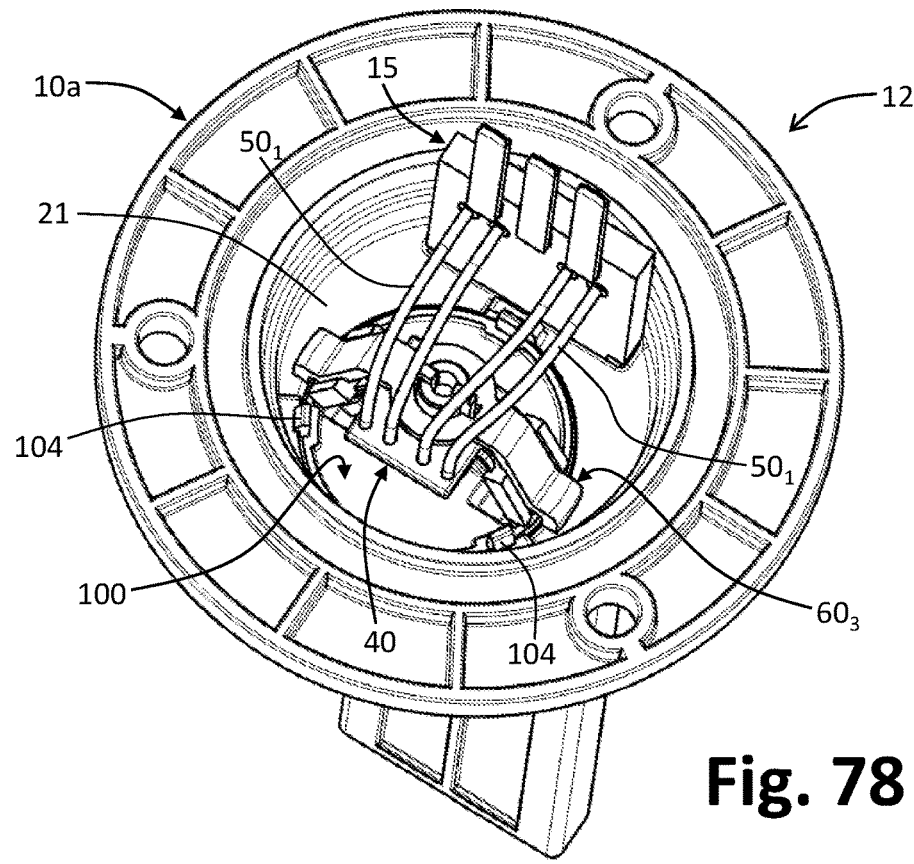
FIG. 78 is a perspective view that shows a part of a sensor device according to possible embodiments of the invention.

In embodiments of this type, it is preferable for the separate spring (60, $60_1$, $60_2$) of the previous embodiments to be replaced by a bridge-like element $60_3$, which extends between opposite parts of the opening 21c, suitable for positioning and/or exerting the right pressure on the module 40 once the optical assembly 100 has been mounted on the body 10a. The element $60_3$ is preferentially made of plastic material, possibly, however, being an element made of metal material, and is fixed with respect to the wall 21 of the body 10a or secured thereto, preferably at its inner side. This element $60_3$ may be made of a single piece with the body 10a, or else be engaged to the body 10a, or else the body 10a may be overmoulded on the element $60_3$, so as to englobe at least the opposite ends of the corresponding arms thereof. With reference, for example, to FIG. 77, also the element $60_3$ hence includes a central part 61 provided with a hole 61a having a profile congruent with the profile in plan view of the formation 51 and of the appendages 35. Extending from the central part 61 are the two opposite arms 62, the ends of which are made of a single piece with or associated to or embedded in the plastic material of the body 10a, here at diametrally opposite points of the opening 21c. In various embodiments, at least a portion of the element $60_3$ and/or of the two opposite arms 62 is at least in part elastic; for example, with at least one of the two arms 62 made of plastic or thermoplastic material having a shape and/or a thickness designed to enable a certain elasticity, in particular in order to enable an elastic thrust on the optical module 40.

As may be appreciated, the assembly 100 is obtained by providing the body 101, in particular via moulding, preferably associated to which is a sealing element 105. The module 40 is fitted on its formation 31, with modalities similar to the ones described previously, and the assembly 100 is then mounted in a sealed way in the corresponding seat 21c starting from the outer side of the bottom wall 21, in such a way that the teeth 104 engage on the inner side of the wall itself, thereby guaranteeing a precise sealed coupling. Coupling between the bodies 101 and 10a could be of an elastic type following upon interposition of the sealing element 105, which enables in this case an elastic assembly of the assembly 100 with respect to a possible bridge-like element $60_3$ of a rigid type, such as a bridge-like element made of a single piece with the body 10a.

Positioning of the assembly 100 is carried out by making sure that the formation 51 of the module 40 and the respective projecting parts of the appendages 35 of the formation 31 are fitted in the central hole 61a of the bridge-like element $60_3$. In the mounted condition, as may be seen in FIG. 77, the arms 62 of the element $60_3$ engage the seats 46a and 47a (FIG. 76) provided on the outer side of the bodies 46 and 47 and position and/or force the bodies themselves elastically until they bear upon the corresponding contrast elements, also in this case exploiting the elasticity of the conductors that connect them to the central body 45 of the module 40: in this way, precise positioning of the emitter 42 and of the photodetectors 44a, 44b with respect to the inclined surfaces of the formation 31 is guaranteed. Next, the connection to the circuit 15 is made, for example, via the electric wires $50_1$, as may be seen in FIG. 78.

As has been mentioned, the embodiments described previously, in particular the ones that envisage the use of electric wires for connection between the module 40 and the circuit 15, may be implemented with modalities similar to the ones described with reference to FIGS. 72-78, i.e., envisaging that the corresponding positioning sites 30 are defined in a distinct body to be applied in a sealed way to the bottom wall 21 of the assembly portion 12 of the body 10a of the device according to the invention.

As has been mentioned, according to possible variant embodiments, the body 101 of the assembly 100 may be fixed in position with modalities different from the ones exemplified, in particular via welding, gluing, or driving of the body itself into the corresponding seat 21c. Obviously, the peripheral profile of the body 101 and that of the corresponding seat 21c do not necessarily have to be circular.

It should be noted that, according to further possible embodiments of the invention, it is also possible to provide a body of the optical assembly, for example a body of the type designated previously by 101, and subsequently overmould thereon a body of the level-sensing device, for example a body of the type designated previously by 10a, or, vice versa, to overmould the body of the optical assembly on the body of the level-sensing device (also a casing of a temperature sensor—such as the casing 14 that here encloses the temperature sensor 19a—may be obtained via overmoulding on at least one of the body of the optical sensor and that of the level sensor). In embodiments of this type, provision of engagement elements (such as the teeth 104) and/or of an interposed sealing element (such as the element 105) may be omitted. Also a bridge-like element such as the one designated by $60_3$ may be omitted, and may, for example, be replaced by a spring element such as the ones previously designated by 60, $60_1$, $60_2$. Of course, an embodiment of this type, i.e., with overmoulding of a body of the sensor device on a body of the optical sensor, may be implemented in all the embodiments of the invention that are described and/or illustrated in the present application.

According to possible embodiments, the site 30, and in particular its formation 31, may be provided with a diffraction grating on an optical surface thereof, in particular the inclined surface 33a.

In these embodiments, the operating principle of the optical sensor remains unaltered, being based once again on the variation of the critical angle as a function of the concentration of the liquid solution. The modification, which may be applied to all the embodiments described herein, consists in inserting a diffraction grating at the optical surface 33a facing the emitter, i.e., with reference to FIG. 79, in the area designated by 107, preferably an inclined area or surface. The basic structure remains in any case unvaried with respect to what has been described so far.

The diffraction grating 107, in the presence of an incident monochromatic light beam, gives rise to a transmitted beam and to various diffracted beams, with a diffraction angle that depends upon the ratio between the distance between the rows of the grating 107 and the wavelength of the incident light. Given the same grating 107, light with a longer wavelength is deflected at an angle wider than that of the direction of the incident ray. By means of the diffraction grating 107, the incident ray is hence decomposed into various light rays referred to as diffraction order or mode.

Figure 80:
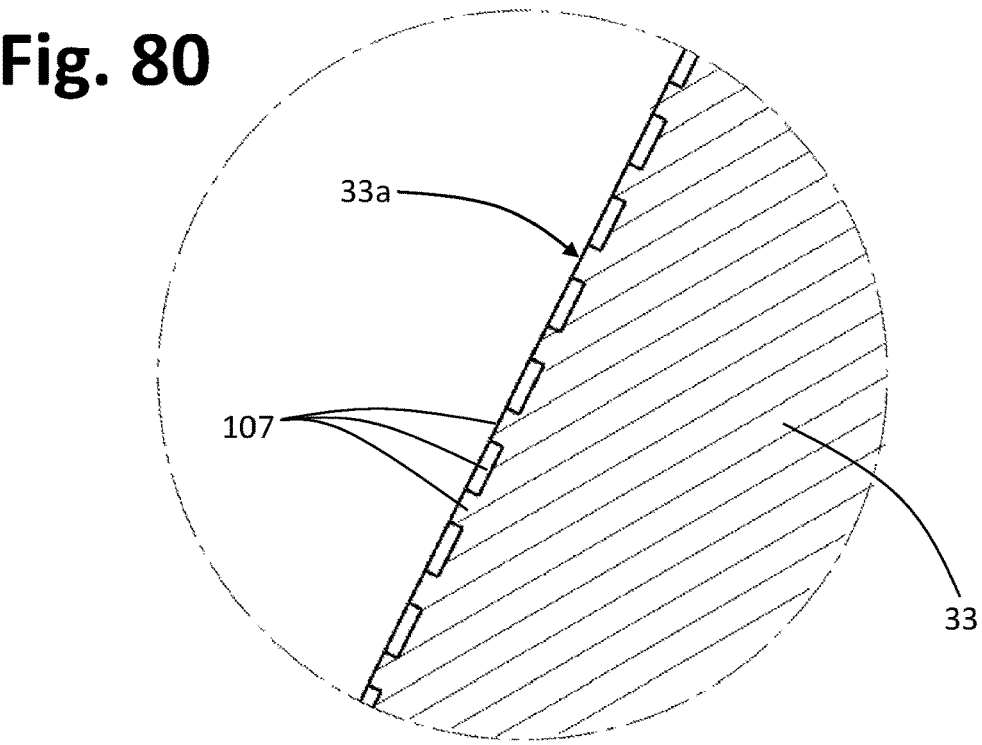
FIG. 80 is a detail at a larger scale of FIG. 79.
Figure 82:
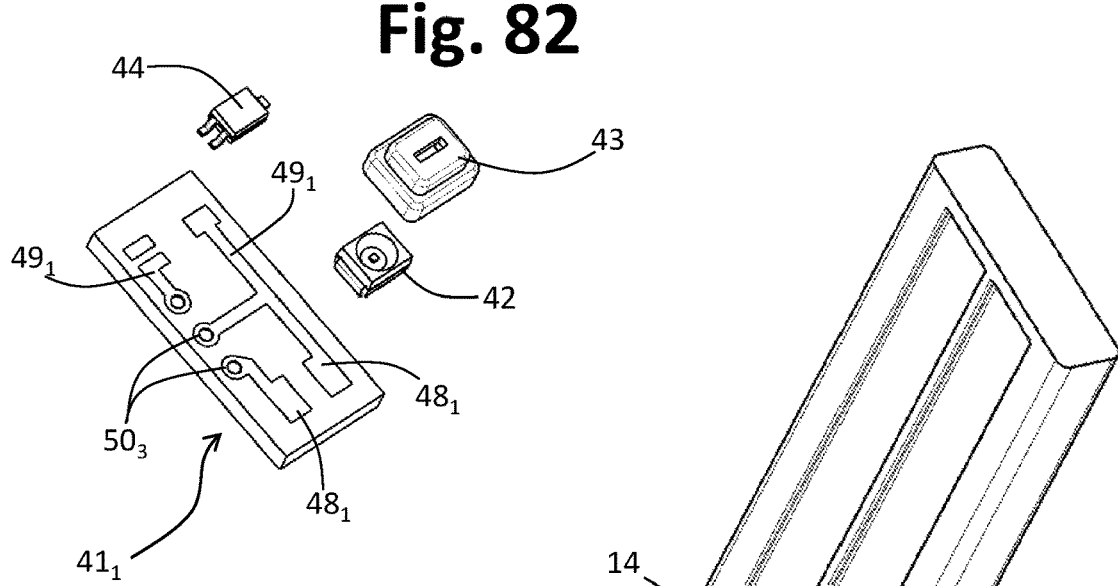
FIG. 82 is an exploded view of an optical module of a sensor device according to possible embodiments of the invention.
Figure 83:
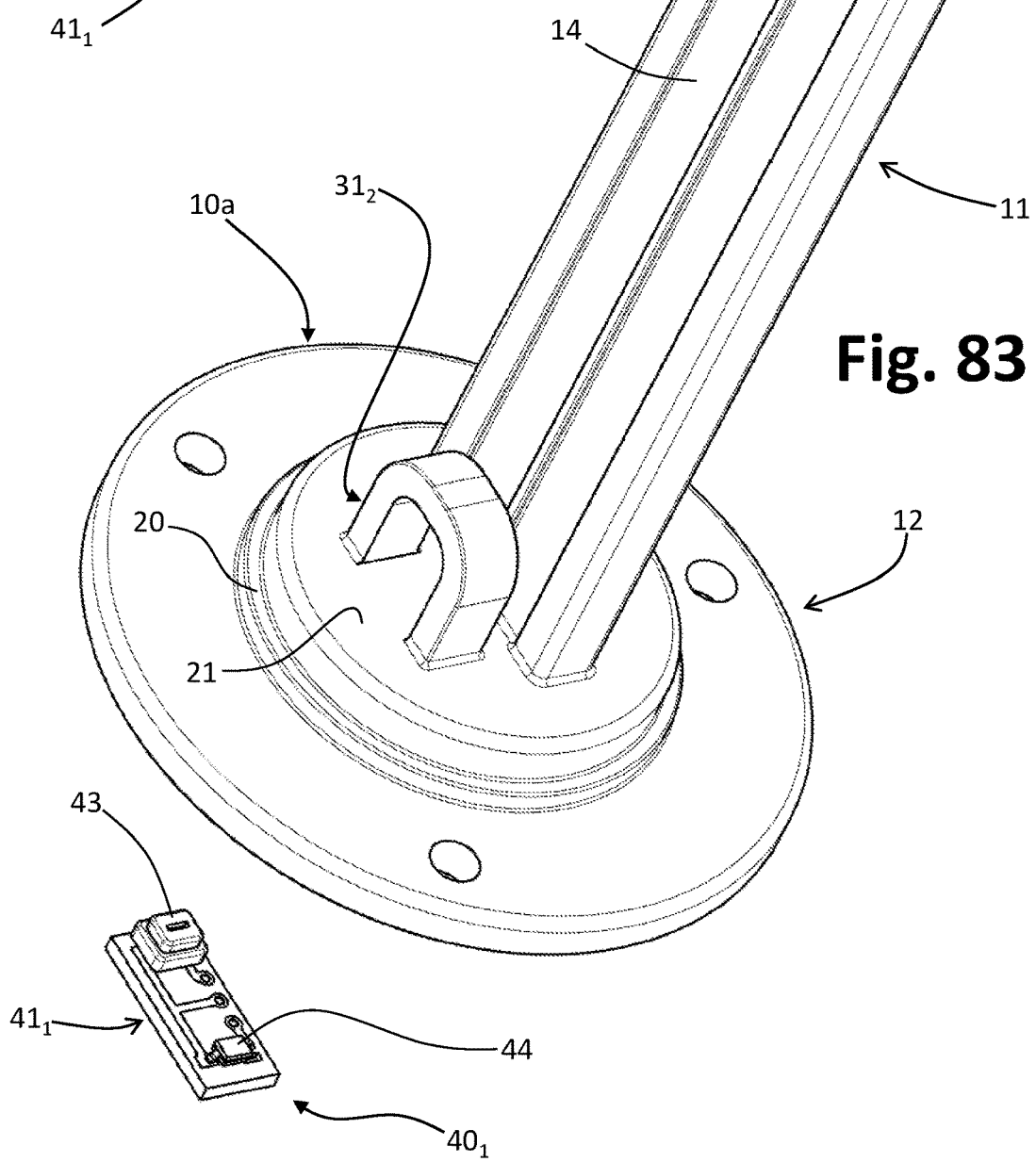
FIG. 83 is a partially exploded view of a part of a sensor device according to possible embodiments of the invention.

The diffraction grating 107 is obtained by providing on the optical surface 33a, i.e., on the side facing the emitter 42, an orderly alternation of recesses and/or reliefs, which give rise to a sort of crenalation or a series of furrows, preferably parallel to one another, as represented schematically in FIG. 80 (at least some reliefs and/or recesses could possibly extend also in different directions or at least in part cross one another). Of course, the pitch of the grating, i.e., dimensions and distance between the recesses and/or reliefs, must be chosen according to what has just been explained above.

By decomposing the monochromatic ray emitted by the emitter, diffracted rays will be generated that will impinge upon the liquid/solid interface surface—i.e., the outer surface $21_1$ of the wall 21 between the two parts 33, 34 of the formation 31 (FIG. 79)—at different angles, greater and smaller than the critical angle. The diffracted rays that impinge at an angle of incidence greater than the critical angle upon the interface surface $21_1$ will be totally reflected, whereas the rays with a smaller angle of incidence will always be partially reflected and partially refracted. As the concentration of the liquid solution varies, as explained previously, the critical angle will change, and consequently also the intensity of the light rays on the two photodetectors 44a, 44b. The electrical signal generated by the two photodetectors will hence change as a function of the concentration, and by measuring the variation of the signals of the two photodetectors it will be possible to measure the variation of concentration.

In embodiments of this type it is preferable for the emitter 42 to be of a concentrated, i.e., collimated, type, with a divergence of the emission limited to a few degrees, preferably less than 3° (in the embodiments that do not envisage the grating 107 it is not necessary for the emitter 42 to be of a collimated type). The space filter 43 is in any case preferably used for collimating more the light emission generated on the diffraction grating 107. In the case where the emitter 42 is of a monochromatic type, the diffracted rays will always be of a monochromatic type, and hence also the photodetectors 44a, 44b will have to be sensitive to the same monochromatic rays as those of the source (i.e., with a specific wavelength).

Instead, if the emitter 42 is of a polychromatic type, the diffraction grating 107 enables separation also of the light rays in terms of wavelength (i.e., into the various colours): considering the operating principle, the two photodetectors 44a, 44b will receive rays with different wavelengths, and consequently they will have to be sensitive to light rays of different wavelengths. Alternatively, it is possible to use a number of diffraction gratings 107 with different pitches, designed so as to direct the light always onto the two photodetectors, with a number of emitters 42 at different wavelengths. In these embodiments, the emitters 42 are turned on at different times, and the resulting signals are acquired using always the same photodetectors.

It is in any case preferable to use a monochromatic light source 42 to prevent introduction of variation of the refractive index (and hence of the critical angle) also as a function of the wavelength and not only as a function of the concentration of the liquid solution.

As regards the diffraction grating 107, various shapes are obviously possible, in order to obtain the desired effect, including shapes that are different from the ones exemplified. The profiles of the grating 107 may be obtained via mechanical etching or else with holographic techniques or, preferably, with micromachining techniques borrowed from microelectronics, or else with micro-moulding techniques. In particular, the solution in which the diffraction grating 107 is moulded of a single piece together with the formation 31 (i.e., with the body 10a or the body 101) is preferable. In this case, the mould used may be of a modular type, i.e., with an insert appropriately micro-structured superficially, at the point where the grating 107 is to be defined.

In various embodiments, the level-sensing device according to the invention is equipped with an optical sensor for detecting the quality or other characteristics of the substance, the operating principle of which is based upon inner reflection or on the use of an optical waveguide. Embodiments of this sort are described with reference to FIGS. 81-88 and 89-97, where the same reference numbers as those of the previous figures are used to designate elements that are technically equivalent to the ones already described above.

As is known, considering a light source that illuminates the input of an optical fibre, the discontinuity of the refractive index between the materials of the core and of the cladding of the fibre traps the optical radiation as long as this maintains a sufficiently grazing angle that is contained within the cone of acceptance. In practice, to function properly according to total reflection, the fibre must not present curves that are excessively sharp. The principle of total inner reflection can be exploited for a measurement of characteristics or concentration, by considering once again the difference in the refractive index between two media—i.e., the plastic material of the body 10a or 101 and the liquid substance or solution in contact with the body—and the variation of this index as a function of the concentration of the substance or solution.

With initial reference to FIG. 81, in various embodiments, at the inner side of the wall 21 of the body 10a a positioning site $30_1$ is defined, which is shaped differently from the previous embodiments and includes a seat $31_1$ for an optical module $40_1$, which also has a structure different from that of the embodiments so far described. In the example illustrated, and as is clearly visible in FIG. 82, the supporting structure of the module $40_1$ comprises a substantially plate-like body $41_1$, associated to the underside of which are an emitter 42 and a receiver 44, here consisting of a single photodetector. The body $41_1$ may be advantageously constituted by a printed circuit support, such as a PCB, on which there are provided paths of electrically conductive material $48_1$, $49_1$ for electrical connection of the electronic components 42 and 44. The circuit support $41_1$ has respective connection elements $50_3$, connected to the aforesaid paths, for example in the form of solder pads and/or metallized through holes, for electrical connection of the module $40_1$. Also in this case, preferentially associated to the emitter 42 is a corresponding space filter 43 of the type described previously. According to possible alternative embodiments (not represented), also the circuit support $41_1$ may be obtained with a technique similar to the one described in relation to the previous embodiments; i.e., it may comprise a body made of an electrically insulating material, for example a plastic material, overmoulded on electrical-connection elements may of electrically conductive material, which perform the functions of the paths $48_1$, $49_1$ and of the connection elements $50_3$.

In the example, the circuit support $41_1$ has a substantially quadrangular shape, and the seat $31_1$ defined on the inner side of the wall 21 is shaped accordingly, to receive inside it at least part of the circuit support $41_1$, with the emitter 42 and the receiver 44 facing the wall 21. Obviously possible are other shapes for the seat $31_1$ and for the circuit support $41_1$. Preferably, the wall 21 likewise defines contrast elements for resting of the circuit support $41_1$ within the seat $31_1$, one of these contrast elements being designated by $37_1$ in FIG. 81.

On the other end, at the outer side of the wall 21, the body 10a defines or comprises an optical guide, designed to diffuse the light or optical radiation emitted by the emitter 42 as far as the receiver 44. This guide, designated by $31_2$ in FIG. 83, preferentially has a generally U-shaped configuration, the two ends of which are located at the area that, on the inner side of the wall 21, is circumscribed by the seat $31_1$. The optical guide $31_2$ may be integrated in the body 10a, for example moulded in a single piece, in particular made of a material permeable to an emitted optical radiation or light. Alternatively, the optical guide $31_2$ may be mounted in the body 10a; for example, it may be associated to a body of its own of a type similar to the body 101 described previously, which is preferably made of a plastic material that is permeable to optical radiation or light, is moulded separately and then mounted on the body 10a, or else is overmoulded on the body 10a, with the latter that may be made of a material of a different type, such as a plastic material not permeable to optical radiation or light.

The optical guide $31_2$ is preferably massive, i.e., full, and is made of the material suitable for diffusion of optical radiation, as explained previously, to perform substantially the functions of an optical-fibre core: as will be seen, the functions of the cladding of this fibre are instead performed by the liquid solution contained in the tank, in which the guide $31_2$ is immersed.

Figure 84:
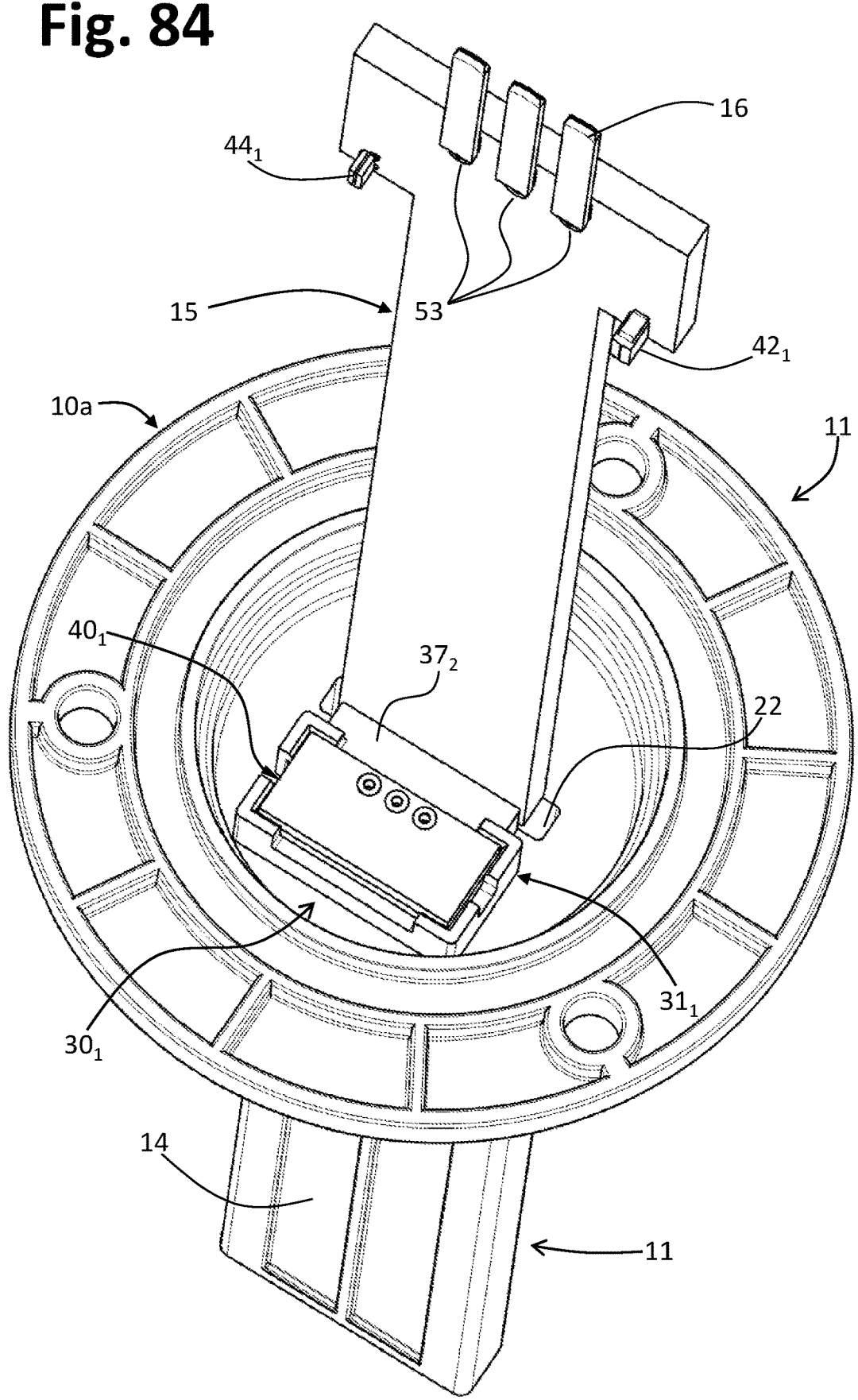
FIGS. 84-85 are perspective views aimed at representing some steps of assembly of a sensor device according to possible embodiments of the invention.
Figure 85:
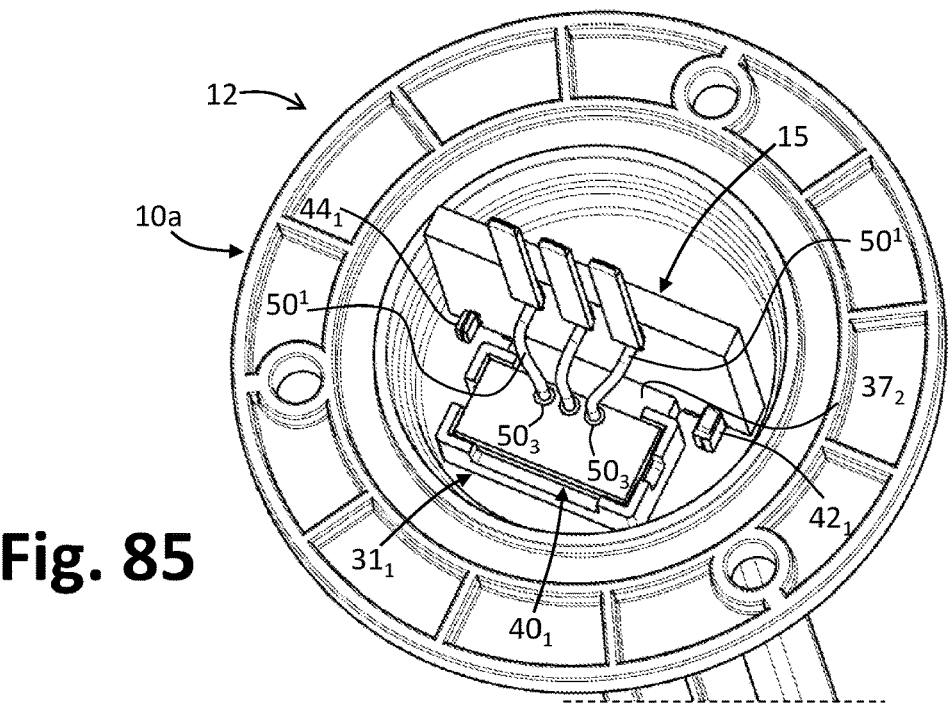

The module $40_1$ is preferably slotted into the corresponding seat $31_1$, as may be seen in FIG. 84, in order to have a precise assembly of the emitter 42 and receiver 44 components with respect to the two ends of the guide $31_2$. In preferred embodiments, in order to render assembly of the module $40_1$ more rigid and sturdy, it is possible to envisage a resin bonding and/or gluing thereof in its seat $31_1$.

Also in embodiments of this type, the circuit 15 is inserted through the opening 22 of the wall 21, as represented schematically in FIG. 84, in order to be partially housed in the corresponding casing 14, and with the upper portion of the circuit itself that remains within the cavity of the body 10a. There can then be made the electrical connection of the module $40_1$ using electric wires $50_1$ or other terminals, connected to the holes or pads 53 or the like provided in the circuit 15, as may be seen in FIG. 85.

Figure 86:
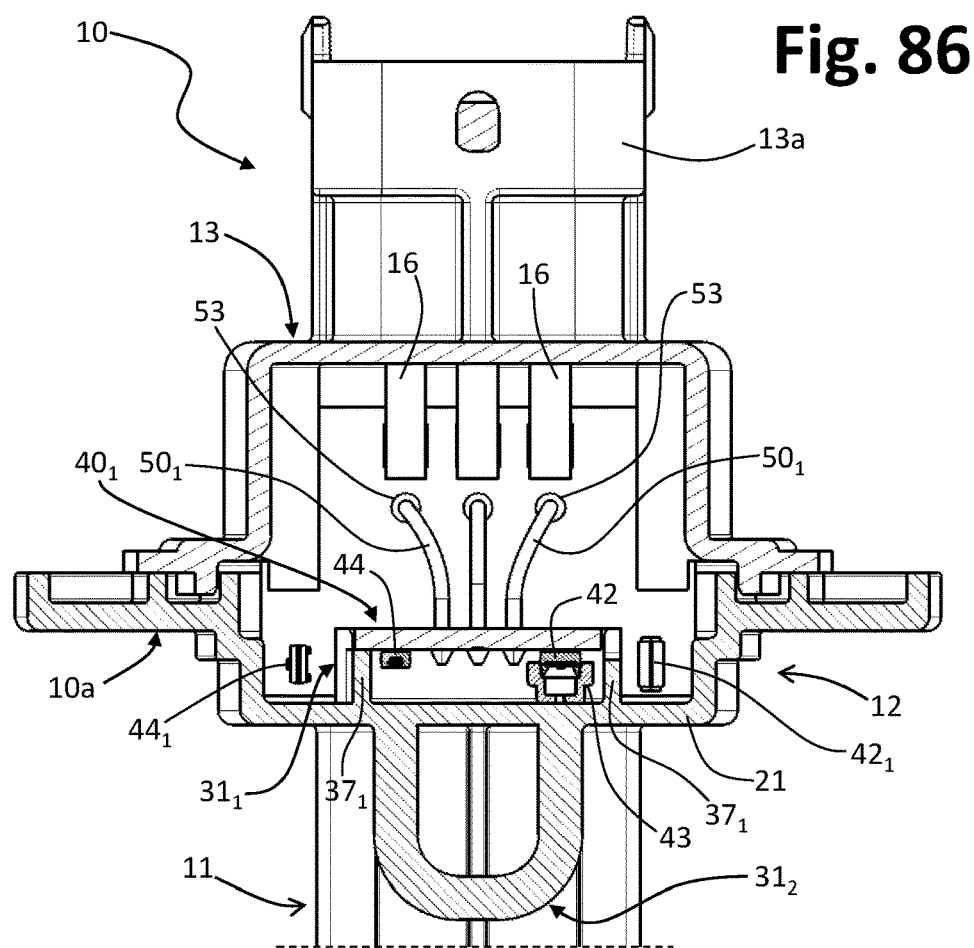
FIG. 86 is a partial vertical cross-sectional view of a sensor device according to possible embodiments of the invention.

As may be seen in FIG. 86, in the configuration where the module $40_1$ is assembled, the emitter 42 and the receiver 44 are set facing each a respective end of the optical guide $31_2$, which, in the mounted condition of the device 1, is immersed in the liquid solution (it is to be recalled that, in the actual configuration of use, the device 10 is preferentially set in a position turned upside down through 180° with respect to what is illustrated in the figure). As mentioned, preferably associated to the emitter 42 is a space filter 43, for improving concentration of the optical radiation emitted and getting it to fall within the cone of acceptance of the guide $31_1$.

In operation, the emitter 42 emits light in front of the first end of the guide $31_2$, which, as has been said, is preferably integrated in the body 10a, i.e., made of a single piece therewith, and is immersed in the solution the concentration of which is to be measured, which performs functions of cladding. Located in front of the opposite end of the guide $31_2$ is the receiver 44, designed to capture the light beam emitted by the emitter 42 that has propagated within the plastic body of the guide by exploiting inner reflection.

Figure 87:
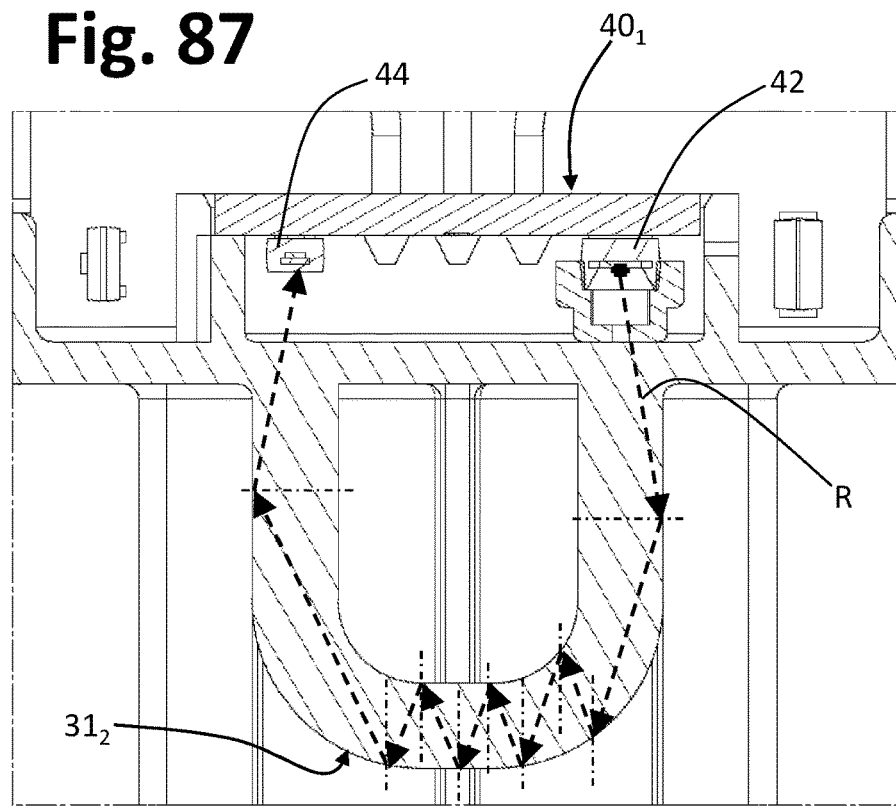
FIGS. 87-88 are partial vertical cross-sectional views aimed at exemplifying operation of an optical sensor of a sensor device according to possible embodiments of the invention.
Figure 88:
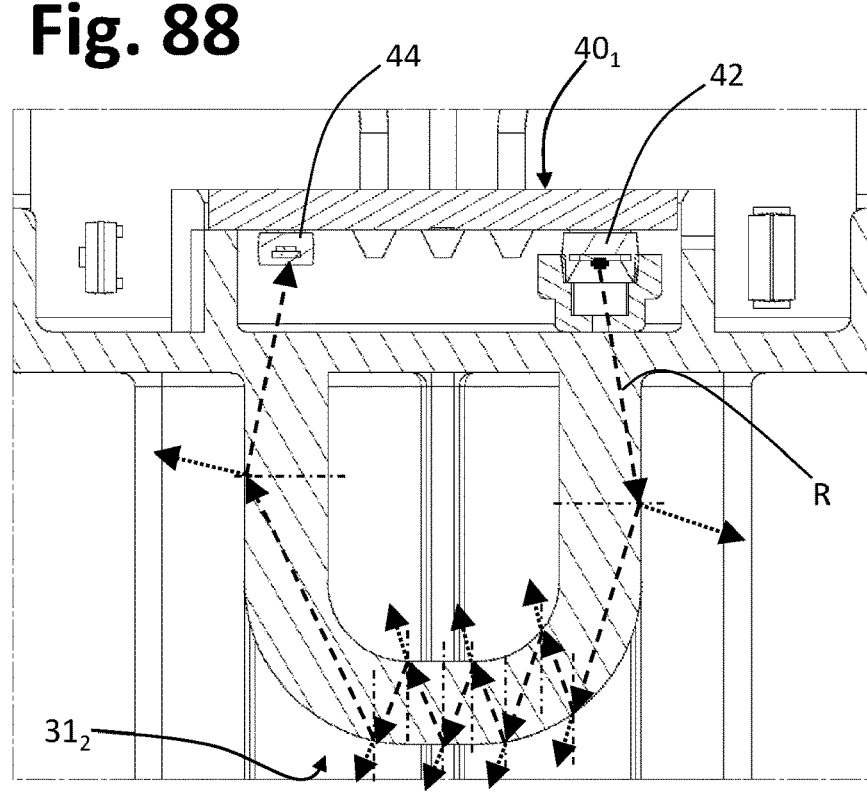

FIGS. 87 and 88 exemplify two situations with a liquid solution at two different concentrations. In the case of FIG. 87, the solution has a first concentration Conc 1 such that the critical angle is smaller than the angle of incidence of the ray R emitted by the emitter 42. The ray R is hence totally reflected, reaching the receiver 44 with a certain intensity. Consequently, assigned to the value of concentration Conc 1 is a certain value of the signal at output from the receiver 44. FIG. 88 highlights, instead, the case where the liquid solution has a concentration Conc 2 that is greater than Conc 1. In this case, the critical angle increases, and the ray R incident on the surface of interface between the material of the guide $31_2$ and the liquid, at the same angle, will be partially reflected and partially refracted, as is exemplified in FIG. 88. There will follow various reflections and refractions each time that the ray reflected in the previous step impinges upon the interface surface. Consequently, the ray R will reach the receiver 44 with a certain attenuation, caused by partial reflection/refraction, i.e., with an intensity lower than in the previous case corresponding to the concentration Conc 1 of FIG. 87. The signal emitted at output from the receiver 44 will hence be different from the previous case, thus enabling discrimination of the value of concentration. Considering the transimpedence, the gain, and the response of the receiver 44, a signal A will be obtained that varies as a function of the intensity P incident on the receiver, and consequently as a function of the concentration of the fluid, as has already been set forth previously:

$$A = ka * P \cdot \text{response} * \text{transimpedence}$$

The intensity P incident on the receiver 44 will be given by the combination of all the rays emitted by the emitter 42 within the cone of emission, totally and partially reflected in the guide $31_2$. The partially reflected rays will hence have an intensity that decreases at each reflection: if the intensity P is not sufficiently high, these rays could even vanish and not reach the receiver 44.

As has been said, the measurement is based upon a detection of intensity: the receiver 44 changes its output signal on the basis of the variation of the incident light intensity, which is in turn a function of the concentration of the liquid solution.

With embodiments of the type referred to, the quality-measurement system is sensitive to the variation of operation of the emitter 42 and to the variation of the characteristics of the plastic material that constitutes the wall 21 and the guide $31_2$, which are principally caused by ageing and temperature variations. These factors could alter the light intensity of the ray emitted (ageing of the source) or else the optical properties of the plastic material (refractive index and consequently critical angle), thus causing errors of measurement.

Consequently, according to particularly advantageous embodiments, an additional or auxiliary emitter and an additional or auxiliary receiver are provided, preferably facing one another, with interposition of at least one reference optical element or waveguide not immersed in the fluid to be detected; this reference optical guide is preferentially, located in the cavity H and/or at the inner side of the wall 21. Preferably, the aforesaid reference optical element or guide is made of the same material as the sensing optical guide $31_2$ and/or as the wall 21 and/or as the body 10a (or 101). In the case exemplified in FIG. 85, the additional emitter and receiver—designated by $42_1$ and $44_1$, respectively—are set at the two opposite ends of a formation $37_2$, which is preferentially defined between the seat $31_1$ and the opening 22, with this formation that hence provides the aforesaid reference optical element or guide. The aforesaid reference optical guide may, however, be configured as an independent element, mounted between the emitter $42_1$ and the receiver $44_1$, or again be defined by one of the walls of the seat $31_1$, for example the rear wall close to the opening 22.

In the example illustrated, the emitter $42_1$ and the receiver $44_1$ are mounted on the circuit support 15 (see FIG. 84) in an area such that, following upon complete insertion of the circuit board itself in the corresponding opening 22, they will be set facing the two ends of the formation $37_2$.

The ray emitted by the emitter $42_1$ and consequently received by the receiver $44_1$ is not involved in any possible refraction/reflection with the liquid solution, in so far as the ray remains prevalently confined within the body 10a, and precisely within its formation $37_2$. The electronic components $42_1$ and $44_1$ are of the same family, in terms of characteristics, as the electronic components 42 and 44 used for measuring concentration. In this way, via the aforesaid additional components, it is possible to have a reference on the light intensity emitted to be used for a normalized measurement and compensate the variations of intensity produced by ageing and/or environmental variations of the material of the body 10a and/or of the reference optical guide $37_2$ and/or of the sensing optical guide $31_2$. This reference is constituted by the signal emitted by the receiver $44_1$, which will be used by the control electronics for making the necessary compensation of the signal emitted by the receiver 44.

It should be noted that, as described with reference to FIGS. 72-78, the module $40_1$, the seat $31_1$, and the light guide $31_2$, and possibly also the reference optical guide $37_2$ and/or the corresponding emitter $42_1$ and receiver $44_1$, could belong to a distinct unit, which may be positioned in a sealed way at a corresponding through opening of the wall 21 of the body 10a.

In various embodiments, the electronic components 42 and 44 used for the measurement and the similar components $42_1$ and $44_1$ used for correcting the measurement made may also be integrated in one and the same optical module. Variant embodiments of this type are described with reference to FIGS. 89-97, where the same reference numbers as those of the previous figures are used to designate elements that are technically equivalent to the ones already described.

Figure 89:
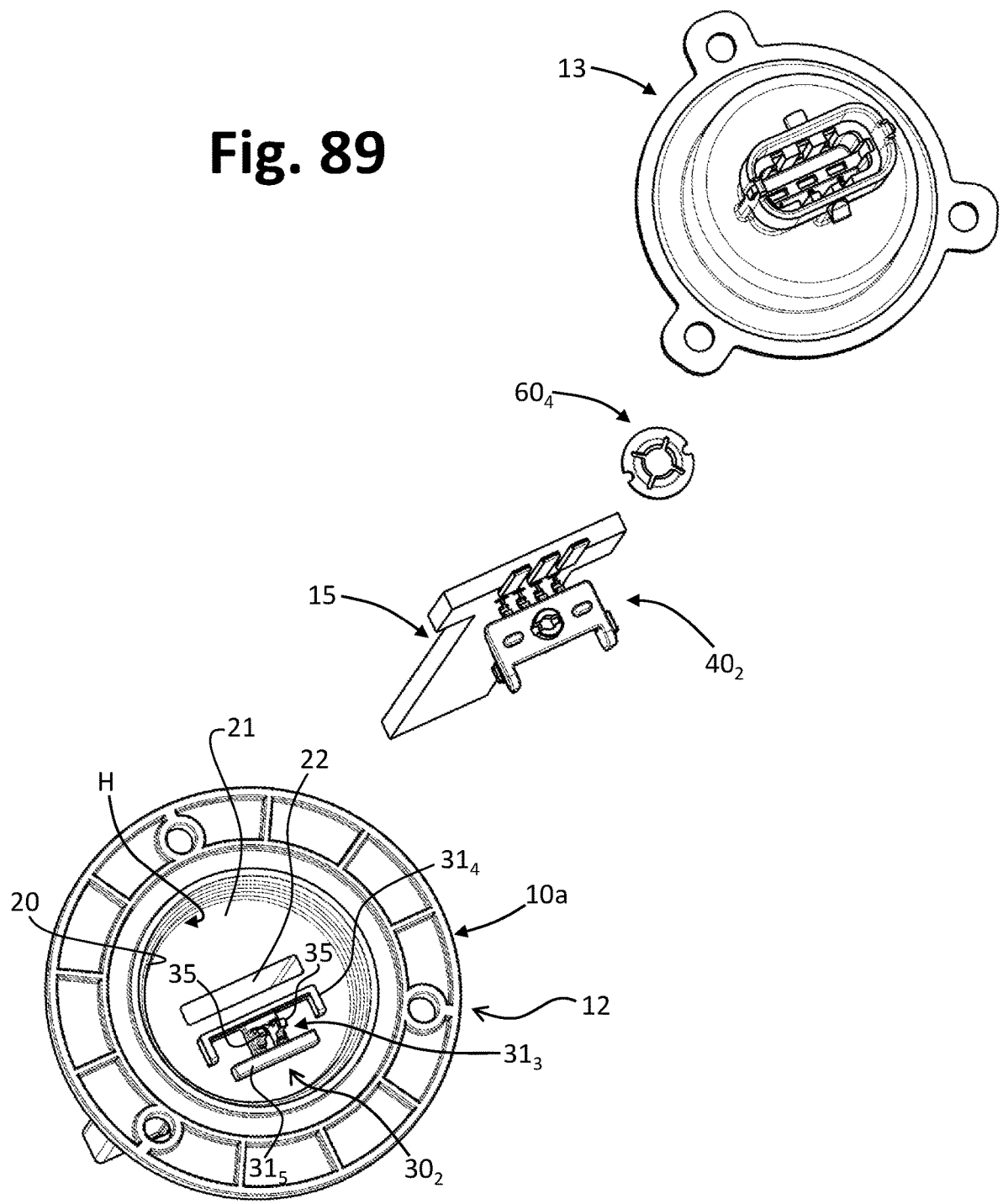
FIGS. 89-90 are partially exploded views, from different angles, of a sensor device according to possible embodiments of the invention.
Figure 90:
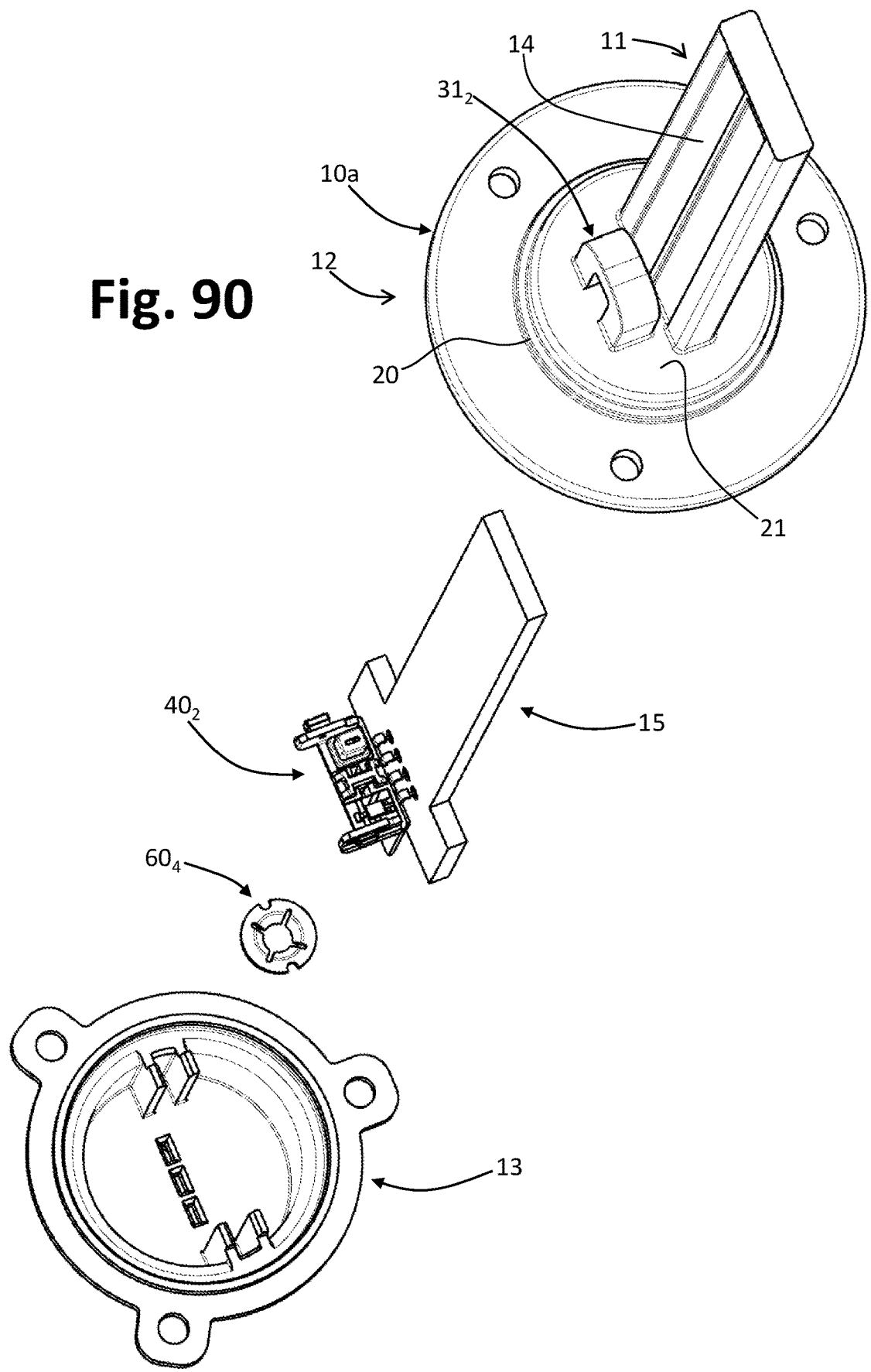

With initial reference to FIGS. 89-90, designated by $40_2$ is an optical module of the type referred to above, i.e., comprising the components 42, 44 and $42_1$, $44_1$, which is designed to be mounted at a positioning site $30_2$ defined on the wall 21 of the body 10a. The site $30_2$ includes a formation $31_3$, which comprises at least two mounted parts or appendages 35 that are generally parallel, functionally similar to the appendages 35 of embodiments described previously. The formation $31_3$ is located within a seat $31_4$ defined in the bottom wall 21. In the example, the aforesaid seat is substantially C-shaped and is defined by a larger wall and two side walls that project from the inner side of the wall 21. Likewise projecting from the wall 21 is a further wall $31_5$, here generally parallel to the larger wall of the seat $31_4$, which in the assembled condition of the module $40_2$, is designed to be set between the auxiliary emitter and the auxiliary receiver, as clarified hereinafter. The module $40_2$ is designed to be secured on the formation $31_3$ by way of a generally ring-shaped blocking and/or positioning element $60_4$, provided with a central tabbed hole. In various embodiments, the module $40_2$ is electrically connected to the circuit support 15 with modalities similar to the ones described with reference to FIGS. 2-26, i.e., exploiting elastically flexible terminals of the module itself, or else connected with wires or in other ways as described previously.

Figure 91:
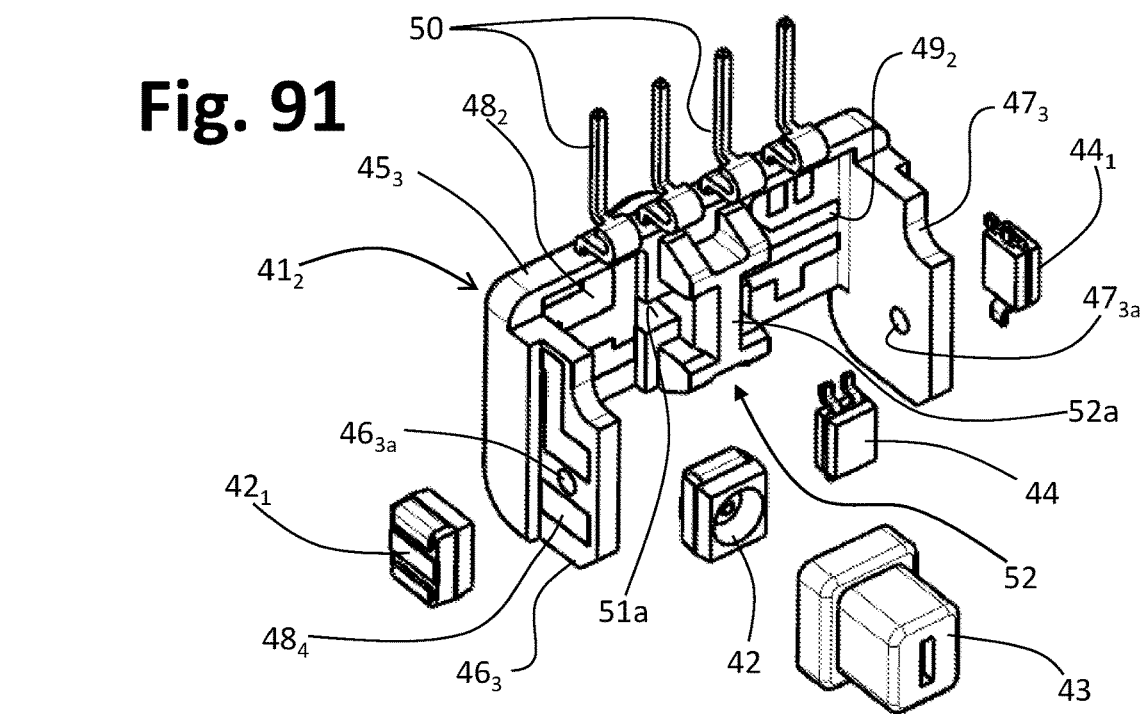
FIG. 91 is an exploded view of an optical module of a sensor device according to possible embodiments of the invention.
Figure 92:
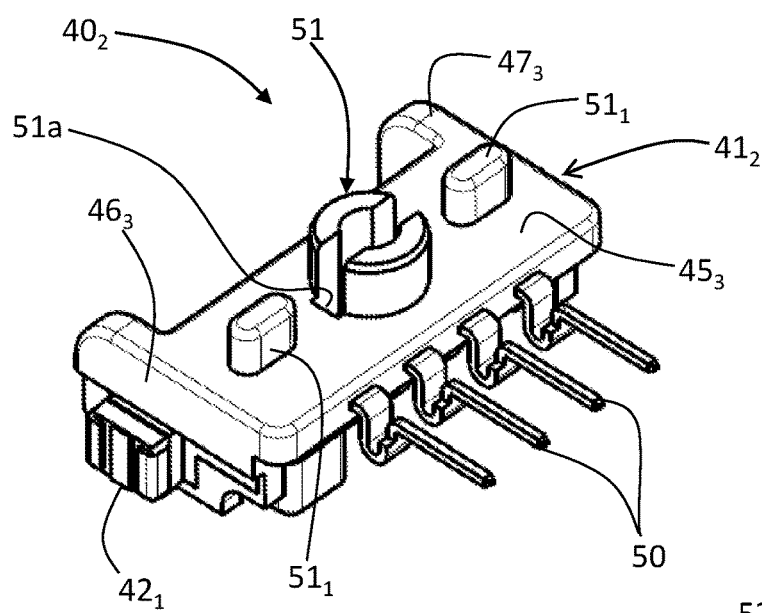
FIGS. 92-93 are perspective views from different angles of an optical module of a sensor device according to possible embodiments of the invention.
Figure 93:
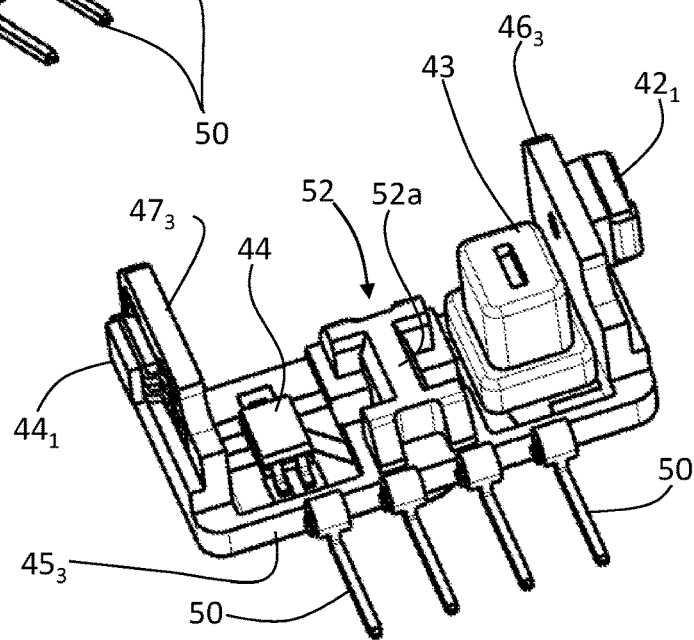
Figure 94:
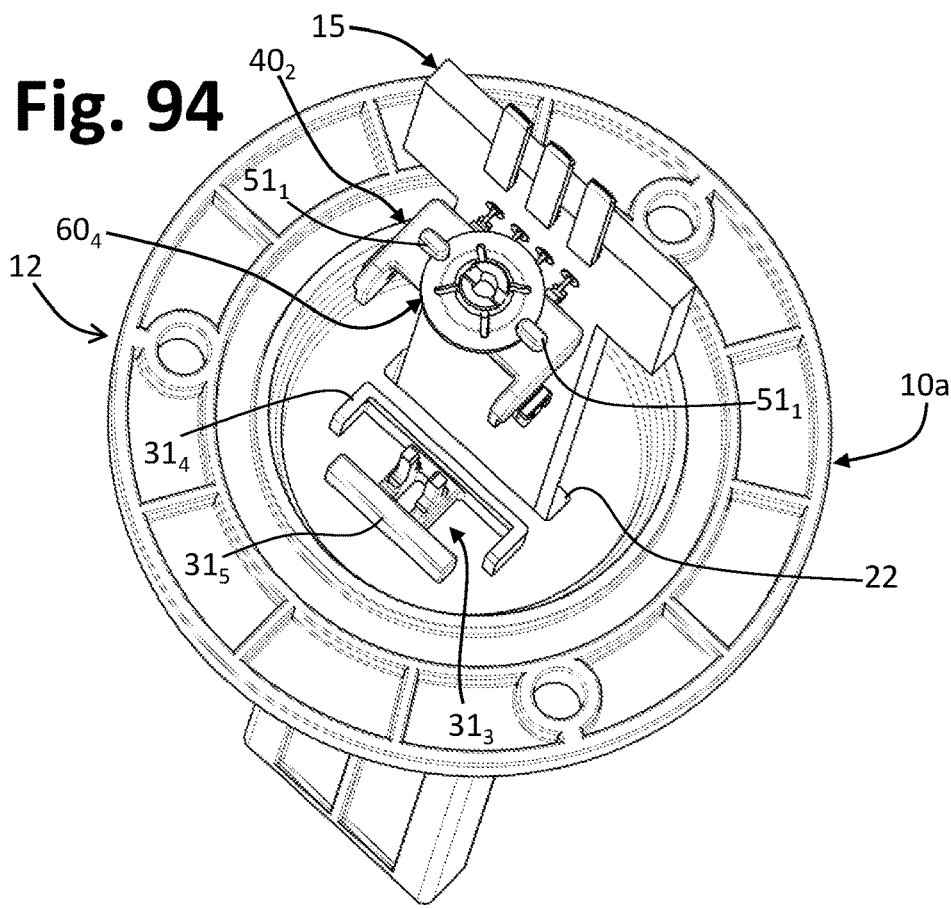
FIGS. 94-95 are perspective views aimed at representing some steps of assembly of a sensor device according to possible embodiments of the invention.
Figure 95:
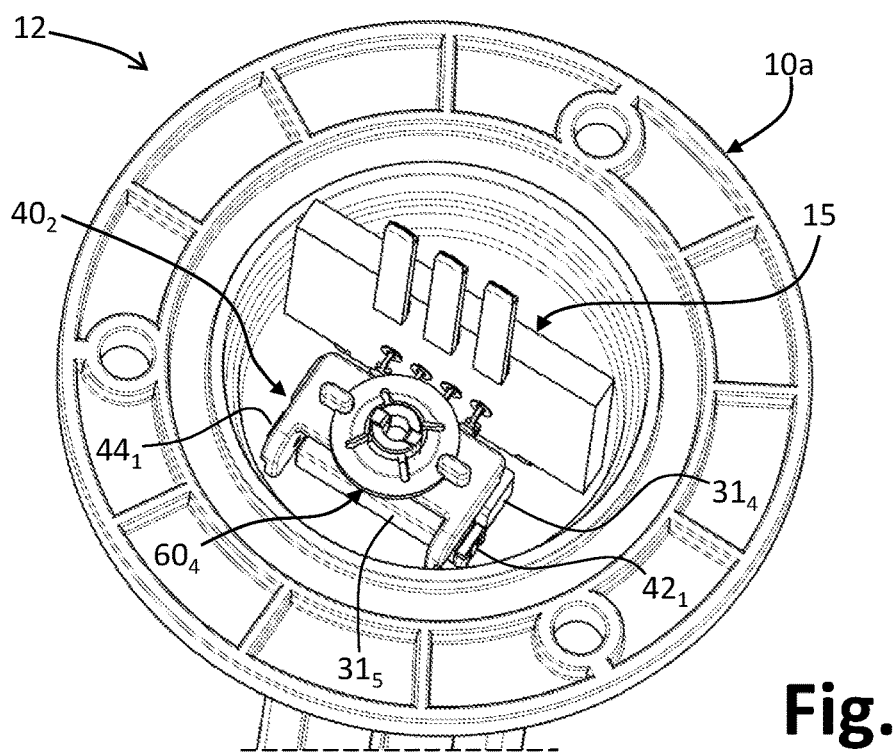
Figure 96:
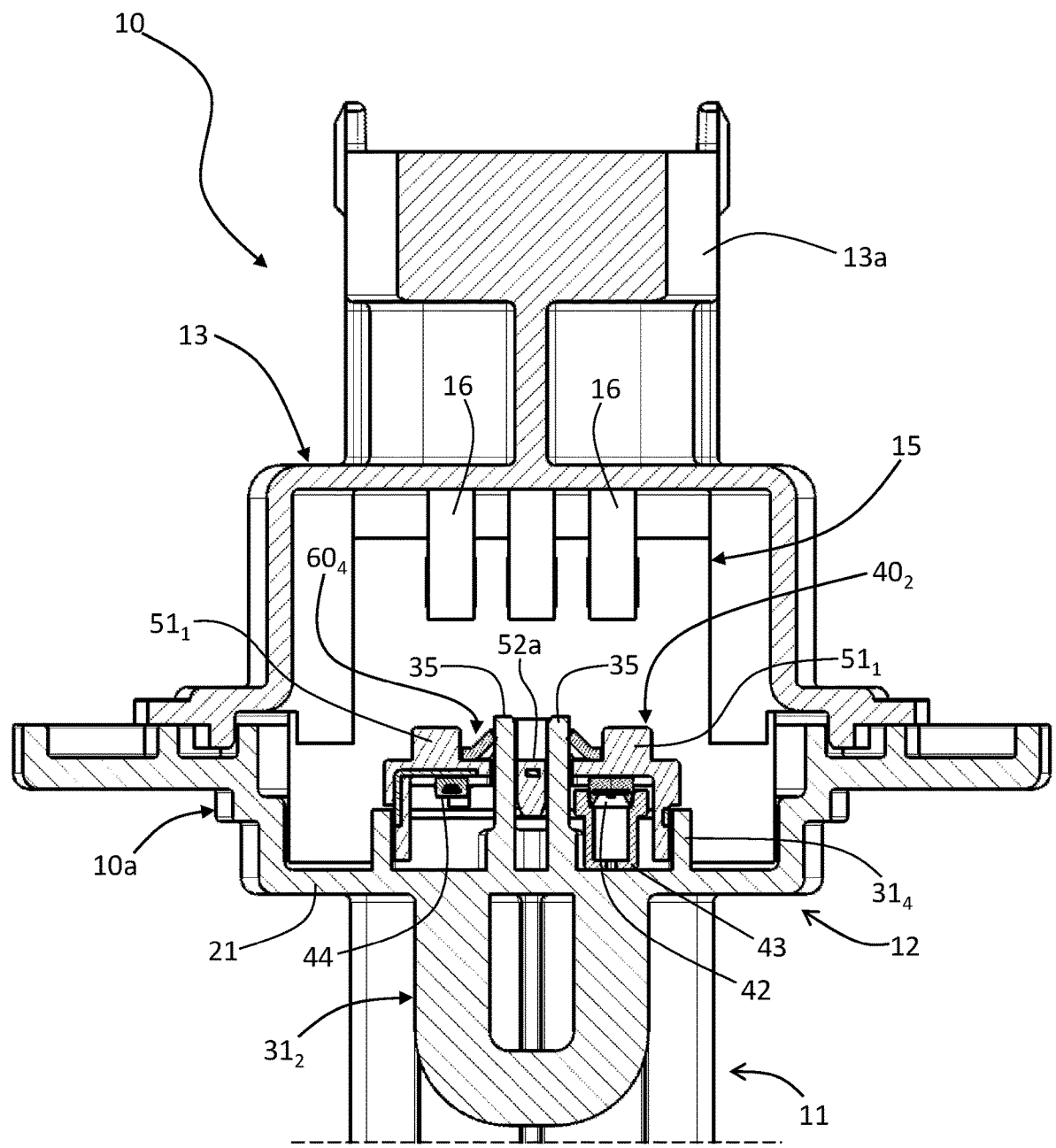
FIGS. 96-97 are partial vertical cross-sectional views, according to two different parallel axes of section, of a sensor device according to possible embodiments of the invention.

A possible embodiment of the module $40_2$ and its structure $41_2$ is illustrated in FIGS. 91-93. The load-bearing structure $41_2$ of the module $40_2$ basically consists of a substantially C-shaped body made of plastic material, i.e., comprising a central upper wall $45_3$ and two side walls $46_3$ and $47_3$, generally orthogonal to the central wall, at its two ends, or possibly walls $46_3$ and $47_3$ inclined with respect to the central wall $45_3$. This body is overmoulded on connection terminals 50, functionally similar to the terminals 50 of FIGS. 2-26, preferably at least in part elastically flexible, designed for connection to the circuit 15. The body of the structure $41_2$ is likewise overmoulded on conductors $48_2$ and $49_2$—which are in part accessible at the underside of the wall $45_3$—for electrical connection of the emitter 42 and of the receiver 44, respectively, as well as to terminals that are in part accessible at the outer side of the walls $46_3$ and $47_3$, for connection of the auxiliary emitter $42_1$ and of the auxiliary receiver $44_1$ (in FIG. 91, one of the conductors for the emitter $42_1$ is designated by $48_4$, the conductors for connection of the receiver $44_1$ having a substantially similar arrangement).

Provided at the upper face of the central wall $45_3$ is a formation 51 with the corresponding through openings 51a, whereas provided at the lower face of the same wall is a formation 52 with the corresponding wall 52a, as in various embodiments described previously. The auxiliary electronic components $42_1$ and $44_1$ are mounted on the outer side of the walls $46_3$ and $47_3$, which are purposely provided with through holes $46_{3a}$ and $47_{3a}$, the hole $46_{3a}$ provided for the emitter $41_1$ basically performing the functions of space filter. The electronic components 42 and 44 are mounted on the inner side of the wall $45_3$. Preferably associated to the emitter 42 is a corresponding space filter, for example of the type previously designated by 43.

Preferably, moreover, the upper face of the central wall $45_3$ has two positioning projections $51_1$ for the blocking element $60_4$, the profile of which defines recesses that are able to engage with the aforesaid projections $51_1$.

As may be noted, as compared to the version of FIGS. 81-88, the auxiliary emitter $42_1$ and the auxiliary receiver $44_1$, provided for compensating ageing of the emitter 42 and of the plastic material of the body 10a, are mounted on the module $40_2$, which also carries the main sensing emitter 42 and the main sensing receiver 44.

In the case exemplified, the module $40_2$ is connected to the circuit 15, preferably by way of the flexible terminals 50, it being possible, however, to use other connections, also of a rigid type. The blocking element $60_4$ may be pre-assembled on the upper formation 51 of the module $40_2$, also exploiting the corresponding positioning projection $51_1$. The circuit is then inserted in the opening 22 of the wall 21, as represented schematically in FIG. 94 until the module $40_2$ comes to rest on the seat $31_4$, as represented schematically in FIGS. 95 and 96. In this step, the two appendages 35 of the formation $31_3$ penetrate into the through openings 51a, and the wall 52a of the lower formation 52 of the module penetrates between the two appendages (see FIG. 96), with some tabs of the central hole of the blocking element $60_4$ that apply the necessary grip on the outer sides of the appendages 35.

Figure 97:
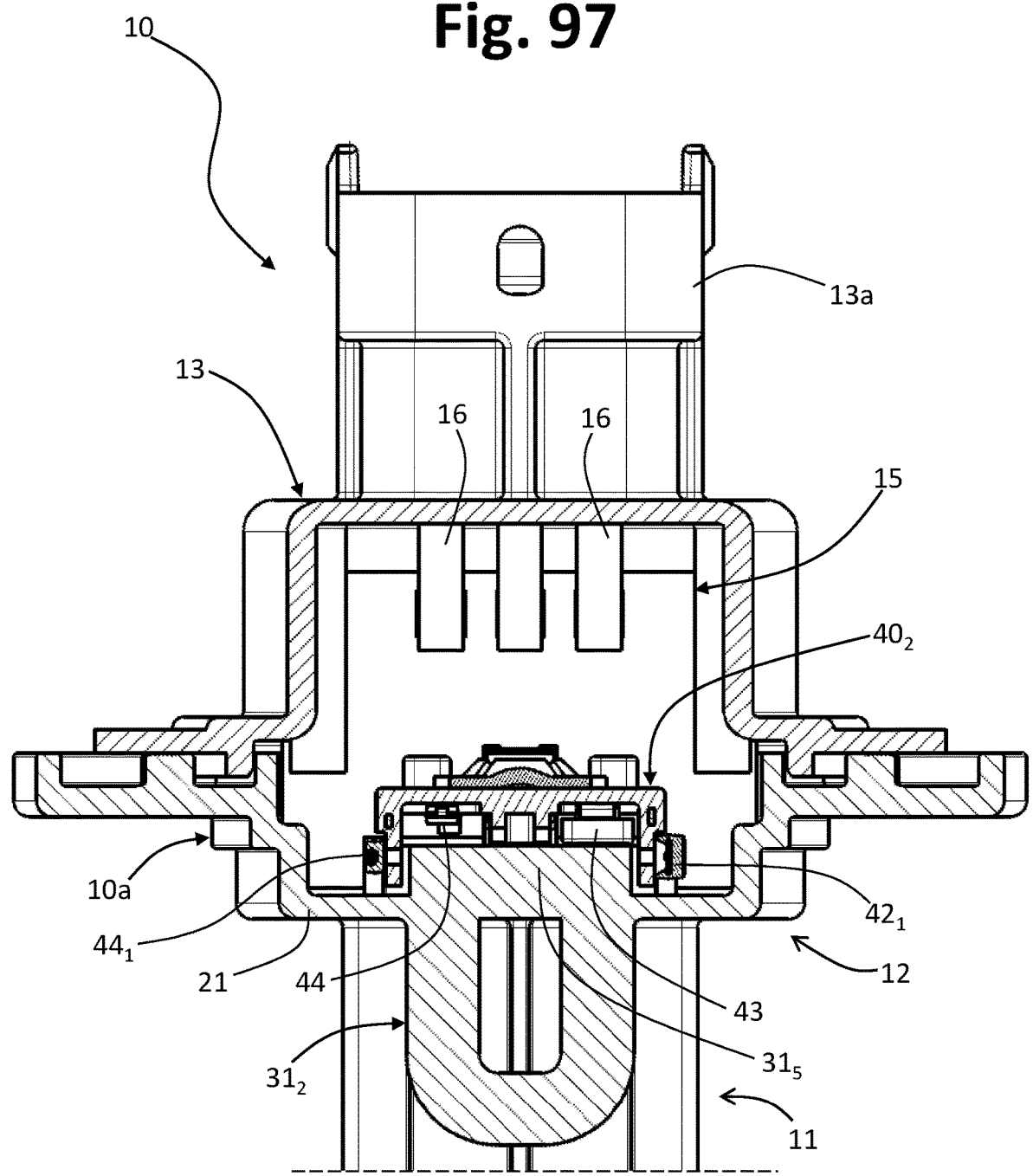

In the condition thus assembled, as may be seen also in FIG. 97, set between the emitter $42_1$ and the receiver $44_1$ is the wall $31_5$ (or other appropriately shaped wall): the ray generated by the emitter $42_1$ reaches the receiver $44_1$ passing through the wall $31_5$, thus giving rise to a reference signal.

In this way, as has already been described previously, it is possible to have a reference for compensating possible variations of light intensity due to ageing of the main emitter 42. As has been said, in fact, the emitters 42 and $42_1$ are of the same family. Furthermore, thanks to the presence of the wall $31_5$, the ray incident on the receiver $44_1$ is a function of the refraction introduced by the plastic material of the body 10a. In this way, as described with reference to FIGS. 81-89, the variation of the refractive index due to ageing of the plastic material entails a variation of the intensity of the refracted light ray and hence a variation of the light intensity on the receiver $44_1$, i.e., of the signal emitted by the latter. Considering, then, the signal of the auxiliary receiver $44_1$ as reference, it is possible to compensate the variation of the properties of the material and/or alterations due to other environmental factors or conditions of use.

Figure 98:
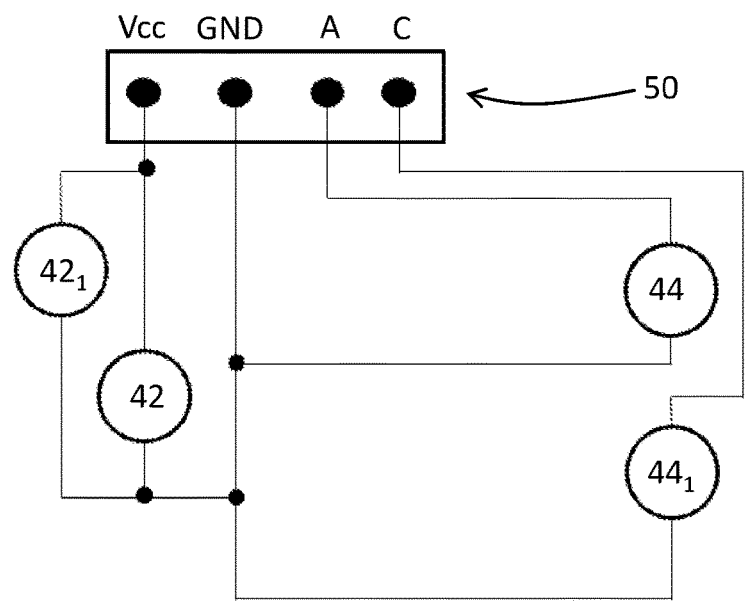
FIG. 98 is an electrical diagram of an optical module, which can be used in sensor device according to possible embodiments of the invention.

Exemplified in FIG. 98 is a possible electrical diagram of the module $40_2$, for its connection to a corresponding interface circuit, here represented by the circuit support 15 of the level-sensing device 10. As may be noted, the terminals 50 preferably make it possible to have as input and output signals a supply level Vcc of the emitter 42 and of the emitter $42_1$, a ground GND, and two voltage signals A and C corresponding to the two photodetectors 44 and $44_1$. These signals A and C are sent to the circuit support 15 for numeric processing within the controller MP (as also represented schematically in FIG. 99) and/or sent to an external circuit via the electrical connector 13a, 16.

It will thus be appreciated that, in various embodiments, at least the level sensor and the optical sensor of the device according to the invention (and preferably also at least one temperature sensor, when envisaged), have a common electrical connector, here represented by the connector 13a, 16.

Likewise, according to various embodiments, the level sensor and the optical sensor (and possibly also at least one temperature sensor) share part of the circuit arrangement, and especially at least its electronic controller MP, which will hence be configured for managing operation of the two (or three) different sensors. Likewise, preferentially, one and the same circuit—here represented by the circuit 15—determines at least part of the connections of the level sensor and of the optical sensor, and/or an emitter and a receiver of the optical sensor, and of the sensing means of the level sensor—here represented by the electrodes J—are connected to one and the same circuit.

Figure 99:
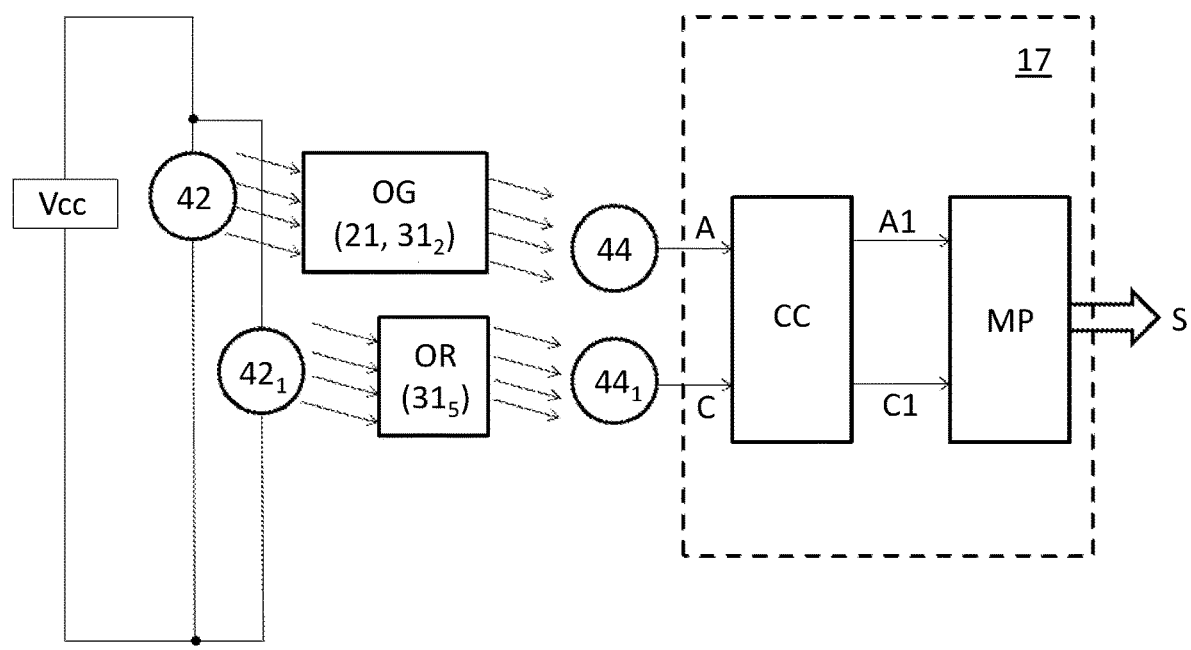
FIG. 99 is a simplified block diagram of an optical sensor of a sensor device according to possible embodiments of the invention.

Exemplified, instead, in FIG. 99 is a block diagram of operation of the quality optical sensor that includes the module $40_2$. In this figure, designated by Vcc is the low-voltage supply of the emitters 42 and $42_1$, the block OG represents the optical geometry defined by the guide $31_1$ and the corresponding part of wall 21, and the block OR represents the part $31_5$ of the body 10a set between the emitter $42_1$ and the receiver $44_1$. As may be noted, the voltage signals A and C at output from the receivers 44 and $44_1$ are treated by a conditioning circuit CC, and the conditioned signals A1 and C1 reach corresponding inputs of the microprocessor MP, which—by correcting the signal A1 as a function of the signal C1—generates the signal S representing the value of concentration of the solution or of some other characteristic or the type of the substance. Also in this case, the components CC and MP are preferably located on the circuit board 15, with the microcontroller MP that manages both level sensing and quality sensing of the liquid solution. The block diagram of FIG. 99 of course also applies in relation to the embodiments described with reference to FIGS. 81-88.

Also general operation of the quality optical sensor of FIGS. 89-99 is similar to what has been described with reference to FIGS. 81-88, in particular as regards use of the emitter 41 and of the receiver 44 in combination with the light guide $31_2$ (see in particular, the part of description regarding FIGS. 87-88).

Obviously, each one from among the site $30_2$, the formation $31_3$, the seat $31_4$, and the wall $31_5$ could have a shape different from the one exemplified, provided that their functions are maintained, and instead of the flexible terminals 50 electric wires could be used of the type previously designated by $50_1$.

In various embodiments, the optical sensor that equips the device 10 according to the invention bases at least in part its operation on the laws of optical refraction, and in particular on refraction of a light ray in its passage from a solid to a fluid (two media with refractive indices different from one another) and on the variation of the refractive index with the concentration of the fluid. As is known from physics and from Snell's equations, given the same angle of incidence of the incident ray, the variation of the refractive index of the fluid—which is representative of its concentration, as already explained above—entails a variation in the angle of the ray refracted through the fluid. By adequately pre-arranging an element for receiving optical radiation, it is thus possible to detect the position of incidence of the refracted ray and hence measure the concentration and/or characteristics of the fluid.

Embodiments of this type are described with reference to FIGS. 100-111, where the same reference numbers as those of the previous figures are used to designate elements that are technically equivalent to the ones already described.

Figure 100:
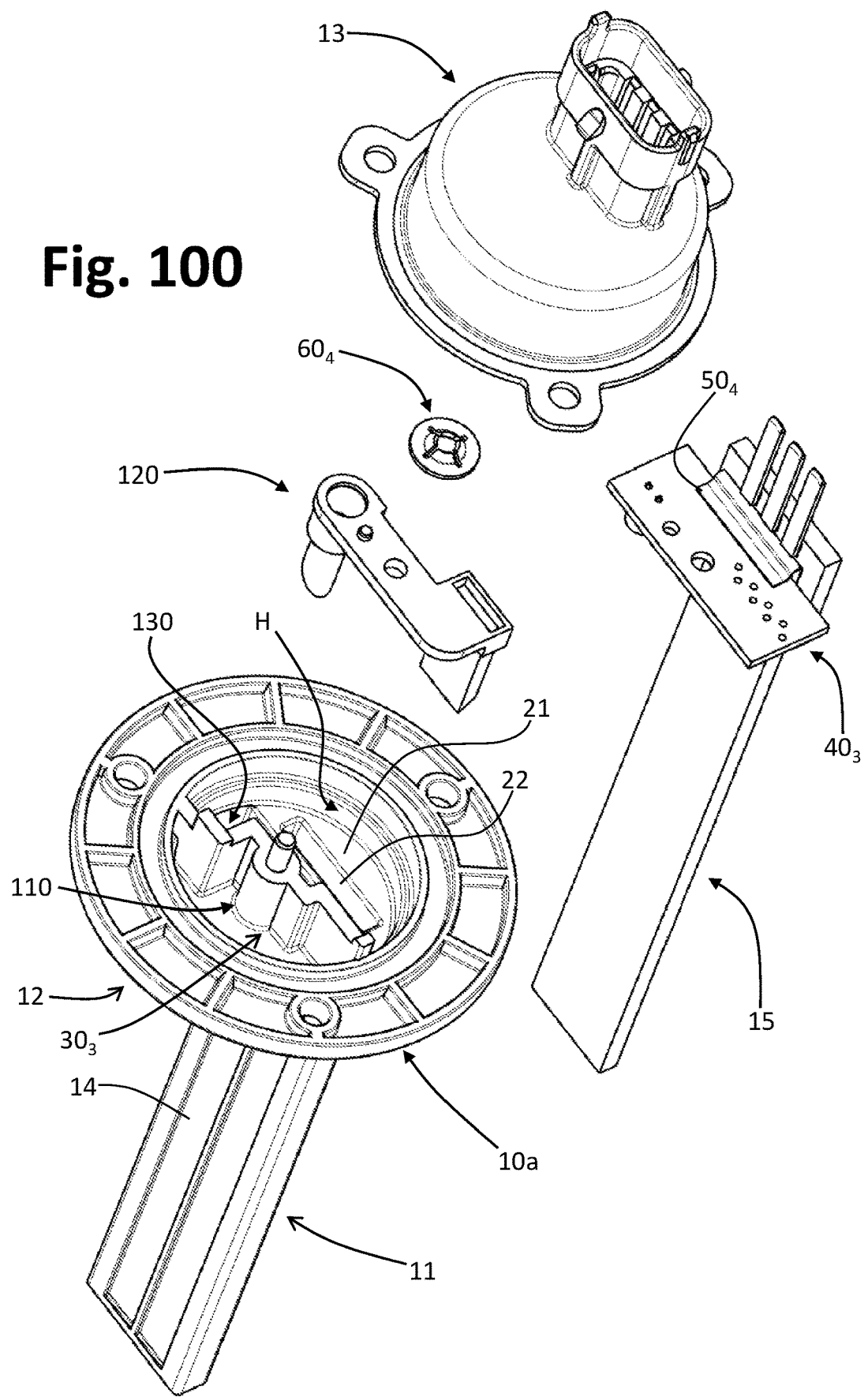
FIGS. 100-101 are partially exploded views, from different angles, of a sensor device according to possible embodiments of the invention.

With initial reference to FIG. 100, in embodiments of this type a positioning site $30_3$ is provided, which includes a formation 110 that rises from the wall 21 towards the inside of the cavity H of the body 10a. The formation 110 comprises a shaped wall that, preferably but not necessarily, extends through the cavity H and has at the top positioning elements for an optical module $40_3$. In the example, this module $40_3$ is designed to rest on the upper surface of the formation 110, which preferentially defines at least one upper appendage 110a and, very preferably, lateral contrast elements 110b for the module $40_3$, as may be seen in FIGS. 105 and 106.

In embodiments of this type, it is envisaged to use a shaped optical insert for propagation of a light ray, designated as a whole by 120, made at least in part of transparent material or material permeable to operating optical radiation of the sensor, for example, the same material as that of the wall 21. The optical insert 120 is designed to be housed in a corresponding seat, designated by 130, basically consisting of a portion of the bottom wall 21, which is shaped so as to define a cavity projecting from the main plane of the wall itself, as is clearly visible in FIG. 101. As may be noted in this FIG. 101, the portion defining the seat 130, which is to be immersed in the liquid solution, includes two outer surfaces 130a, 130b that are angled with respect to one another. In the example, the two surfaces 130a and 130b form between them an angle greater than 90°.

The insert 120 is represented in different views in FIGS. 102 and 103, preferably moulded and/or made of a plastic material. The body of the insert 120 has a main wall 121, which is preferably plane and provided with a through hole 121a designed for coupling with the appendage 110a of the formation 110. Preferentially projecting on the upper side of the wall 121 is an appendage 121b for positioning of the optical module $40_3$.

On the underside of the wall 121 there project two elements for transmission of light 122 and 123, each of which has, at the distal end, an inclined surface 122a and 123a, preferably inclined at about 45°. Preferably, moreover, the body of the insert 120 likewise defines two housings or seats 122b and 123b, which open at the upper side of the wall 121, each in a position corresponding to a respective transmission element 122 and 123. The body of the insert is preferably made of a single piece, including the transmission elements 122 and 123. As will be seen, the seats 122b and 123b are designed to house at least partially an emitter and a receiver of the optical module $40_3$. Preferentially, the transmission element 123 has an elongated cross section, for example substantially rectangular, given that the corresponding inclined surface 123a is designed to receive an incident light ray, the position of which may vary—in the longitudinal direction of the surface 123a—as a function of the concentration of the liquid solution. The transmission element 122 has in the example a circular cross section.

The seat 130 (FIGS. 100-101) is designed to receive inside it at least part of the transmission elements 122 and 123 and is hence shaped accordingly and/or has an at least in part complementary shape, preferably with at least some inner walls of the seat 130 set facing or coupled to at least some surfaces of the transmission elements 122 and 123.

With reference to FIG. 104, the optical module $40_3$ has a structure $41_3$ that comprises a substantially plate-like supporting body, preferably constituted by a printed circuit support or PCB, which has two through openings $41_{3a}$ and $41_{3b}$, for the appendage 110a of the formation 110 and the appendage 121b of the insert 120, respectively.

Associated to the underside of the structure $41_3$ are at least one emitter $42_2$ and at least one receiver $44_2$ of optical radiation, preferably visible radiation. The emitter $42_2$ may for example be a light-emitting diode. In preferred embodiments, the receiver $44_2$ is a receiver of the CMOS-array type, comprising a linear or two-dimensional array of independent pixels each constituted by a photodetector. The structure $41_3$ includes suitable elements for electrical connection of the components $42_2$ and $44_2$, not illustrated for reasons of clarity, which comprise, for example, paths made of electrically conductive material and metallized holes for the terminals of the aforementioned components. According to possible alternative embodiments (not represented), also the structure $41_3$ may comprise a body made of an electrically insulating material, for example a plastic material, over-moulded on electrical-connection elements made of electrically conductive material, which perform the functions of the aforesaid paths and holes, i.e., using a technique similar to the one described in relation to previous embodiments.

Figure 101:
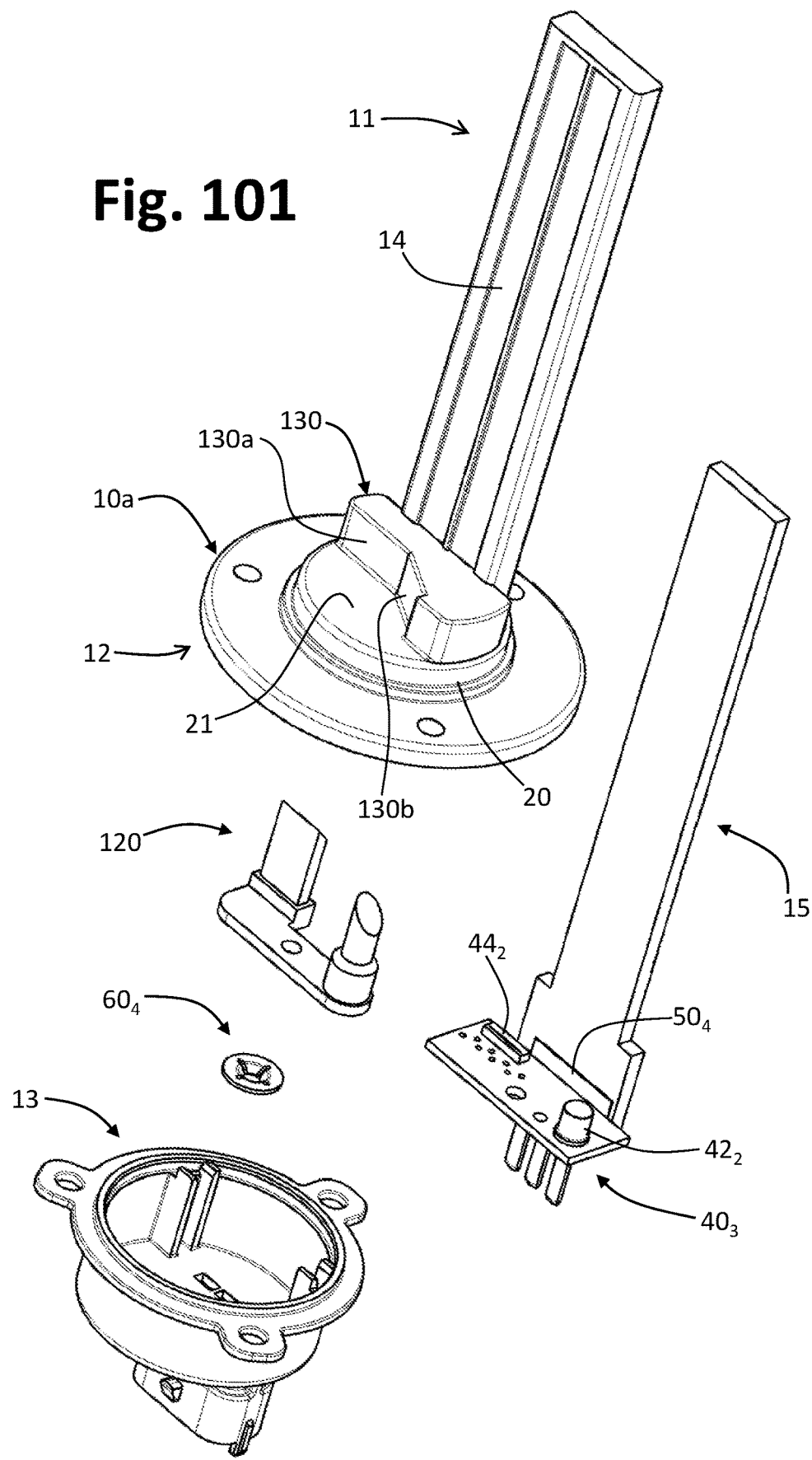

In preferred embodiments, the electrical connection between the module $40_3$ and the circuit support 15 of the device is obtained by way of a flat cable designated by $50_4$, for example, in FIGS. 100-101, in which case the circuit 15 will be preferably equipped with a connector or paths and/or conductive pads for connection. Obviously, it is also possible to provide a connection via separate flexible terminals or electric wires or with other connections, according to what has already been described previously. Of course, a flat cable may also be used for connection of the optical modules of various embodiments described previously.

Figure 105:
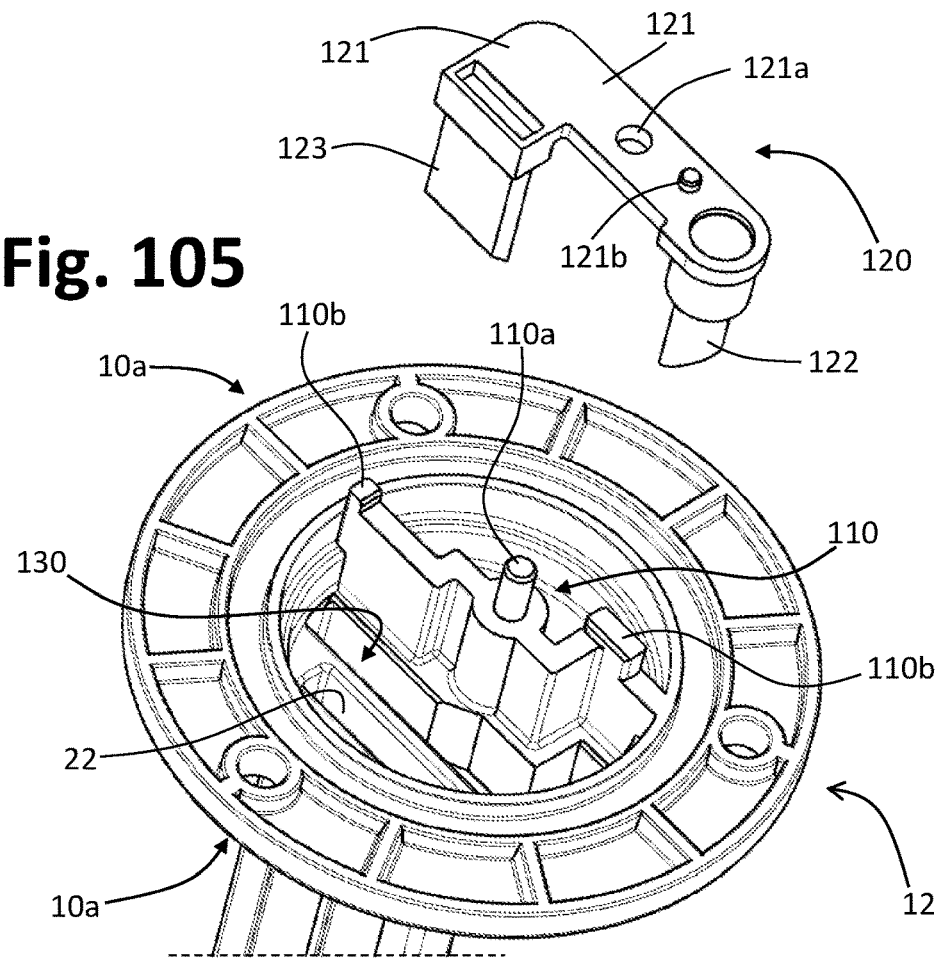
FIGS. 105-108 are perspective views aimed at representing some steps of assembly of a sensor device according to possible embodiments of the invention.
Figure 106:
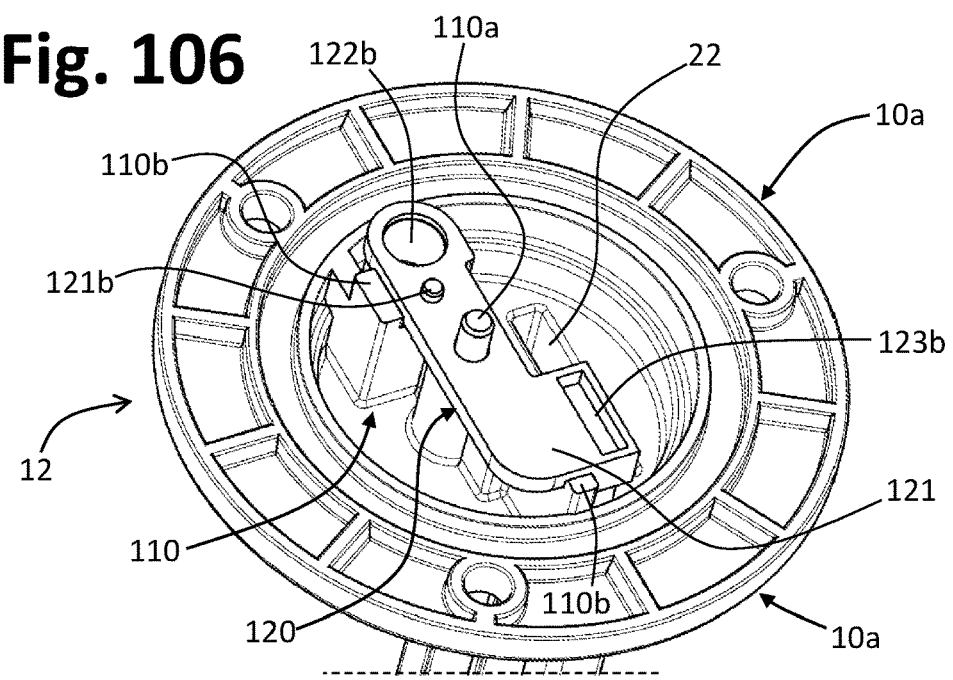
Figure 107:
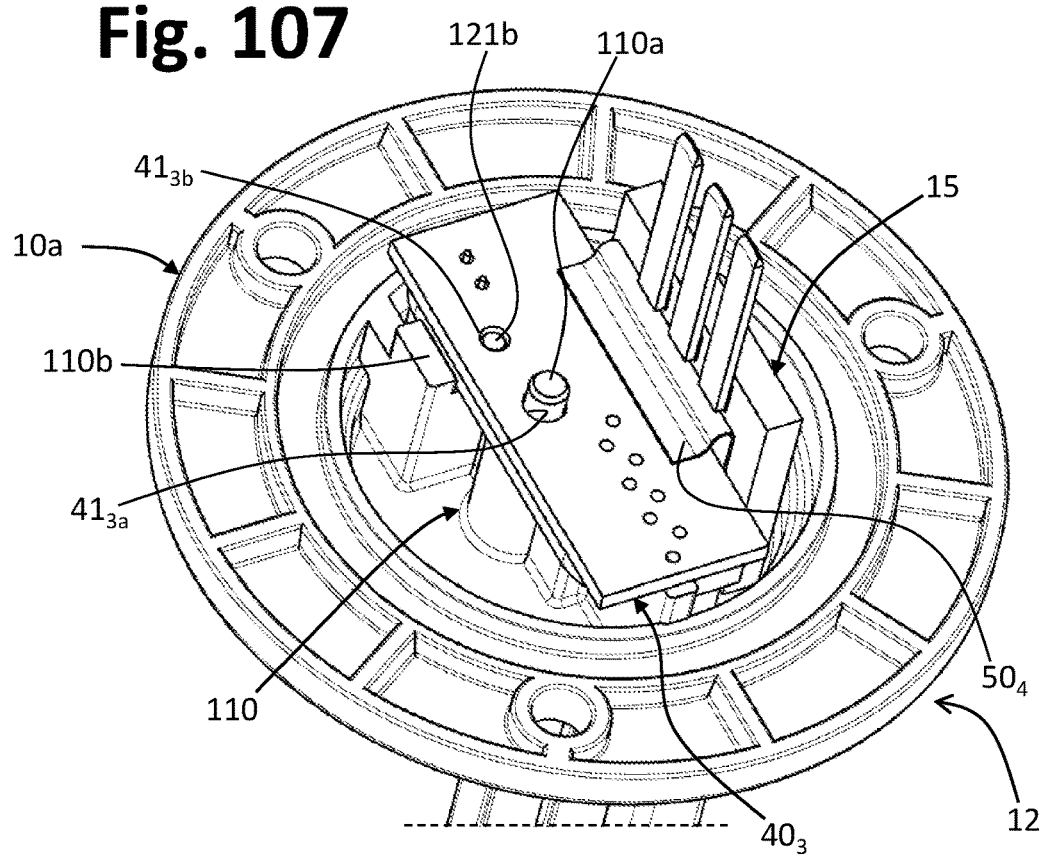
Figure 108:
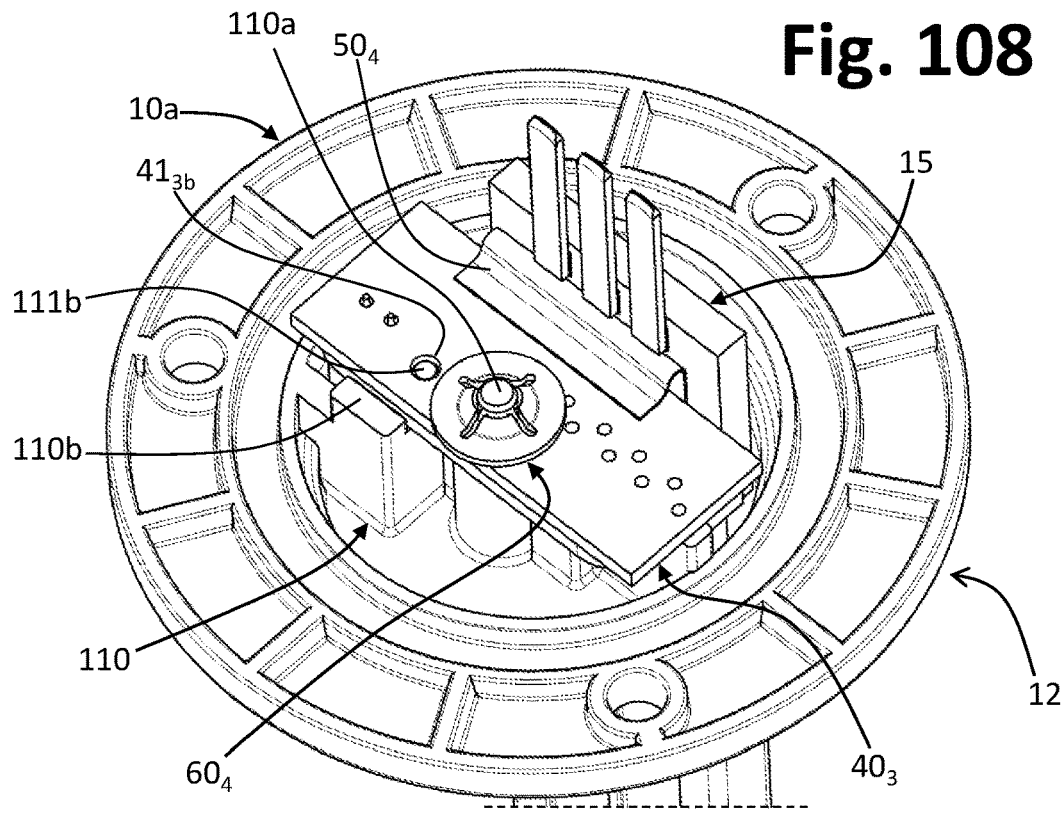

For the purposes of assembly, the optical insert 120 is mounted on the body 10a, as represented schematically in FIG. 105, in particular in such a way that the underside of its wall 121 comes to rest on the upper surface of the formation 130. In this step, care must be taken to see that the hole 121a of the insert 120 is fitted on the appendage 110a of the formation 110. In the mounted condition, as may be seen in FIG. 106, the upper contrast elements of the formation 110 contribute to proper positioning of the insert 120. In this condition, moreover, the elements 122 and 123 of the insert are inserted in the corresponding seat 130, in particular with the inclined surface 122a of the element 122 in a position opposite to the outer surface 130b of the seat 130 (see FIGS. 101 and 109) and the inclined surface 123a of the element 123 in a position opposite to the outer surface 130a of the seat 130 (see FIGS. 101 and 111).

Next, the circuit support 15 with the module $40_3$ pre-assembled is inserted through the opening 22 of the bottom wall 21 of the body 10a until the module itself comes to rest on the upper side of the insert 120. For the purposes of positioning also the holes $41_{3a}$ and $41_{3b}$ of the structure of the optical module are coupled to the appendage 110a of the formation 110 and the appendage 121b of the insert 120, respectively, as may be seen in FIG. 107. In this condition, moreover, the emitter $42_2$ and the receiver $44_2$ are positioned and/or at least partially housed within the corresponding seats 122b and 123b of the insert 120 (see FIGS. 109 and 111).

At this point, the module is fixed in position via a fixing ring substantially of the type already designated by $60_4$, the tabbed hole of which engages with interference on the appendage 110a. The ring $60_4$ preferably operates also as spring, enabling positioning of the module $40_3$ and the optical insert 120 and/or recovery of possible assembly tolerances.

As may be appreciated, at least the appendage 110a and the hole 121a provide means for positioning and centring of the insert 120 with respect to the formation 110, in combination with the possible contrast elements 110b, whereas the appendage 110a itself and the appendage 121b of the insert 120, with the holes $41_{3a}$ and $41_{3b}$ provide positioning and centring means for the module $40_3$ with respect to the formation 110 and to the insert 120.

The insert 120 is designed to propagate the light ray generated by the emitter $42_2$ as far as the receiver $44_2$ also through the body 10a, in particular through the walls 130a and 130b of the corresponding seat 130, and also through the liquid substance in which the walls are immersed. The optical surfaces 122a and 123a of the insert are hence designed for reflecting the light ray in a correct way, also considering the interface between the air and the plastic material. Likewise, the seat 130, and in particular its outer surfaces 130a and 130b are designed for the purpose in order to refract the optical ray at the interface between the plastic material and the liquid solution.

Figure 109:
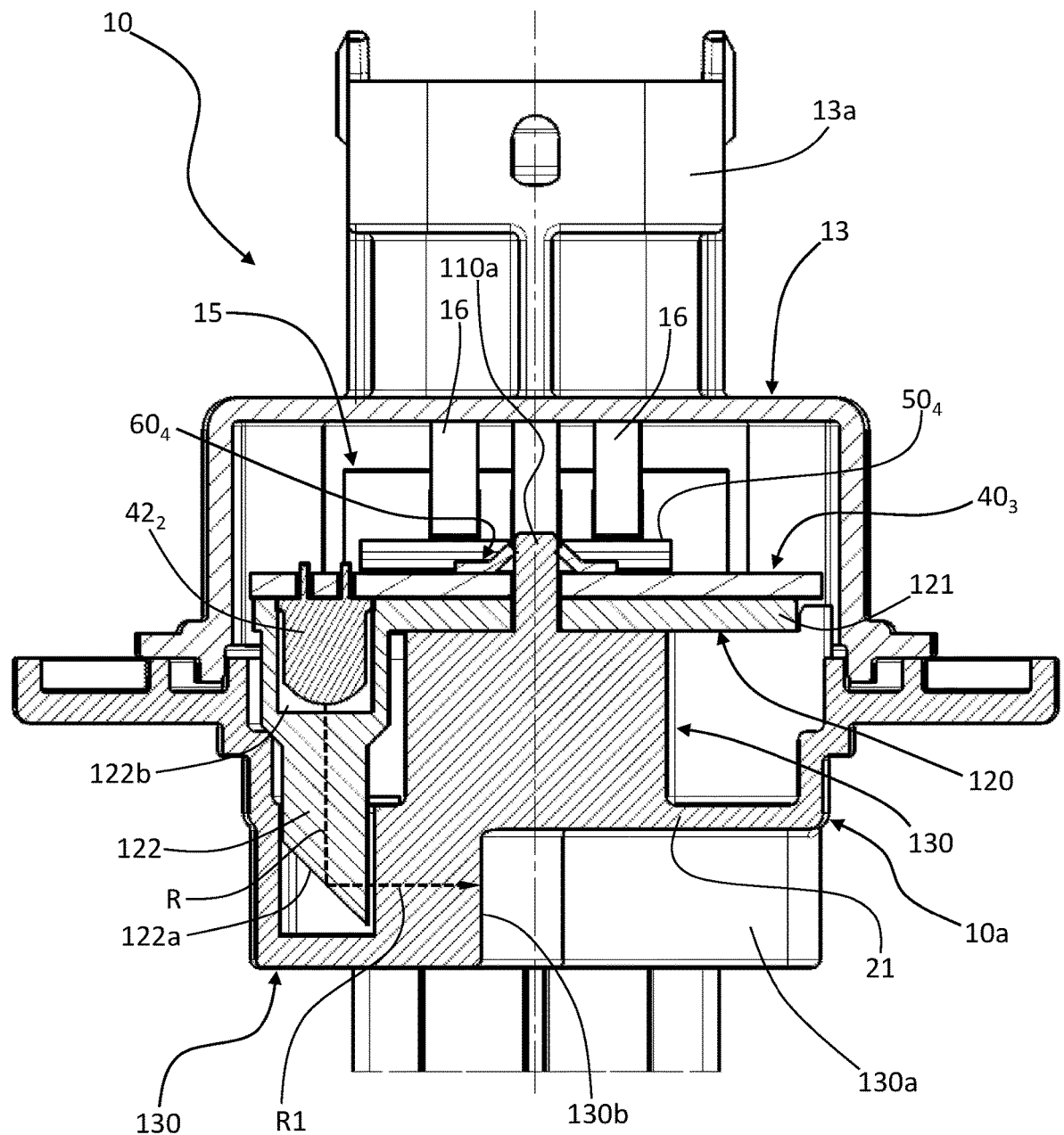
FIG. 109 is a partial vertical cross-sectional view of a sensor device according to possible embodiments of the invention.
Figure 110:
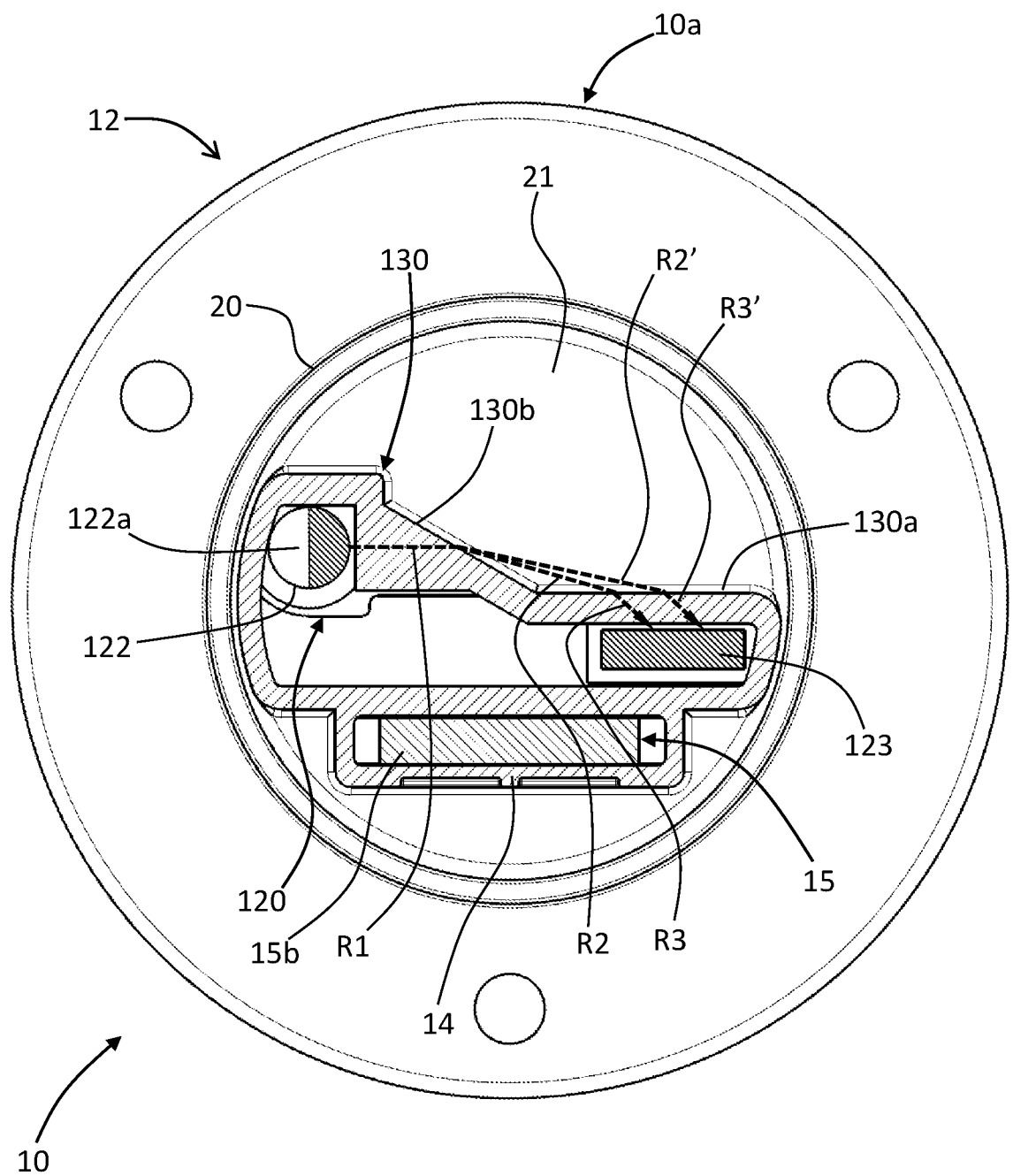
FIG. 110 is a horizontal cross-sectional view of the sensor device of FIG. 109.
Figure 111:
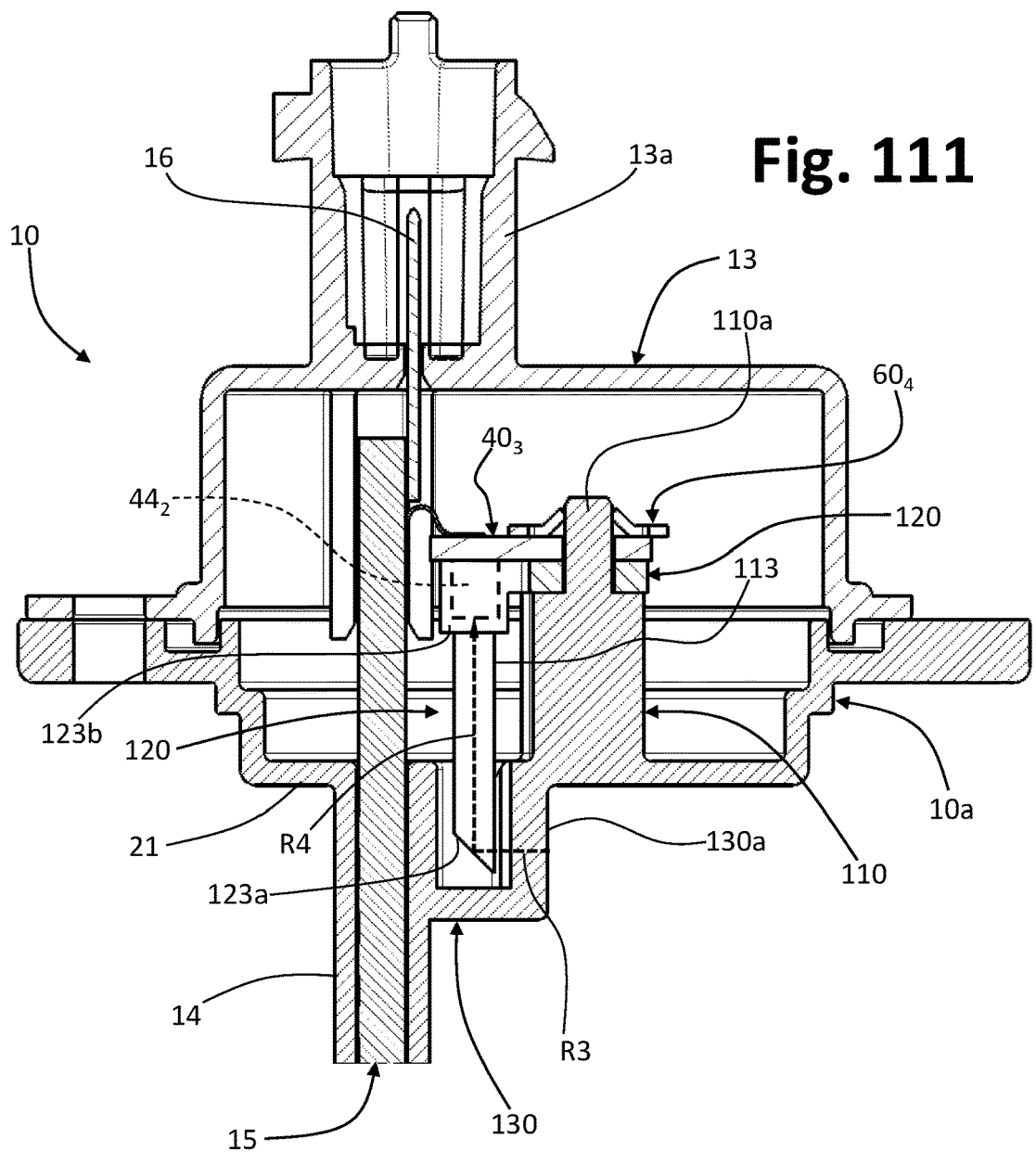
FIG. 111 is a partial vertical cross-sectional view of the sensor device of FIGS. 109-110, according to a plane of section orthogonal to that of FIG. 109.

Operation of the optical sensor is exemplified in FIGS. 109-111. With initial reference to FIG. 109, the light ray R is emitted by the emitter $42_2$ within the insert 120, in particular within its element 122, until it impinges upon its optical surface 122a inclined at 45°, which represents an interface between the solid and the air. For this purpose, the emitter $42_2$ is preferably of a collimated type, to obtain a highly concentrated emission in the direction of interest.

The optical surface 122a is preferably designed and inclined for bringing about a total reflection at the interface between the solid and the air, with an outgoing ray R1 at 90° with respect to the incident ray R. The interface surfaces between the element 122 and the corresponding part of the seat 130 are parallel to one another and orthogonal to the incident ray R1, and are provided with an appropriate surface finish. The ray R1 propagates without changing direction, neglecting the minor refraction that is generated by the small distance between the insert 120 and the seat 130.

With reference now to FIG. 110, the ray R1 then impinges upon the optical surface of interface between the seat 130 and the liquid solution, this surface being represented by the outer surface 130b of the seat 130. The optical surface 130b is designed and inclined in such a way that the ray R1 is refracted in the ray R2 within the liquid, towards the other optical surface of interface between the liquid and the seat 130, represented by the outer surface 130a of the seat 130. When the incident ray R2 reaches the second interface surface 130a, as a result of refraction it is transformed into the ray R3 through the corresponding wall of the seat 130.

Also considering FIG. 111, the ray R3 passes from the inside of the seat 130 to the insert 120, and in particular to its element 123. The two interface surfaces, namely the interface between the plastic material (seat 130) and the air and the interface between the air and the plastic material (element 123), are parallel to one another and orthogonal to the incident ray R3 so that the ray does not undergo any deflection, once again assuming the small distance in air as being negligible. The ray R3 impinges upon the optical surface 123a inclined at 45° of the element 123, being transformed into the ray R4 that is totally reflected towards the receiver $44_a$.

The ray R4 impinges upon the linear or two-dimensional array of the receiver $44_2$ and will light up a given pixel: in this way, to a given concentration Conc 1 of the liquid solution there will be associated a given pixel lit up, and hence a signal generated by the receiver $44_2$. In the case where the ray R4 lights up a number of neighbouring pixels, it will be possible to process the signal to define a corresponding mean pixel or mean point; alternatively, a different light intensity associated to each pixel could be detected, considering the highest pixel value as corresponding to the central point of the optical beam.

In the case of a different concentration Conc 2 of the liquid solution, the refractive index of the solution itself changes: hence, if the angle of incidence of the ray R1 at the interface surface is kept fixed, the angle of the ray R2, and consequently that of the ray R3, corresponding to the case of the concentration Conc 1, will be modified, in the case of the concentration Conc 2, as represented in FIG. 110 by the rays R2' and R3'. As in the case represented in FIG. 111, the ray R3' will be transformed into another ray, similar to the ray R4, which will impinge orthogonally upon the receiver $44_2$, but in a point different from the ray R4, and consequently will light up a pixel different from the previous one (the pixel that was previously lit up with the concentration Conc 1 will be instead be off). In the case where the ray R4 lights up a number of neighbouring pixels, it will be possible to detect the various pixels and/or the corresponding signal intensity and to calculate the corresponding mean pixel or mean point. The variation of lighting within the linear or two-dimensional array of pixels enables identification of the precise position of the incident ray on the receiver $44_2$: in this way, it will be possible to associate to each variation of lighting on the pixels of the linear or two-dimensional array a given value that is representative of the concentration of the liquid solution.

From the foregoing description the characteristics of the present invention emerge clearly, as likewise do its advantages.

It is clear that for the person skilled in the art numerous variations may be made to the level-sensing device described by way of example, without thereby departing from the scope of the invention as defined in the ensuing claims.

The presence of an auxiliary or reference arrangement, aimed at detection of at least one characteristic of a plastic material of the body of the device, which for example vary following upon ageing or conditions of use, it is to be understood as autonomously inventive, i.e., not necessarily linked to the presence of a main optical-sensing arrangement, such as the ones including the emitters 42, $42_2$ and the receivers 44, $44_2$, or else linked to the presence of a level-sensing arrangement and/or a temperature-sensing arrangement.

Such an auxiliary or reference arrangement for detecting the characteristics of the material of a body of the device 10 may be of an optical type, for example of the type previously exemplified with reference to the emitters $42_1$ and to the receivers $44_1$ (FIGS. 84-89 and FIGS. 90-99), or else of some other type designed for the purpose, such as an arrangement that detects the variations of capacitance and/or impedance or of thermal conductivity and/or resistance of the material of a body (such as the body 10a, 14), for example for compensating the level sensing made by a level sensor of a capacitive type and/or by a temperature sensor.

As has been explained, the detections that can be made by the aforesaid auxiliary arrangement supply information on the state of a material of the body of the device, in particular of a material that is transparent or permeable to optical radiation. Information of this type is useful for the purposes of compensation of detections made using level sensors and/or temperature sensors, when these detections are made in an indirect way, i.e., in the presence of a wall (such as a wall of the casing 14) set between the sensing means (such as the electrodes J and/or at least one of the temperature sensors 19a and 19b) and the fluid (the substance or the ambient air) that is undergoing level sensing and/or temperature sensing.

It will be appreciated, for example, that ageing of the material of the aforesaid interposed wall and/or the thermal stresses undergone by this material may cause variations of the corresponding dielectric characteristics and/or characteristics of electrical conductivity, which may adversely affect the precision of level sensing, for example when this is of a capacitive type. Likewise, the aforesaid ageing and/or thermal stresses may cause a variation of the characteristics of thermal conductivity of the material in question, with consequent adverse effects on the precision of detection of temperature of the substance or of the environment inside the tank 1. For this purpose, there could be envisaged a reference arrangement of a thermal type, for example comprising at least one electric heater and one temperature sensor, associated to different points of one and the same reference wall, or else there could be provided a reference arrangement designed to detect at least a capacitance, and/or a impedance, and/or an electrical resistance, which for example comprises at least two electrical conductors or electrodes associated to different points of one and the same reference wall.

Consequently, according to possible embodiments, the auxiliary or reference arrangement may even be provided with level-sensing devices that are without an optical arrangement for detection of characteristics of the liquid substance, for example level sensors of a capacitive type or ones based upon variations of impedance, where the sensing electrodes are isolated from the fluid via a wall (e.g., of the type described in the aforementioned documents Nos. PCT/M2015/054020, PCT/IB2015/057036, and PCT/IB2015/057043).

For applications of this type, the control electronics of the sensor device is appropriately provided for compensating the detections made as a function of information acquired via the auxiliary arrangement and hence indicative of possible variations of characteristics of the material in question. For this purpose, for example, in storage means of the control electronics there may be encoded corresponding information, for example in tabular form and based upon empirical investigations, aimed at expressing the correlation existing between the reference properties of the plastic material considered (such as an optical property, in particular its refractive index) and other properties thereof that affect a measurement for which the sensor device is designed (such as dielectric properties and/or properties of electrical and/or thermal conductivity). This information will be used by the control electronics, in particular by an electronic controller, for making the necessary compensations in the course of the aforesaid measurement, for example in the level-sensing step and/or in the temperature-sensing step.

Obviously, the auxiliary or reference arrangement may be provided in any suitable position of the body of the sensor device that mounts it, provided that—in the case of an optical reference arrangement of the type described—set between the corresponding emitter and receiver is a part made of the same plastic material as the one the characteristics of which are to be monitored.

As mentioned previously, the modalities for obtaining the supporting and electrical-connection structure of an optical module provided according to the invention may be different and comprise, for example, overmoulding or coupling of one or more bodies of the structure on a flexible circuit support.

FIGS. 112-116 illustrate an example of a possible mode of implementation of an optical module, substantially of the type illustrated in FIGS. 37-38, based upon overmoulding. In these figures the same reference numbers as those of the previous figures are used to designate elements that are technically equivalent to the ones already described above.

Figure 112:
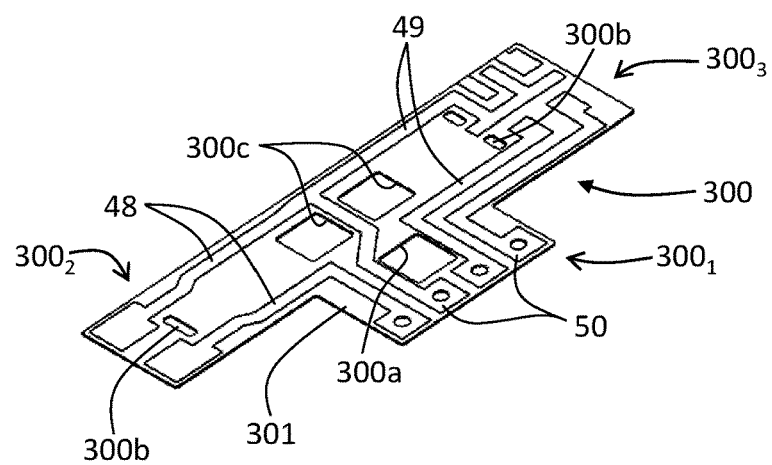
FIG. 112 is a schematic perspective view of an electrical-connection element, in the form of flexible printed-circuit board, which can be used for producing optical modules according to embodiments of the invention.

In FIG. 112, designated as a whole by 300 is a flexible circuit support or PCB, which integrates electrical-connection elements and, preferably, also connection terminals. For this purpose, the circuit support 300 comprises a substantially film-like insulating substrate 301, for example made of at least one polymer, such as a polyamide, or Kapton®, or liquid-crystal polymers (LCPs), or a polyethylene (PE), such as a polyethylene naphthalate (PEN) or a polyethylene terephthalate (PET). The substrate 301 is provided with electrically conductive paths, for example made of metal or a metal alloy or a polymer with addition of electrically conductive fillers, which form the conductors 48 and 49 and preferably also the terminals 50.

Identified in the circuit support 300 are a central part $300_1$ and two lateral parts $300_2$, $300_3$. Located at the distal-end portions of the lateral parts $300_2$ and $300_3$ are the ends of the conductive paths 48, 49 that are to be connected to the optical emitter and receiver, the ends of the paths preferably being in the form of pads (not represented). Preferentially, the opposite ends of the paths 48, 49 are located, instead, at the central part $300_1$ of the circuit support 300, in particular in the proximity of an edge thereof, to provide the terminals 50. In the example, these terminals are constituted by pads having a central opening, which is coaxial with corresponding through holes provided in the substrate 301.

In the cases where the optical module must be provided with a positioning opening similar to the one designated by 45a in FIGS. 36-37, the substrate 301 has a corresponding through opening 300a. In other embodiments, in which the aforesaid positioning opening is not necessary, the opening 300a may be omitted. In preferred embodiments, the substrate 301 of the circuit support 300 may in any case present one or more passages, some of which are designated by 300b and 300c, through which part of the insulating material of supporting and/or positioning bodies, which, as will be seen, are overmoulded on the circuit support 300, is to penetrate and solidify. Preferentially, at least one opening 300b is provided in each distal end region of the lateral parts $300_2$, $300_3$ of the circuit support 300, as well as two openings 300c at the central part $300_1$, which are necessary also for providing suitable openings in the central body of the electrical supporting and connection structure.

In various embodiments, overmoulded on the circuit support 300 are one or more bodies designed to perform the functions of the bodies previously designated by 45, 46, and 47. FIGS. 113 and 114 exemplify the case of a supporting and/or electrical-connection structure $41_4$, which includes the three aforesaid bodies 45, 46, and 47, which are overmoulded in respective regions of the circuit support 300, and in particular at the central part $300_1$ and on the distal end regions of the lateral parts $300_2$, $300_3$. For this purpose, as may be seen in FIG. 112, the circuit support 300 is set in a suitable mould, having the impressions necessary for definition of the profiles of the bodies 45-47 (e.g., a mould substantially similar to that of FIG. 15, with appropriate impressions), injected in which is then the electrically insulating material necessary for formation of the bodies themselves, for example a polymer or a thermoplastic material. The aforesaid bodies can hence be moulded so as to present the elements that have already been described previously: for example, at the central part $300_1$, there may be defined the arrest projections 45b, as well as the upper formation 51 and lower formation 52, with the corresponding through openings 51a, whereas at the lateral parts $300_2$, $300_3$ there may be defined the seats 46a, 47a and the appendages 46b and 47b. In the course of moulding, the presence of the passages 300b, 300c of the substrate $300_1$ (FIG. 112) enables the necessary flow of the injected material also towards the face of the circuit support 300 opposite to the point of injection of the material and/or ensures—after solidification of the material—a solid fixing of the bodies themselves on the circuit support 300. In various embodiments, such as the one represented, the passages 300c are also necessary for the purposes of definition of the through openings 51a. Preferentially, in various embodiments, for the purposes of fixing of at least one of the bodies 45, 46, 47 to the circuit support 300, moulded material is provided in the passages 300b, 300c and on at least a portion of both of the faces of the circuit support 300, and/or moulded material is provided along at least part of the edges of the circuit board 300 and on at least a portion of both of the faces of the circuit support 300.

Preferably, the lateral bodies 44 and 47 are overmoulded on the circuit support 300 so as to present, at the corresponding lower faces, at least one passage, designated by 46e and 47e in FIG. 114, in order to leave exposed corresponding regions of the circuit support 300 necessary for positioning and electrical connection of the emitter and of the receiver of the optical module. In the case of terminals 50 of the type exemplified herein, it is moreover preferable also for the lower face of the body 45 to be moulded so as to define passages that will leave also the terminals themselves at least partially exposed, as is clearly visible in FIG. 114, for example to facilitate subsequent operations of soldering of the wires or electrical connectors of the optical module.

After extraction from the mould, the structure $41_4$ is as represented in FIGS. 113 and 114, and there can be mounted thereon the emitter 42 and the receiver 44a, 44b, as may be seen in FIG. 115, which are connected to the respective conductive paths 48 and 49, respectively, in order to obtain an optical module, designated as a whole by $40_4$. The module $40_4$ may then be mounted at the corresponding optical site of the body of the device, substantially with the modalities described previously. In an embodiment of this sort, between the lateral bodies 46, 47 and the central body 45 there remain exposed respective portions of the circuit support 300, designated by 301a only in FIG. 116, which is as a whole flexible and/or deformable. By exploiting the flexibility and/or deformability of these portions 301a of the circuit support 300, the lateral bodies 46, 47—and hence the emitter and the receiver—may assume the correct position with respect to the corresponding optical surfaces of the site (such as the surfaces 33a, 34a, visible in FIG. 19), as explained previously, for example as a result of the thrust exerted by the blocking and/or positioning member used (such as a member of the type designated by 60 in FIG. 20).

Of course, the bodies 45-47 could have a configuration different from the one exemplified and be overmoulded so as to define also thin connection portions, or in any case elastically deformable portions, which extend between the lateral bodies 46, 47 and the central body.

In further embodiments of the invention, one or more distinct positioning and/or supporting bodies is/are associated to a circuit support. An embodiment of this type is exemplified in FIGS. 117-119, where the same reference numbers as those of the previous figures are used to designate elements that are technically equivalent to the ones already described above.

With initial reference to FIGS. 117 and 118, in various embodiments a flexible circuit support 300 is used for the purpose, for example of the type already described with reference to FIGS. 112-115, integrating the conductors 48, 49 and the terminals 50 in the form of electrically conductive paths.

Designated as a whole by 41' is a single body in which three upper half-bodies are identified, and in particular a central half-body, designated by 45', and two lateral half-bodies, designated by 46' and 47', which are to provide an upper portion of the supporting and/or positioning bodies designated hereinafter by 45, 46, and 47. In the example, the lateral half-bodies 46' and 47' are joined to the central body via at least one connection portion 160, preferably having a relatively thin and/or flexible configuration. The upper faces of the three half-bodies 45'-47' are formed so as to define the necessary functional elements. For instance, with reference to FIG. 117, the half-body 45' defines the arrest projections 45b, the upper formation 51, and the holes 50₂, as well as respective parts of the through openings, here designated by 45a' and 51a'. The half-bodies 46' and 47' define, instead, the corresponding seats 46a, 47a and appendages 46b, 47b.

Designated, instead, by 45", 46" and 47" are three lower half-bodies, which are distinct from one another, which are to provide a lower portion of the supporting and/or positioning bodies designated hereinafter by 45, 46, and 47. In this perspective, as is for example visible in FIG. 118, the lower half-body 45" defines the formation 52, as well as respective parts 45a" and 51a" of the necessary through openings, as well as openings 170 in order to leave part of the terminals 50 exposed. The lower lateral half-bodies 46" and 47" are instead configured substantially in the form of frames, each defining a respective passage 46e and 47e.

In various embodiments, the aforesaid supporting and/or positioning bodies, i.e., the half-bodies 45'-47' and 45" and 46" that form them, are made of a polymer, such as a thermoplastic or thermosetting material or a resin. Preferably, the material used is of a relatively rigid type, in particular if moulded with a relatively large thickness, for example a thickness at least locally greater than 1 mm, in order to guarantee the necessary supporting and/or positioning functions. The connection portions 160 may be made of the same material and may be provided with articulated joints or hinges, or else—as in the case exemplified—may be substantially in the form of a lamina, or in any case with relatively small dimensions (such as a thickness of less than 1 mm) in order to guarantee proper flexibility. Alternatively, the half-bodies 45'-47" (and possibly the half-bodies 45"-47") may be made of a relatively rigid polymer and be comoulded or overmoulded on or associated to connection portions 160 made, instead, of another, flexible, material.

In various embodiments, the half-bodies 45'-47' and the half-bodies 45"-47" are provided with mutual-coupling means, for example snap-action coupling means and/or slot-fit and/or interference-fit means. In the case exemplified, for instance, provided at the lower faces of the half-bodies 45'-47' are projections 180 or seats 190, which are to couple with corresponding seats 190 and projections 180 provided at the upper faces of the half-bodies 45"-47". In various embodiments, the aforesaid seats 190 are through seats, but in other possible embodiments they may be blind seats. As has been said, preferentially, the projections 180 may be coupled by snap-action in the corresponding seats 190. It is also possible to provide further mutual-positioning elements, such as seats 200 defined at the upper face of the half-body 45" (FIG. 117), which are to receive corresponding projections 210 defined on the lower face of the half-body 45' (FIG. 118), these seats and projections being designed to be located at the openings 300c of the substrate 300₁ (FIG. 117). The projections 210 and the seats 200 may also be provided on the half-bodies 46'-46" and 47'-47", in particular in positions corresponding to those of the openings 300b of the substrate 300₁, as may be seen, for example, in FIGS. 117 and 118.

Figure 118:
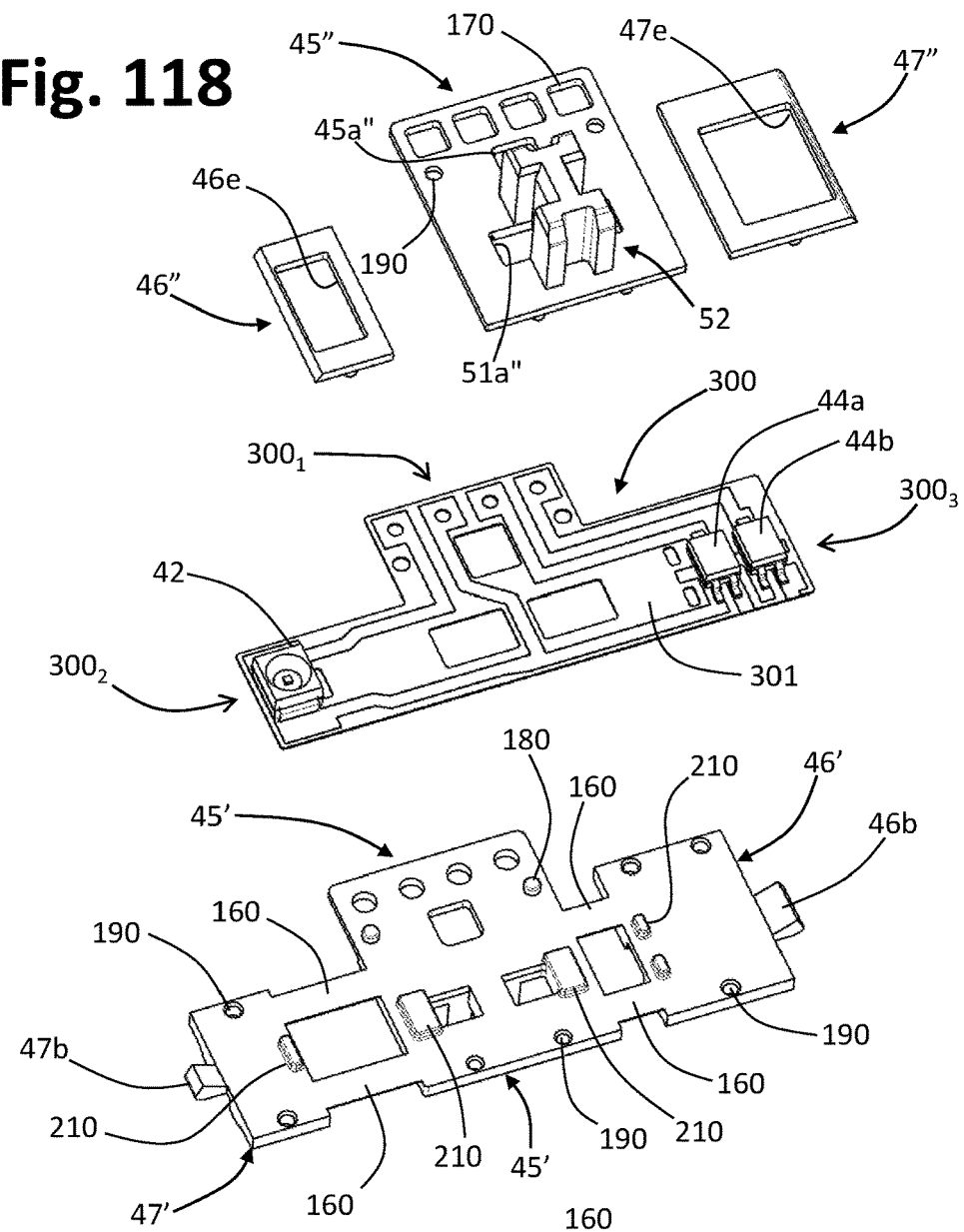

The half-bodies 45'-47'(i.e., the body 41') and the half-bodies 45"-47" may be moulded separately, being made, for example, of polymer, and then be coupled together, with interposition of the circuit support 300, on which there may previously be mounted the emitter 42 and the receiver 44a, 44b, as may be seen in FIG. 118. For instance, with reference to the case exemplified, the bottom face of the body 41' is set up against the upper face of the circuit support 300 so that the positioning projections 210, 210a penetrate through the openings 300b, 300c. On the other side, the upper faces of the half-bodies 45"-47" are set up against the lower face of the circuit support 300 so as to produce coupling between the projections 180, 210 and the corresponding seats 190, 200. The presence of the passages 46e, 47e of the lower half-bodies 46" and 47" enables pre-assembly of the emitter and of the receiver on the circuit support 300. As has been said, in the case exemplified, the projections 180 and the seats 190 are configured for snap-action coupling, but the type of coupling thereof—as well as their number and/or position—could be different.

Figure 119:
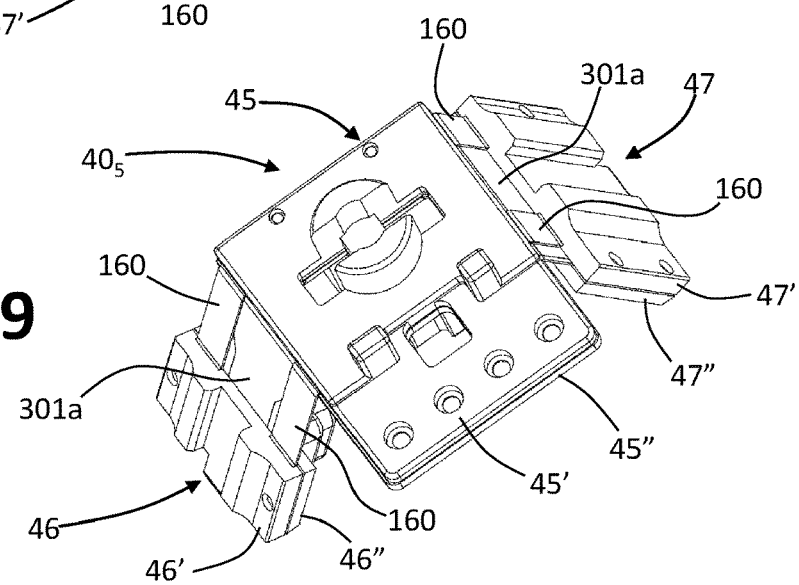
FIG. 119 is a schematic perspective view of an optical module including the structure of FIGS. 117-118.

Following upon coupling between the half-bodies 45'-47' and the half-bodies 45" and 47" the optical module is defined, the structure of which comprises the bodies 46 and 47, each of which is formed by the corresponding half-bodies 45'-45", 46'-46", and 47'-47", as may be seen in FIG. 119, where the module is designated as a whole by 40₅. Also in embodiments of this type, between the lateral bodies 46, 47 and the central body 45 there remain exposed respective portions 301a of the circuit support 300 that are flexible or deformable, as well as the intermediate body portions 160, which are also flexible or connected in an articulated way. By exploiting the flexibility of these portions 301a of the circuit support 300 and of the intermediate portions 160, the lateral bodies 45, 47—and hence the emitter and the receiver—can assume the right position with respect to the corresponding optical surfaces of the site (it should be noted, in this regard, that FIG. 119 simulates by way of example a condition in which the module is assembled), as a result of the thrust exerted by the blocking and/or positioning member used.

Obviously, instead of snap-action coupling means, and/or slot-fit means, and/or interference-fit means, the half-bodies 45'-47' and 45"-47" could be rendered fixed with respect to one another in some other way, with interposition of the circuit support 300, for example via gluing, or welding, or partial re-melting of the coupling means 180-210 themselves, if these are envisaged. It will moreover be appreciated that the presence of the intermediate connection portions 160, albeit advantageous from the production standpoint, in particular to facilitate handling, and possibly useful for the purposes of protection of the conductive paths of the circuit support 300, is not strictly indispensable for the purposes of implementation. On the other hand, where deemed preferable, also the half-bodies 45"-47" could be joined together to form a single body via intermediate flexible portions similar to the portions designated by 160. Intermediate connection portions of the same type as the ones designated by 160 could, on the other hand, also be envisaged in the case of embodiments of the same type as the ones described with reference to FIGS. 112-115, on the upper face and/or lower face of the circuit support 300, for example in the case where it is desired to provide the module with a protection for the conductive paths.

It will moreover be appreciated that a flexible circuit, for example of the same type as the one designated by 300, could also be provided with metal connection terminals 50 of a flexible type, for example of the type described with reference to FIG. 7-9 or 91-93, in particular in the case of overmoulding of the central body 45.

In possible variant embodiments, the body 41' may be moulded with the half-bodies 46' and 47' already in a configuration inclined with respect to the half-bodies 45', for example as in FIG. 119, in particular exploiting the presence of the intermediate body portions 160; possibly, for this purpose, also the half-bodies 45"-47" could be joined to the half-body 45" via intermediate body portions. Variants of this type may be applied also to the case of an overmoulded structure of the same type as those of FIGS. 112-116, in particular when the bodies 45-47 are joined together via intermediate body portions.

Obviously, optical modules of the types described with reference to FIGS. 112-116 and 117-119 may be used in all the embodiments described previously.

It will appear evident to a person skilled in the art that the individual characteristics described in relation to one embodiment may be used in other embodiments described herein. For instance, all the various embodiments described may be implemented according to the teachings provided in relation to the embodiment of FIGS. 72-78, i.e., with the closing or bottom structure 21 of the portion 12 that comprises at least one distinct part, associated in a sealed way to the body 10a and integrating a positioning site for an optical module. Likewise, the solution that envisages at least one emitter and at least one receiver of a reference optical radiation with interposition of a reference optical guide (such as the elements previously designated by 42$_1$, 44$_1$, 37$_2$, 35$_2$) may be implemented in all the embodiments.

In various embodiments, the closing or bottom structure of the body 10a could also include a portion of the peripheral wall 20 of the housing part 12 that projects towards the inside of the tank 1, or with the corresponding outer surface in contact with the liquid substance. In implementations of this type, the optical arrangement for detection of the quality and/or other characteristics of the substance could be associated to this projecting portion of the peripheral wall 20, which will be made of material transparent to the operating optical radiation of the optical sensor. For instance, with reference to the embodiment of FIGS. 100-111, the seat 130 could be defined at the aforesaid portion of the peripheral wall 20, with the latter shaped to define at least the surfaces 130a-130b (FIGS. 101 and 110).

In various embodiments, an optical formation or optical prism of the type previously designated by 31, integrating at least part of the characteristics indicated in the previous examples, at least in part transparent or permeable to optical radiation, is configured as a distinct or independent element that is mounted in a corresponding seat. For instance, the optical formation or prism 31, described with reference to FIGS. 72-78, could be a distinct element, like the shaped optical insert 120 of the example described with reference to FIGS. 100-111, whereas the corresponding seat 21c could have a bottom wall and/or walls that are transparent to optical radiation, like the seat 130.

As has been mentioned, a sensor device of the type described previously may be obtained by making appropriate structural modifications (for example, with a different angle α and/or using a different emitter and/or receiver), or else may be obtained in other embodiments and/or for other applications, and/or may be used for detecting characteristics of a fuel and/or for distinguishing mixtures of fuels, such as petrol-ethanol mixtures or diesel-biodiesel mixtures, or else for detecting possible contamination of a fuel.

As has been mentioned, a sensor device of the type described, comprising an optical sensor for detecting characteristics of a substance, may find use also in systems different from vehicles, which envisage internal-combustion or endothermal engines, such as electric generators.

The invention claimed is:

1. A sensor device for a container of a liquid substance, the sensor device comprising a body with a housing portion having a closing structure that includes an interface wall having an inner surface and an outer surface, wherein the housing portion is pre-arranged for being mounted at an opening of the container, in such a way that at least one portion of the outer surface of the interface wall faces the inside of the container so as to be in contact with the liquid substance, and the inner surface of the interface wall is isolated from the inside of the container, wherein a first arrangement for detection of the level of the liquid substance is associated to the body, the first arrangement including a level detection part configured to extend at least partially into the container, the level detection part including electrodes for detecting an electrical quantity representative of the level of the liquid substance, wherein a second arrangement for detection of at least one qualitative characteristic of the liquid substance which depends upon the composition thereof is associated to the interface wall and comprises at least one emitter and at least one receiver of a given optical radiation;

wherein at least one first portion of the interface wall is made of a material suitable for propagation of the given optical radiation, the at least one emitter and the at least one receiver being optically coupled to the inner surface of the interface wall;

wherein said first portion of the interface wall is shaped so as to contribute to propagation of the given optical radiation by refraction and/or reflection from the at least one emitter to the at least one receiver, in such a way that the given optical radiation is at least in part propagated through said first portion of the interface wall towards the at least one receiver, at an angle and/or with an intensity that are/is variable as a function of said at least one qualitative characteristic of the liquid substance;

and wherein the device moreover comprises a circuit arrangement configured for supplying first electrical signals, representing level detections made via the first arrangement for detection, and second electrical signal, representing qualitative detections made via the second arrangement for detection.

2. The sensor device according in claim 1, wherein the second arrangement for detection comprises an optical module, which includes a structure for support and electrical connection of the at least one emitter and of the at least one receiver, the structure for support and electrical connection comprising a module body which is configured as a part separate from the body of the sensor device, and wherein the module body defines a first body part and second body part which are set angled with respect to one another, the at least one emitter being mounted at the first body part and the at least one receiver being mounted at the second body part such that an axis of the at least one emitter and an axis of the at least one receiver intersect to form therebetween an angle greater than 90°, whereas the at least one emitter and the at least one receiver are arranged according to respective laying planes that form therebetween an angle smaller than 90°.

3. The sensor device according to claim 2, wherein the structure for support and electrical connection includes at least one of the following:

one or more bodies made of electrically insulating material overmoulded on connection elements made at least in part of electrically conductive material;

one or more bodies overmoulded on a flexible circuit support that comprises electrical-connection elements;

a plurality of distinct bodies connected together by means of electrical-connection elements;

a plurality of distinct bodies associated to a flexible circuit support that comprises electrical-connection elements;

a plurality of bodies moulded with electrically insulating polymeric material and electrical-connection elements moulded with electrically conductive material comprising a polymer;

a plurality of moulded bodies which are connected together and are able to vary a relative position thereof during assembly of the optical module on the device body.

4. The sensor device according in claim 1, wherein the inner surface of the interface wall is shaped at said first portion to define a positioning site for the at least one emitter and the at least one receiver, wherein the positioning site includes at least one projecting element which extends at the inner side of the interface wall towards the inside of the housing portion and which defines a first inclined surface and a second inclined surface, wherein the first inclined surface and the second inclined surface are inclined in opposite directions to identify therebetween an angle smaller than 90°, the at least one emitter facing the first inclined surface and the at least one receiver facing the second inclined surface, wherein the at least one emitter and the at least one receiver each have a respective axis and are set such that a plane passing through the axis of the at least one emitter intersect a plane passing through the axis of the second receiver to form therebetween an angle greater than 90°, wherein an angle of incidence of the given optical radiation emitted by the at least one emitter with respect to an interface region between the liquid substance and the outer side of the interface wall at said first portion is comprised between 50° and 70°, in such a way that the given optical radiation is reflected at said interface region at an angle which depends upon said at least one qualitative characteristic of the liquid substance.

5. The sensor device according in claim 4, wherein the second arrangement for detection comprises an optical module, which includes a structure for support and electrical connection of the at least one emitter and of the at least one receiver and which is configured as a part separate from the body of the sensor device, wherein the optical module comprises a module body that supports the at least one emitter and the at least one receiver and that is mounted at the positioning site, and wherein at said least one projecting element of the positioning site is coupled to a blocking and/or positioning member of the optical module, to secure the module body in position with the at least one emitter facing the first inclined surface and the at least one receiver facing the second inclined surface.

6. The sensor device according in claim 4, wherein the at least one projecting element comprises one or more optical elements for propagation of the given optical radiation selected from a single optical element defining the first inclined surface and the second inclined surface, or a pair of optical elements each defining a respective one of said first inclined surface and second inclined surface.

7. The sensor device according to claim 1, wherein the first arrangement for detection and the second arrangement for detection have a circuit support in common, the circuit support having an elongated body which defines:

a first portion which extends within the housing portion, the at least one emitter and the at least one receiver, or a corresponding optical module to which they belong, being electrically connected to or mechanically supported by the first portion of the elongated body; and a second longitudinally extended portion, which extends in a level sensing axis and carries said electrodes belonging to the first detection arrangement, wherein said electrodes comprise a plurality of electrodes each extending in a direction transverse to a length direction of said second longitudinally extended portion, the electrodes being set apart from one another along the level sensing axis.

8. The sensor device according in claim 7, wherein the second longitudinally extended portion of the elongated body of the circuit support is at least partially housed into a corresponding hollow casing that projects from the interface wall, and wherein the hollow casing is configured for isolating the plurality of electrodes from the liquid substance.

9. The sensor device according to claim 1, further comprising a shielding arrangement that includes at least one of:

a cavity defined in said first portion of the interface wall in an intermediate position between the first inclined surface and the second inclined surface, a shielding wall of an optical module to which the at least one emitter and the at least one receiver belong, the shielding wall being in an intermediate position between the at least one emitter and the at least one receiver, a space filter, mounted in front of the at least one emitter and configured for selecting or concentrating a light beam generated by the at least one emitter, an optical shield set into the housing portion and having a body made of a material which limits or prevent passage of ambient lights towards the at least one emitter and the at least one receiver.

10. The sensor device according to claim 1, wherein the body of the sensor device comprises:

a first body part, which defines the housing portion and have a first region from which said level detection part of the first arrangement for detection extends, the first body part being provided with a through opening defined in a lateral position with respect to said first region, and a second body part mounted at said through opening, the second body part including said first portion of the interface wall made of material suitable for propagation of the given optical radiation.

11. The sensor device according to claim 10, wherein:

the first body part defines a respective portion of the interface wall, which is provided with said through opening, and the second body part comprises a body of an optical assembly belonging to the second arrangement for detection, which is set at said through opening and defines a respective portion of the interface wall;

the body of the optical assembly includes said first portion made of material suitable for propagation of the given optical radiation and has an inner surface and an outer surface that form part of the inner surface and of the outer surface of the interface wall, respectively; and the at least one emitter and the at least one receiver are optically coupled to the inner surface of the body of the optical assembly.

12. The sensor device according to claim 1, wherein the outer surface of the interface wall is shaped, at said first portion, to define a generally projecting U-shaped optical guide, the U-shaped optical guide having a first end and a second end set apart from one another and associated to, or defined by, respective areas of said inner surface of the interface wall, and wherein the at least one emitter faces the first end and the at least one receiver faces the second end, such that the given optical radiation emitted by the at least one emitter is reflected and refracted into the U-shaped optical guide to reach the at least one receiver with an intensity which depends upon said at least one qualitative characteristic of the liquid substance.

13. The device according to claim 1, wherein:

the interface wall is shaped, at said first portion, to define a housing seat for an optical insert belonging to said second arrangement for detection;

the at least one receiver includes a linear or two-dimensional array of photodetectors;

the housing seat is defined by a generally projecting hollow formation of the interface wall, having an inner surface and an outer surface that form part of the inner surface and of the outer surface of the interface wall, respectively, the housing portion being designed to extend into the container up to a smaller height than the level detection part of the first arrangement for detection;

the optical insert has a shaped body made at least in part of a material suitable for propagation of the given optical radiation, with projecting portions of its outer surface that face corresponding portions of the inner surface of the housing seat, said projecting portions including a first light transmission portion and a second light transmission portions, which are set parallel and spaced apart from one another, the first and second light transmission portions each having a distal end defining an inclined surface;

the at least one emitter and the at least one receiver face respective regions of the optical insert in positions corresponding to a proximal end of the first and second light transmission portions, respectively; and the housing seat and the optical insert are shaped in such a way that the given optical radiation propagates from the at least one emitter to the at least one receiver through the first and second light transmission portions, through at least one peripheral wall of the housing seat, and also through the liquid substance in contact with said peripheral wall, while being reflected at the inclined surface of the first and second light transmission portions, in such a way that the given optical radiation reaches the linear or two-dimensional array of photodetectors at a point thereof which depends upon said at least one qualitative characteristic of the liquid substance.

14. The sensor device according to claim 1, further comprising at least one of:

an electrical heater, for heating the container and/or a content thereof; or a third arrangement for detection of a temperature, the third arrangement for detection comprising at least one temperature sensor for detection of at least one from among a temperature of the liquid substance contained in the container, a temperature of an internal environment of the container, and a temperature within the housing portion.

15. The sensor device according to claim 1, further comprising an auxiliary arrangement for detecting an optical property of a material of the body of the device suitable for propagation of the given optical radiation, the auxiliary arrangement comprising an emitter and a receiver of a reference optical radiation and at least one reference optical guide made of material suitable for propagation of the given optical radiation, wherein the emitter and the receiver of the reference optical radiation face respective generally opposite ends of the reference optical guide, the reference optical guide being shaped for causing propagation of the reference optical radiation from the corresponding emitter to the corresponding receiver, and wherein the reference optical guide comprises at least one element of the body of the sensor device that projects towards the inside of the housing portion.

16. The sensor device according to claim 1, wherein the circuit arrangement comprises a control circuit prearranged for transmitting said first electrical signals and said second electrical signals by means of one and the same electrical connection device of the sensor device.

17. The sensor device according to claim 1, wherein the first detection arrangement, the second detection arrangement and the circuit arrangement share:

a circuit support;

electrical and/or electronic control components mounted on said circuit support; and an electrical-connection arrangement, comprising a connector.

18. The sensor device according to claim 1, wherein the at least one receiver comprises a first receiver and a second receiver, and wherein the circuit arrangement is configured for detecting, based on output electrical signals of the first receiver and the second receiver, a possible variation of a critical angle of the given optical radiation which is representative of a variation in composition or concentration of the liquid substance.

19. A sensor device for a container of a liquid substance, the sensor device comprising a body prearranged for assembly on the container, there being associated to the body a first optical arrangement, comprising at least one first emitter and at least one first receiver of a first optical radiation and at least one of an arrangement for detection of a level of the liquid substance and an arrangement for detection of a temperature, the first optical arrangement being provided for detection of at least one characteristic of the liquid substance, wherein further associated to the body of the device is a second optical arrangement, comprising a second emitter and a second receiver of a second optical radiation, the second optical arrangement being configured for detecting an optical property of one of a material of the body of the sensor device being transparent to optical radiation, or a material of an optical prism belonging to the first optical arrangement, or a material of an optical guide belonging to or associated with the body of the sensor device, the second optical arrangement being operable to supply an electrical signal which varies in function of possible variations of said optical property of said material.

20. A sensor device for a container of a liquid substance, the sensor device comprising a body with a housing portion having a closing structure that includes an interface wall having an inner surface and an outer surface, wherein the housing portion is pre-arranged for being mounted at an opening of a wall of the container, in such a way that at least one portion of the outer surface of the interface wall faces the inside of the container so as to be in contact with the liquid substance, and the inner surface of the interface wall is isolated from the inside of the container, wherein a first arrangement for detection of the level of the liquid substance is associated to the body, the first arrangement including a level detection part configured to extend at least partially into the container, the level detection part including a circuit support that extend longitudinally in a level sensing axis and carries a plurality of electrodes for detecting a capacitance value representative of the level of the liquid substance, the electrodes extending in a direction transverse to a length direction of the circuit support and being spaced from one another along the level sensing axis, wherein a second arrangement for detection of one of a composition or a concentration of the liquid substance is associated to the inner surface of the interface wall and comprises at least one emitter and at least one receiver of a given optical radiation;

wherein at least one first portion of the interface wall is made of a material suitable for propagation of the given optical radiation, the at least one emitter and the at least one receiver being optically coupled to the inner surface of the interface wall;

wherein said first portion of the interface wall is shaped so as to contribute to propagation of the given optical radiation by refraction and/or reflection from the at least one emitter to the at least one receiver, in such a way that the given optical radiation is at least in part propagated through said first portion of the interface wall towards the at least one receiver, at an angle that is variable as a function of the composition or the concentration of the liquid substance, wherein the inner surface of the interface wall is shaped at said first portion to define a positioning site for the at least one emitter and the at least one receiver, wherein the positioning site includes at least one projecting element which extends at the inner side of the interface wall towards the inside of the housing portion and which defines a first inclined surface and a second inclined surface, wherein the first surface and the second surface are inclined in opposite directions to identify therebetween an angle smaller than 90°, the at least one emitter facing the first inclined surface and the at least one receiver facing the second inclined surface, wherein the at least one emitter and the at least one receiver each have a respective axis and are set such that a plane passing through the axis of the at least one emitter and a plane passing through the axis of the at least one receiver form between them an angle greater than 90°, wherein an angle of incidence of the given optical radiation emitted by the at least one emitter with respect to an interface region between the outer side of the interface wall at said first portion and the liquid substance is comprised between 50° and 70°, in such a way that the given optical radiation is reflected at said interface region at an angle which depends upon the composition or the concentration of the liquid substance;

and wherein the device moreover comprises a circuit arrangement configured for transmitting first electrical signals representing level detections made via the first arrangement for detection, and second electrical signals representing qualitative detections made via the second arrangement for detection.

* * * * *